US012748876B2

(12) United States Patent
Rolle et al.

(10) Patent No.: US 12,748,876 B2
(45) **Date of Patent: *Sep. 29, 2026**

(54) PROXY AND VETO SERVICES IN DATA PRIVACY INTEGRATION SCENARIOS

(71) Applicant: SAP SE, Walldorf (DE)

(72) Inventors: Benny Rolle, Reinhardshagen (DE); Ufuoma Ighoroje, Schönefeld (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 136 days.

This patent is subject to a terminal disclaimer.

(21) Appl. No.: 18/772,470

(22) Filed: Jul. 15, 2024

(65) Prior Publication Data

US 2024/0370582 A1 Nov. 7, 2024

Related U.S. Application Data

(63) Continuation of application No. 17/702,013, filed on Mar. 23, 2022, now Pat. No. 12,067,139, which is a (Continued)

(51) Int. Cl.
*G06F 21/62* (2013.01)
*G06F 16/903* (2019.01)

(52) U.S. Cl.
CPC .... *G06F 21/6218* (2013.01); *G06F 16/90335* (2019.01)

(58) Field of Classification Search
CPC ............ G06F 21/6218; G06F 21/6245; G06F 16/90335; G06F 17/27; G06F 17/30; G06F 17/60; G06F 2/00; G06Q 50/24
See application file for complete search history.

(56) References Cited

U.S. PATENT DOCUMENTS

| | | | |
|---|---|---|---|
| 17,186 | A | 5/1857 | Atwater |
| 17,457 | A | 6/1857 | Tidgewell |

(Continued)

FOREIGN PATENT DOCUMENTS

| | | |
|---|---|---|
| CA | 2922139 | 11/2021 |
| CA | 3096061 | 4/2023 |

(Continued)

OTHER PUBLICATIONS

U.S. Appl. No. 17/186,934, Rolle et al., filed Feb. 26, 2021.

(Continued)

*Primary Examiner* — Alina A Boutah
(74) *Attorney, Agent, or Firm* — Fish & Richardson P.C.

(57) ABSTRACT

The present disclosure involves systems, software, and computer implemented methods for integrated data privacy services. An example method includes determining to initiate an integrated end of purpose protocol for an object. An end-of-purpose query is provided to multiple applications that requests each application to determine whether the application is able to block the object. End-of-purpose statuses are received, in response to the end-of-purpose query, that each indicate whether a respective application is able to block the object. The end-of-purpose statuses are evaluated to determine whether an aligned end of purpose has been reached for the object. In response to determining that the aligned end of purpose has been reached for the object, a block command is provided to each application that instructs the application to locally block the object in the application.

20 Claims, 79 Drawing Sheets

Related U.S. Application Data continuation of application No. 17/457,797, filed on Dec. 6, 2021, now Pat. No. 12,072,993, and a continuation of application No. 17/457,827, filed on Dec. 6, 2021, now Pat. No. 12,079,358, and a continuation of application No. 17/457,802, filed on Dec. 6, 2021, now Pat. No. 12,210,897, and a continuation of application No. 17/457,811, filed on Dec. 6, 2021, now Pat. No. 12,164,470, and a continuation of application No. 17/457,816, filed on Dec. 6, 2021, now Pat. No. 12,056,254, and a continuation of application No. 17/457,824, filed on Dec. 6, 2021, now Pat. No. 12,086,279.

(56) References Cited

U.S. PATENT DOCUMENTS 7,308,704 B2 12/2007 Vogel et al.
7,350,237 B2 3/2008 Vogel et al.
7,685,605 B1 3/2010 Ahmed et al.
7,831,567 B2 11/2010 Luther et al.
8,484,351 B1 7/2013 Dean et al.
8,566,193 B2 10/2013 Singh et al.
9,405,429 B1 8/2016 Gopalakrishnan
9,703,813 B2 7/2017 Hegde et al.
9,836,366 B2 * 12/2017 Schatz ................ G06F 11/2046
9,904,796 B2 * 2/2018 Pluder ................. G06F 21/6236
10,387,810 B1 8/2019 Kalush et al.
10,409,790 B2 9/2019 Lehnert et al.
10,430,413 B2 10/2019 Christoph et al.
10,552,642 B2 2/2020 Rolle et al.
10,642,805 B1 5/2020 Masse
10,754,932 B2 8/2020 Wiederspohn et al.
10,776,254 B1 * 9/2020 Dhayanithi ......... G06F 11/3698
10,812,608 B1 10/2020 Thummala Abbigari et al.
10,839,099 B2 11/2020 Vogel et al.
10,909,222 B1 2/2021 Fregly et al.
11,042,654 B2 6/2021 Nos et al.
11,113,417 B2 9/2021 Rolle
11,146,560 B1 * 10/2021 Nene ................... G06F 16/2365
11,200,331 B1 12/2021 Bouaichi et al.
11,463,416 B1 10/2022 Ashman et al.
11,615,059 B2 3/2023 Kottomtharayil et al.
11,630,673 B2 4/2023 Grant
11,675,651 B2 6/2023 Li et al.
11,720,367 B2 8/2023 Wallach
11,765,045 B1 9/2023 Nguyen et al.
11,899,655 B2 2/2024 Malik et al.
11,921,905 B2 3/2024 Savagaonkar et al.
11,941,151 B2 3/2024 Mendoza et al.
11,947,662 B2 4/2024 Gingell et al.
11,962,576 B2 4/2024 Sapek et al.
11,994,966 B2 5/2024 Anthonappa et al.
12,045,242 B2 7/2024 Srivastava et al.
12,056,255 B1 8/2024 Mystetskyi et al.
12,067,139 B2 * 8/2024 Rolle .................. G06F 21/6245
12,141,302 B2 11/2024 Rolle et al.
12,147,567 B2 11/2024 Rolle et al.
12,164,470 B2 12/2024 Rolle et al.
12,184,656 B2 12/2024 Rolle et al.
12,189,813 B2 1/2025 Rolle et al.
12,210,897 B2 1/2025 Rolle et al.
12,306,996 B2 5/2025 Rolle et al.
12,417,294 B2 9/2025 Vogel et al.
12,499,263 B2 * 12/2025 Vogel .................. G06F 21/6218
2004/0187047 A1 9/2004 Rathunde et al.
2007/0089117 A1 4/2007 Samson
2008/0060051 A1 3/2008 Lim
2008/0091807 A1 4/2008 Strub et al.
2008/0174425 A1 7/2008 Torning
2008/0244016 A1 10/2008 Parthasarathy et al.
2008/0301175 A1 12/2008 Applebaum et al.
2008/0312982 A1 12/2008 Braun et al.
2009/0210394 A1 8/2009 Saravanan et al.
2009/0228340 A1 9/2009 Bohannon
2010/0138500 A1 6/2010 Consul et al.
2012/0036507 A1 2/2012 Jonnala et al.
2012/0221444 A1 8/2012 Bowes et al.
2013/0066977 A1 3/2013 Katti et al.
2013/0132696 A1 5/2013 Tomida et al.
2013/0347064 A1 12/2013 Aissi
2014/0032600 A1 1/2014 Sarferaz et al.
2014/0059458 A1 2/2014 Levien et al.
2014/0082753 A1 3/2014 Sarferaz
2014/0109238 A1 4/2014 Ravindran
2014/0188572 A1 7/2014 Hegde et al.
2014/0267770 A1 9/2014 Gervautz et al.
2015/0242531 A1 8/2015 Rodniansky
2016/0132696 A1 * 5/2016 Vidhani ................. G06Q 30/00
726/28
2016/0148143 A1 5/2016 Anderson et al.
2016/0292455 A1 10/2016 Jebara
2017/0006135 A1 1/2017 Siebel et al.
2017/0034192 A1 2/2017 Schulman et al.
2017/0091479 A1 3/2017 Pluder et al.
2018/0101164 A1 4/2018 Noetzelmann et al.
2018/0113811 A1 4/2018 Xing
2018/0176301 A1 * 6/2018 Rosier ..................... H04L 41/22
2018/0322279 A1 11/2018 Beskorovajnov et al.
2019/0018985 A1 1/2019 Rolle et al.
2019/0132276 A1 5/2019 Scheiber et al.
2019/0156445 A1 5/2019 Markham et al.
2019/0236294 A1 8/2019 McDonald et al.
2019/0236334 A1 8/2019 Babushkin
2020/0019728 A1 1/2020 Rolle
2020/0133554 A1 4/2020 Kishi et al.
2020/0167699 A1 5/2020 Cohen
2020/0285766 A1 9/2020 Jois et al.
2020/0293356 A1 9/2020 Bonaud et al.
2020/0380810 A1 * 12/2020 Unagami .............. H04L 63/123
2021/0089678 A1 3/2021 Gkoulalas-Divanis et al.
2021/0192052 A1 6/2021 Loch et al.
2021/0209251 A1 7/2021 Parthasarathy
2022/0043917 A1 2/2022 Rolle
2022/0050834 A1 2/2022 Rolle et al.
2022/0050920 A1 2/2022 Rolle
2022/0058333 A1 2/2022 Rolle
2022/0083513 A1 3/2022 Wong et al.
2022/0100755 A1 3/2022 Rolle
2022/0207429 A1 6/2022 Haribhakti et al.
2022/0277023 A1 9/2022 Rolle et al.
2022/0300837 A1 9/2022 Shmelkin et al.
2022/0309052 A1 9/2022 Rolle
2022/0321566 A1 10/2022 Coyle et al.
2022/0374339 A1 11/2022 Brown
2023/0081785 A1 3/2023 Zhang
2023/0111687 A1 4/2023 Mclean et al.
2023/0177180 A1 * 6/2023 Rolle .................... G06F 21/604
726/27
2023/0177182 A1 6/2023 Rolle et al.
2023/0177183 A1 6/2023 Rolle et al.
2023/0177194 A1 6/2023 Rolle et al.
2023/0177206 A1 * 6/2023 Rolle .................. G06F 16/2365
726/31
2023/0177213 A1 6/2023 Rolle et al.
2023/0179602 A1 6/2023 Rolle et al.
2023/0237192 A1 7/2023 Kahan et al.
2023/0244637 A1 8/2023 Wu
2023/0262094 A1 8/2023 Patnaikuni et al.
2023/0379276 A1 11/2023 Roy et al.
2024/0005037 A1 1/2024 Chintalapati et al.
2024/0031373 A1 * 1/2024 Gupta ................... H04L 9/3255
2024/0346167 A1 10/2024 Vogel et al.
2025/0117245 A1 4/2025 Rolle et al.

FOREIGN PATENT DOCUMENTS

CN 108664805 10/2018
CN 112818372 5/2021
CN 113095348 7/2021
CN 113282864 8/2021
CN 114092253 2/2022
CN 115809259 3/2023
CN 116522389 8/2023

(56) References Cited

FOREIGN PATENT DOCUMENTS

| | | |
|---|---|---|
| EP | 1662355 | 5/2006 |
| EP | 3553689 | 10/2019 |
| EP | 3575983 | 12/2019 |
| GB | 2316509 | 2/1998 |
| KR | 10-2006-0004909 | 1/2006 |
| RU | 2459379 | 8/2012 |
| WO | WO 2012061433 | 5/2012 |
| WO | WO 2018170504 | 9/2018 |
| WO | WO 2018131031 | 7/2019 |
| WO | WO 2022211899 | 10/2022 |

OTHER PUBLICATIONS

U.S. Appl. No. 17/457,797, Ighoroje et al., filed Dec. 6, 2021.
U.S. Appl. No. 17/457,802, Rolle et al., filed Dec. 6, 2021.
U.S. Appl. No. 17/457,811, Rolle et al., filed Dec. 6, 2021.
U.S. Appl. No. 17/457,816, Vogel et al., filed Dec. 6, 2021.
U.S. Appl. No. 17/457,824, Vogel et al., filed Dec. 6, 2021.
U.S. Appl. No. 17/457,827, Ighoroje et al., filed Dec. 6, 2021.
U.S. Appl. No. 17/680,717, Rolle et al., filed Feb. 25, 2022.
U.S. Appl. No. 17/680,741, Rolle et al., filed Feb. 25, 2022.
U.S. Appl. No. 17/680,759, Rolle et al., filed Feb. 25, 2022.
U.S. Appl. No. 17/680,858, Rolle, filed Feb. 25, 2022.
U.S. Appl. No. 18/049,063, Hesse et al., filed Oct. 24, 2022.
U.S. Appl. No. 18/073,164, Rolle et al., filed Dec. 1, 2022.
U.S. Appl. No. 18/074,745, Vogel et al., filed Dec. 5, 2022.
U.S. Appl. No. 18/077,476, Rolle et al., filed Dec. 8, 2022.
U.S. Appl. No. 18/077,493, Rolle et al., filed Dec. 8, 2022.
Inquaero.com [online], “Fulfill GDPR Art. 17 (”Right to Erasure“): SAP ILM Simplified Blocking and Deletion”, Jun. 12, 2018, retrieved on Jan. 27, 2024, retrieved from URL <https://www.inquaero.com/blog/ilm-simplified-blocking-deletion>, 17 pages.
Non-Final Office Action in U.S. Appl. No. 17/457,802, mailed on Apr. 16, 2024, 17 pages.
Non-Final Office Action in U.S. Appl. No. 17/457,811, mailed on Dec. 20, 2023, 27 pages.
Non-Final Office Action in U.S. Appl. No. 17/702,013, mailed on Jan. 4, 2024, 9 pages.
SAP “SAP Asset Manager Security Guide” Dec. 10, 2020, 28 pages.
SAP “SAP Event Stream Processor: Security Guide” Sep. 23, 2019, 58 pages.
Wikipedia.org [online], “Hyperscale computing” created on May 2013, retrieved on Dec. 1, 2022, retrieved from URL <https://en.wikipedia.org/wiki/Hyperscale computing>, 2 pages.
Wikipedia.org [online], “Information privacy” created on May 2003, retrieved on Dec. 6, 2021, retrieved from URL <https://en.wikipedia.org/wiki/Information privacy>, 7 pages.
Wikipedia.org [online], “Master Data” created on Oct. 2006, retrieved on Dec. 6, 2021, retrieved from URL <https://en.wikipedia.org/wiki/Master_data>, 2 pages.
Wikipedia.org [online], “Personal Data” created on May 2005, retrieved on Dec. 6, 2021, retrieved from URL <https://en.wikipedia.org/wiki/Personal_data>, 7 pages.
Wikipedia.org [online], “Personal Identifier” created on Feb. 2007, retrieved on Dec. 1, 2022, retrieved from URL <https://en.wikipedia.org/wiki/Personal_identifier>, 3 pages.
Barreto et al, “An Efficient and Fault-Tolerant Update Commitment Protocol for Weakly Connected Replicas” INESC-ID/IST, Sep. 2005, 1059-1068.
Final Office Action in U.S. Appl. No. 18/077,493, mailed on Mar. 4, 2025, 31 pages.
Non-Final Office Action in U.S. Appl. No. 18/077,493, mailed on Nov. 5, 2024, 30 pages.
Non-Final Office Action in U.S. Appl. No. 18/751,559, mailed on Mar. 25, 2025, 16 pages.

* cited by examiner

2100
DPI
2102
Purpose Manager
2156
Purposes
2154
EoP Handler 2104
Connected Applications
2105
App1
App2
App3
Local Blocking
2112
2114
2116
Objects
App1-Obj123
App2-Obj123
App3-Obj123
2106
2108
2110
2132
2134
2136
MDI 2140
Event Bus
2130
Analytic Sys
2128
Lifecycle Management
2126
Objects
Obj123
2138
Admin Device
2124
Admin App 2122
Rule Engine N00
Admin UI 2120
2118
Rule Engine
Veto Service 2142
2144
Proxy Comm.
2146
Interface 2147
Other System 2148
Obj123 2152
Local Blocking
2150
R Day 1:

| System | Master Data Object | Purpose 2510 | Local CAN-DISASSOCIATE-PURPOSE Decision 2524 | Centralized 2537 Determinations |
|---|---|---|---|---|
| A 2502 | m 2508a | p1 2512 | yes 2526 | 2538 Disassociate p1 |
| | | p2 2514 | no 2528 | Dissassociate p4 2540 |
| B 2504 | m 2508b | p2 2516 | no 2530 | |
| | | p3 2518 | no 2532 | |
| C 2506 | m 2508c | p3 2520 | yes 2534 | |
| | | p4 2522 | yes 2536 | |

FIG. 25 2500

Day 2:

| System | Master Data Object | Purpose | Local CAN-DISASSOCIATE-PURPOSE Decision 2602 | Centralized 2620 Determinations |
|---|---|---|---|---|
| A 2502 | m 2508a | p2 2606 | no 2604 | 2622 Disassociate p3 |
| B 2504 | m 2508b | p2 2610 | no 2608 | |
| | | p3 2614 | yes 2612 | |
| C 2506 | m 2508c | p3 2625 | yes 2616 | |

FIG. 26 2600

Day 3:

| System | Master Data Object | Purpose | Local CAN-DISASSOCIATE-PURPOSE Decision 2702 | Centralized Determinations 2714 |
|---|---|---|---|---|
| A 2502 | m 2508 | p2 2706 | no 2704 | Cannot dissassociate p2 2716 |
| B 2504 | m 2508 | p2 2710 | no 2708 | |
| C 2506 | m 2508 | -- blocked -- 2712 | | |

FIG. 27 2700

Day 4:

| System | Master Data Object | Purpose | Local CAN-DISASSOCIATE-PURPOSE Decision 2802 | Centralized Determinations 2814 |
|---|---|---|---|---|
| A 2502 | m 2508 | p2 2806 | yes 2804 | 2816 Disassociate p2 |
| B 2504 | m 2508 | p2 2810 | yes 2808 | |
| C 2506 | m 2508 | -- blocked -- 2812 | | |

FIG. 28 2800

Day 5:

| System | Master Data Object | Local Actions / State | Centralized Determinations |
|---|---|---|---|
| A 2502 | m 2508a | -- blocked -- 2904 | |
| B 2504 | m 2508b | -- blocked -- 2906 | |
| C 2506 | m 2508c | -- blocked -- 2902 | |

FIG. 29 2900

Day 6:

| System | Master Data Object | Local Actions / State | Centralized Determinations |
|---|---|---|---|
| C 2506 | m 2508c | -- blocked -- 3002 | |

FIG. 30 3000

3300

3304 $M := \textit{Master Data Objects}$

3302 $P := \textit{Purposes}$

3306 $B := \textit{Applications}$

3308 $A := \textit{Association Functions};\ a : M, P \rightarrow \textit{Boolean}$ 3310 $D := \textit{Disassociation Functions};\ d : M, P \rightarrow \textit{Boolean}$ 3312 $$\bigwedge_{\substack{m \in M,\\ p \in P,\\ a \in A,\\ d \in D}} \neg\exists\, \mathrm{p}, \mathrm{m} : a(m,p) \wedge d(m,p)$$

3314 $B_i := \textit{Applications participating in } q_i \text{ with } B_i \subseteq B_{i+1};\ B_3 = B_4 = B$ 3316 $$\Pi(p,m,b) = \begin{cases} true, \text{ if } b \text{ associates } m \text{ with } p \\ false, \text{ otherwise} \end{cases}$$

3318 $$\Pi(p,m) = \begin{cases} true, if \text{ any } b \in B \text{ associates } m \text{ with } p \\ false, otherwise \end{cases}$$

3320 $$d(p,m,b) = \begin{cases} true \text{ if } b \text{ can disassociate } p \text{ from } m \\ false \text{ otherwise} \end{cases}$$

3322 $t_p^{max} := \textit{Maximal Accepted Minimum Remaining Association Time per purpose}$ 3324 $t_{b_2,m,p}^{min} := \textit{Minimum Remaining Association Time Timestamp of } p \textit{ with } m \textit{ by } b_2$ 3326 $t_{m,p} := \textit{Global Minimum Association Timestamp}$

FIG. 33

APD Phase 1 Formal Description

APD Phase 1 Example 1

APD Phase 2 Formal Description

APD Phase 2 Example 1

APD Phase 2 Example 2

APD Phase 2 Example 3

APD Phase 3 Formal Description

APD Phase 3 Example 3 FIG. 45 4500

APD Phase 4 Example 1

APD Phase 4 Example 2 iPDR Integrated Personal Data Retrieval

6100

| Communication Type | Name | Description |
| --- | --- | --- |
| $\alpha^i$ 6104 | Data Subject Information Request 6102 | A requestor is requesting personal data about a data subject represented by an entity of a specific data type. |
| $\beta^n$ 6108 | Data Subject Information Request 6106 | The orchestrator sends a message to the event bus for the event bus to forward the data subject information request to registered applications. |
| $\gamma^q$ 6112 | Data Subject Information Request 6110 | The event bus delivers the data subject information request to the registered applications. |
| $\alpha^f$ 6116 | Data Subject Information Response 6114 | Each application collects the data about the requested data subject from its own storage and sends the personal data about the data subject to the orchestrator. |
| $\beta^1$ 6120 | Data Subject Information Finished 6118 | After the orchestrator collects the data from all responding applications, the orchestrator sends a notification to the event bus to be forwarded to the requestor. |
| $\gamma^q$ 6124 | Data Subject Information Finished 6122 | The event bus forwards the notification to the requestor. |
| $\alpha^r$ 6128 | Data Subject Information Result 6126 | The requestor service uses an API of the orchestrator to obtain the collected data. |

FIG. 61

PROXY AND VETO SERVICES IN DATA PRIVACY INTEGRATION SCENARIOS

CLAIM OF PRIORITY

This application claims priority under 35 USC § 120 to U.S. patent application Ser. No. 17/702,013, filed on Mar. 23, 2022, entitled "PROXY AND VETO SERVICES IN DATA PRIVACY INTEGRATION SCENARIOS"; which claims priority under 35 USC § 120 to U.S. patent application Ser. No. 17/457,797, filed on Dec. 6, 2021, entitled "INTEGRATED END-OF-PURPOSE PROTOCOL FOR MULTIPLE APPLICATIONS"; and also claims priority under 35 USC § 120 to U.S. patent application Ser. No. 17/457,802, filed on Dec. 6, 2021, entitled "ALIGNED PURPOSE DISASSOCIATION PROTOCOL FOR MULTIPLE APPLICATIONS"; and also claims priority under 35 USC § 120 to U.S. patent application Ser. No. 17/457,811, filed on Dec. 6, 2021, entitled "INTEGRATED PERSONAL DATA RETRIEVAL ACROSS MULTIPLE APPLICATIONS"; and also claims priority under 35 USC § 120 to U.S. patent application Ser. No. 17/457,816 filed on Dec. 6, 2021, entitled "ENHANCING AN INTEGRATED END-OF-PURPOSE PROTOCOL WITH PURPOSE INFORMATION"; and also claims priority under 35 USC § 120 to U.S. patent application Ser. No. 17/457,824 filed on Dec. 6, 2021, entitled "TRANSITIONING FROM AN INTEGRATED END-OF-PURPOSE PROTOCOL TO AN ALIGNED PURPOSE DISASSOCIATION PROTOCOL"; and also claims priority under 35 USC § 120 to U.S. patent application Ser. No. 17/457,827 filed on Dec. 6, 2021, entitled "REDISTRIBUTING AN OBJECT IN AN INTEGRATED END-OF-PURPOSE PROTOCOL"; the entire contents of each and together, are hereby incorporated by reference.

TECHNICAL FIELD

The present disclosure relates to computer-implemented methods, software, and systems for integrated data privacy services.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for integrated data privacy services. An example method includes: sending a first block command for a master data object to each application in a set of multiple applications in a multiple-application landscape, wherein the multiple-application landscape includes a master data distribution application that is separate from the applications in the set of multiple applications; receiving a first blocking status from each application in the set of multiple applications, wherein a respective first blocking status for a respective application indicates whether the application successfully blocked the master data object in response to the first block command; determining a first overall blocking status based on the first blocking statuses received from the applications in the set of multiple applications; determining, based on the first overall blocking status, that at least one application failed to successfully block the master data object; in response to determining that at least one application failed to block the master data object, sending an unblock command to each application in the set of multiple applications; receiving an unblocking status from each application in the set of multiple applications, wherein a respective unblocking status for a respective application indicates whether the application successfully unblocked the master data object in response to the unblock command; determine an overall unblocking status based on the unblocking statuses received from the applications in the set of multiple applications; determining, based on the overall unblocking status, that at least one application failed to unblock the master data object; and in response to determining that at least one application failed to unblock the master data object, sending a redistribution request to the master data distribution application requesting the master data distribution application to redistribute the master data object to applications that failed to unblock the master data object.

Implementations can include one or more of the following features. The master data distribution application might have no retention period for the master data object. A second block command for the master data object can be sent to each application in the set of multiple applications. A second blocking status can be received from each application in the set of multiple applications. A second overall blocking status can be determined based on the second blocking statuses received from the applications in the set of multiple applications. A determination can be made, based on the second overall blocking status, that each application in the set of multiple applications successfully blocked the master data object. In response to determining that each application in the set of multiple applications successfully blocked the master data object, a delete object command can be sent to the master data distribution application instructing the master data distribution application to delete the master data object. The master data distribution application can delete the master data object in response to receiving the delete object command based on not having a retention period for the master data object. A first application can have a retention period for the master data object and the first application, in response to the first block command, can block the master data object to create a blocked master data object and determine a successful blocking status. The first application, in response to the unblock command, can unblock the blocked master data object and determine a successful unblocking status. The first application might not have a retention period for the master data object and the first application, in response to the first block command, can delete the master data object and determine a successful blocking status. The first application, in response to the unblock command, can determine that the master data object has been deleted and determine an unsuccessful unblocking status. The first block command can be sent based on a determination of an integrated end of purpose for the master data object in the multiple-application landscape. A first application can determine, in response to the first block command, an unsuccessful blocking status based on new activity for the master data object in the first application after the first application had indicated end of purpose for the master data object.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 25-30 are example tables that illustrate different days of a multi-day example for aligned purpose disassociation.

FIG. 33 illustrates formal definitions that describe an aligned purpose disassociation protocol.

FIG. 61 is a table that describes integrated personal data request messages.

DETAILED DESCRIPTION

Figure 1:
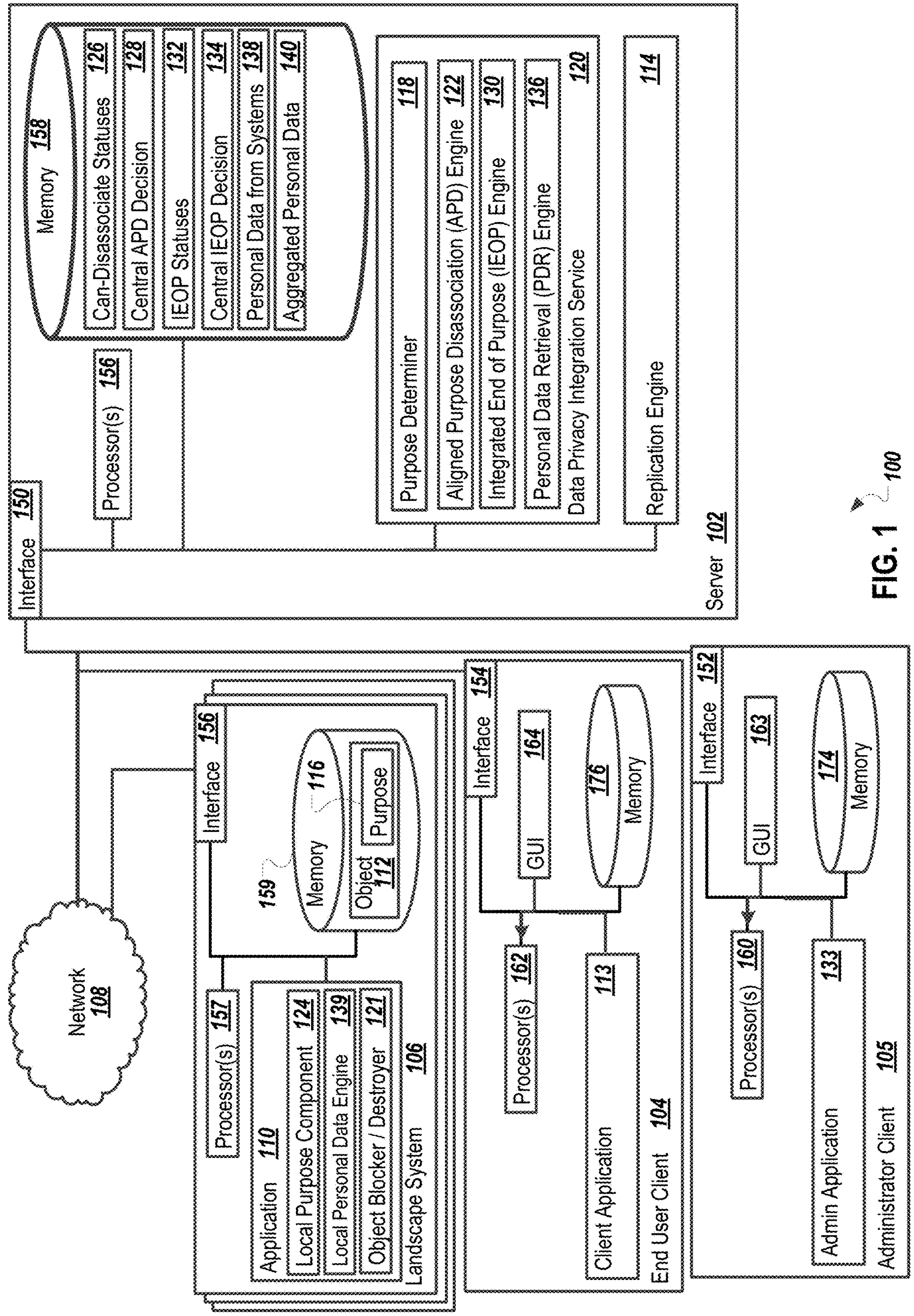
FIG. 1 is a block diagram illustrating an example system for integrated data privacy services.

Master data objects in a system can represent a concept for an organization. For example, a master data object may correspond to a data subject such as a workforce person, a business partner (e.g., vendor), a customer, etc. Data privacy regulations, whether legislated or as part of corporate or product development policies, can stipulate various uses and requirements regarding personal data about a data subject. For example, data privacy regulations can stipulate that personal data (e.g., information relating to an identified or identifiable data subject) should be blocked or deleted when there is no legitimate purpose for processing. As a specific example, a regulation may stipulate that “the data subject shall have the right to obtain from the controller the erasure of personal data concerning him or her without undue delay.” As another example, a data privacy regulation may stipulate that a data subject has a right to be informed about what is processed about them upon request.

Accordingly, applications and systems that process personal data can each include functionalities for dealing with personal data. For example, applications can have functionality for blocking and deletion of personal data, and for retrieving personal information stored in the application for a data subject. A local blocking component can determine whether end of purpose has been reached for a master data object that corresponds to a data subject, for example.

The processing of personal data can be a core aspect of many processes in an enterprise that uses integrated applications, and integration of applications can pose challenges for managing data privacy. For example, applications may not act in isolation, and may integrate with other applications, with an intelligent suite of applications offering integrated applications that support end-to-end processes. End-to-end business processes, for example in cloud environments, can involve integrating several applications and distribution of master data objects between multiple applications. Cloud-based platforms can present new integration challenges that were not present or relevant in monolithic single systems that used a single database, for example.

For example, for an intelligent suite used to manage an enterprise, a hire-to-retire (or recruit-to-retire-) process can be implemented across applications of the suite. For example, a master data object that represents an employee of the organization can be a WorkforcePerson object. A given WorkforcePerson object can be processed in various representations in various applications of the suite. Each application can process a WorkforcePerson object, for different purposes, and each application may store different data for a given WorkforcePerson object instance.

To ensure data consistency and in accordance with data privacy regulations, a data privacy integration (DPI) service can align blocking and deletion of WorkforcePerson objects across systems. For example, the DPI service can implement an Integrated End-of-Purpose (iEoP) protocol as an alignment process to block the same master data object in all systems at an aligned time. Additionally, a master data object may often be processed for several purposes. In such cases, the DPI service can provide a more granular Aligned Purpose Disassociation (APD) protocol that aligns disassociation of particular purposes from master data objects. As another example, with respect to personal data retrieval, various challenges can occur when integrating personal data retrieved by multiple applications in the landscape. The DPI service can offer integrated personal data retrieval, and enable a data subject to initiate personal data retrieval from any application but receive aggregated personal data stored by all integrated applications.

Regarding integrated blocking and deletion of data, a master data object can be associated with one or more purpose references that indicate for which purposes the object can be processed. An "end of purpose" check for a master data object can be performed, in a given system, to determine whether an object is still needed. A system can disassociate a purpose from an object as part of (or in response to) an end of purpose check. However, distributed end of purpose checks and purpose disassociations can cause problems, as detailed below. For example, one system can disassociate a purpose from an object, delete or block an object after the purpose has been removed, but then receive an object copy with the purpose attached, from another system, due to replication. Replication can occur in distributed systems, including in a landscape in which a leading system for an object has not been defined.

An improved aligned purpose disassociation protocol can be used, in which each system can perform a local "can disassociate purpose" decision for each purpose for each object, without actually disassociating purposes from objects at a can-disassociate decision time. A central component can perform a central evaluation of the local can-disassociate decisions, determine disassociate instructions, and send the disassociate instructions to the respective systems (e.g., to respective applications in respective systems). Although distributed systems are described herein, aligned purpose disassociation and other approaches can be used for distributed applications that are each connected to at least one replication service, for example. Additionally, some applications might be integrated with other application(s) directly, without use of any replication service. Accordingly, use of "application" and "system" herein can both apply to the aligned purpose disassociation approach and other approaches. The aligned purpose disassociation can be applied to master data that no longer has any transactional data referencing the master data. For example, aligned purpose disassociation can be applied to an insurance contract, if no pending claims or cases of damages refer to the insurance contract. As another example, aligned purpose disassociation can be applied to a customer object of an insurance company, if no insurance contracts refer to the customer, for example.

The aligned purpose disassociation approach can provide various advantages over an existing distributed end of purpose check approach. For example, end of purpose checks can involve synchronous calls between systems which may take an unacceptable amount of time to complete. The aligned purpose disassociation solution can use a more efficient, central, and asynchronous approach. The aligned purpose disassociation approach can work even with landscapes in which a leading system is not defined for an object. Purpose disassociation per purpose can increase regulatory compliance, by ensuring that data is only processed for a purpose if that purpose is still valid, and by enabling one system to block data when appropriate without requiring waiting for a synchronous response from each system in the landscape. With some existing approaches an object that remains active due to an associated first purpose could possibly be processed for a second purpose. With the aligned purpose disassociation approach, data is processed only for granted purposes. For instance, with the aligned purpose disassociation approach, the disassociation of purposes can be handled per purpose, rather than performing other actions, such as blocking an entire object when one of multiple purposes for the object is no longer applicable.

While aligned purpose disassociation can lead to eventual object blocking or deletion (after all purposes have been disassociated from an object), some applications may additionally or alternatively implement an integrated end of purpose (iEoP) protocol. The iEoP protocol is a protocol for aligned blocking of master data objects that are shared among integrated applications in end-to-end processes. At the end of an iEoP process, a consensus blocking decision can be made by every connected application that processes a same master data object. For example, an object can be blocked, in all applications, when all applications are at end of purpose for the object.

Regarding personal data retrieval, in complicated application landscapes, the DPI service can provide a feature to retrieve personal data from all of the integrated applications. The integrated personal data retrieval can be used instead of a manual approach. A manual approach to fulfill a data subject's right to information can be for an administrator to extract information reports using each of the information retrieval tools provided by various integrated applications and manually aggregate the disparate reports before informing the data subject. However, the manual approach is not scalable as it becomes cumbersome when myriads of applications are integrated. Furthermore, a manual approach may not provide a uniform information report to the data subject. To solve these problems, the DPI service can provide an Integrated Personal Data Retrieval (iPDR) protocol. The iPDR protocol can be used to aggregate and unify heterogeneous reports from different information retrieval tools. The iPDR protocol can support asynchronous retrieval and reporting of personal data using event-driven and API communication patterns.

The iPDR protocol can offer various other advantages. For example, the iPDR protocol can 1) handle personal data in multiple types of formats; 2) provide a loose coupling between applications and the DPI service (e.g., the requestor does not need to know how many responders are contributing personal data reports); 3) provide platform-agnostic integration (e.g., all integrated applications, i.e. requestors and responders can be deployed in different types of platforms); 4) provide integration with third party applications; 5) use asynchronous communication; and 6) utilize identifier mapping when a data subject is represented by objects with different identifiers in different systems). Each of the iPDR, iEoP, and APD protocols are described in more detail below.

System Overview

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server.

The landscape systems 106 can include multiple systems that exist in a multi-system landscape. An organization can use different systems, of different types, to run the organization, for example. The landscape systems 106 can include systems from a same vendor or different vendors. The landscape systems 106 can each include at least one application 110 for performing organizational processes and working with organizational data. Organizational data can include master data objects and transactional objects. For example, the application 110 can process a master data object 112. An end user can use a client application 113 (which may be a client version of the application 110) on the end-user client device 104 to view and interact with landscape data, including information from the master data object 112.

Regarding the handling of master data objects, various best practices can be applied by an organization. For example, the system 100 can be configured so that corresponding master data objects are consistent across all landscape systems 106. For instance, a replication engine 114 can distribute master data across the landscape systems 106 so that each application 110 can perform processing on the same consistent master data.

Various data protection rules and laws may require that data is only processed for legitimate specified purposes. The system 100 can implement a purpose requirement by associating purpose information with each object instance. For example, a purpose 116 has been associated with the master data object 112. A purpose determiner 118 included in a data privacy integration (DPI) service 120 can determine appropriate purposes for an object and associate the purposes with the object. The landscape system 106 can receive the master data object 112 and the associated purpose 116 from the replication engine 114, for example. The purpose determiner 118 can also which applications process objects for which purposes. The replication engine 114 can replicate an object with an assigned purpose to a given landscape system 106 when the landscape system 106 processes objects for that purpose.

Purpose information for an object can specify for which purposes an object instance can currently be processed. Purpose information associated with an object instance is referred to herein as a purpose that is assigned to or otherwise associated with the object instance. Purpose information can be associated with an object by using a field of the object, metadata for the object, or associating a separate purpose object with the object. In some implementations, the purposes described herein are assigned to master data objects but not to transactional data objects.

Purposes for an object instance can have lifecycles that correspond to the lifecycle of the object instance. For example, a WorkforcePerson object may be created when an employee of the organization is hired. Accordingly, certain purposes, such as resource planning and payroll activities, can be assigned to the object instance. When an employee leaves the company, certain purposes, like resource planning, can be disassociated from the WorkforcePerson instance. Other purposes, such as payroll, might not be disassociated at the same time, since some payroll processing may still be performed for the employee even after the employee has left the organization (e.g., a final paycheck or an earned bonus, for example).

Objects that no longer have any associated purposes can be put into a blocked state for a period of time, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 106 can disassociate a purpose with an object in response to information received from an aligned purpose disassociation engine 122, rather than solely based on a local decision. For example, each landscape system 106 can provide information to the aligned purpose disassociation engine 122. For example, a local purpose component 124 in each landscape system 106 can determine locally (e.g., without consulting other systems), for each purpose of an object, whether the purpose can be locally disassociated from the object. For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. For example, a first retention policy can specify that the object is to be kept (e.g., in a blocked state) for ten years to support potential tax audits and a second retention policy can specify that the object is to be kept in a blocked state for twenty years to support employee safety audits (e.g., related to handling of dangerous chemicals). In this example, the object can be blocked for twenty years (e.g., a maximum of the ten and twenty year retention policies). After twenty years, the object can be destroyed. The object blocker/destroyer 121 can determine to destroy a blocked object in response to determining that all applicable retention reasons have expired.

Object destruction decisions and actions can occur locally and independently in each landscape system 106. For example, each application 110 can determine locally whether a blocked object is to be destroyed. For instance, the application 110 can determine to destroy an object when no purposes are associated with the object, no transactional data references the object, and no retention policy currently applies to the object. In response to an object destruction decision, the object blocker/destroyer 121 can destroy the object.

In some implementations, an iEoP engine 130 is used instead of or in addition to the APD engine 122. The iEoP engine 130 can send EoP queries to each landscape system 106 and receive EoP statuses 132 from the local purpose components 124 of different landscape systems regarding ability to delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored about the data subject. The data subject can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136. Accordingly, any application within the landscape that is integrated with the DPI service 120 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end-user client device 104, the landscape system 106, and the administrator client device 105, respectively, for communicating with other systems in a distributed environment-including within the system 100—connected to the network 107. Generally, the interfaces 150, 152, 153, and 154 each comprise logic encoded in software and/or hardware in a suitable combination and operable to communicate with the network 107. More specifically, the interfaces 150, 152, 153, and 154 may each comprise software supporting one or more communication protocols associated with communications such that the network 107 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example. Similarly, each landscape system 106 includes one or more processors 157. Each processor 157. Each processor 157 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP 00 (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 159. The memory 159 may store various objects or data associated with the purposes of the landscape system 106.

The end-user client device 104 and the administrator client device 105 may each be any computing device operable to connect to or communicate in the network(s) 107 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 163 or a GUI 164, respectively.

The GUI 163 and the GUI 164 each interface with at least a portion of the system 100 for any suitable purpose, including generating a visual representation of the client application 113 or the administrative application 132, respectively. In particular, the GUI 163 and the GUI 164 may each be used to view and navigate various Web pages. Generally, the GUI 163 and the GUI 164 each provide the user with an efficient and user-friendly presentation of business data provided by or communicated within the system. The GUI 163 and the GUI 164 may each comprise a plurality of customizable frames or views having interactive fields, pull-down lists, and buttons operated by the user. The GUI 163 and the GUI 164 each contemplate any suitable graphical user interface, such as a combination of a generic web browser, intelligent engine, and command line interface (CLI) that processes information and efficiently presents the results to the user visually.

Memory 174 and memory 176 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 174 and the memory 176 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Integrated End of Purpose

Figure 2:
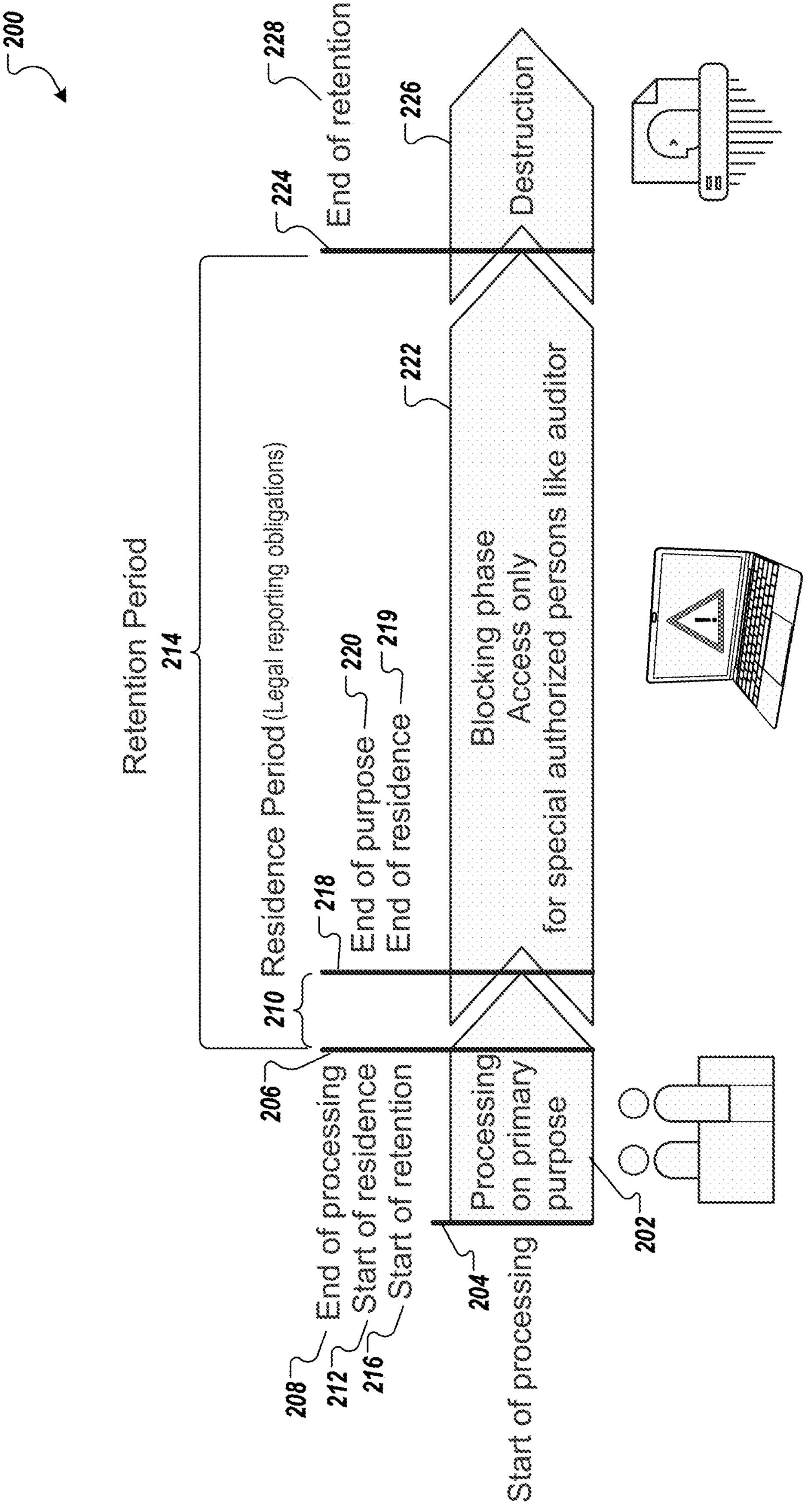
FIG. 2 is a diagram that illustrates the lifecycle of master data objects.

FIG. 2 is a diagram 200 that illustrates the lifecycle of master data objects. A processing phase 202 for a master data object begins at a first time point 204. The processing phase 202 can begin when the master data object is created. The master data object can be created in response to various types of transactions, such as creation of a contract, a delivery, a payment, or another transaction relating to a data subject. In the processing phase 202, processing of the master data object is performed within a scope of associated purposes. The lifecycle of the master data object is tied to purposes of processing.

At a second time point 206, an end of processing 208 is reached. After the end of processing 208, a residence period 210 may apply for the master data object, such as for legal reporting obligations. Accordingly, the second time point 206 may correspond to a start of residence 212. In the residence period 210, the master data object may be accessed by applications for reporting but is no longer modified by processing. In addition (or alternatively) to the residence period 210, a retention period 214 can begin at the second time point 206 (e.g., the second time point 206 can also correspond to a start of retention 216). The retention period 214 is described in more detail below.

At a third time point 218, which corresponds to an end of residence 219, an end of purpose 220 is reached for the master data object. The end of purpose 220 can occur when no purposes (e.g., including processing or regular reporting) exist for processing the master data object. In some cases, the end of purpose corresponds to a withdrawal of consent to process the master data object that is received from a data subject.

The third time point 218 can also begin a blocking phase 222 for the master data object. In the blocking phase 222, the master data object is logically deleted, in that applications, even for reporting, can no longer access the master data object. However, specialized access outside of regular application access can be used with specialized authorizations to access the blocked master data object, such as for auditing purposes. Blocking can be achieved, for example, by marking the master data object as blocked, archiving the master data object, applying specialized authorizations to the master data object, and/or encrypting the master data object. However blocking is implemented, access to blocked data is restricted to only special authorized entities (e.g. auditors or regulatory agencies).

The blocking phase 222 can exist if the retention period 214 applies for the master data object. If no retention period 214 applies for the master data object, the master data object can be physically deleted (e.g., destructed) at the third time point 218. If the retention period 214 applies for the master data object, the master data object can be physically deleted at a fourth time point 224, in a destruction phase 226. Destruction of data is irreversible. The fourth time point 224 corresponds to an end of retention 228.

Figure 3:
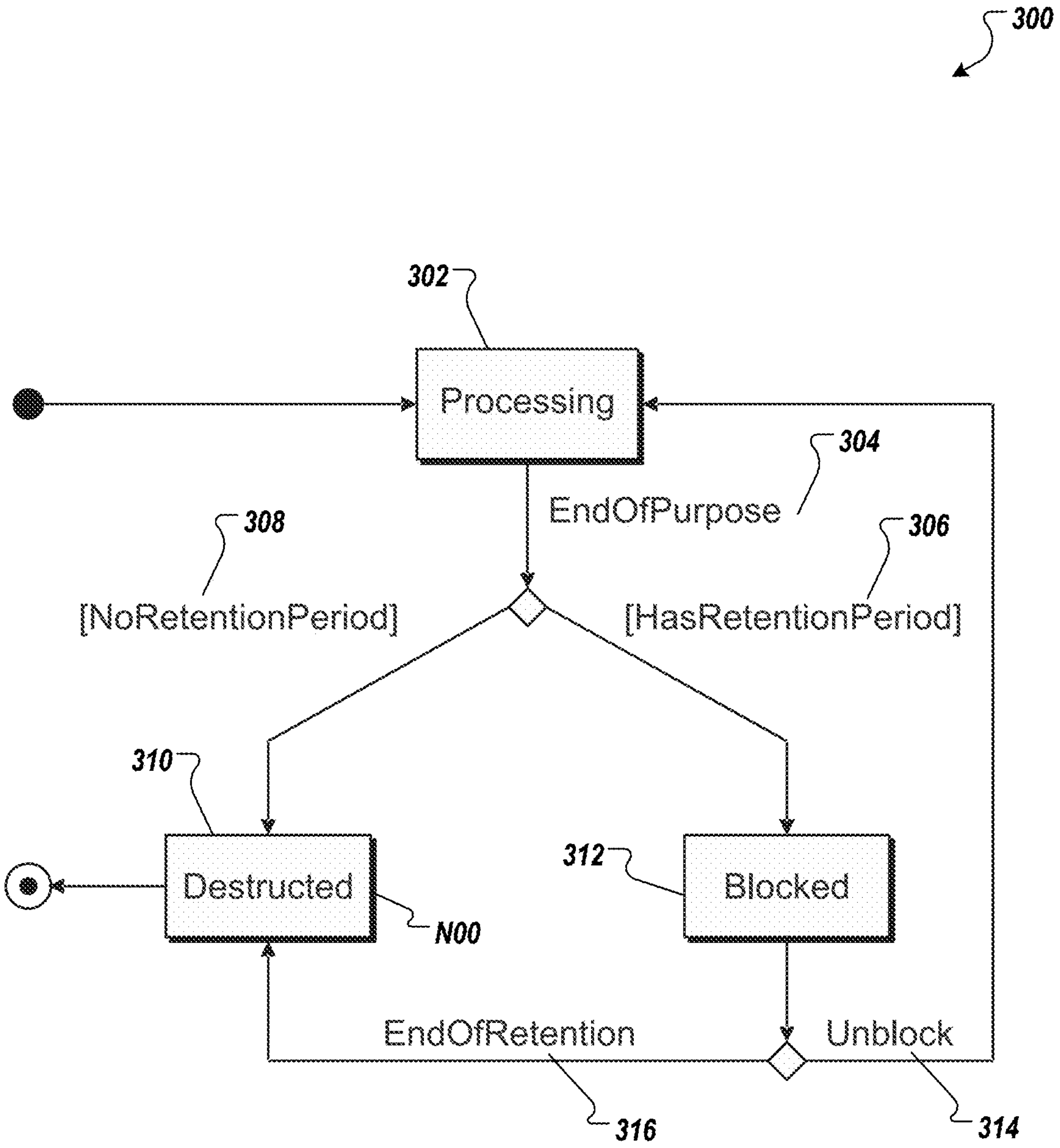
FIG. 3 is a state diagram that illustrates potential states of a master data object.

FIG. 3 is a state diagram 300 that illustrates potential states of a master data object. While a master data object is being processed (e.g., for one or more authorized purposes), the master data object is in a processing state 302. After processing has been completed for all purposes to which the master data object has been assigned, a system can determine (e.g., by performing an end-of-purpose check 304) that there are no longer any purposes associated with the master data object. The master data object can either have a retention period (e.g., as shown by a HasRetentionPeriod attribute 306) or not have a retention period (e.g., as shown by a NoRetenionPeriod attribute 308). If the master data object does not have a retention period, the master data object transitions to a destructed state 310 after the processing state. In the destructed state 310, contents of the master data object are deleted.

If the master data object has a retention period, the master data object transitions to a blocked state 312 after the processing state 302. In the blocked state 312, the master data object is available only for special authorized access, such as for auditing, and is not available for production processing. In some cases, a need may arise for the master data object to be unblocked (e.g., as shown by an unblock operation 314). For example, if the master data object is a Workforce Person instance that represents a particular employee who had left a company, the master data object may need to be unblocked if the employee later returns to the company. As another example, a master data object that represents a contract may be unblocked if a contract that expired was subsequently renewed. In general, unblocking can occur in response to receiving a consent to continue processing of a blocked master data object. In response to the unblock operation 314, the master data object returns to the processing state 302 and access restrictions that may have been configured for the master data object for the blocked state 312 can be removed. If a master data object that is in the blocked state 312 has a retention period expire (e.g., as shown by an EndOfRetention event 316), the master data object transitions from the blocked state 312 to the destructed state 310.

As mentioned, unblocking of a master data object can include removing restrictions that may have been configured to implement previous blocking of the master data object, to enable further processing of the master data object according to a reactivated purpose. Actions that are performed for removal of blocking restrictions are performed with necessary authorizations and can be logged for audit and accounting purposes. As an example, a business partner master data object that had been previously blocked (but not yet destructed) may be unblocked due to new transactions associated with the business partner master data object. Unblocking can involve reversing a previously-performed blocking process, such as by reloading the master data object from an archive, removing a “blocking flag”, decrypting blocked data, etc.

As described in more detail below, unblocking can also be performed as a corrective process for errors in an EoP or IEoP process, such as a failure or partial failure in an integrated blocking scenario. In a distributed landscape, unblocking of a master data object can be coordinated across systems, to handle different decentralized retention rules that may exist across systems. Decentralized and different retention rules can lead to scenarios, for example, in which a master data object is deleted in some applications but not yet deleted in other applications. In systems in which the master data object has not yet been deleted, an integrated and coordinated unblocking process can include initiation of a local unblocking operation. In systems in which the master data object has already been deleted due to local retention rules, the integrated and coordinated unblocking process can include re-creation of the master data object after receiving replicated master data from a distribution service. For example, the distribution service can be a MDI (Master Data Integration) service. MDI is described in more detail below. The distribution service can be configured to re-distribute unblocked data based on original distribution rules so that applications or systems that did not previously include the master data object prior to a failed blocking operation do not incorrectly receive the master data object as part of an unblocking operation.

Figure 4A:
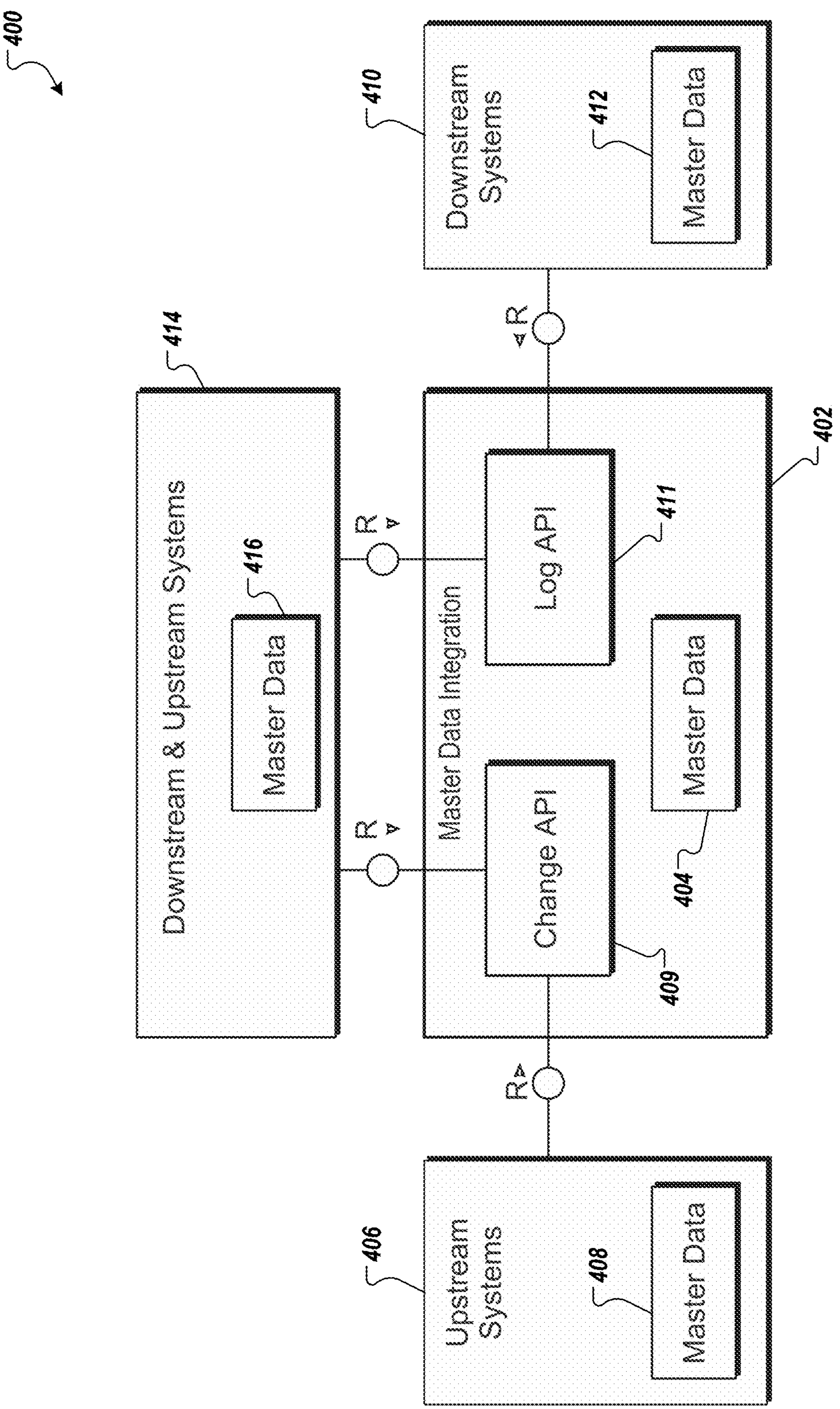
FIG. 4A illustrates an example system that uses a master data integration service 402.

FIG. 4A illustrates an example system 400 that uses a master data integration service 402. A service provider can offer an integrated suite of applications that support end-to-end customer processes. Integration of applications in the integrated suite can be performed using the MDI service 402 that replicates master data 404 that is based on a One Domain Model (ODM). The ODM defines an interchange format for objects that are used within the integrated suite of applications. Integration between applications or systems can be performed by the MDI service by exchanging master data objects that conform to the ODM. Although a MDI service is described, other types of replication services can be used in association with integrated end of purpose and aligned purpose disassociation protocols.

Upstream systems 406 in a customer landscape can replicate and distribute master data 408 that includes ODM entities using a change API (Application Programming Interface) 409 of the MDI service 402. Downstream systems 410 can consume replicated entities (e.g., and store received data as master data 412) by being informed of replicated data using a logging API 411. The logging API 411 may be a push or pull interface from the perspective of the downstream systems 410. Some systems, such as downstream and upstream systems 414, can take on both downstream and upstream roles. For example, the downstream and upstream systems 414 can include a master data governance system that sends, in an upstream role, updates of a business partner master data object 416 and consumes, in a downstream role, updates for the same business partner master data object from the MDI service 402.

An upstream system 406 can be configured as a leading system for a given master data object. The leading system for a master data object is an upstream system that is responsible for the master data object (e.g., for consolidation and resolving inconsistencies and error situations). Generally, a leading system has a longest retention period among systems that use a master data object and are thus a last system to delete a master data object. As described in more detail below, a leading system can be used to redistribute a master data object. Other redistribution schemes can be used.

Figure 4B:
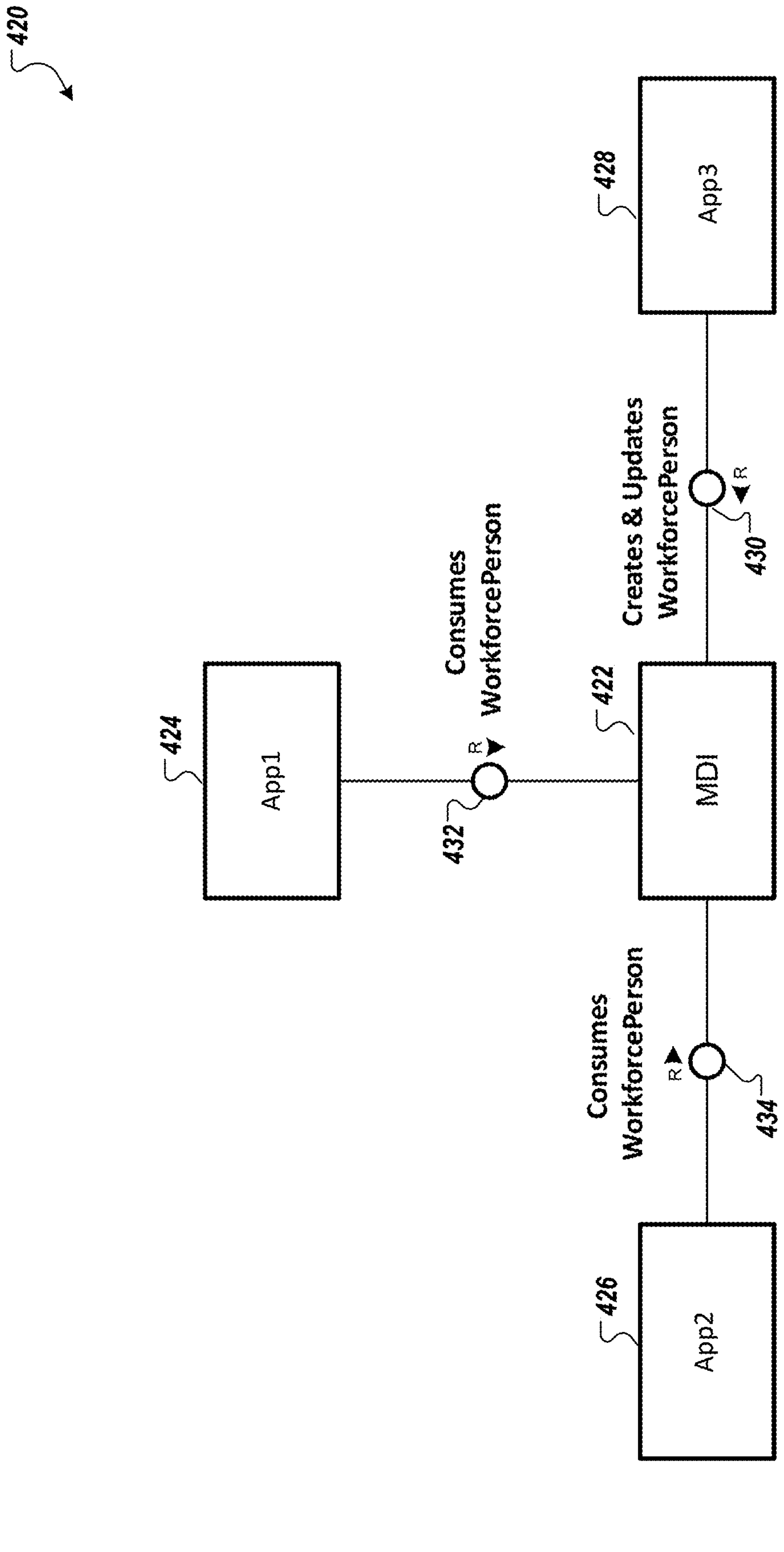
FIG. 4B illustrates an example system that uses a master data integration service.

FIG. 4B illustrates an example system 420 that uses a master data integration service 422. The MDI service 422 can replicate master data between different applications of a landscape, such as a first application 424, a second application 426, and a third application 428. The third application 428 can be a leading system for a WorkforcePerson type of master data object. The third application 428 can create instances of WorkforcePerson objects and can provide updates to WorkforcePerson objects. The third application 428 can provide initial and updated WorkforcePerson data to the MDI service 422, as illustrated by a message 430. Other applications, including the first application 424 and the second application 426, can consume WorkforcePerson data that is replicated by the MDI service 422, as illustrated by messages 432 and 434, respectively. As described in more detail below, the third application 428, as a leading system for WorkforcePerson objects, can be used as a source of replicated WorkforcePerson data in situations where WorkforcePerson data has been deleted in some but not all landscape systems or applications. As the leading system, the third application 428 can have a longest retention period among connected applications, and can therefore include WorkforcePerson data that has been removed from other applications.

Figure 5C:
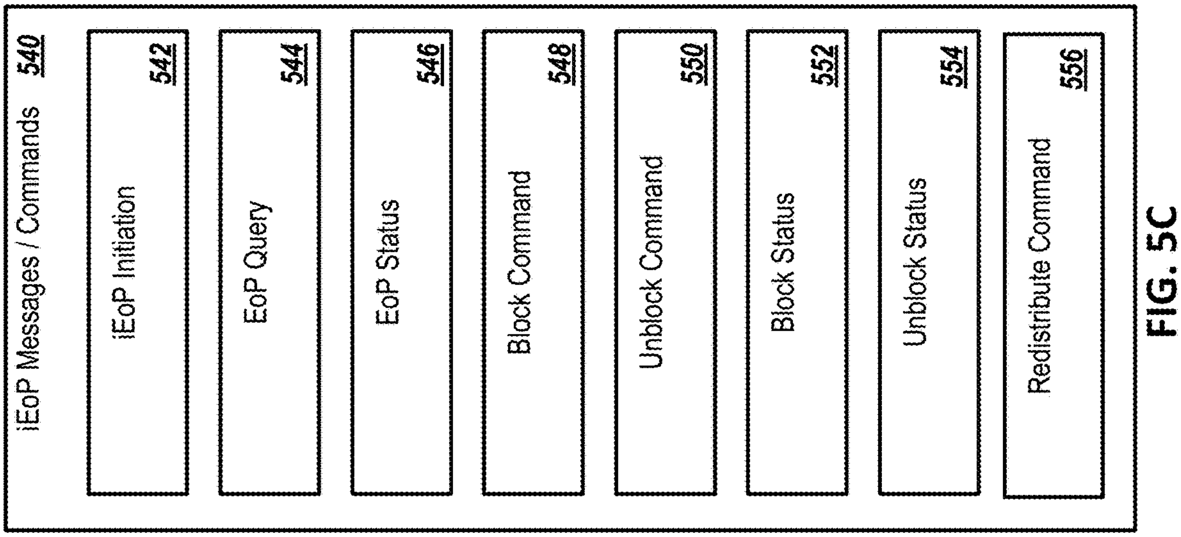
FIG. 5C illustrates various integrated end of purpose messages and commands.
Figure 5B:
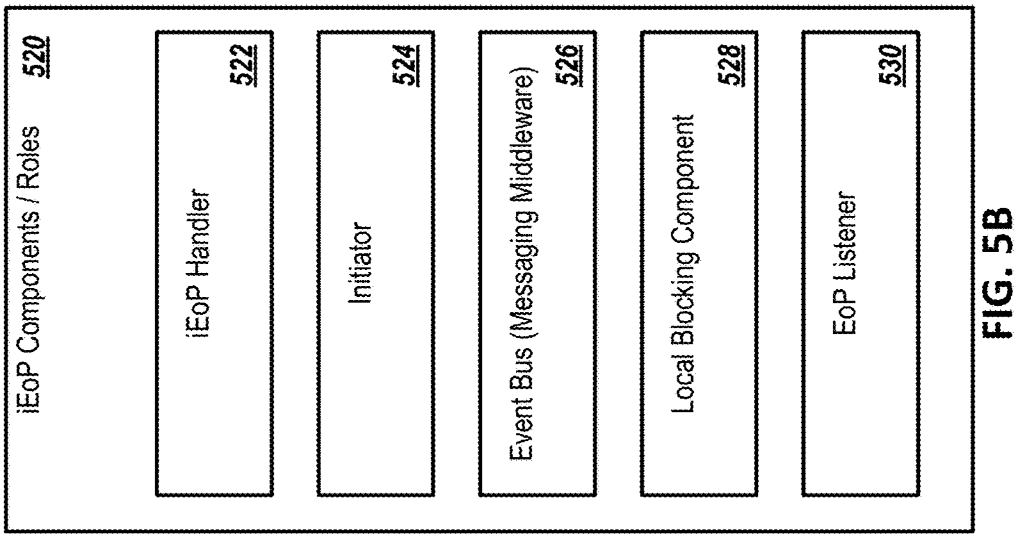
FIG. 5B illustrates various components and roles that may be involved in integrated end of purpose processes.
Figure 5A:
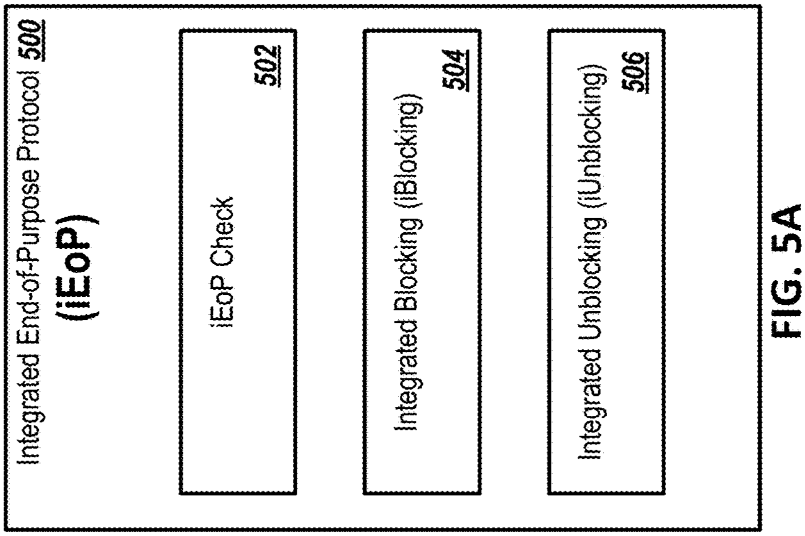
FIG. 5A illustrates sub-processes of an integrated end-of-purpose protocol.

FIG. 5A illustrates sub-processes of an integrated end-of-purpose protocol 500. The integrated end-of-purpose (iEoP) protocol 500 is a protocol for aligned blocking of master data objects that are shared among integrated applications in end-to-end processes. At the end of a successful iEoP process, a consensus blocking decision is made by every connected application that processes a same master data object. The iEoP protocol 500 includes iEoP check 502, integrated blocking (iBlocking) 504, and integrated unblocking (iUnblocking) 506 sub-processes. The iEoP check sub process 502 can be used to check if an end-of-purpose status has been reached for a master data object in all integrated applications. The iBlocking sub process 504 can be used to block a master data object in all integrated applications. The iBlocking sub process 504 is initiated after a consensus is achieved by all applications in an iEoP check. The iUnblocking process 506 can be used to reverse blocking, either due to reasons occurring due to production use of an application or as a correction to a failed iBlocking process.

FIG. 5B illustrates various components and roles 520 that may be involved in iEoP processes. An iEoP handler 522 can orchestrate the iEoP check 502, the iBlocking 504, and iUnblocking sub-processes. In some implementations, a Data Privacy Integration (DPI) service acts as the iEoP handler 522. An initiator 524 is a role that can be performed by various components to trigger the beginning of an iEoP sub process. The initiator 524 can be the DPI service, an ILM (Information Lifecycle Management) tool, or some other tool or application that manages requests from data subjects regarding deletion of personal data. A landscape application can be the initiator 524. As a particular example, a leading system can serve as the initiator 524 for the iEoP check sub process 502. When a landscape application or system is the initiator 524, preferably the application or system performs a local end of purpose check before initiating the iEoP process (e.g., if the landscape application or system is itself not at end of purpose for the object, initiating the iEoP process can be avoided, since an aligned end of purpose is not possible due to the application or system itself not being at end of purpose for the object).

As described in more detail below, an initiation request can be validated by the iEoP handler 522. The event bus 526 is messaging middleware that can be used by the iEoP handler 522 to send messages (e.g., queries or commands) to all connected applications. A local blocking component 528 is included in each connected application and can perform a local end-of-purpose check and local blocking and unblocking operations. In some cases, the local blocking component 528 (or another component of a receiving application) can use an indenter mapper to map an identifier of the master data object from an identifier space of a received identifier to an identifier space used by the local blocking component 528. An EoP listener 530 is a component that listens for iEoP decisions but does not participate actively in an iEoP decision process. For example, a master data governance or analytic tool may not need to participate in (e.g., provide input to) the iEoP check sub process 502 but may listen for an aligned blocking decision.

FIG. 5C illustrates various iEoP messages and commands 540. An iEoP initiation 542 is a trigger to begin an iEoP sub process (e.g., either the iEoP check sub process 502, the iBlocking sub process 504, or the iUnblocking sub process 506) for a master data object. The iEoP initiation 542 can occur as a direct call from an initiator 524 to the iEoP handler 522. An EoP query 544 is a query that is sent from the iEoP handler 522 to the local blocking component 528 of a connected application asking if end-of-purpose has been reached for a master data object for all purposes for which the application is processing the master data object. The EoP query 544 can be sent to all integrated applications using the event bus 526. An EoP status 546 is a response to an EoP query 544 that is sent by a local blocking component 528 to the iEoP handler 522. The EoP status 546 includes the lifecycle status of the master data object. For example, the EoP status 546 may be or include a timestamp in the past or future that indicates when the end of purpose was or would be reached. As another example, the EoP status 546 may indicate that the purpose is actually not associated with the master data object. A block command 548 is a command sent from the iEoP handler 522 to all EoP listeners 530 to block a master data object. The iEoP handler 522 can send the block command 548 in response to determining that all connected applications are aligned in that all of the connected applications can consistently block the master data object. An unblock command 550 is a command sent from the iEoP handler 522 to unblock a master data object. The unblock command 550 can be sent either in response to the initiation of an unblocking operation or to correct an error or condition in an iEoP process (e.g., the unblock command 550 can be sent in response to detection of a race condition). A block status 552 is a response sent by a connected application in response to the block command 548. The block status 552 indicates whether requested blocking was successful. An unblock status 554 is a response sent by a connected application in response to the unblock command 550. The unblock status 554 indicates whether requested unblocking was successful. A redistribute command 556 can be sent to connected applications in response to unsuccessful unblocking.

As a summary of the iEoP protocol 500, as part of performing the iEoP check sub process 502 for a master data object, the iEoP handler 522 can send EoP query messages 544 to the local blocking components 528 of all integrated applications that are processing the master data object for one or more purposes. The DPI service can include knowledge of which applications are processing which master data objects for which purposes, for example. The local blocking components 528 perform local EoP checks and send back an EoP status 546 to the iEoP handler 522. The iEoP handler 522 aggregates the EoP statuses 546 from all applications and in response to determining that an EoP for the master data object has been reached globally (e.g., across all applications), the iEoP handler 522 initiates the iBlocking sub process 504 by broadcasting a block command 548 to all applications to effect blocking of the master data object. After an application attempts blocking, the application sends a block status 552 to the iEoP handler 522 to indicate whether blocking was successful. The iEoP handler 522 can initiate the iUnblocking sub process 506, such as to roll back a block operation if not all applications were able to successfully block the master data object, or in response to another need to perform unblocking (e.g., due to production transaction activity in one or more applications). The iEoP handler 522 can send an unblock command 550 to all connected applications to initiate unblocking. After an application attempts unblocking, the application sends back an unblock status 554 to the iEoP handler 522 to indicate whether unblocking was successful. For both the iBlocking sub process 504 and the iUnblocking sub process 506, if one or more applications sends a status (e.g., a block status 552 or an unblock status 554) that indicates failure, the iEoP handler 522 can initiate a correction process, as described in more detail below.

Figure 6A:
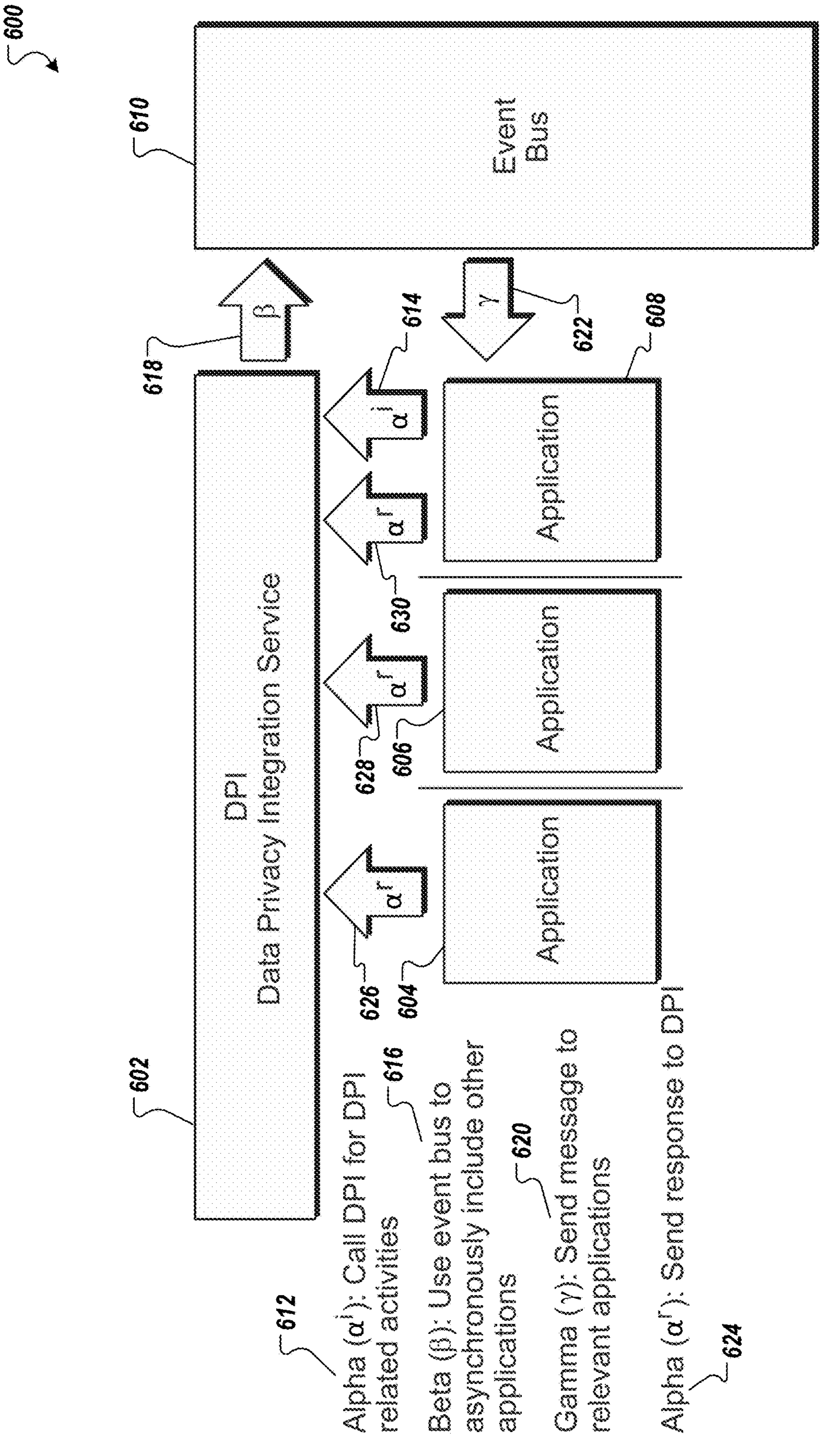
FIG. 6A is a diagram that illustrates a data privacy service integration architecture pattern.

FIG. 6A is a diagram 600 that illustrates a data privacy service integration architecture pattern. As mentioned, a DPI service 602 can serve as an iEoP handler. The DPI service 602 can offer iEoP and other data privacy services for applications, including managing personal information requests, definition of retention periods and retention rules, orchestration of the iEoP protocol, context and purpose management, consent management facilities, and aligned purpose disassociation. The DPI service 602 can support data privacy compliance of end-to-end processes that use multiple applications or systems, by having all connected applications or systems interface with the DPI service 602 using a DPI architecture pattern. The DPI architecture pattern can describe communication strategies between the DPI service 602 and integrated applications. Applications, systems, or services, such as a first application 604, a second application 606, and a third application 608 can communicate with the DPI service 602 by making direct API calls to the DPI service 602, as described below. The DPI service 602 can communicate with the integrated applications (e.g., the first application 604, the second application 606, and the third application 608) by sending messages or events through a messaging middleware such as an event bus 610. The DPI service 602 can also provide an API so that applications can retrieve events directly from the DPI service 602, in case the event bus 610 is offline, for example.

To enable seamless integration of applications with respect to data privacy, the DPI service 602 can offer a framework for integration using the DPI architecture pattern. As part of the framework, to initiate a DPI function (e.g. an iEoP process, an integrated personal data retrieval (iPDR) process, or another DPI process), an application can directly call the APIs provided by the DPI service 602. An invocation of a DPI API can be formally represented as an alpha $\alpha^i$ invocation 612. For example, the third application 608 can perform an alpha $\alpha^i$ invocation 614, such as to initiate the iEoP protocol.

As part of the framework, the DPI service 602 can send a message, query, or command (e.g., an EoP query) to integrated applications, by sending a message or event through messaging middleware such as the event bus 610. Messages sent by the DPI service to the event bus 610 can be formally referred to as beta $\beta^n$ messages 616 (e.g., as illustrated by a beta $\beta$ message 618 being sent from the DPI service 602 to the event bus 610). The beta $\beta^n$ messages 616 that are received by the event bus 610 can be delivered to target applications as gamma $\gamma^q$ 620 messages (e.g., as illustrated by a gamma $\gamma$ message 622 being sent from the event bus 610 to the first application 604, the second application 606, and the third application 608).

As part of the framework, applications can send a response to the DPI service 602 (e.g., a sending of an EoP status in response to an EoP query) by directly invoking the APIs provided by the DPI service 602. An invoking of a DPI API by an application for purposes of sending a response to the DPI service 602 can be formally referred to as an alpha $\alpha^r$ invocation 624. For example, the first application 604, the second application 606, and the third application 608 perform alpha $\alpha^r$ invocations 626, 628, and 630, respectively.

Use of the DPI architecture/framework can provide various benefits. For example, benefits can include providing a loose coupling of applications, in that each application receives events used for communications from the DPI service 602 via the event bus 610 and each application separately uses API calls for initiating DPI functions and sending messages to the DPI service 602. Additionally, applications, including initiator applications, can stay independent by having no knowledge (and needing no knowledge) of how many other connected applications exist. Another benefit of the DPI framework is that applications can be integrated in a platform-agnostic manner. For instance, all integrated applications, including requesters and responders, can be deployed in various types of platform. The DPI framework can also benefit from use of asynchronous communication. For example, connected applications and systems asynchronously receive messages from the DPI service 602 via the event bus 610 and can send responses asynchronously to the DPI service 602.

In further detail, the DPI architecture can define the following roles: (1) orchestrator role: the DPI service 602 can serve as the orchestrator that directs the execution of a process (e.g., a blocking or unblocking process used in the iEoP protocol); 2) initiator role: imitator applications can trigger a DPI protocol (e.g. end-of-purpose check, information request) by making alpha $\alpha^i$ calls; 3) active participant role: applications can actively participate in a protocol by listening to requests sent by the orchestrator (e.g., via beta $\beta$ messages) and sending responses as alpha $\alpha^r$ calls; and 4) passive participant role: applications may be passive participants that only listen to decision messages from the orchestrator and do not send responses that influence the decisions or results (e.g., passive participants in the EoP protocol do not send an EoP status and listen only for aligned blocking commands).

To implement the iEoP protocol using the DPI architecture pattern: 1) the DPI service 602 can implement the iEoP Handler role (e.g., all requests to initiate the iEoP protocol for a master data object can be sent directly to the DPI service 602); 2) the event bus 610 can provide messaging middleware; 3) respective local blocking components can be implemented by the respective integrated applications; 4) EoP queries, blocking commands, and unblocking commands can be sent from the DPI service 602 as beta $\beta''$ messages and delivered (e.g., by the event bus 610) as gamma $\gamma^q$ messages; and 5) EoP statuses, blocking statuses, and unblocking statuses can be sent to the DPI service 602 as $\alpha^r$ messages during DPI invocations by respective applications.

Figure 6B:
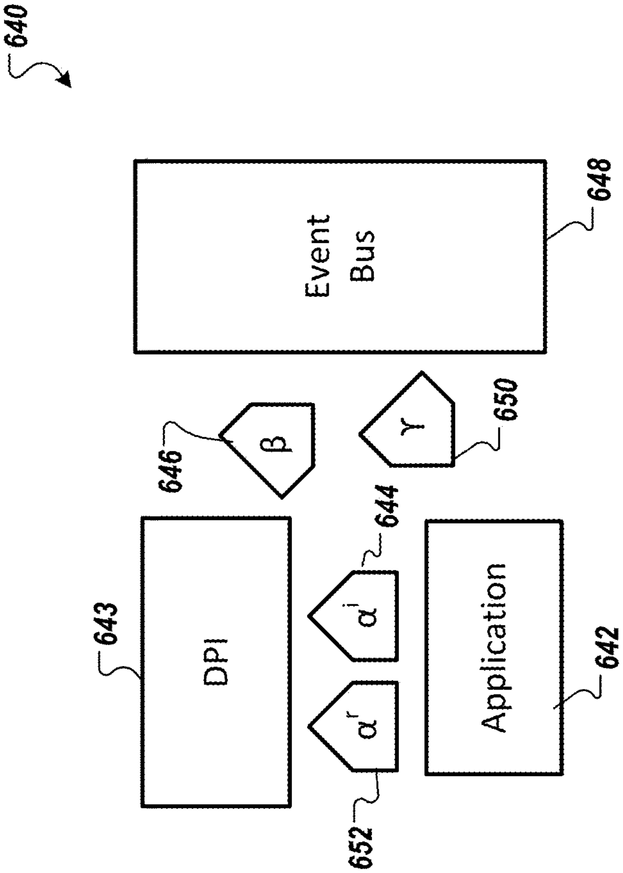
FIG. 6B illustrates a system that illustrates the data privacy integration framework from the perspective of a particular application.

FIG. 6B illustrates a system 640 that illustrates the data privacy integration framework from the perspective of a particular application 642. The application 642 can initiate a DPI process provided by a DPI service 643 by performing an alpha $\alpha^i$ invocation 644 of an API provided by the DPI service 643. The DPI service 643 can send a beta β message 646 to an event bus 648 to be broadcasted to connected applications (e.g., including the application 642). The event bus 648 can forward the beta β message 624 to the application 642 (and to other applications) as a forwarded gamma γ message 650. The application 642 can perform an action in response to the gamma γ message 650. The application 642 can send a response to the DPI service 643 that is responsive to the gamma γ message 650 by performing an alpha $\alpha^r$ invocation of an API provided by the DPI service 643.

Figure 7:
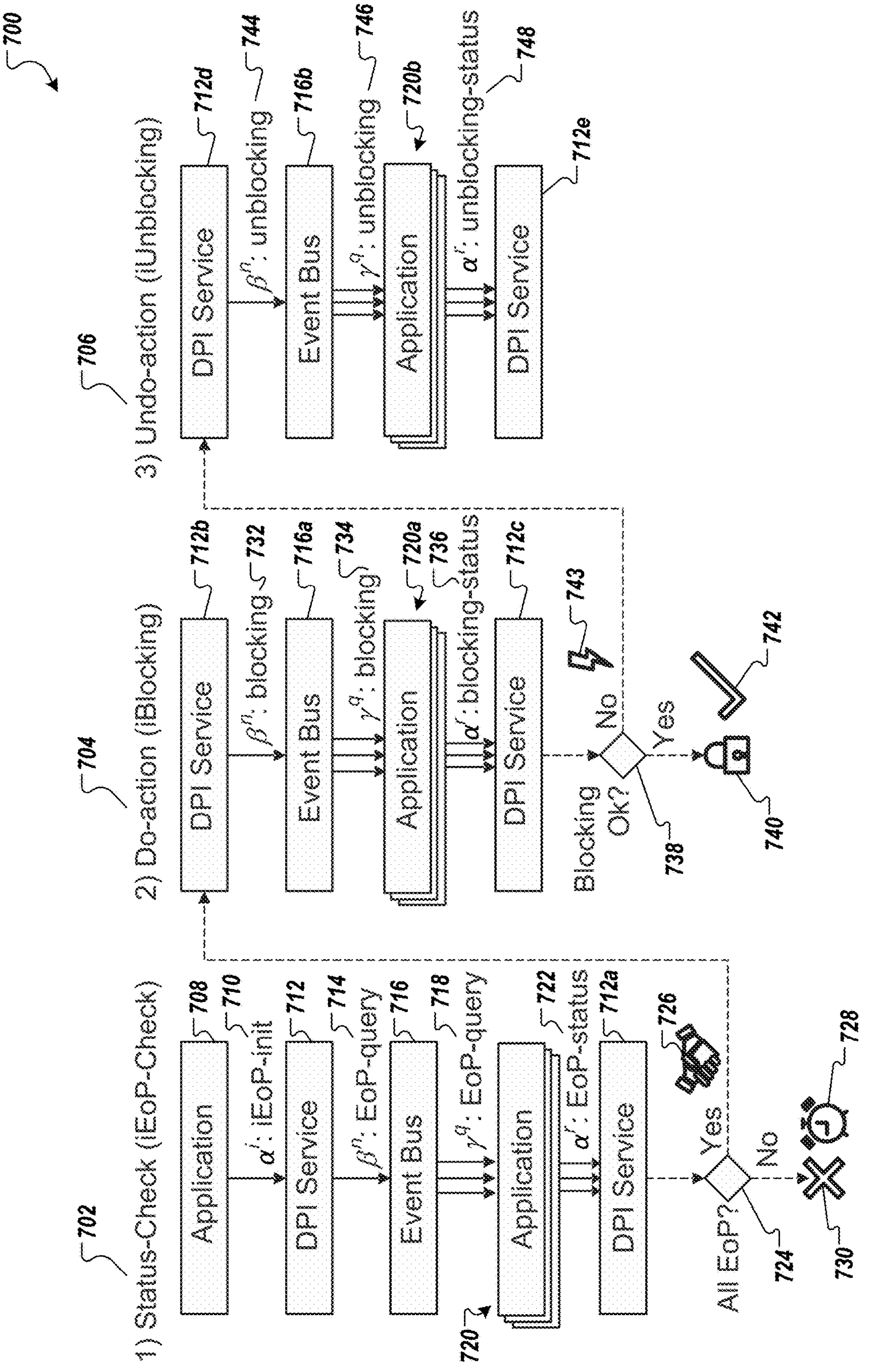
FIG. 7 is a flowchart that illustrates example status-check, blocking, and unblocking processes.

FIG. 7 is a flowchart 700 that illustrates example status-check 702, blocking 704, and unblocking 706 processes. As part of the status-check process 702, an application 708 sends an iEoP-initialization message 710 for a master data object during an alpha $\alpha^i$ invocation of an API provided by a DPI service 712. The iEoP-initialization message 710 can be sent by the application 708 for various reasons. For example, the application 708 may have determined that the application 708 has reached an end-of-purpose for the master data object and the application 708 may send the iEoP-query message to initiate a determination of whether all other applications have also reached the end-of-purpose for the master data object. As another example, the application 708 may have received a request from a data subject for a master data object corresponding to the data subject to be deleted. The application 708 can send the iEoP-initialization message 710 as part of initiating a process to request deletion of the master data object across all applications in the landscape.

In response to the iEoP-initialization message 710, the DPI service 712 can validate the iEoP-initialization message 710, as described in more detail below. In response to validating the iEoP-initialization message 710, the DPI service 712 sends a beta $\beta''$ EoP-query message 714 to an event bus 716 requesting that the event bus 716 distribute the EoP-query message 714 to connected applications (e.g., applications that have subscribed to receive messages related to the status-check process 702). The event bus 716, in response to receiving the beta $\beta''$ EoP-query message 714, distributes a gamma $\gamma^q$ message 718 to each application of connected applications 720.

Each application 720 has a local blocking component that can determine whether a local end-of-purpose has been reached for the master data object in the respective application 720. Accordingly, each application 720 can send an EoP-status message 722 to the DPI service 712 (as illustrated by a DPI service 712*a* receiving EoP-status messages 722) during an alpha $\alpha^r$ invocation of an API provided by the DPI service 712. Each EoP-status message 722 indicates whether a respective application 720 has reached a local end-of-purpose for the master data object. The DPI service 712 can collect EoP-status messages 722 that have been received from respective applications 720. At 724, the DPI service 712 determines whether an EoP-status message 722 that indicates a local end-of-purpose has been received from all connected applications. If an EoP-status message 722 that indicates a local end-of-purpose has been received from all connected applications, the DPI service 712 can determine that an end-of-purpose consensus decision has been reached for the master data object (e.g., as illustrated by a consensus icon 726). In response to determining that the end-of-purpose consensus decision has been reached for the master data object, the DPI service 712 can initiate the blocking process 704, as described below.

At 724, if the DPI service 712 has not received an EoP-status message 722 from all connected applications 720, the DPI service 712 can be configured to wait for a predetermined time interval for other EoP-status messages 722 to be received (e.g., as illustrated by a timer icon 728). If the predetermined time interval elapses before an EoP-status message has been received from all connected applications or if at least one received EoP-status message 722 indicates that a respective application has not reached a local end-of-purpose for the master data object, the DPI service 712 can determine to not initiate the blocking process 704 (e.g., as illustrated by an icon 730). When a received EoP-status message 722 indicates that a respective application has not reached a local end-of-purpose for the master data object, the EoP-status message 722 can include a time value when the application will reach (or predicts to reach) the end of purpose for the master data object. The DPI service 712 can store the time and use the time value when processing future iEoP-query messages, for example. For instance, if the time value included in an EoP-status message indicates that a respective application won't reach end-of-purpose for the master data object until a date of Mar. 31, 2022, the DPI service 712 can determine to not propagate EoP-query messages before that date (e.g., based on the DPI service 712 knowing that at least one application won't reach end-of-purpose for the master data object before the Mar. 31, 2022 date).

As part of the blocking process 704, the DPI service 712 (illustrated in the blocking process 704 as a DPI service 712*b*) sends a beta $\beta''$ blocking command 732 to the event bus 716 (illustrated in the blocking process 704 as an event bus 716*a*). In response to receiving the beta $\beta''$ blocking command 732, the event bus 716 sends a gamma $\gamma^q$ blocking command 734 to all connected applications 720 (illustrated in the blocking process 704 as applications 720*a*). In response to receiving the gamma $\gamma^q$ blocking command 734, each application 720 instructs a respective local blocking component to locally block the master data object for the respective application 720. Each application 720 sends a blocking-status message 736 to the DPI service 712 (as illustrated by a DPI service 712*c* receiving blocking-status messages 736) during an alpha $\alpha^r$ invocation of an API provided by the DPI service 712. Each blocking-status message 736 indicates whether the local blocking component of a respective application 720 has successfully blocked the master data object. A given application, even after previously sending an EoP-status message 722 indicating end-of-purpose for the master data object, may respond with a blocking-status corresponding to cannot-block, if, for example, new activity (e.g., for a new purpose) has occurred in the application for the master data object after the EoP-status message was sent by the application and before the gamma $\gamma^q$ blocking command 734 was received by the application.

The DPI service 712 can collect blocking-status messages 736 that have been received from respective applications 720. At 738, the DPI service 712 determines whether each application 720 has successfully blocked the master data object. If each application 720 has successfully blocked the master data object, the DPI service 712 can determine that the master data object has been consistently blocked across all applications of the landscape, as illustrated by icons 740 and 742. As described above, if a given application does not have a retention period, the master data object may be destructed, rather than blocked, in that application.

At 738, if the DPI service 712 determines that at least one application has not successfully blocked the master data object, the DPI service 712 determines that an error condition exists (e.g., as illustrated by an icon 743) of the master data object not being blocked in all of the applications 720. The DPI service 712 can be configured to ensure that the master data object is blocked in all applications, or not blocked in any application, for example (e.g., if at least one application can't current block the master data object). The DPI service 712 can determine to initiate the unblocking process 706 as an undo action, to resolve the error condition of the master data object not being blocked in all of the applications 720.

As part of the unblocking process 706, the DPI service 712 (illustrated in the unblocking process 706 as a DPI service 712*d*) sends a beta $\beta''$ unblocking command 744 to the event bus 716 (illustrated in the unblocking process 706 as an event bus 716*b*). In response to receiving the beta $\beta''$ unblocking command 744, the event bus 716 sends a gamma $\gamma^q$ unblocking command 746 to all connected applications 720 (illustrated in the unblocking process 706 as applications 720*b*). In response to receiving the gamma $\gamma^q$ unblocking command 746, each application 720 instructs a respective local blocking component to locally unblock the master data object for the respective application 720. Each application 720 sends an unblocking-status message 748 to the DPI service 712 (as illustrated by a DPI service 712*e* receiving unblocking-status messages 748) during an alpha $\alpha^r$ invocation of an API provided by the DPI service 712. Each unblocking-status message 748 indicates whether the local blocking component of a respective application 720 has successfully unblocked the master data object. A given application may not be able to unblock the master data object, for example, if the application does not have a retention period for the master data object and if the application has destructed the master data object after receiving the blocking command 734. As described in more detail below, the DPI service 712 can initiate redistribution of the master data object in cases where some applications have destructed, rather than blocked, a master data object.

Figure 8:
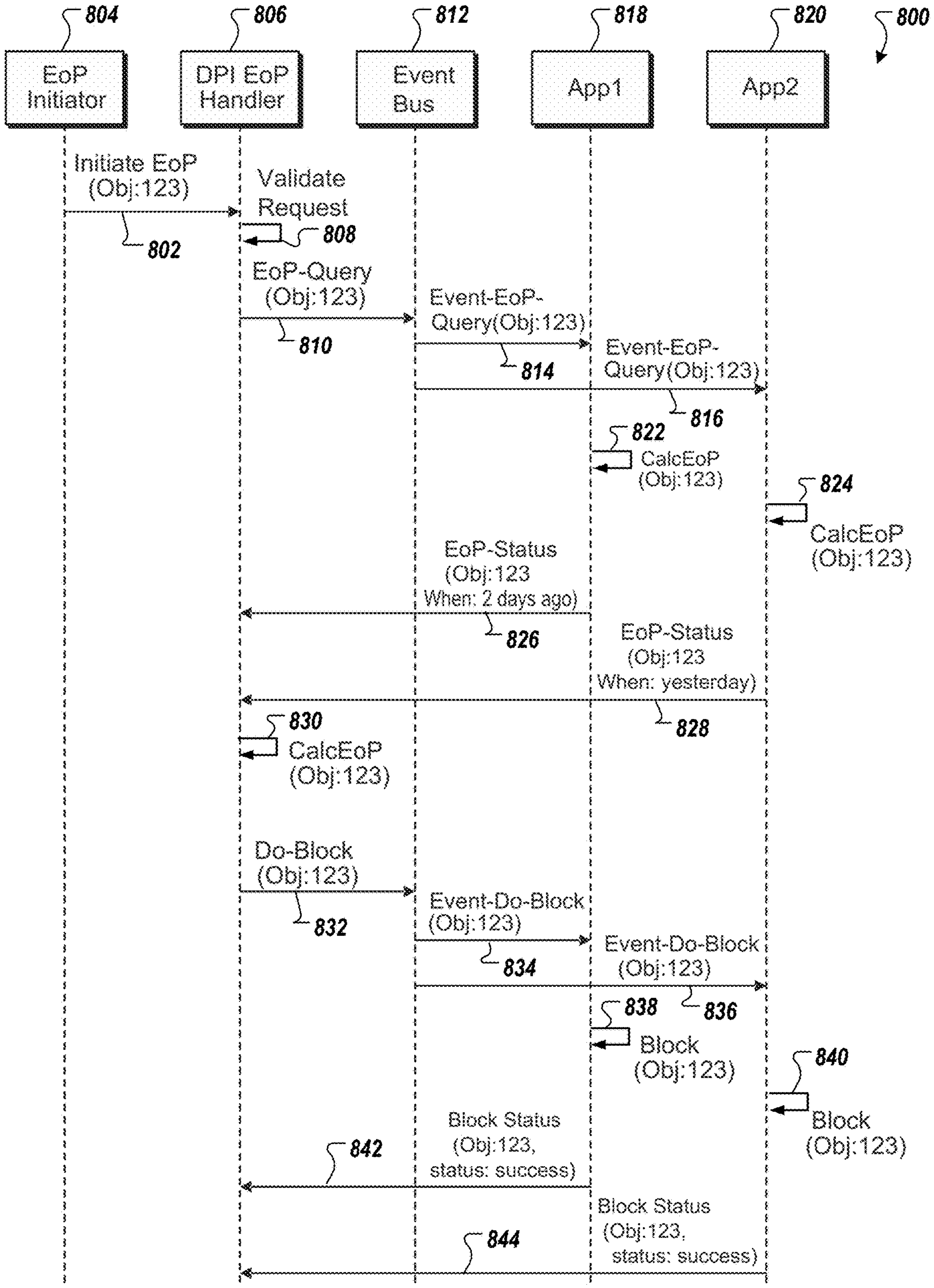
FIG. 8 is a swim lane diagram of an example method for an integrated end of purpose status check.

FIG. 8 is a swim lane diagram of an example method 800 for an integrated end of purpose status check. At 802, an EoP initiator 804 sends an EOP initialization message to an EoP handler 806 (e.g., a DPI service) for a master data object with an object identifier of "123". At 808, the EoP handler 806 validates the EOP initialization message. At 810, the EoP handler 806 sends an EoP-query message to an event bus 812. The event bus 812 broadcasts the EoP-query message to all connected applications. For example, at 814 and 816, the event bus 812 forwards the EoP-query message to a first application 818 and a second application 820, respectively.

A local blocking component of each application that receives the EoP-query message can perform a local end-of-purpose check to determine an EoP status of the master data object in the respective application. For example, at 822 and 824, local blocking components of the first application 818 and the second application 820 perform local EoP calculations for the master data object, respectively. The local EoP calculations can include determining a timestamp that indicates when end of purpose has been or will be reached.

Each connected application can send a calculated EoP status by making direct API calls to the EoP handler 806. The EoP status can indicate whether the EoP check was successful and can include a timestamp of the EoP date. For example, at 826 and 828, the first application 818 and the second application 820 each respectively send an EoP status to the EoP handler 806. In the example of FIG. 8, all dates returned with respective EoP statuses are dates in the past (e.g., indicating that each application has already reached an end-of-purpose for the master data object).

At 830, the EoP handler 806 uses the EoP-status messages received from all of the connected applications to calculate a global end-of-purpose determination. In the example of FIG. 8, the EoP handler 806 determines that end-of-purpose is reached based on all connected applications returning an EoP status with a timestamp that is in the past.

At 832, based on determining that end-of-purpose has been globally reached for the master data object, the EoP handler 806 sends a block command for the master data object to the event bus 812. The event bus 812 broadcasts the block command to all connected applications. For example, at 834 and 836, the event bus 812 forwards the block command for the master data object to the first application 818 and the second application 820, respectively.

The local blocking component of each application that receives the block command for the master data object can perform a local blocking operation for the master data object in the respective application. For example, at 838 and 840, local blocking components of the first application 818 and the second application 820 perform local blocking operations for the master data object, respectively. Each blocking operation can have a success or failure blocking status.

Each connected application can send a respective blocking status to the EoP handler 806 by invoking an API of the EoP handler 806. For example, at 842 and 844, the first application 818 and the second application 820 each respectively send a blocking status indicating success to the EoP handler 806. Since each blocking status indicates successful blocking, aligned blocking has occurred in the landscape, and the method 800 ends. In other examples, other situations, including error conditions can occur and be respectively handled, as described below.

Figure 9:
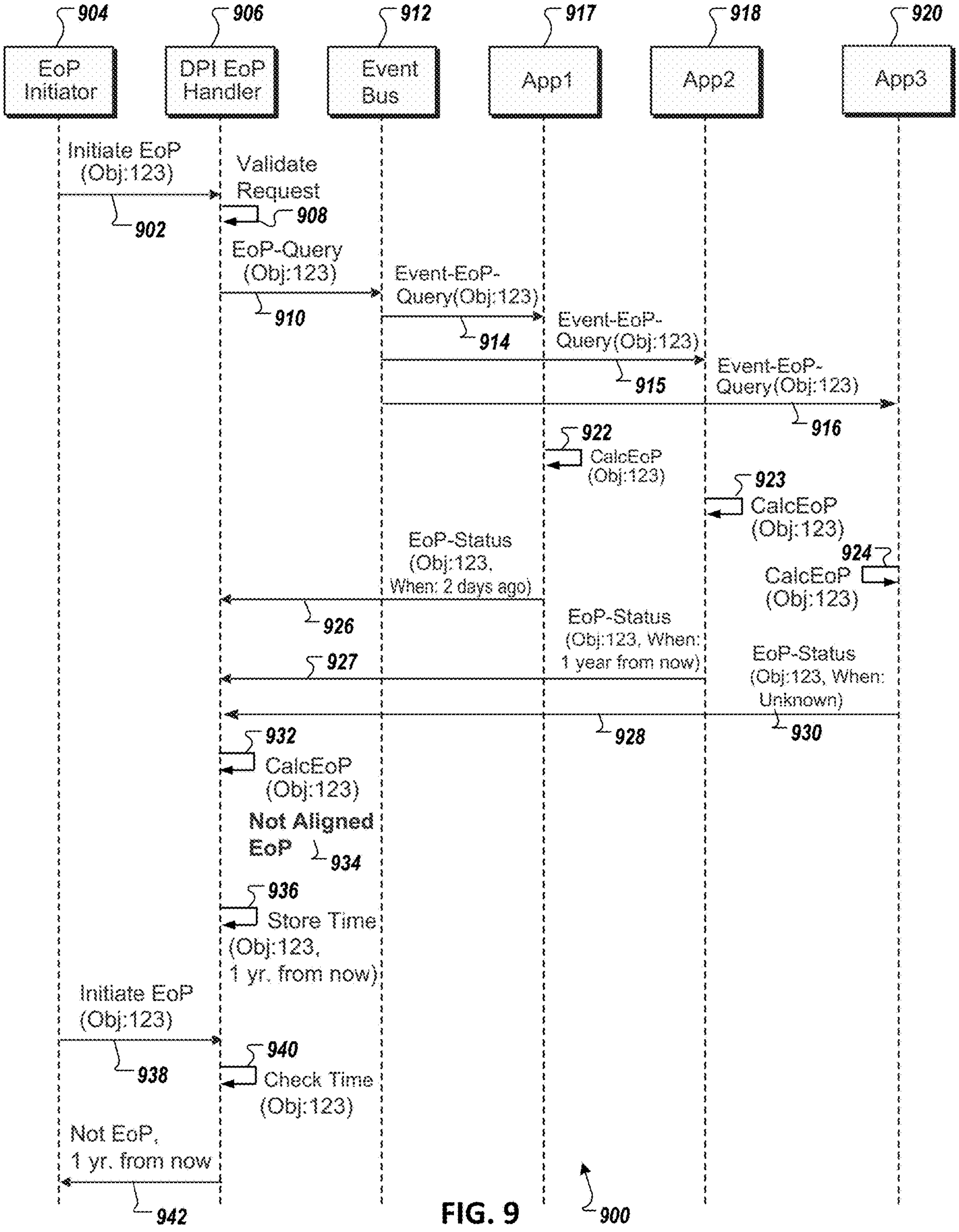
FIG. 9 is a swim lane diagram of an example method for an integrated end of purpose status check.

FIG. 9 is a swim lane diagram of an example method 900 for an integrated end of purpose status check. The first steps of the method 900 are similar to the method 800. For example, at 902, an EoP initiator 904 sends an EOP initialization message to an EoP handler 906 (e.g., a DPI service) for a master data object with an object identifier of "123". At 908, the EoP handler 906 validates the EOP initialization message. At 910, the EoP handler 906 sends an EoP-query message to an event bus 912. At 914, 915, and 916, the event bus 912 forwards the EoP-query message to a first application 917, a second application 918, and a third application 920, respectively. At 922, 923, and 924, local blocking components of the first application 917, the second application 918, and the third application 920 perform local EoP calculations for the master data object, respectively.

Each connected application can send a calculated EoP status by making direct API calls to the EoP handler 906. The EoP status for an application can indicate whether the EoP check was successful for the application and can include a timestamp of the EoP date. For example, at 926, 927, and 928, the first application 917, the second application 918, and the third application 920 each respectively send an EoP status to the EoP handler 906.

The EoP status sent by the first application 917 has an EoP date value corresponding to “2 days ago” which indicates that the first application 917 is at end of purpose for the master data object. The EoP status sent by the second application 918 has an EoP date value corresponding to “one year from now”, which indicates that the second application 918 is not at end of purpose for the master data object.

In some implementations, a local blocking purpose may determine that the respective application is not at end of purpose for the master data object but may not be currently able to determine or predict a future date or time at which the application will be at end of purpose for the master data object. For example, the EoP status sent by the third application 920 has an EoP date value of “Unknown” 930, which indicates that the third application 920 is not at end of purpose for the master data object (and currently can’t determine or predict an end of purpose date).

At 932, the EoP handler 906 uses the EoP-status messages received from all of the connected applications to calculate a global end-of-purpose determination. In the example of FIG. 9, the EoP handler 906 determines that end-of-purpose has not been reached based on the second application 918 and the third application 920 not being at end of purpose for the master data object (e.g., as illustrated by a not-aligned-EoP result 934). Accordingly, an aligned block command is not sent to the connected applications in response to the EoP initialization message.

In some implementations, the EoP handler 906 performs a store time operation 936 to store an EoP time received from an application in an EoP status message that is farthest into the future. The EoP time farthest into the future represents a soonest time that an aligned end of purpose state is possible to be reached for applications in the landscape. In the store time operation 936, the EoP handler stores a time corresponding to one year from the current date, based on the EoP status received from the second application 918. In some implementations, the EoP handler sets a cap on a maximum amount of time that is stored as a stored time. In some implementations, applications can send an update to the EoP handler if conditions in the application, such as new transactional data or a configuration change (e.g., a change in legal retention periods) occurs. The EoP handler can adjust the stored time based on received application updates.

The EoP handler 906 can use the stored time to validate or respond to future EoP initialization requests. For example, at 938, the EoP initiator 904 sends another EoP initialization message to the EoP handler 906. Although both EoP initialization messages sent at 902 and 938, respectively, are shown as being sent from the same EoP initiator 904, the EoP initialization messages sent at 902 and 938 can be sent from different entities.

At 940, in response to the EoP initialization message sent at 938, the EoP handler 906 performs a check time operation to compare a current time to the time stored during the store time operation 936. In response to determining that the current time is less than the time stored during the store time operation 936, the EoP handler 906 can determine that end of purpose has not been reached for the master data object (e.g., since the EoP handler 906 knows that at least the second application 918 has not yet reached end of purpose for the master data object). Accordingly, the EoP handler 906 determines to not send EoP query messages to connected applications. In some implementations, the EoP handler 906 sends a response 942 to the EoP initiator 904 that includes the time stored during the store time operation 936. The EoP initiator 904 can in turn store the time included in the response 942 and determine to not send any other EoP initialization messages until after the stored time has passed.

Figure 10:
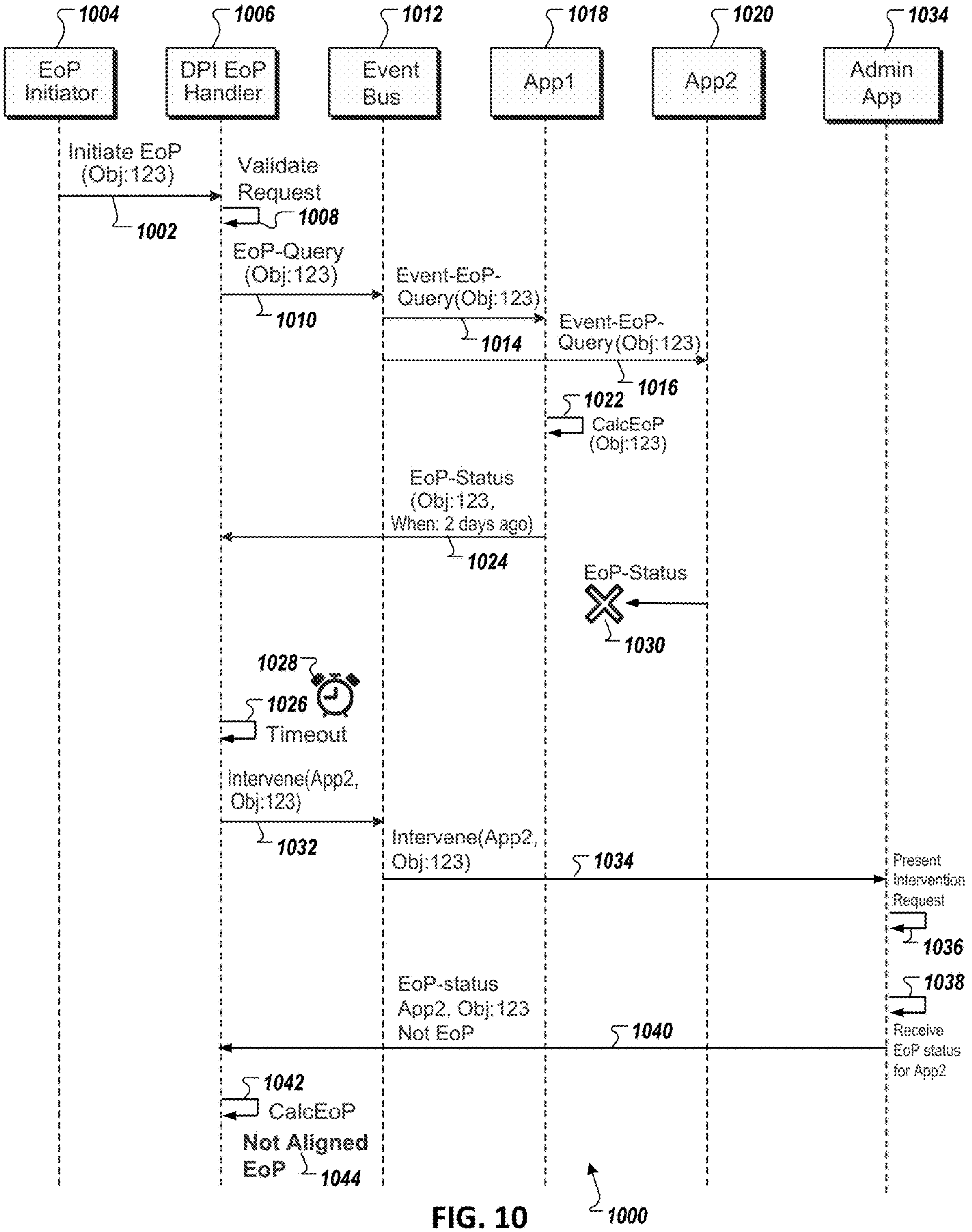
FIG. 10 is a swim lane diagram of an example method for an integrated end of purpose status check.

FIG. 10 is a swim lane diagram of an example method 1000 for an integrated end of purpose status check. The first steps of the method 1000 are similar to the method 900. For example, at 1002, an EoP initiator 1004 sends an EOP initialization message to an EoP handler 1006 (e.g., a DPI service) for a master data object with an object identifier of “123”. At 1008, the EoP handler 1006 validates the EOP initialization message. At 1010, the EoP handler 1006 sends an EoP-query message to an event bus 1012. At 1014 and 1016, the event bus 1012 forwards the EoP-query message to a first application 1018 and a second application 1020, respectively. At 1022 a local blocking component of the first application 1018 performs a local EoP calculation for the master data object.

At 1024, the first application 1018 sends an EoP status to the EoP handler 1006 that indicates that the first application 1018 reached end of purpose for the master data object two days ago. At 1026, the EoP handler 1006 determines that a timer event has occurred (e.g., as illustrated by a timer icon 1028) for the EoP query sent to the second application 1020 without the EoP handler 1006 receiving an EoP status from the second application 1020. As illustrated by an icon 1030, the second application 1020 has not sent an EoP status to the EoP handler 1006, such as due to the second application 1020 being down, the second application 1020 not having yet completed a local EoP check process, the second application 1020 (or a local blocking component of the second application 1020) not having received (or detected receipt of) an EoP query, or for other various reasons.

In some implementations, in response to the timer event, the EoP handler 1006 determines that an aligned end of purpose has not been reached for connected applications (e.g., the EoP handler 1006 can determine that an aligned end of purpose cannot be determined without receiving status from all applications). In some implementations, the EoP handler 1006 sends an intervention request 1032 to the event bus 1012 requesting that the event bus 1012 forward the intervention request 1032 to an administrative application 1034 (e.g., that is being monitored by an administrator). At 1034, the event bus 1012 forwards the intervention request 1032 to the administrative application 1034.

At 1036, the administrative application 1034 presents the intervention request (e.g., to the administrator, in a user interface of the administrative application 1034). At 1038, the administrative application 1034 receives an EoP status for the second application 1020 (e.g., from the user interface). For example, the administrative application 1034 can receive an indication from the administrator from the user interface that the second application 1020 is not at end of purpose for the master data object. At 1040, the administrative application 1034 sends the EoP status for the second application 1020 to the EoP handler 1006. At 1042, the EoP handler 1006 performs an EoP calculation for the master data object, using the EoP status received from the first application 1018 and the EoP status for the second application 1020 that was received from the administrative application 1034. Since the EoP status for the second application 1020 indicates that the second application 1020 is not at end of purpose for the master data object, the EoP calculation performed by the EoP handler 1006 yields a result 1044 indicating that aligned end of purpose has not been reached for the master data object.

Figure 11:
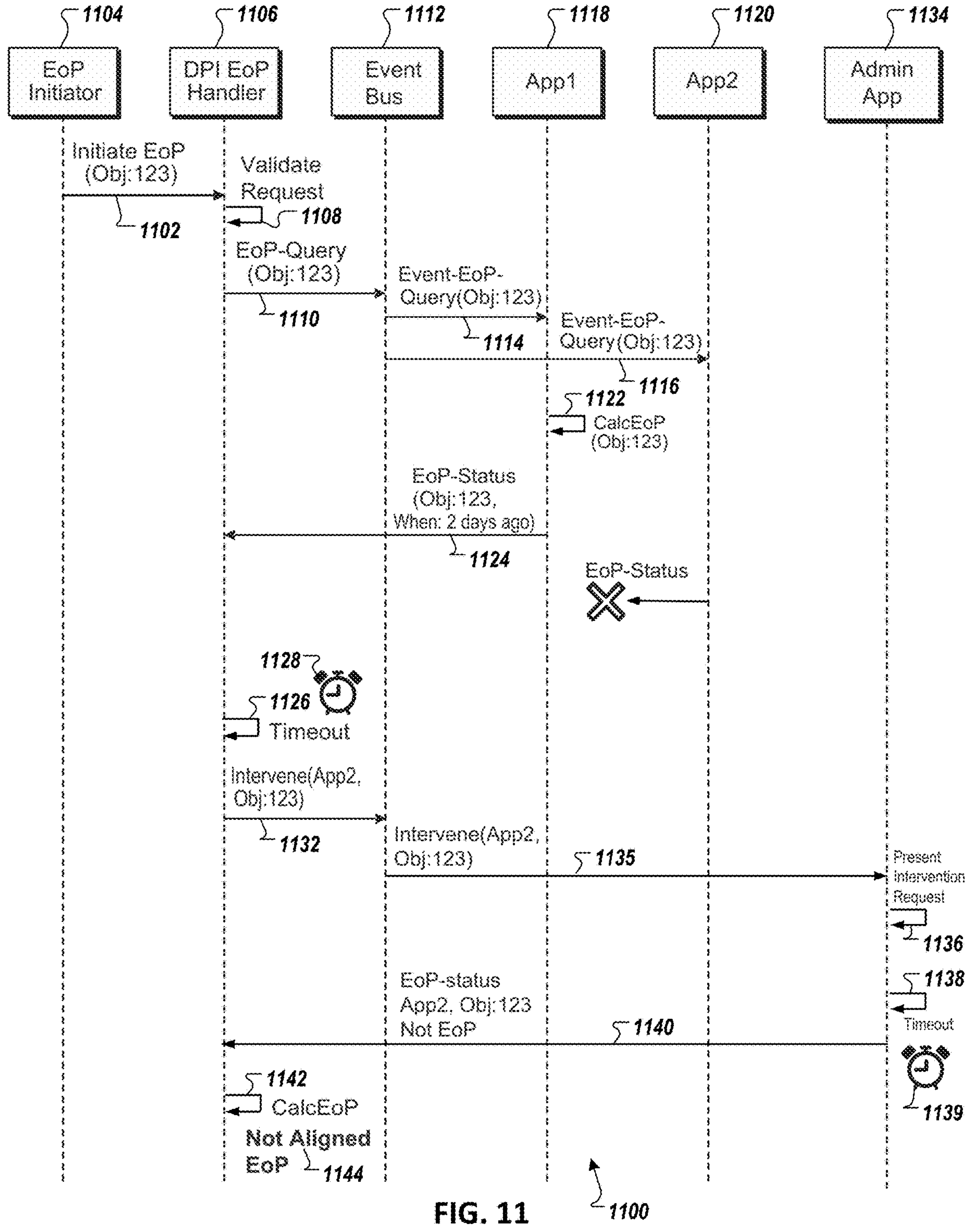
FIG. 11 is a swim lane diagram of an example method for an integrated end of purpose status check.

FIG. 11 is a swim lane diagram of an example method 1100 for an integrated end of purpose status check. The first steps of the method 1100 are similar to the method 1000. For example, at 1102, an EoP initiator 1104 sends an EOP initialization message to an EoP handler 1106 (e.g., a DPI service) for a master data object with an object identifier of "123". At 1108, the EoP handler 1106 validates the EOP initialization message. At 1110, the EoP handler 1106 sends an EoP-query message to an event bus 1112. At 1114 and 1116, the event bus 1112 forwards the EoP-query message to a first application 1118 and a second application 1120, respectively. At 1122 a local blocking component of the first application 1118 performs a local EoP calculation for the master data object.

At 1124, the first application 1118 sends an EoP status to the EoP handler 1106 that indicates that the first application 1118 reached end of purpose for the master data object two days ago. At 1126, the EoP handler 1106 determines that a first timer event has occurred (e.g., as illustrated by a timer icon 1128) for the EoP query sent to the second application 1120 without the EoP handler 1106 receiving an EoP status from the second application 1120. As illustrated by an icon 1130, the second application 1120 has not sent an EoP status to the EoP handler 1106.

The EoP handler 1106 can send an intervention request 1132 to the event bus 1112 requesting that the event bus 1112 forward the intervention request 1132 to an administrative application 1134 (e.g., that is being monitored by an administrator). At 1135, the event bus 1112 forwards the intervention request 1132 to the administrative application 1134. At 1136, the administrative application 1134 presents the intervention request (e.g., to the administrator, in a user interface of the administrative application 1134). At 1138, the administrative application 1134 determines that a second timer event (e.g., illustrated by a timer icon 1139) has occurred (e.g., indicating that the administrator has not responded to the presented intervention request within a predetermined amount of time).

The administrative application 1134 can be configured in different modes where in each mode the administrative application 1134 determines a different default EoP status for an intervention request when an administrator fails to respond to the intervention request before a timeout occurs. For example, in a first mode, the default EoP status can be not end of purpose and in a second mode the default EoP status can be end of purpose. As another example, the administrative application 1134 can be configured to access a rules database that has rules for determining a default EoP status based on an application, a type of master data object, a combination of application and master data object, or other conditions.

In the example of FIG. 11, at 1140, the administrative application 1134 sends an EoP status of not end of purpose for the second application 1120 for the master data object, to the EoP handler 1106. For example, the administrative application 1134 may be configured to use a default EoP status of not end of purpose when an administrator fails to respond to an intervention request.

At 1142, the EoP handler 1106 performs an EoP calculation for the master data object, using the EoP status received from the first application 1118 and the EoP status for the second application 1120 that was received from the administrative application 1134. Since the EoP status for the second application 1120 indicates that the second application 1120 is not at end of purpose for the master data object, the EoP calculation performed by the EoP handler 1106 yields a result 1144 indicating that aligned end of purpose has not been reached for the master data object.

Figure 12:
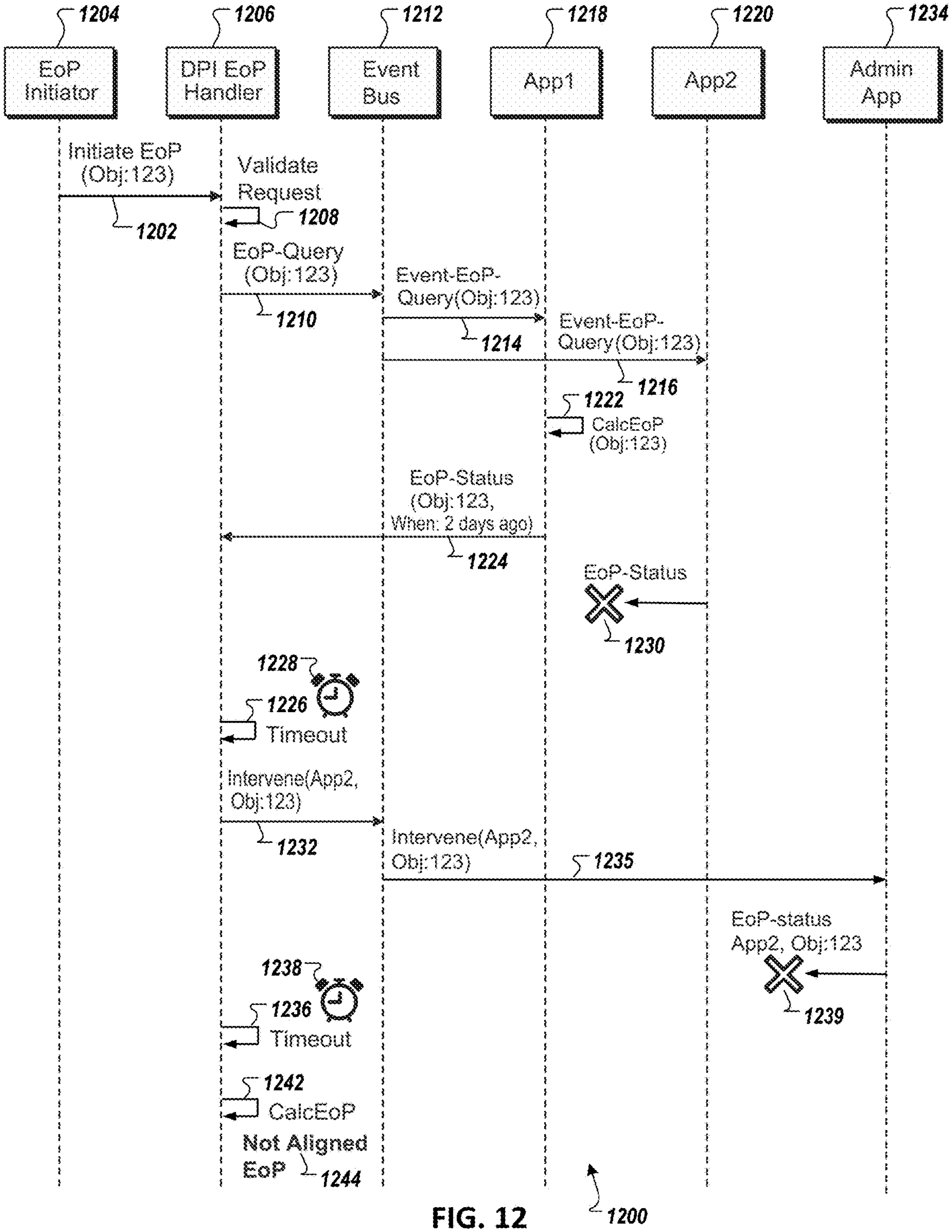
FIG. 12 is a swim lane diagram of an example method for an integrated end of purpose status check.

FIG. 12 is a swim lane diagram of an example method 1200 for an integrated end of purpose status check. The first steps of the method 1200 are similar to the method 1100. For example, at 1202, an EoP initiator 1204 sends an EOP initialization message to an EoP handler 1206 (e.g., a DPI service) for a master data object with an object identifier of "123". At 1208, the EoP handler 1206 validates the EOP initialization message. At 1210, the EoP handler 1206 sends an EoP-query message to an event bus 1212. At 1214 and 1216, the event bus 1212 forwards the EoP-query message to a first application 1218 and a second application 1220, respectively. At 1222 a local blocking component of the first application 1218 performs a local EoP calculation for the master data object.

At 1224, the first application 1218 sends an EoP status to the EoP handler 1506 that indicates that the first application 1218 reached end of purpose for the master data object two days ago. At 1226, the EoP handler 1206 determines that a first timer event has occurred (e.g., as illustrated by a timer icon 1228) for the EoP query sent to the second application 1220 without the EoP handler 1206 receiving an EoP status from the second application 1220. The EoP handler 1206 sends an intervention request 1232 to the event bus 1212 requesting that the event bus 1212 forward the intervention request 1232 to an administrative application 1234. At 1235, the event bus 1212 forwards the intervention request 1232 to the administrative application 1234.

At 1236, the EoP handler 1206 determines that a second timer event (e.g., illustrated by a timer icon 1238) has occurred that indicates that the administrative application 1234 has not responded to the intervention request within a predetermined amount of time. For example, an icon 1239 indicates that the administrative application 1234 has not sent a response to the intervention request. The administrative application 1234 may be down or otherwise unresponsive, for example.

The EoP handler 1206 can be configured in different modes where in each mode the EoP handler 1206 determines a different default EoP status for an intervention request when the administrative application 1234 fails to respond to the intervention request before a timeout occurs. For example, in a first mode, the default EoP status can be not end of purpose and in a second mode the default EoP status can be end of purpose. As another example, the EoP handler 1206 can be configured to access a rules database that has rules for determining a default EoP status based on an application, a type of master data object, a combination of application and master data object, or other conditions.

In the example of FIG. 12, at 1240, the administrative application 1234 sends an EoP status of not end of purpose for the second application 1220 for the master data object, to the EoP handler 1206. For example, the administrative application 1234 may be configured to use a default EoP status of not end of purpose when an administrator fails to respond to an intervention request.

At 1242, the EoP handler 1206 performs an EoP calculation for the master data object, using the EoP status received from the first application 1218 and a default EoP status of not end of purpose for the second application 1220.

Since the EoP status for the second application 1220 is not at end of purpose for the master data object, the EoP calculation performed by the EoP handler 1206 yields a result 1244 indicating that aligned end of purpose has not been reached for the master data object.

Figure 13:
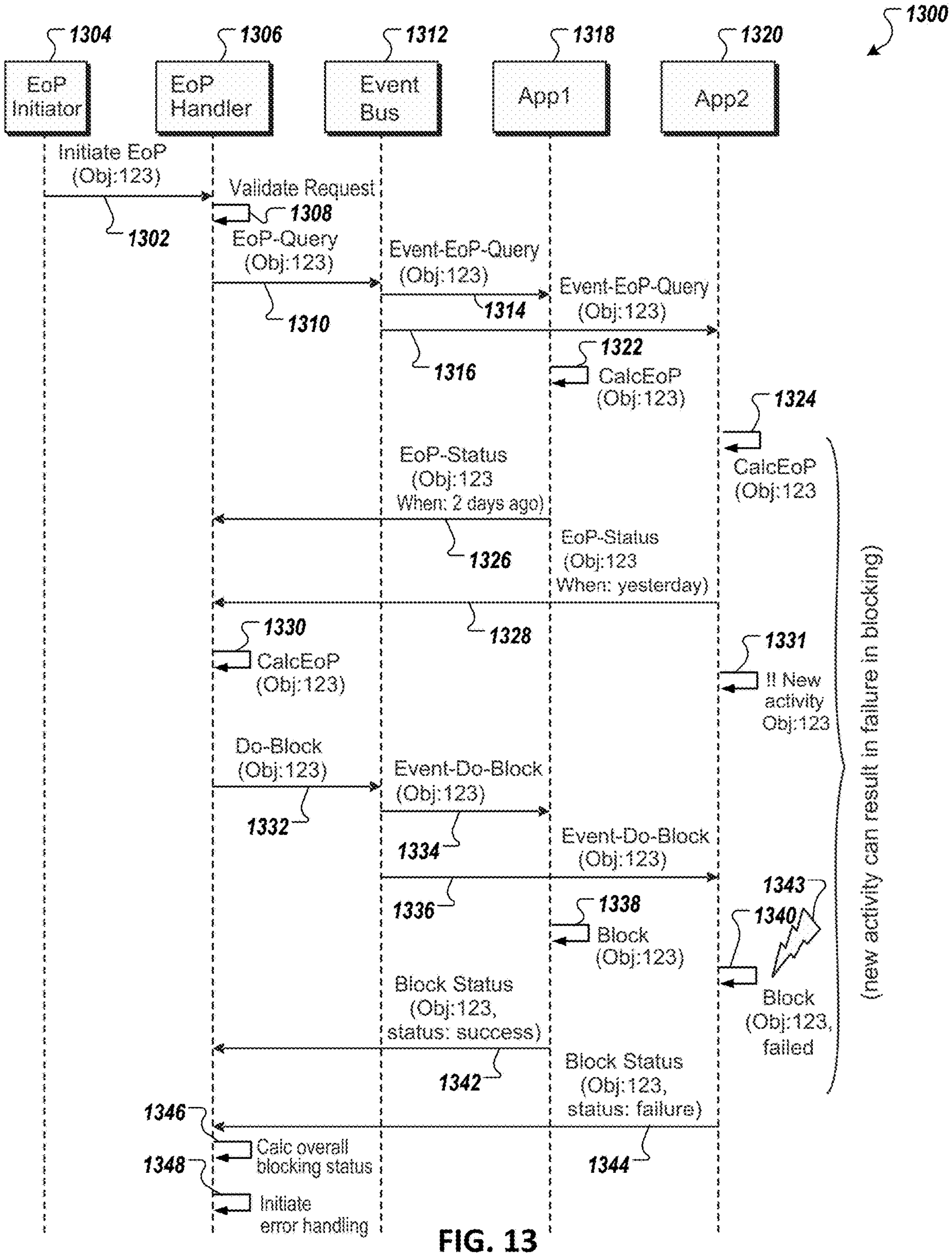
FIG. 13 is a swim lane diagram of an example method for an integrated end of purpose status check.

FIG. 13 is a swim lane diagram of an example method 1300 for an integrated end of purpose status check. The first steps of the method 1300 are similar to the method 800. For example, at 1302, an EoP initiator 1304 sends an EOP initialization message to an EoP handler 1306 (e.g., a DPI service) for a master data object with an object identifier of "123". At 1308, the EoP handler 1306 validates the EOP initialization message. At 1310, the EoP handler 1306 sends an EoP-query message to an event bus 1312. The event bus 1312 broadcasts the EoP-query message to all connected applications. For example, at 1314 and 1316, the event bus 1312 forwards the EoP-query message to a first application 1318 and a second application 1320, respectively. At 1322 and 1324, local blocking components of the first application 1318 and the second application 1320 perform local EoP calculations for the master data object, respectively.

At 1326 and 1328, the first application 1318 and the second application 1320 each respectively send an EoP status to the EoP handler 1306. In the example of FIG. 13, all dates returned with respective EoP statuses are dates in the past (e.g., indicating that each application has already reached an end-of-purpose for the master data object). At 1330, the EoP handler 1306 uses the EoP-status messages received from all of the connected applications to calculate a global end-of-purpose determination. In the example of FIG. 13, the EoP handler 1306 determines that end-of-purpose is reached based on all connected applications returning an EoP status with a timestamp that is in the past.

At 1331, new activity related to the master data object occurs in the second application 1320 after the second application 1320 has sent the EoP status at 1328. For example, a new transaction related to an entity corresponding to the master data object may occur in the second application 1320. As a particular example, an employee who had left a company may be rehired by the company or may be marked as employed after a correction has been entered after a human resources employee incorrectly marked the employee as having left the company. Accordingly, a WorkforcePerson master data object for which the second application 1320 previously reported at end of purpose may have activity occur in the second application 1320 after the second application 1320 has sent a status indicating that the WorkforcePerson object had reached end of purpose. The new activity can occur after one or more purposes are associated with the master data object.

At 1332, based on the determining at 1330 that end-of-purpose has been globally reached for the master data object, the EoP handler 1306 sends a block command for the master data object to the event bus 1312. The event bus 1312 broadcasts the block command to all connected applications. For example, at 1334 and 1336, the event bus 1312 forwards the block command for the master data object to the first application 1318 and the second application 1320, respectively.

The local blocking component of each application that receives the block command for the master data object can attempt a local blocking operation for the master data object in the respective application. For example, at 1338 and 1340, local blocking components of the first application 1318 and the second application 1320 attempt local blocking operations for the master data object, respectively. Each blocking operation can have a success or failure blocking status. For example, the local blocking operation performed by the first application 1318 at 1338 can have a successful status and the first application 1318 can send, at 1342, a blocking status that indicates successful blocking of the master data object to the EoP handler 1306 by invoking an API of the EoP handler 1306.

Based on the new activity that has occurred at 1331 for the master data object in the second application 1320, the second application 1320 can determine, at 1340, that attempted blocking of the master data object has a failure status, as illustrated by an icon 1343. The second application 1320 can determine that blocking is unsuccessful based on purpose(s) that are now assigned to the master data object. Accordingly, the second application can send, at 1344, a blocking status that indicates unsuccessful blocking of the master data object to the EoP handler 1306 by invoking an API of the EoP handler 1306.

At 1346, the EoP handler 1306 calculates an overall blocking status based on the blocking statuses received from the first application 1318 and the second application 1320. The EoP handler 1306 can determine a successful overall blocking status if all respective blocking statuses received from applications are successful—otherwise the EoP handler 1306 can determine a failure status as the overall blocking status. Based on the unsuccessful blocking status received from the second application 1320, the EoP handler 1306 determines an unsuccessful overall blocking status. At 1348, in response to determining the unsuccessful overall blocking status, the EoP handler 1306 initiates error handling. Error handling can include invoking an unblocking procedure in which requests are sent to connected applications that had successfully blocked the master data object to unblock the master data object. Unblocking is described below with respect to FIG. 14.

Figure 14:
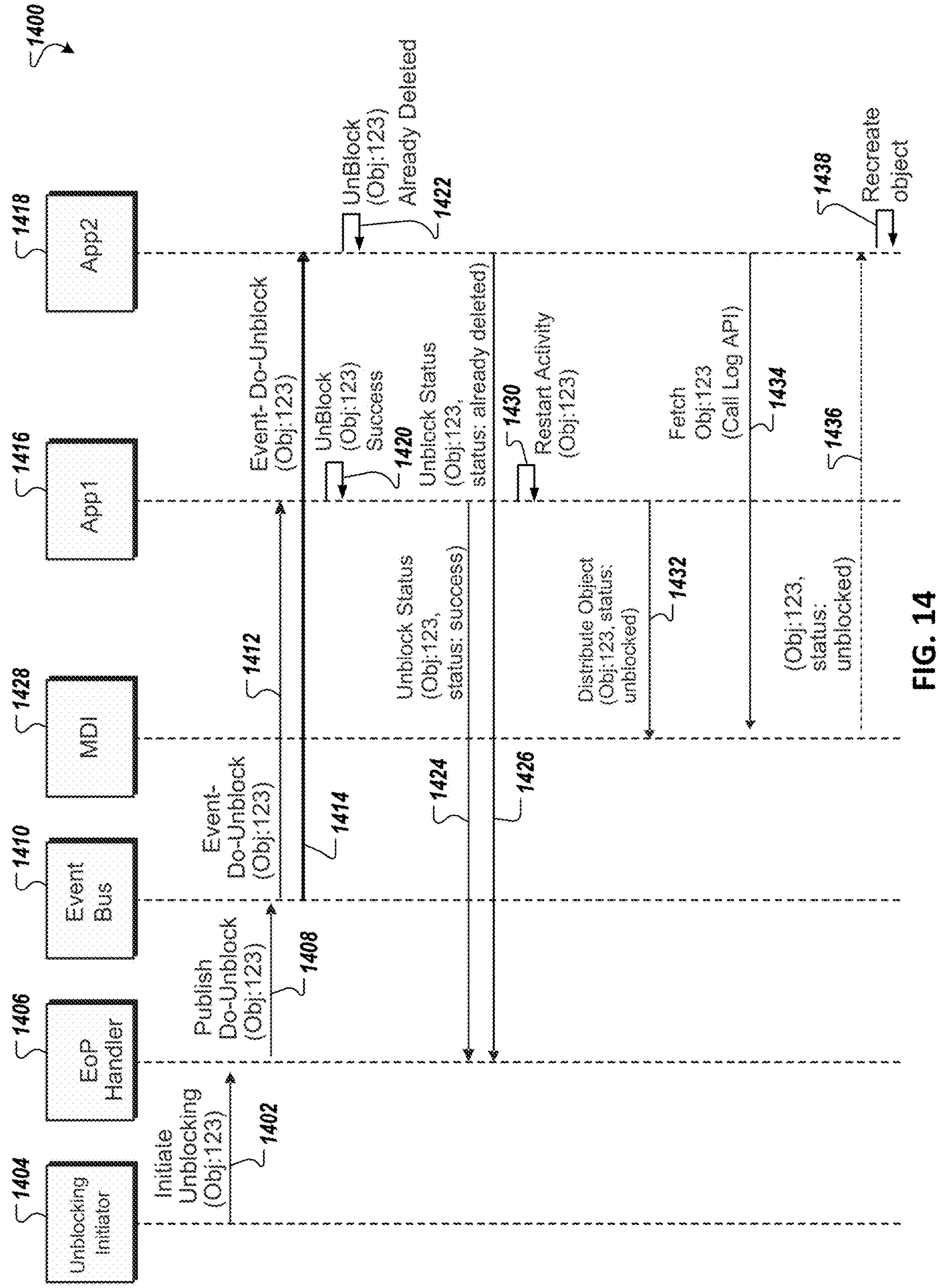
FIG. 14 is a swim lane diagram of an example method for an unblocking protocol.

FIG. 14 is a swim lane diagram of an example method 1400 for an unblocking protocol. As described above, the unblocking protocol can be performed in response to new activity occurring for a master data object that was previously blocked or in response to an error condition that occurred during an aligned blocking operation (e.g., when not all applications were able to successfully block the master data object).

At 1402, an unblocking initiator 1404 sends an initiate unblocking message for a master data object with an object identifier of "123" to an EoP handler 1406. The EoP handler 1406 can be the DPI service, for example. The unblocking initiator 1404 can be a landscape application and the initiate unblocking message can be sent by the landscape application in response to new activity occurring for the master data object after the master data object was blocked. As another example, the unblocking initiator 1404 can be the DPI service itself, and the initiate unblocking message may be an internal message sent within the DPI service to initiate unblocking in response to an error condition that occurred during an aligned blocking operation.

At 1408, the EoP handler 1406 sends an unblock command for the master data object to an event bus 1410. The event bus 1410 can broadcast the unblock command to all connected applications. For example, at 1412 and 1414, the event bus 1410 forwards the unblock command for the master data object to a first application 1416 and a second application 1418, respectively.

The local blocking component of each application that receives the unblock command for the master data object can attempt a local unblocking operation for the master data object in the respective application. For example, at 1420 and 1422, local blocking components of the first application 1416 and the second application 1418 attempt local unblocking operations for the master data object, respectively. Each unblocking operation can have an unblocking status. Unblocking status values can include success (e.g., the master data object was successfully unblocked), already-deleted (e.g., unblocking cannot be performed due to the master data object being already deleted in the application), or error-condition (e.g., requested unblocking cannot occur for some reason other than the master data object having been deleted). For example, the local unblocking operation performed by the first application 1416 at 1420 can have a successful status and the first application 1416 can send, at 1424, an unblocking status that indicates successful unblocking of the master data object to the EoP handler 1406 by invoking an API of the EoP handler 1406.

As another example, the local unblocking operation performed by the second application 1418 at 1422 can have a status of already-deleted (e.g., if the master data object has already been deleted in the second application 1418). The second application 1418 can send, at 1426, an unblocking status that indicates prior deletion of the master data object to the EoP handler 1406 by invoking an API of the EoP handler 1406.

The EoP handler 1406 can evaluate unblocking statuses received from the connected applications. If all unblocking statuses received from the connected applications indicate successful unblocking, the method 1400 can end. If any of the unblocking statuses indicate an error condition, further error handling can be performed, which can include requesting intervention from an administrator. If at least one unblocking status indicates that the master data object was already deleted from an application, that application can receive the master data object as part of a replication process that is performed by an MDI service 1428.

For example, at 1430, activity for the master data object is restarted in the first application 1416, after the first application 1416 has unblocked the master data object. The first application 1416 can be a leading system for the master data object. As such, the first application 1416, at 1432, can distribute the master data object to the MDI service 1428 (e.g., in response to the new activity, in response to the unblocking, or as part of a periodic distribution). Other applications other than the leading system for the master data object can receive the master data object from the MDI service 1428. For example, at 1434, the second application 1418 sends a fetch request to the MDI service 1428 to receive updates from the MDI service 1428. At 1436, the MDI service 1428 sends data for the master data object to the second application 1418. At 1438, the second application 1418 uses the received data for the master data object to recreate the master data object in the second application 1418. Other redistribution scenarios that involve the MDI service are described below with respect to FIG. 72-75.

Figure 15:
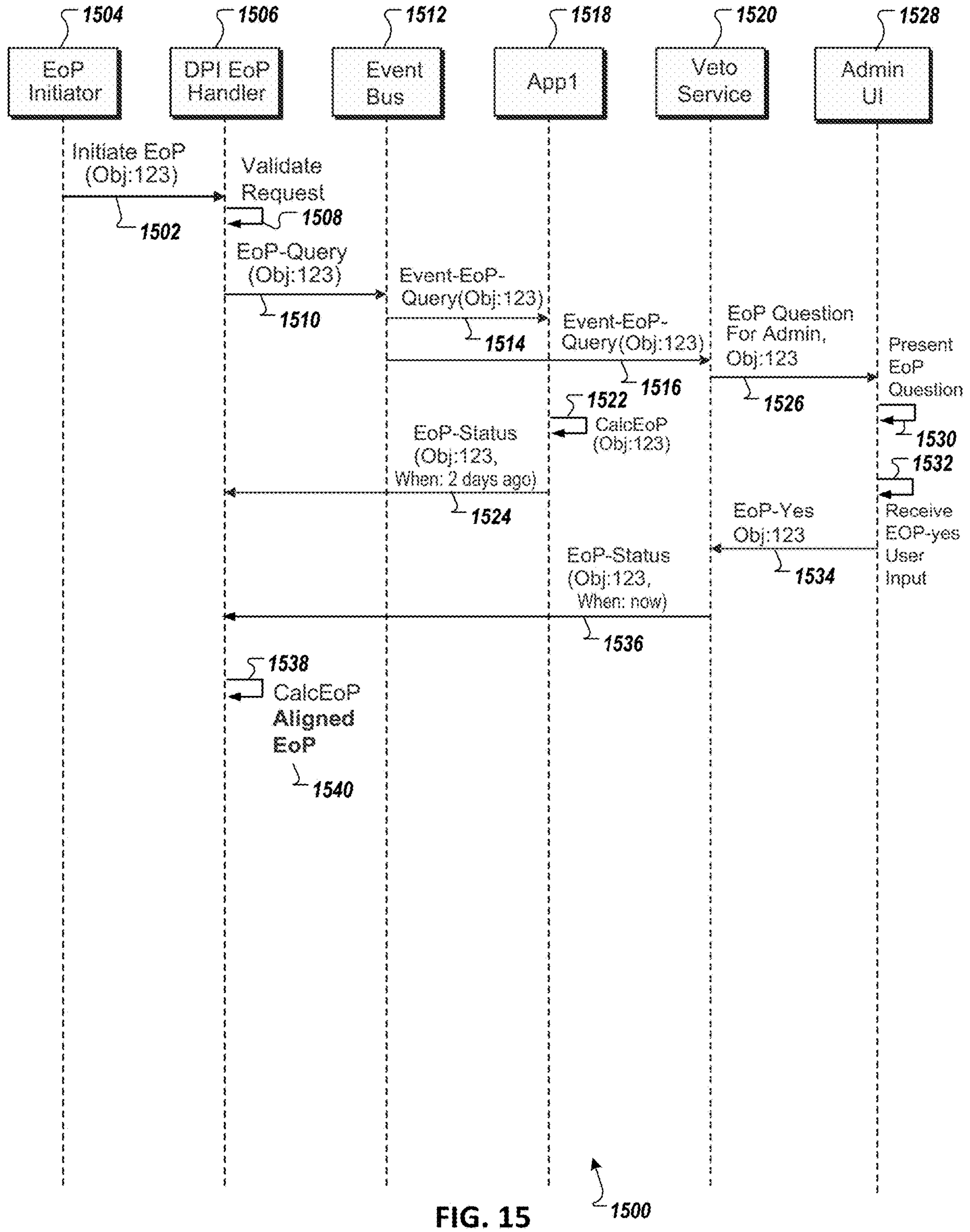
FIG. 15 is a swim lane diagram of an example method for an integrated end of purpose status check that involves a veto service.

FIG. 15 is a swim lane diagram of an example method 1500 for an integrated end of purpose status check that involves a veto service. At 1502, an EoP initiator 1504 sends an EOP initialization message to an EoP handler 1506 (e.g., a DPI service) for a master data object with an object identifier of "123". At 1508, the EoP handler 1506 validates the EOP initialization message. At 1510, the EoP handler 1506 sends an EoP-query message to an event bus 1512. At 1514 and 1516, the event bus 1512 forwards the EoP-query message to a first application 1518 and a veto service 1520, respectively.

The veto service 1520 can participate in EoP protocols as a regular application (e.g., with a same voting status as other applications). The veto service 1520 can be configured in various ways, such as to forward requests to human experts and/or to forward requests as a proxy service to other systems that aren't (or can't be, for some reason) connected to the event bus 1512. As another example, the veto service 1520 can be configured to evaluate various rules regarding certain types or instances of master data objects. In summary, the veto service 1520 can be installed or deployed in the landscape to provide special processing not provided by a regular landscape application. From the perspective of the EoP handler 1506 and the event bus 1512, the veto service 1520 is a regular landscape application (e.g., having a same role in EoP protocols and a same standing as the first application 1518). In contrast to the administrative application 1234 described above with respect to FIG. 12, the veto service 1520 can receive all messages sent to connected applications, rather than only receiving intervention messages in error handling situations.

In some implementations, the veto service 1520 is configured in one of two modes (e.g., a confirm mode or a deny mode). Each mode enables an administrator to provide an EoP status regarding the master data object. The veto service 1520 may be configured to participate in EoP protocols for certain situations, such as if human experts have knowledge about end of purpose for at least some master data objects that is not modeled by a landscape application.

In the confirm mode, the veto service 1520 provides an opportunity for an administrator to confirm that an end of purpose has been reached for the master data object. If the administrator fails to confirm that end of status has been reached for the master data object before a predetermined amount of time elapses, the veto service 1520 automatically provides an EoP status of not end of purpose. That is, the veto service 1520 can deny/veto an aligned blocking decision by default if the administrator does not respond.

Figure 16:
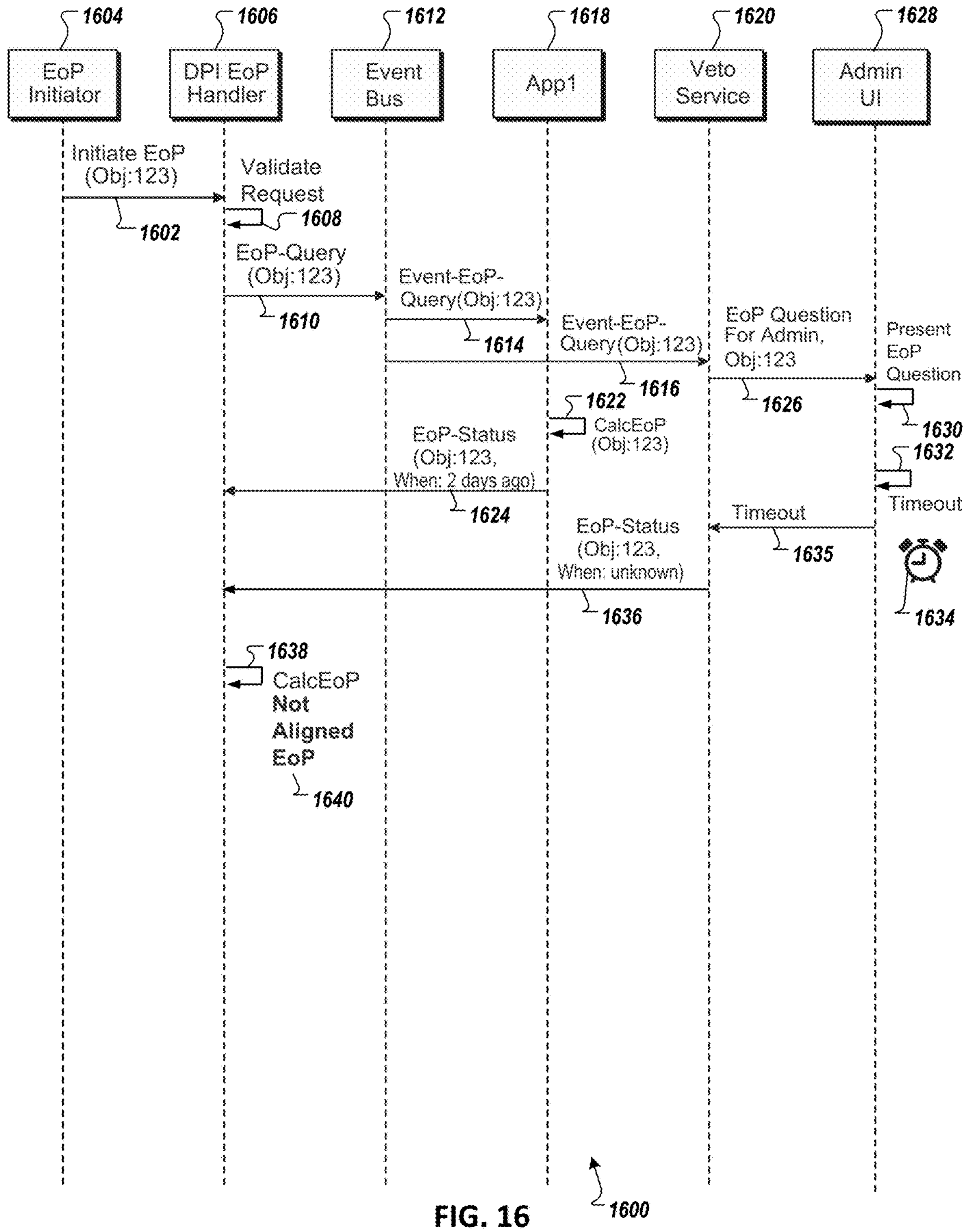
FIG. 16 is a swim lane diagram of an example method for an integrated end of purpose status check that involves a veto service.
Figure 17:
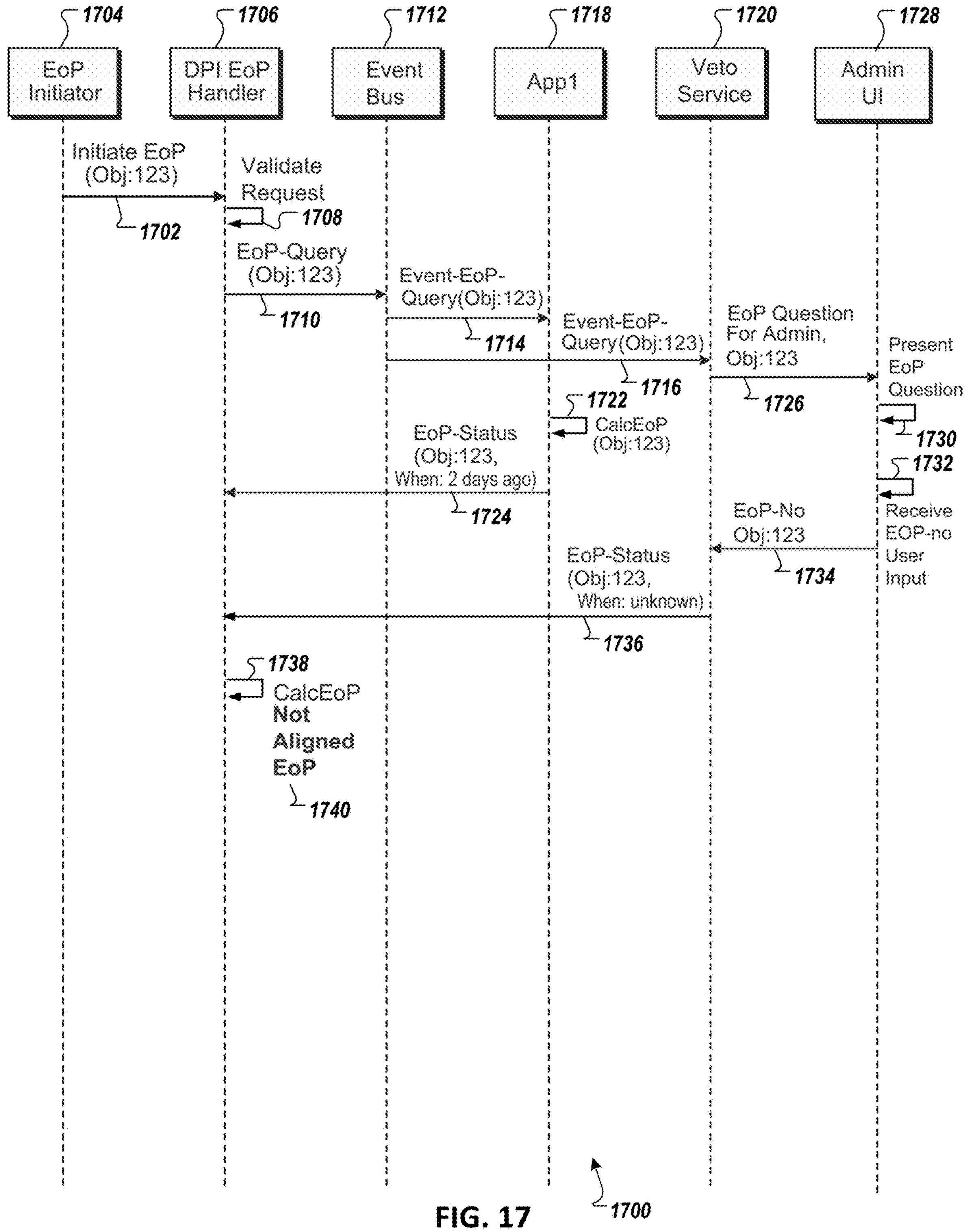
FIG. 17 is a swim lane diagram of an example method for an integrated end of purpose status check that involves a veto service.
Figure 18:
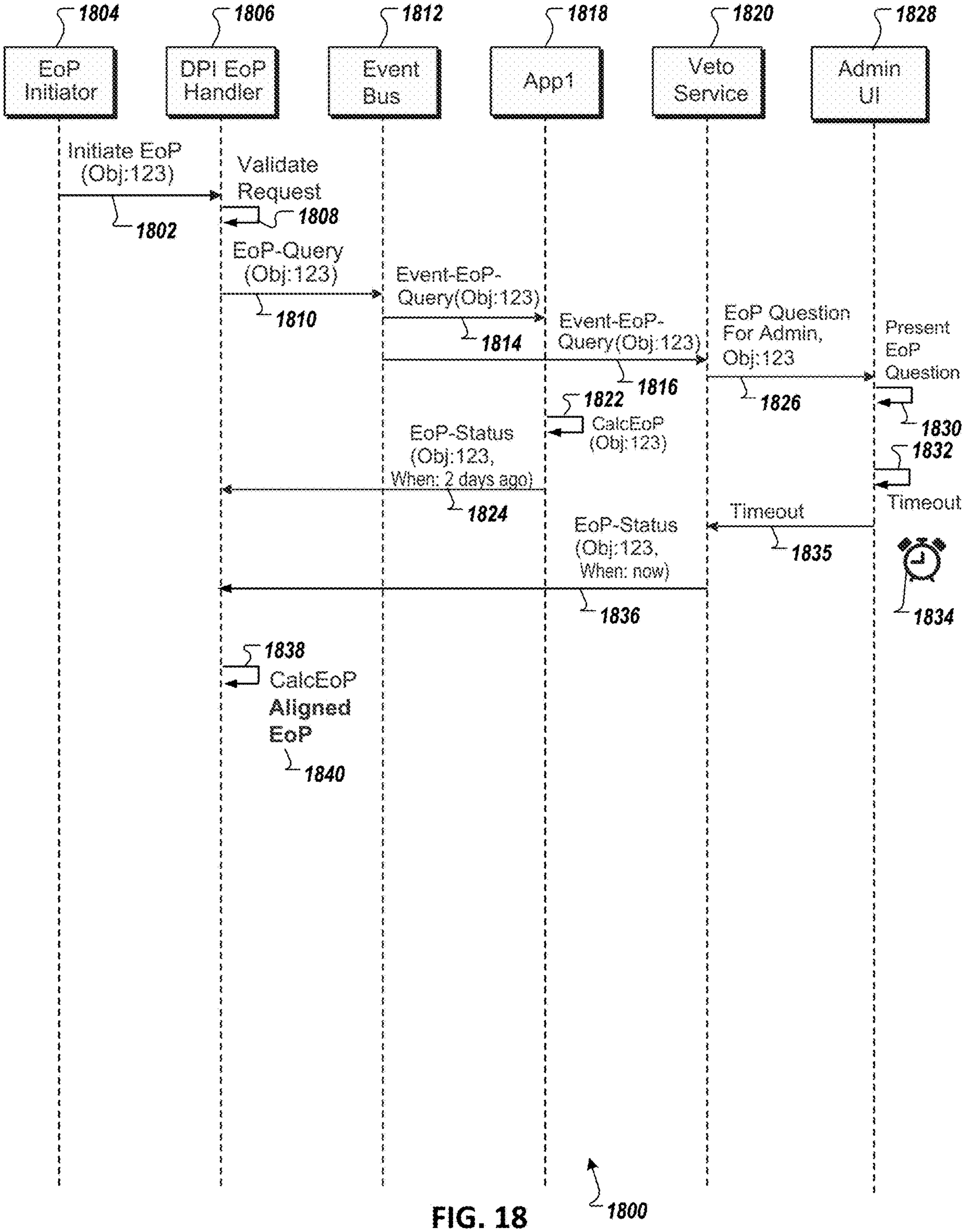
FIG. 18 is a swim lane diagram of an example method for an integrated end of purpose status check that involves a veto service.

In the deny mode, the veto service 1520 provides an opportunity for an administrator to deny/veto an aligned purpose determination by indicating that an end of purpose has not been reached for the master data object. If the administrator fails to deny the aligned end of purpose determination before a predetermined amount of time elapses, the veto service 1520 automatically provides an EoP status of end of purpose (e.g., which can allow an aligned end of purpose determination to occur if all other applications have reached end of purpose for the master data object). In the example of FIGS. 15 and 16, the veto service 1520 is in the confirm mode. In the examples of FIGS. 17 and 18, the veto service 1520 is in the deny mode. Although specific confirm and deny modes are described below, the veto service can also be configured in a single mode that enables the administrator to either respond with either end-of-purpose or not end-of-purpose in response to an inquiry about a master data object.

At 1522 a local blocking component of the first application 1518 performs a local EoP calculation for the master data object. At 1524, the first application 1518 sends an EoP status to the EoP handler 1506 that indicates that the first application 1518 reached end of purpose for the master data object two days ago.

At 1526, the veto service 1520 provides an EoP question to an administrative user interface 1528 that is associated with the veto service 1520. The EoP question requests an EoP status for the master data object from an administrator. Since the veto service 1520 is in the confirm mode, the question can present an opportunity for the administrator to confirm that the master data object is at end of purpose. At 1530, the EoP question is presented in the administrative user interface 1528. At 1532, the administrative user interface 1528 receives a user input that corresponds to an EoP status of EoP-yes (e.g., indicating end of purpose for the master data object). At 1534, the veto service 1520 retrieves the EoP-yes status from the administrative user interface 1528.

At 1536, the veto service 1520 sends an EoP status indicating end of purpose for the master data object to the EoP handler 1506. At 1538, the EoP handler 1506 determines an aligned EoP status 1540 for the master data object, based on the EoP statuses received from the first application 1518 and the veto service 1520.

FIG. 16 is a swim lane diagram of an example method 1600 for an integrated end of purpose status check that involves a veto service. The first steps of the method 1600 are similar to the method 1500. For example, at 1602, an EoP initiator 1604 sends an EOP initialization message to an EoP handler 1606 (e.g., a DPI service) for a master data object with an object identifier of "123". At 1608, the EoP handler 1606 validates the EOP initialization message. At 1610, the EoP handler 1606 sends an EoP-query message to an event bus 1612. At 1614 and 1616, the event bus 1612 forwards the EoP-query message to a first application 1618 and a veto service 1620, respectively.

At 1622 a local blocking component of the first application 1618 performs a local EoP calculation for the master data object. At 1624, the first application 1618 sends an EoP status to the EoP handler 1606 that indicates that the first application 1618 reached end of purpose for the master data object two days ago.

As with the veto service 1520, the veto service 1620 is configured in the confirm mode. At 1626, the veto service 1620 provides an EoP question to an administrative user interface 1628 that is associated with the veto service 1620. At 1630, the EoP question is presented in the administrative user interface 1628. At 1632, as illustrated by a timer icon 1634, a timer event occurs after a predetermined amount of time elapses after presentation of the question in the administrative user interface 1628 without an administrator user input being received that is responsive to the presented question. At 1635, the veto service 1620 identifies the timer event.

In response to the timer event and based on being in the confirm mode, at 1636, the veto service 1620 sends an EoP status that indicates that a date of end of purpose is not known for the master data object to the EoP handler 1606. At 1638, the EoP handler 1606 determines an aligned EoP status 1640 for the master data object, based on the EoP statuses received from the first application 1618 and the veto service 1620. Since the veto service 1620 did not confirm end of purpose for the master data object, the aligned EoP status 1640 is that end of purpose has not been reached for the master data object.

FIG. 17 is a swim lane diagram of an example method 1700 for an integrated end of purpose status check that involves a veto service. The first steps of the method 1700 are similar to the method 1500. For example, at 1702, an EoP initiator 1704 sends an EOP initialization message to an EoP handler 1706 (e.g., a DPI service) for a master data object with an object identifier of "123". At 1708, the EoP handler 1706 validates the EOP initialization message. At 1710, the EoP handler 1706 sends an EoP-query message to an event bus 1712. At 1714 and 1716, the event bus 1712 forwards the EoP-query message to a first application 1718 and a veto service 1720, respectively.

At 1722 a local blocking component of the first application 1718 performs a local EoP calculation for the master data object. At 1724, the first application 1718 sends an EoP status to the EoP handler 1706 that indicates that the first application 1718 reached end of purpose for the master data object two days ago.

The veto service 1720 is configured in the deny mode. At 1726, the veto service 1720 provides an EoP question to an administrative user interface 1728 that is associated with the veto service 1720. The EoP question requests an EoP status for the master data object from an administrator. Since the veto service 1720 is in the deny mode, the question can present an opportunity for the administrator to veto/deny that the master data object is at end of purpose. At 1730, the EoP question is presented in the administrative user interface 1728. At 1732, the administrative user interface 1728 receives a user input that corresponds to an EoP status of EoP-no (e.g., indicating end of purpose for the master data object has not been reached). At 1734, the veto service 1720 retrieves the EoP-no status from the administrative user interface 1728.

At 1736, the veto service 1720 sends an EoP status indicating that the veto service 1720 does not know when end of purpose will be reached for the master data object to the EoP handler 1706. At 1738, the EoP handler 1706 determines an aligned EoP status 1740 for the master data object, based on the EoP statuses received from the first application 1718 and the veto service 1720. Since the veto service 1720 did not confirm end of purpose for the master data object, the aligned EoP status 1740 is that end of purpose has not been reached for the master data object.

FIG. 18 is a swim lane diagram of an example method 1800 for an integrated end of purpose status check that involves a veto service. The first steps of the method 1800 are similar to the method 1500. For example, at 1802, an EoP initiator 1804 sends an EOP initialization message to an EoP handler 1806 (e.g., a DPI service) for a master data object with an object identifier of "123". At 1808, the EoP handler 1806 validates the EOP initialization message. At 1810, the EoP handler 1806 sends an EoP-query message to an event bus 1812. At 1814 and 1816, the event bus 1812 forwards the EoP-query message to a first application 1818 and a veto service 1820, respectively.

At 1822 a local blocking component of the first application 1818 performs a local EoP calculation for the master data object. At 1824, the first application 1818 sends an EoP status to the EoP handler 1806 that indicates that the first application 1818 reached end of purpose for the master data object two days ago.

As with the veto service 1720, the veto service 1820 is configured in the deny mode. At 1826, the veto service 1820 provides an EoP question to an administrative user interface 1828 that is associated with the veto service 1820. At 1830, the EoP question is presented in the administrative user interface 1828. At 1832, as illustrated by a timer icon 1834, a timer event occurs after a predetermined amount of time elapses after presentation of the question in the administrative user interface 1828 without an administrator user input being received that is responsive to the presented question. At 1835, the veto service 1820 identifies the timer event.

In response to the timer event and based on being in the deny mode, at 1836, the veto service 1820 sends an EoP status that indicates that end of purpose has been reached for the master data object to the EoP handler 1806. At 1838, the EoP handler 1806 determines an aligned EoP status 1840 for the master data object, based on the EoP statuses received from the first application 1818 and the veto service 1820.

Figure 19:
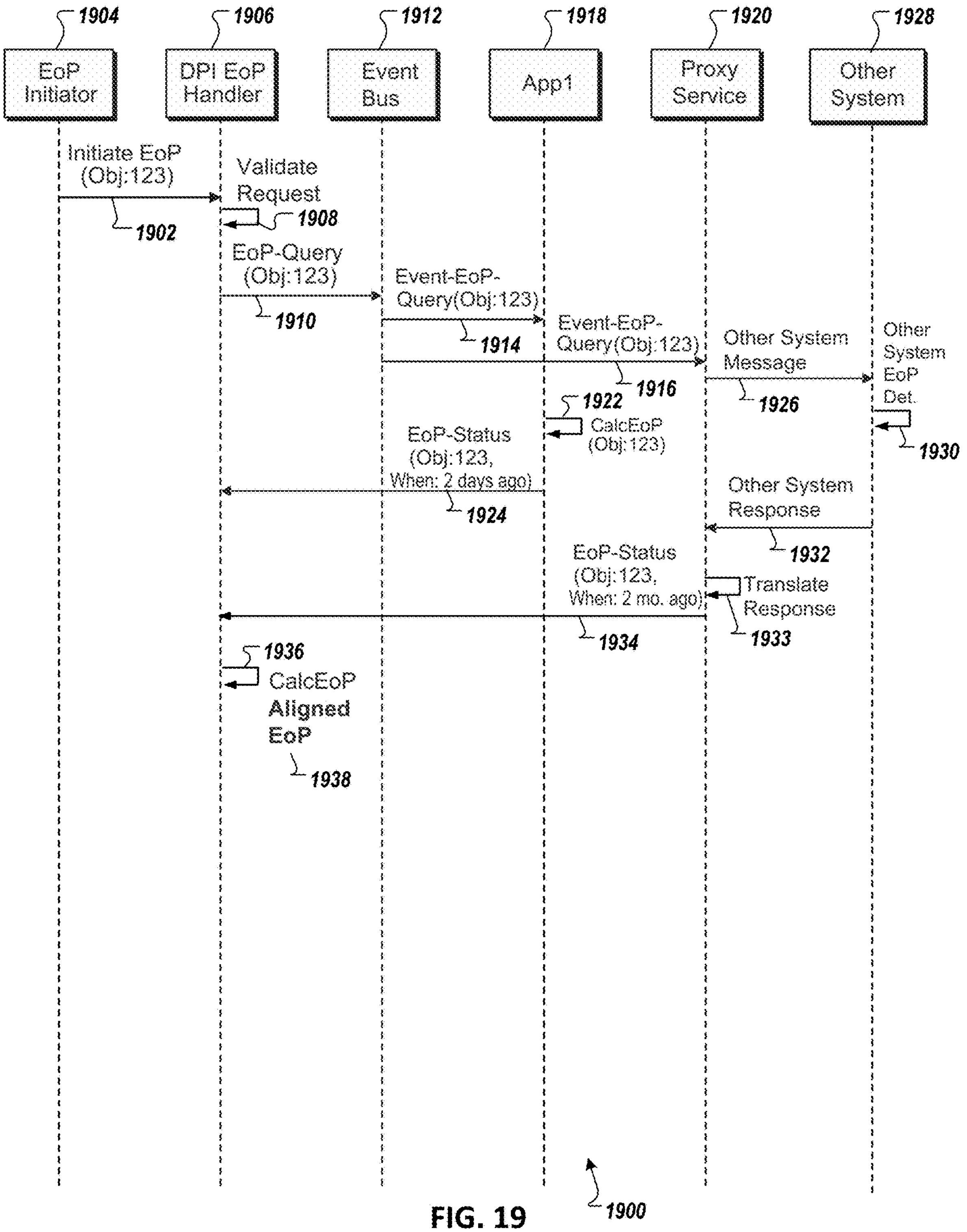
FIG. 19 is a swim lane diagram of an example method for an integrated end of purpose status check that involves a proxy service.

FIG. 19 is a swim lane diagram of an example method 1900 for an integrated end of purpose status check that involves a proxy service. At 1902, an EoP initiator 1904 sends an EOP initialization message to an EoP handler 1906 (e.g., a DPI service) for a master data object with an object identifier of "123". At 1908, the EoP handler 1906 validates the EOP initialization message. At 1910, the EoP handler 1906 sends an EoP-query message to an event bus 1912. At 1914 and 1916, the event bus 1912 forwards the EoP-query message to a first application 1918 and a proxy service 1920, respectively. The proxy service 1920 can be the previously-described veto service, a proxy-service portion the veto service, or a separate service. As described below, the proxy service 1920 can be configured to interface with systems that do not directly interface with the EoP handler 1906 or the event bus 1912.

At 1922 a local blocking component of the first application 1918 performs a local EoP calculation for the master data object. At 1924, the first application 1918 sends an EoP status to the EoP handler 1906 that indicates that the first application 1918 reached end of purpose for the master data object two days ago.

At 1926, the proxy service 1920 sends a message to a system 1928. The system 1928 is not configured to directly interface with the EoP handler 1906 or the event bus 1912. The system 1928 may be a third party system that can't be modified (or can't be acceptably modified, due to cost, time, or other resource constraints) to interface with the EoP handler 1906, for example. The proxy service 1920 is configured to interface with the system 1928, using protocols that are in place for the system 1928. The message sent by the proxy service 1920 to the system 1928 requests the system 1928 to perform a local determination to determine whether end of purpose has been reached for the master data object in the system 1928. At 1930, the system 1928 performs the local determination and determines, for example, that end of purpose has been reached for the master data object two months ago. At 1932, the proxy service 1920 receives a result of the local end of purpose determination that was performed in the system 1928. At 1933, the proxy service 1920 translates the result of the local end of purpose determination that was performed in the system 1928 to an EoP status format used by the EoP handler 1906.

At 1936, the proxy service 1920 sends an EoP status that indicates that end of purpose has been reached for the master data object to the EoP handler 1906. At 1938, the EoP handler 1906 determines an aligned EoP status 1940 for the master data object, based on the EoP statuses received from the first application 1919 and the proxy service 1920.

Figure 20:
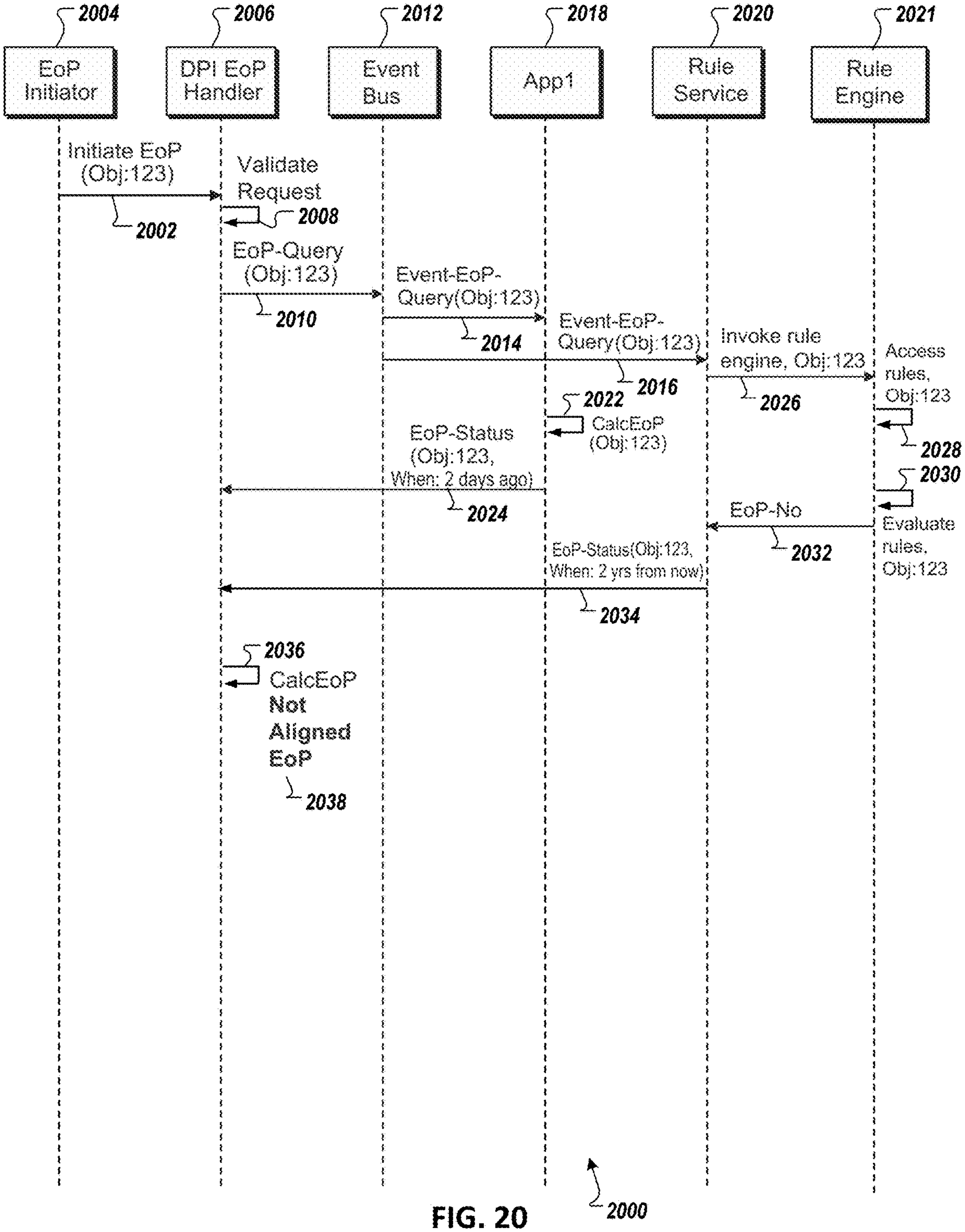
FIG. 20 is a swim lane diagram of an example method for an integrated end of purpose status check that involves a configurable rule engine.

FIG. 20 is a swim lane diagram of an example method 2000 for an integrated end of purpose status check that involves a configurable rule engine. At 2002, an EoP initiator 2004 sends an EOP initialization message to an EoP handler 2006 (e.g., a DPI service) for a master data object with an object identifier of "123". At 2008, the EoP handler 2006 validates the EOP initialization message. At 2010, the EoP handler 2006 sends an EoP-query message to an event bus 2012. At 2014 and 2016, the event bus 2012 forwards the EoP-query message to a first application 2018 and a rule service 2020, respectively. The rule service 2020 can be the previously-described veto service, a rule-service portion of the veto service, or a separate service.

A rule engine 2021 included in or otherwise associated with the rule service 2020 can be configured with various types of rules with each rule including logic for determining whether end of purpose has been reached for particular instances of master data objects and/or for particular types of master data objects. The rule service 2020 can be configured by an administrator and be configured to participate in EoP protocols to model expert knowledge that is not currently reflected in a particular landscape application, for example. For instance, an expert may know that particular types of master data objects are to be retained, for legal or other reasons, for ten years. The administrator can configure the rule engine 2021 to reflect the knowledge of the expert. In some cases, the rule engine 2021 may be able to be configured more quickly, instead of configuring a landscape application, for example.

At 2022 a local blocking component of the first application 2018 performs a local EoP calculation for the master data object. At 2024, the first application 2018 sends an EoP status to the EoP handler 2006 that indicates that the first application 2018 reached end of purpose for the master data object two days ago.

At 2026, the rule service invokes the rule engine 2021 for the master data object. At 2028, the rule engine 2021 identifies and accesses a rule that applies to the master data object. At 2030, the rule engine 2021 evaluates the identified rule for the master data object to determine an EoP status for the master data object. For example, the identified rule can specify that master data objects having particular identifiers are to not be blocked (or deleted) due to an ongoing litigation or investigation. Accordingly, in the example of FIG. 20, the rule engine 2021 provides, at 2032, an EoP status of EoP-No to the rule service 2020. At 2034, the rule service 2020 provides an EoP status indicating end purpose won't be reached for the master data for two years to the EoP handler 2006. At 2036, the EoP handler 2006 determines an aligned EoP status 2038 for the master data object indicating that end of purpose has not been reached, based on the EoP statuses received from the first application 2018 and the rule service 2020.

Figure 21:
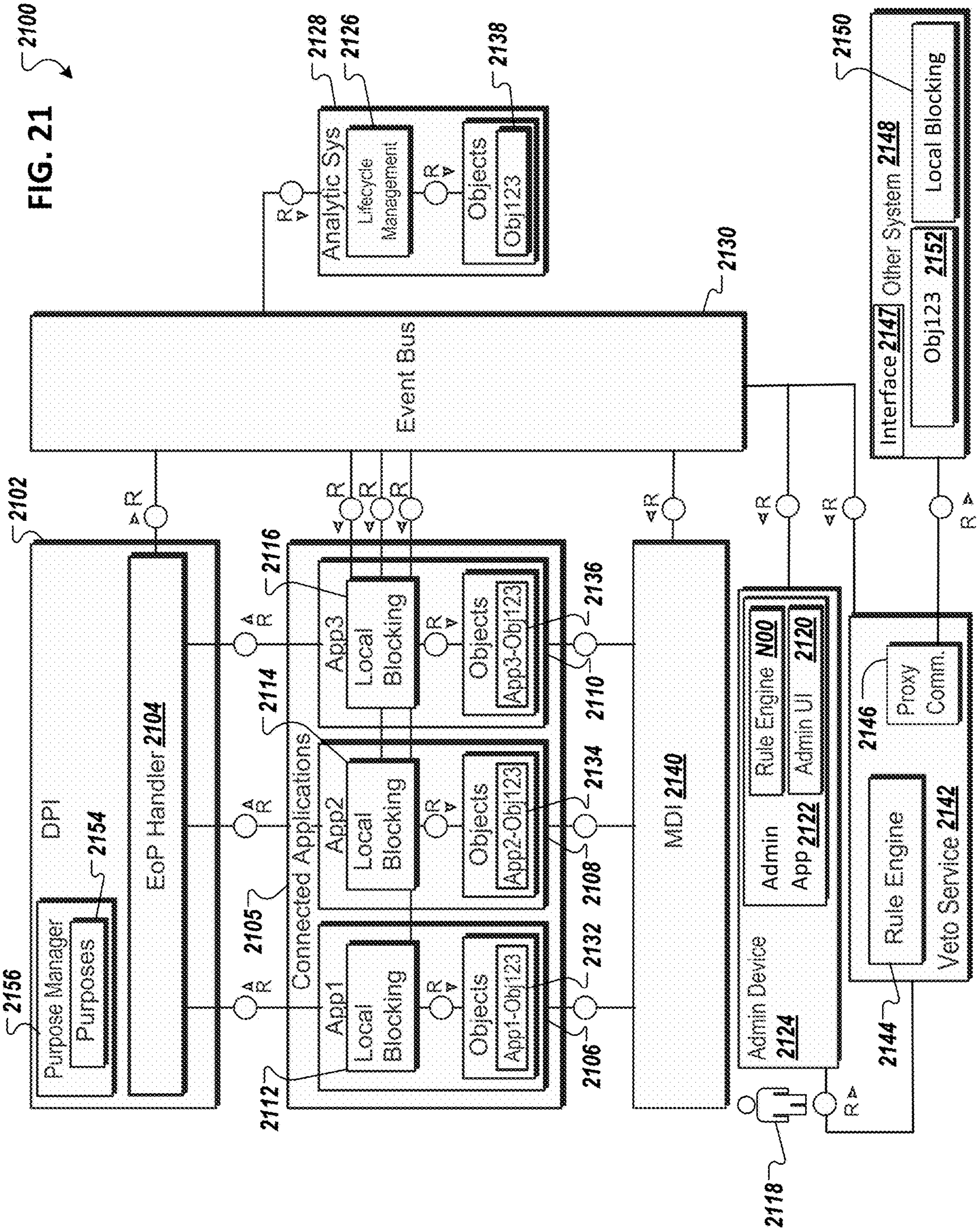
FIG. 21 illustrates an example system for integrated end of purpose processing.

FIG. 21 illustrates an example system 2100 for integrated end of purpose processing. A DPI service 2102 can include an end-of-purpose handler 2104 (among other components). The end-of-purpose handler 2104 can handle integrated end of purpose processing for connected applications 2105 that include a first application 2106, a second application 2108, and a third application 2110. Each application in the connected applications 2105 includes a local blocking component. For example, the first application 2106 includes a blocking component 2112, the second application 2108 includes a blocking component 2114, and the third application 2110 includes a blocking component 2116.

Different types of components can initiate an integrated end of purpose protocol for a master data object. For example, the DPI service 2102 or one of the connected applications 2105 can initiate the integrated end of purpose protocol. As another example, an administrator 2118 can initiate the integrated end of purpose protocol using a user interface 2120 of an administrative application 2122 running on an administrative device 2124. For example, in some cases, the administrator 2118 can initiate the integrated end of purpose protocol in response to receiving a "right to be forgotten" request from a particular end user. As yet another example, another application or system other than the connected applications 2105, such as a lifecycle management tool 2126 of an analytic system 2128, can initiate the integrated end of purpose protocol.

In response to initiation of the integrated end of purpose protocol, the DPI service 2102 can send an EoP query to each application or system that has registered with the DPI service 2102 to receive EoP queries. For example, the EoP query can be received by each of the connected applications 2105. Some applications or systems, such as the analytic system 2128, can register with the DPI service 2102 as a listener, and can receive a result of the integrated EoP protocol but do not receive an EoP query.

Each connected application 2105 can receive the EoP query from the DPI service 2102 using an event bus 2130. In response to receiving the EoP query, each of the local blocking components 2112, 2114, and 2116 can perform a local determination regarding whether end of purpose has been reached in the corresponding application for the master data object. A result of the local determination can be referred to as an EoP status for the master data object in a respective application. For example, the local blocking components 2112, 2114, and 2116 can determine an EoP status for a local object 2132, 2134, or 2136, respectively.

Each connected application 2105 can send an EoP status to the DPI service 2102. The DPI service 2102 evaluates the received EoP statuses to determine whether an aligned end of purpose has been reached in the landscape for the master data object. If an aligned end of purpose has been reached in the landscape for the master data object, the DPI service 2102 can provide, using the event bus 2130, a block command to each connected application and each listener application or system. For example, the block command can be received by the first application 2106, the second application 2108, the third application 2110, and the analytic system 2128.

In response to receiving the block command, a respective application or system can perform a local block operation on the local master data object. For example, the local blocking components 2112, 2114, and 2116 can attempt a local blocking operation on the local object 2132, 2134, or 2136, respectively, and the analytic system 2128 can perform a local blocking operation on a local object 2138. The analytic system 2128 may not implement any retention periods, for example, so a local blocking operation can result in deletion of the object. Each of the connected applications 2105 may or may not implement a retention period. If a retention period applies, the respective local object is blocked until the retention period expires.

Each recipient of the block command can send a blocking status to the DPI service 2102 that indicates whether the respective local blocking operation was successful. If any blocking status indicates a blocking failure, the DPI service 2102 can initiate an unblocking protocol, as described above, to roll back the blocking operation across the landscape. If any application or system has already deleted a local object (e.g., such as due to having no retention period), then that application or system can again receive a copy of the object from a replication process that happens using an MDI service 2140 (e.g., the MDI service 2140 can receive the object from a leading system that has a longest retention period).

In some implementations, the system 2100 includes a veto service 2142 that can receive and respond to EoP queries as a participant in the integrated end of purpose protocol. The veto service 2142 can be configured to respond to EoP queries using a rule engine 2144. As an example, an administrator may configure a rule in the rule engine 2144 so that the veto service 2142 responds with not at end of purpose for certain objects. The administrator may be aware of reasons for preventing blocking or destruction of certain objects and can implement a rule that prevents those objects from being blocked or deleted. Since the veto service 2142 is a participant that has a same weight as other applications or systems in the integrated protocol, an EoP status (e.g., "vote") of not end of purpose by the veto service 2142 can prevent an aligned end of purpose from occurring for an object. In some cases, a rule in the rule engine 2144 specifies that an EoP query is to be sent to the administrative device 2124 for presentation to the administrator 2118, to enable the administrator to respond with an EoP status of end of purpose or not end of purpose for an object. The rule can be configured in different ways. For example, the rule can specify whether a default EoP status of end of purpose or not end of purpose can be sent in response to an EoP query if the administrator fails to respond to the presented EoP query within a predetermined amount of time.

As another example, the veto service 2142 can include a proxy communication component 2146 that is configured to communicate with an interface 2147 of a system 2148. The system 2148 may be a system that is not directly connected to the DPI service 2102, for example. The veto service 2142 can forward an EoP query, a block command, or an unblock command to the system 2148, receive a responses from the system 2148, and forward information from received responses to the DPI service 2102. A local blocking component 2150 can perform EoP determination, blocking operations, and unblocking operations, on a local object 2152, in response to information received from the veto service 2142.

In some implementations, the administrative device 2124 is configured to monitor the integrated end of purpose protocol to enable the administrator 2118 to intervene in certain cases, for example. For instance, the administrator 2118 can intervene if a protocol participant is not responding to requests or commands from the DPI service 2102.

While the end of purpose protocol can react to aligned end of purpose situations that occur for an object when no applications have any purposes assigned to the object, in some implementations and as described in more detail below, the integrated end of purpose protocol can be enhanced using knowledge of purpose information 2154 managed by a purpose manager 2156 regarding specific purposes for the object that are assigned in specific applications. For instance, in some cases (and as described in more detail below), the DPI service 2102 can determine that an object can be locally blocked in some applications, based on the purpose information 2154, and can distribute respective block commands to those applications.

Figure 22:
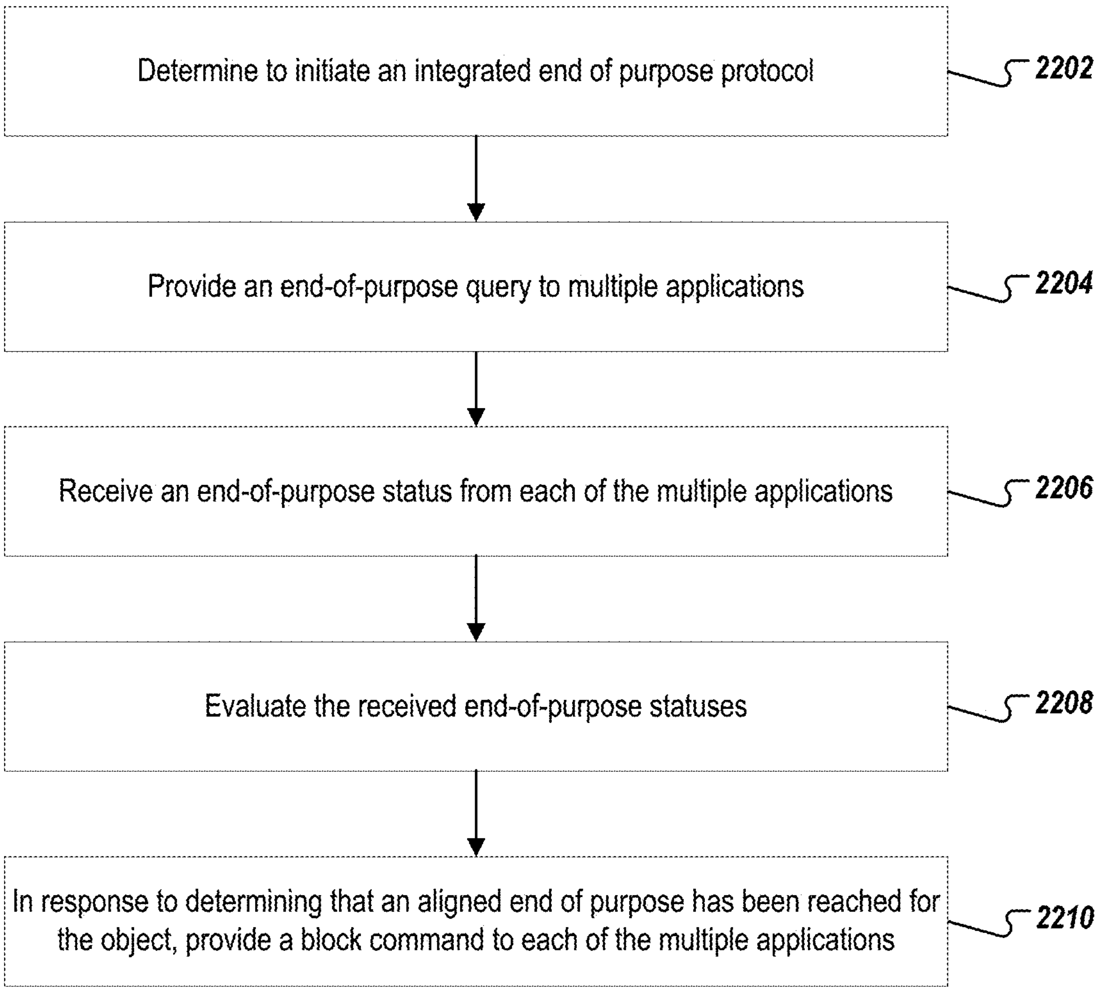
FIG. 22 is a flowchart of an example method for integrated end of purpose processing.

FIG. 22 is a flowchart of an example method 2200 for integrated end of purpose processing. It will be understood that method 2200 and related methods may be performed, for example, by any suitable system, environment, software, and hardware, or a combination of systems, environments, software, and hardware, as appropriate. For example, one or more of a client, a server, or other computing device can be used to execute method 2200 and related methods and obtain any data from the memory of a client, the server, or the other computing device. In some implementations, the method 2200 and related methods are executed by one or more components of the system 100 described above with respect to FIG. 1. For example, the method 2200 and related methods can be executed by the server 102 of FIG. 1.

At 2202, a determination is made to initiate an integrated end of purpose protocol for an object is received in a multiple-application landscape that includes multiple applications. Each of the multiple applications is allowed to use the object only when at least one purpose is assigned by the application to the object. Determining to initiate the end of purpose protocol can include receiving a request to initiate the protocol from a requesting application. As another example, a DPI service can make an internal determination to initiate the protocol.

At 2204, an end-of-purpose query is provided, to each of the multiple applications, that requests each of the multiple applications to determine whether the application is able to block the object. Determining by an application that the application can block the object can include determining that no purposes are assigned to the object. The application can determine that the application cannot block the object if the application determines that at least one purpose is assigned to the object. As another example, the application can determine that the application can block the object if the application does not recognize the object. As yet another example, the application can determine that the application cannot block the object if the application determines that transactional data associated with the object that is less than a threshold age exists in the application.

At 2206, an end-of-purpose status is received, in response to the end-of-purpose query, from each of the multiple applications, that indicates whether the respective application is able to block the object.

At 2208, the received end-of-purpose statuses are evaluated to determine whether an aligned end of purpose has been reached for the object in the multiple-application landscape. Evaluating the received end-of-purpose statuses can include determining whether each end-of-purpose status indicates end of purpose for the object. An end-of-purpose status can include an end-of-purpose time for the object for an application. A determination can be made that an application has reached end of purpose for the object based on determining that the end-of-purpose time provided by the application is a historical time. A determination can be made that an application has not reached end of purpose for the object based on determining that the end-of-purpose time provided by the application is a future time.

The end-of-purpose time received by an application can be stored. If a subsequent request to initiate an integrated end of purpose protocol for the object is received at a time before the end-of-purpose time, a response to the subsequent request can be provided indicating that the object has not reached an aligned end of purpose, without providing any end-of-purpose queries to the multiple applications in the multiple-application landscape.

At 2210, in response to determining that the aligned end of purpose has been reached for the object in the multiple-application landscape, a block command is provided to each of the multiple applications that instructs a respective application to locally block the object in the respective application. Each respective application can process the block command. Processing the block command can include: determining whether a retention period applies for the object in the application; in response to determining that a retention period applies for the object in the application, blocking the object by blocking access to the object except for processing that is authorized for the retention period; and in response to determining that a retention period does not apply for the object in the application, physically deleting the object in the application. A block status can be received from each respective application that indicates a success or failure of processing the block command in the application. If at least one block status indicates failure, an unblock command can be sent to each of the multiple applications instructing the application to unblock the object. A block status can indicate failure for an application based on the application performing new activity for the object after the application provided a first end-of-purpose status that indicated the application had reached end of purpose for the object. An unblock status from each respective application that indicates a success or failure of processing the unblock command in the application. In response to determining that at least one unblock status indicates failure, a request can be sent to a leading application for the object to initiate redistribution of the object in the landscape. The leading application has a longest retention period for the object among the multiple applications in the landscape.

Figure 23:
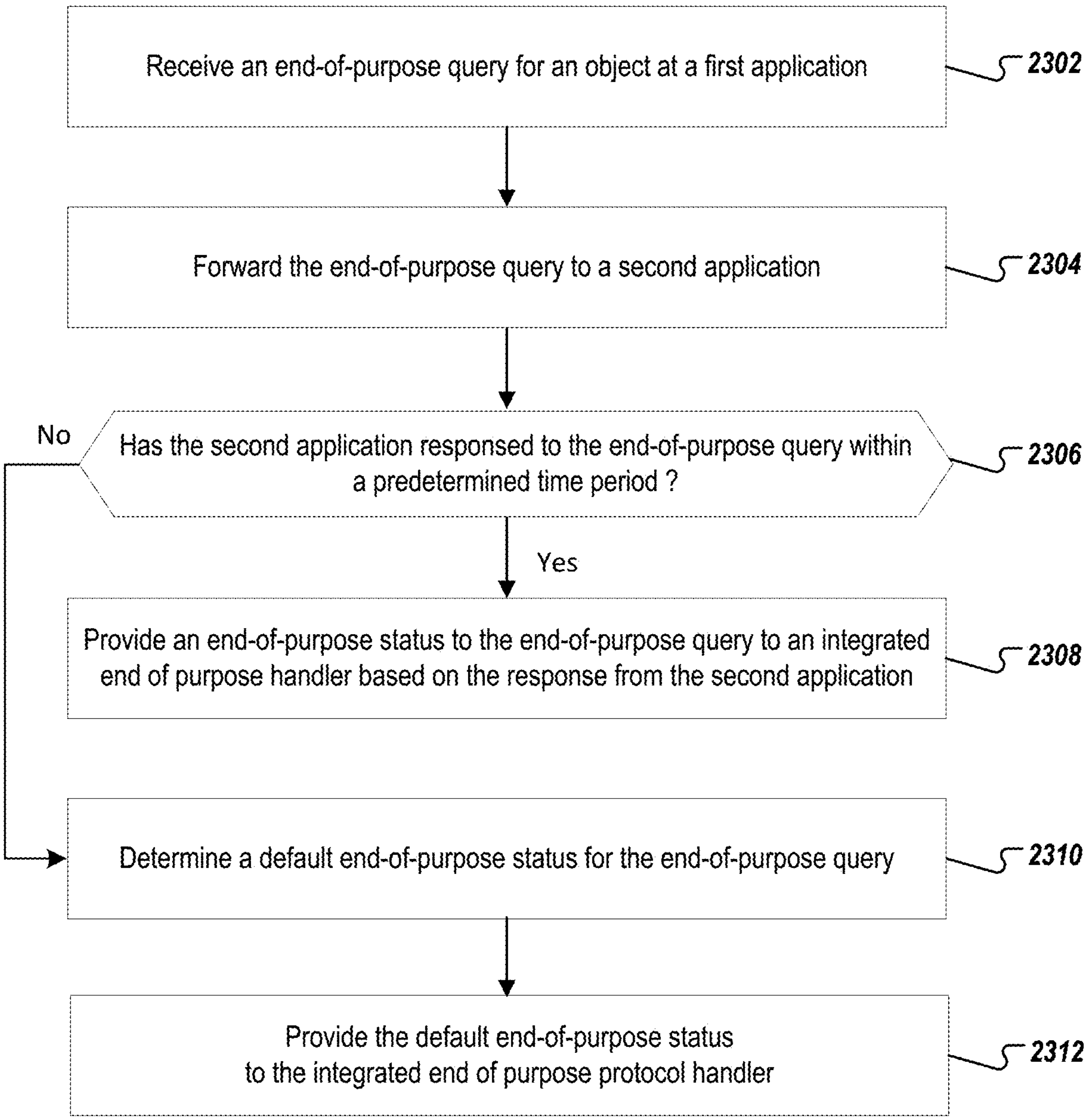
FIG. 23 is a flowchart of an example method for integrated end of purpose processing

FIG. 23 is a flowchart of an example method 2300 for integrated end of purpose processing. It will be understood that method 2300 and related methods may be performed, for example, by any suitable system, environment, software, and hardware, or a combination of systems, environments, software, and hardware, as appropriate. For example, one or more of a client, a server, or other computing device can be used to execute method 2300 and related methods and obtain any data from the memory of a client, the server, or the other computing device. In some implementations, the method 2300 and related methods are executed by one or more components of the system 100 described above with respect to FIG. 1. For example, the method 2300 and related methods can be executed by the administrative client device 105 of FIG. 1.

At 2302, receiving, from an integrated end of purpose protocol handler, at a first application in a multiple-application landscape, an end-of-purpose query for an object, wherein the end-of-purpose query is also received from the integrated end of purpose protocol handler by multiple other applications in the multiple-application landscape;

At 2304, the first application forwards the end-of-query purpose to a second application that is different from the first application and the multiple other applications. The second application can be an administrative application used by an administrator on an administrative device. The end-of-purpose query can be presented to the administrator in a user interface of the administrative application. The first application can be a proxy application and the second application can be an application that is external to and not connected to the integrated end of purpose handler. The first application can translate the end-of-purpose query to a first format understandable by the second application before forwarding the end-of-purpose query to the second application.

At 2306, the first application determines whether the second application provides a response to the end-of-purpose query within a predetermined time period.

At 2308, in response to determining that the second application has provided the response to the end-of-purpose query within the predetermined time period, the first application provides an end-of-purpose status to the end-of-purpose query to the integrated end of purpose protocol handler based on the response from the second application. Determining that the second application has provided the response to the end-of-purpose query within the predetermined time period can include receiving the response by the first application within the predetermined time period. The response can include end-of-purpose status information for the object that was provided by the administrator in the user interface of the administrative application. The end-of-purpose status information provided by the administrator can be translated into a translated response that has a format that is understandable by the integrated end of purpose handler. The translated response can be included in the end-of-purpose status before providing the end-of-purpose status to the integrated end of purpose handler.

At 2310, the first application, in response to determining that the second application has not provided the response to the end-of-purpose query within the predetermined time period, determines a default end-of-purpose status for the end-of-purpose query. Determining that the second application has not provided the response to the end-of-purpose query within the predetermined time period can include determining that the predetermined time period has passed without receiving the response from the second application. The default end-of-purpose can be determined based on a mode of the first application. The first application, in a first mode, can determine a default end-of-purpose status of not end-of-purpose for the object in response to determining that the second application has not responded to the end-of-purpose query within the predetermined time period. As another example, the first application, in a second mode, can determine a default end-of-purpose status of end-of-purpose for the object in response to determining that the second application has not responded to the end-of-purpose query within the predetermined time period.

At 2312, the default end-of-purpose status is provided to the integrated end of purpose protocol handler.

Aligned Purpose Disassociation

With the integrated end of purpose protocol, a DPI service can check whether there is at least one application that reports that a particular object cannot be blocked, and if so, use of the integrated end of purpose protocol can ensure that none of the applications block the object. However, the integrated end of purpose protocol does not consider individual purposes. Accordingly, a situation may occur where one application (e.g., "application one") has a particular purpose for the object (e.g., "purpose A") and no other applications have purpose A for the object. Application one can report that it cannot block the object (e.g., due to still having purpose A). However, other applications may be able to block the object since they each may not have any other assigned purposes for the object. However, with the IEOP protocol, application one can prevent other applications from blocking the object. With an aligned purpose disassociation protocol that is described in detail below, specific purposes can be disassociated from objects across the landscape once no application requires the purpose. Accordingly, as purposes get disassociated from objects in the landscape, respective applications can block or delete objects for which they no longer have any purpose.

Figure 24A:
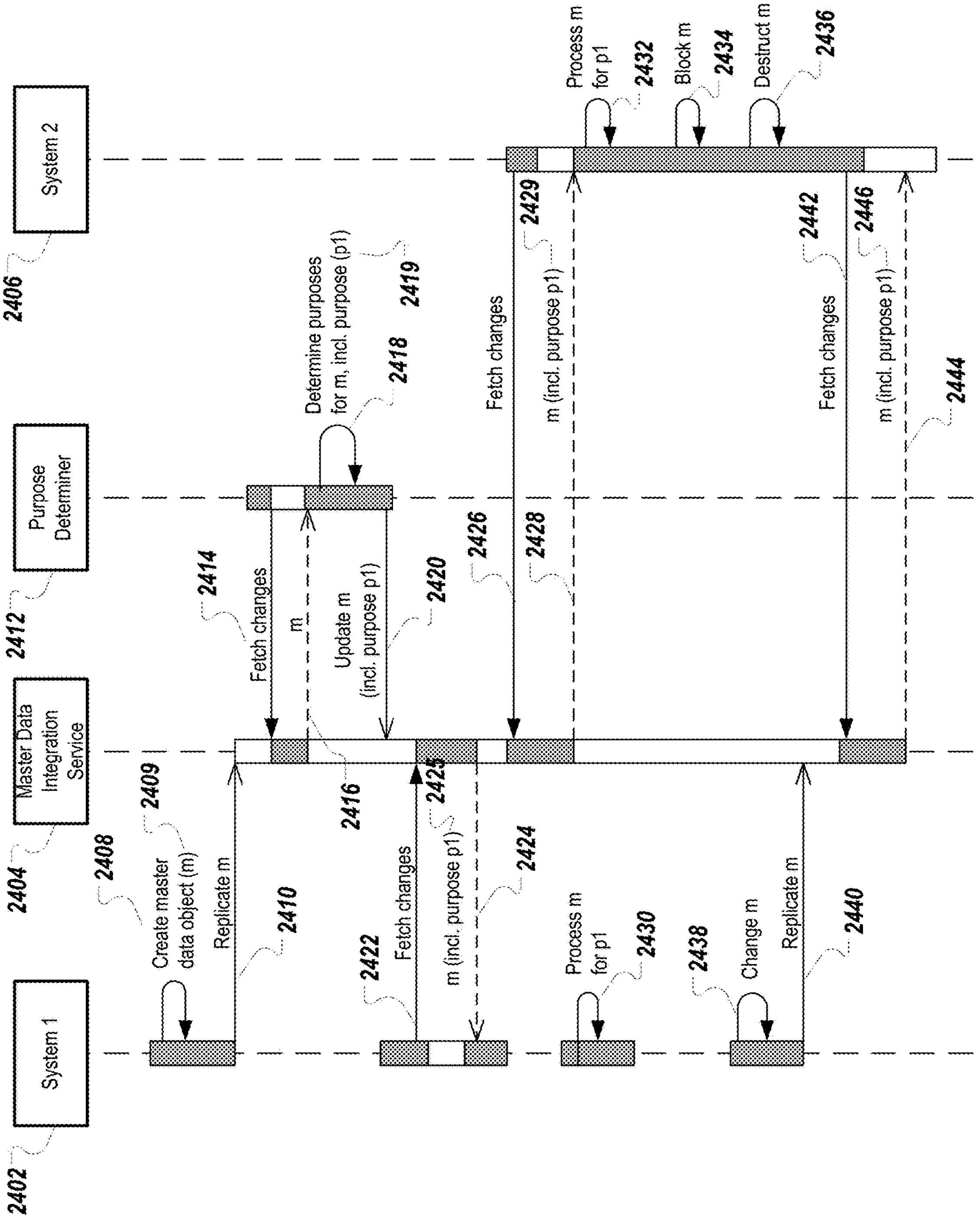
FIG. 24A is a sequence diagram illustrating an example problem scenario that can be caused by a distributed end of purpose determination.

FIG. 24A is a sequence diagram 2400 illustrating an example problem scenario that can be caused by a distributed end of purpose determination. In the example of FIG. 24, as part of an organizational process, master data is created in a first system 2402 and then replicated, using a master data integration (MDI) service 2404, to a second system 2406. For example, the first system 2402 can be cloud software used to manage the workforce of a company and the second system 2406 can be an ERP (Enterprise Resource Planning) system. Employee data might be created in the first system 2402 and then replicated to the second system 2406 so that the employees can be assigned to projects, for example, that are configured in the second system 2406.

In further detail, at 2408, a master data object 2409 (e.g., an object "m") is created in the first system 2402. At 2410, the first system 2402 (e.g., an application in the first system 2402) sends a replicate request for the master data object 2409 to the MDI service 2404. The MDI service 2404 can replicate the master data object 2409 in the MDI service 2404. Although the master data object 2409 is mentioned here and below, it is noted that a copy of the master data object 2409 can be sent to and included in various systems.

In this example, the first system 2402 does not have a mechanism to define for which purpose the master data object 2409 can be used. A purpose determiner 2412 can be configured to determine purpose information for master data objects in the system. For instance, at 2414, the purpose determiner 2412 sends a request for data to the MDI service 2404. The purpose determiner 2412 can retrieve data (e.g., data matching one or more retrieval rules) periodically, or on an event-driven basis, from the MDI service 2404. At 2416, the MDI service 2404 provides the requested data, including the master data object 2409 (e.g., a copy of or a reference to the master data object 2409) to the purpose determiner 2412.

At 2418, the purpose determiner 2412 determines one or more purposes for the master data object 2409, for example, based on one or more configured purpose rules that specify condition(s) of the master data object 2409 that can result in assignment of a purpose. For example, the purpose determiner 2412 can determine that a purpose p1 2419 is to be assigned to the master data object 2409. At 2420, the purpose determiner 2412 provides a request to the MDI service 2404 to update the master data object 2409 with the purpose 2419. As another example, the purpose determiner 2412 can update the master data object 2409 with the purpose 2419 and provide the updated master data object to the MDI service 2404.

The MDI service 2404 can notify the first system 2402 about updated information. As another example, the first system 2402 can periodically poll the MDI service 2404 to determine if the MDI service 2404 has any data updates relevant to the first system 2402. For example, the first system 2402 sends a request 2422 for updated information to the MDI service 2404.

The purpose determiner 2412 can include information (e.g., a list) that specifies which system(s) are allowed to received data for which purposes. The list can specify, for example, which systems (or applications) can be used for the purpose 2419. For instance, the purpose 2419 can be associated with both the first system 2402 and the second system 2406. The purpose determiner 2412 can share this list with the MDI service 2404.

At 2424, the MDI service 2404 can determine, based on information received from the purpose determiner 2412, that the first system 2402 is associated with the purpose 2419 and can send an updated master data object 2425 to the first system 2402 in response to the request 2422. The updated master data object 2425 can include or be linked to the purpose 2419. If the second system 2406 had sent a request for updated information to the MDI service 2404 before the purpose 2419 was associated with the master data object 2409, the MDI service 2404 may have instead responded with a "no updates" or similar message.

Similar to the request 2422, the second system 2406 sends a request 2426 for updated information to the MDI service 2404. At 2428, the MDI service 2404 can determine that the second system 2406 is associated with the purpose 2419 and can send, in response to the request 2426, an updated master data object 2429 (e.g., which includes or is linked to the purpose 2419) to the second system 2406.

At 2430, the first system 2402 processes the updated master data object 2425 for the purpose 2419. Similarly, at 2432, the second system 2406 processes the updated master data object 2429 for the purpose 2419.

After processing the master data object 2429 for the purpose 2419, the second system 2406 can determine, internally, whether the updated master data object 2429 can be blocked, for example, as part of an end of purpose check. That is, in existing systems, while the association of data with purposes may happen centrally (e.g., by the purpose determiner 2412), the disassociation of expired purposes can happen separately in a distributed fashion, at or by each system. However, distributed disassociation checks and actions can cause various problems, as described below.

For example, if the second system 2406 determines that the updated master data object 2429 can be blocked, the second system 2406 can perform a block operation 2434 for the updated master data object 2429. Similarly, the second system 2406 can determine, internally, whether the updated master data object 2429 can be destructed. If the updated master data object 2429 can be destructed, the second system 2406 can perform a destruct operation 2436 for the updated master data object 2429.

At 2438, after the second system 2406 has destructed the updated master data object 2429, the first system 2402 makes a change to the updated master data object 2425. At 2440, the updated master data object 2425 is replicated to the MDI service 2404.

The second system 2406 sends a request 2442, after the updated master data object 2429 has been destructed, for updated information to the MDI service 2404. At 2444, the MDI service 2404 sends, in response to the request 2444, an updated master data object 2446, which can be a copy of the updated master data object 2425 that is still linked to the purpose 2419, where the updated master data object 2425 includes changes made by the first system 2402 (i.e., at 2438). The second system 2406 receiving the updated master data object 2446 with the purpose 2419 is problematic, as the second system had already blocked and destroyed the corresponding master data object.

This type of problem (and other problems) can be avoided using an aligned purpose disassociation procedure described below. An aligned purpose disassociation procedure performed by all systems in the landscape can avoid the scenario shown in FIG. 24, where one system or application disassociates a purpose for an object, followed by another application or system configured with the same purpose making a change to the object, resulting in replication of the purpose-linked object back to the system that had previously disassociated the purpose. A central component (e.g., the MDI service 2404) may still associate a purpose with the object, for example.

Other problems can also occur when purpose disassociation is not aligned. For example, new transactional data that references a master data object can be created in one system (e.g., the first system 2402) and forwarded to another system (e.g., the second system 2406) for further processing. For instance, an expense report from the first system 2402 may be forwarded to the second system 2406 to be posted to a financials application or repository. If the second system 2406 has blocked or destroyed the underlying master data object, then the receipt of new transactional data for the master data object can lead to unexpected errors. Aligned purpose disassociation can solve these and other problems. With aligned purpose disassociation, disassociation of purposes happens in an aligned fashion. For instance, in the example of FIG. 24, the second system 2406 can be allowed to disassociate a purpose for an object in alignment with other systems, including the first system 2402.

Figure 24B:
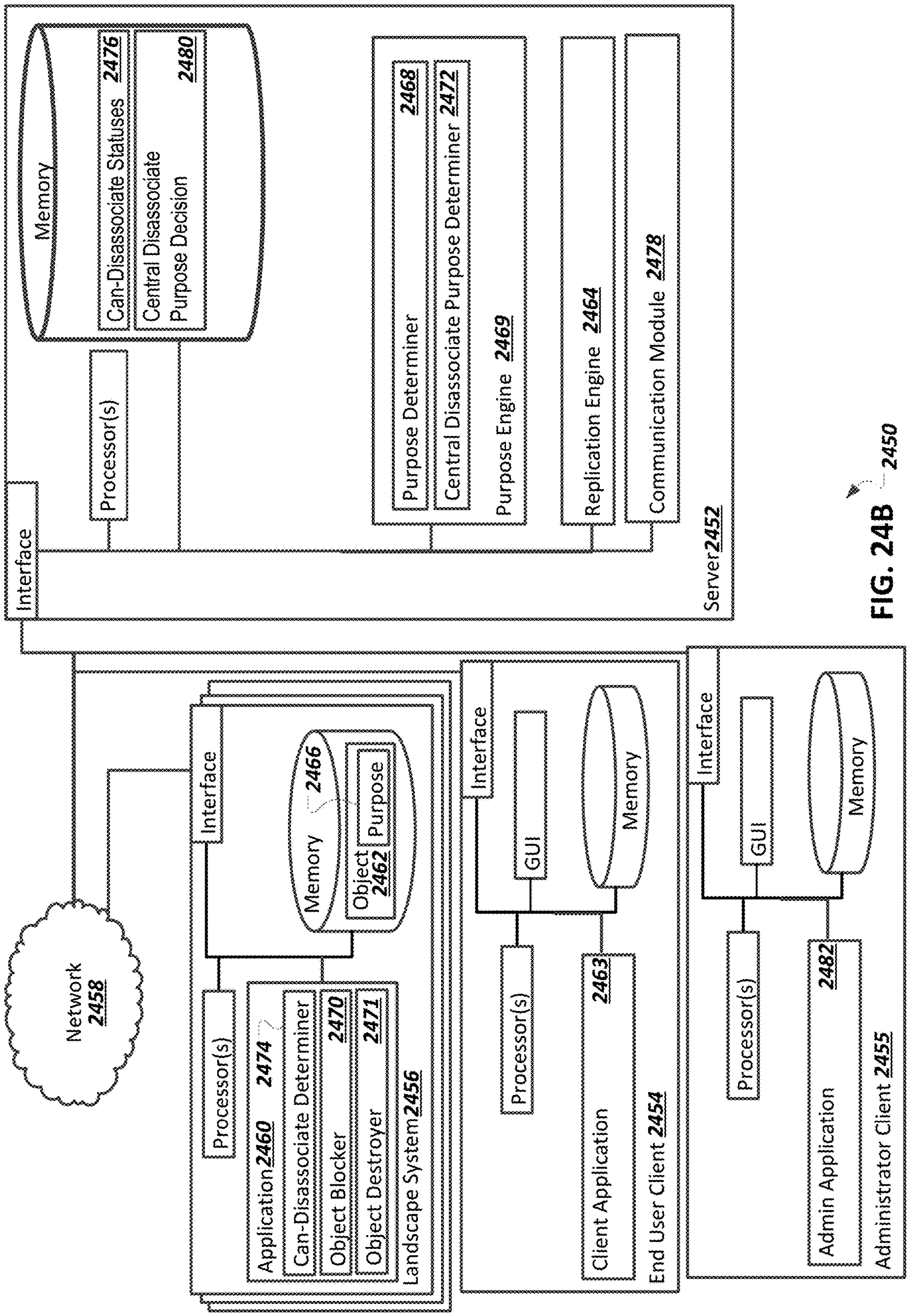
FIG. 24B is a block diagram illustrating an example system for aligned purpose disassociation.

FIG. 24B is a block diagram illustrating an example system 2450 for aligned purpose disassociation. Portions of the system 2450 are similar to the system 100 described above with respect to FIG. 1. The system 2450 discusses specific aligned purpose disassociation functionality. The illustrated system 2450 includes or is communicably coupled with a server 2452, an end-user client device 2454, an administrator client device 22455, landscape systems 2456, and a network 2458. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server.

The landscape systems 2456 can include multiple systems that exist in a multi-system landscape. An organization can use different systems, of different types, to run the organization, for example. The landscape systems 2456 can include systems from a same vendor or different vendors. The landscape systems 2456 can each include at least one application 2460 for performing organizational processes and working with organizational data. Organizational data can include master data objects and transactional objects. For example, the application 2460 can process a master data object 2462. An end user can use a client application 2463 (which may be a client version of the application 2460) on the end-user client device 2454 to view and interact with landscape data, including information from the master data object 2462.

Regarding the handling of master data objects, various best practices can be applied by an organization. For example, the system 2450 can be configured so that corresponding master data objects are consistent across all landscape systems 2456. For instance, a replication engine 2464 can distribute master data across the landscape systems 2456 so that each application 2460 can perform processing on the same consistent master data.

Various data protection rules and laws may require that data is only processed for legitimate specified purposes. The system 2450 can implement a purpose requirement by associating purpose information with each object instance. For example, a purpose 2466 has been associated with the master data object 2462. A purpose determiner 2468 (which can be included in a purpose engine 2469) can determine appropriate purposes for an object and associate the purposes with the object. The landscape system 2456 can receive the master data object 2462 and the associated purpose 2466 from the replication engine 2464, for example.

Purpose information for an object can specify for which purposes an object instance can currently be processed. Purpose information associated with an object instance is referred to herein as a purpose that is assigned to or otherwise associated with the object instance. Purpose information can be associated with an object by using a field of the object, metadata for the object, or associating a separate purpose object with the object. In some implementations, the purposes described herein are assigned to master data objects but not to transactional data objects.

Purposes for an object instance can have lifecycles that correspond to the lifecycle of the object instance. For example, a WorkforcePerson object may be created when an employee of the organization is hired. Accordingly, certain purposes, such as resource planning and payroll activities, can be assigned to the object instance. When an employee leaves the company, certain purposes, like resource planning, can be disassociated from the WorkforcePerson instance. Other purposes, such as payroll, might not be disassociated at the same time, since some payroll processing may still be performed for the employee even after the employee has left the organization (e.g., a final paycheck or an earned bonus, for example).

Objects that no longer have any associated purposes can be put into a blocked state for a period of time, for instance by an object blocker 2470, before being deleted by an object destroyer 2471. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 2456 can disassociate a purpose with an object in response to information received from a central disassociate purpose determiner 2472, rather than strictly based on local decisions. Each landscape system 106 can provide information to the central disassociate purpose determiner 2472. For example, a can-disassociate determiner 2474 in each landscape system 2456 can determine locally (e.g., without consulting other systems), for each purpose of an object, whether the purpose can be locally disassociated from the object. For example, each landscape system 2456 can determine a "can-disassociate" status for each purpose for each object (or for requested purposes or objects).

A can-disassociate status for a respective landscape system 2456 can be either an affirmative can-disassociate status that indicates that the landscape system 2456 can disassociate a purpose from an object or a negative can-disassociate status that indicates that the landscape system 2456 cannot disassociate the purpose from the object. The server 2452 can collect received can-disassociate statuses as aggregated can-disassociate statuses 2476.

The server 2452 can receive the can-disassociate statuses 2476 in a variety of ways. For example, a communications module 2478 can support polling, eventing, and/or one or more APIs (Application Programming Interfaces) for sending data to and receiving data from the landscape systems 2456. The landscape systems 2456 can periodically push can-disassociate statuses to the server 2452. As another example, the server 2452 can pull can-disassociate statuses from the landscape systems 2456 (e.g., using polling). In some cases, polling can occur in response to a given landscape system 2456 sending a request for a central can-disassociate system for a given purpose of an object in that landscape system 2456. Other eventing scenarios can be supported, where local can-disassociate information is sent to the server 2452 in response to an event.

The central disassociate purpose determiner 2472 can evaluate the aggregated can-disassociate statuses 2476 to determine a central disassociate purpose decision 2480 regarding disassociating a purpose from an object. For example, the central disassociate purpose determiner 2472 can evaluate the aggregated can-disassociate statuses 2476 to determine whether any landscape system 2456 is unable to disassociate the purpose from the object. The central disassociate purpose determiner 2472 can determine that the central disassociate purpose decision 2480 is to disassociate the purpose from the object if no landscape system 2456 is unable to disassociate the purpose from the object. The central disassociate purpose determiner 2472 can determine that the central disassociate purpose decision 2480 is to not disassociate the purpose from the object if at least one landscape system 2456 is unable to disassociate the purpose from the object.

In some implementations and for some cases, the central disassociate purpose determiner 2472 can essentially override or veto a local can-disassociate decision, based, for example, on an administrator or data protection expert decision or manual intervention, for instance, for an exception case. The administrator can use an administrative application 2482 to provide input to the central disassociate purpose determiner 2472, to override a particular value in the aggregated can-disassociate statuses 2476, for example.

The purpose engine 2469 can (e.g., using the communication module 2478) provide the central disassociate purpose decision 2480 to each landscape system 2456. The purpose engine 2469 can broadcast the central disassociate purpose decision 2480 to the landscape systems 2456, enable each landscape systems 2456 to pull the central disassociate purpose decision 2480, and/or send the central disassociate purpose decision 2480 to all or particular landscape systems 2456, such as in response to a particular request. The application 2460 (or other component or engine) in each landscape system 2456 can disassociate the purpose from the object in response to receiving the central disassociate purpose decision 2480, if the central disassociate purpose decision 2480 is in fact to disassociate the purpose from the object. In some cases, the central disassociate purpose decision 2480 may be to not disassociate the purpose from the object, and the central disassociate purpose decision 2480 can in these cases be informative (rather than directive). As another example, in some cases the central disassociate purpose decision 2480 is communicated only if the central decision is to disassociate the purpose from the object (and the central decision is not communicated if the central decision is to not disassociate the purpose from the object). A given landscape system 2456 disassociating a purpose from an object only in response to a directive from the server 2452 can prevent a scenario in which a purpose is disassociated from an object when another landscape system 2456 might still associate the purpose with the object.

The object blocker 2470 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. For example, a first retention policy can specify that the object is to be kept (e.g., in a blocked state) for ten years to support potential tax audits and a second retention policy can specify that the object is to be kept in a blocked state for twenty years to support employee safety audits (e.g., related to handling of dangerous chemicals). In this example, the object can be blocked for twenty years (e.g., a maximum of the ten and twenty year retention policies). After twenty years, the object can be destroyed. The object destroyer 2471 can determine to destroy a blocked object in response to determining that all applicable retention reasons have expired.

Object destruction decisions and actions can occur locally and independently in each landscape system 2456. For example, each application 2460 can determine locally whether a blocked object is to be destroyed. For instance, the application 2460 can determine to destroy an object when no purposes are associated with the object, no transactional data references the object, and no retention policy currently applies to the object. In response to an object destruction decision, the object destroyer 2471 can destroy the object.

Although purposes for an object have been described, in some implementations, a purpose can be configured for a portion of an object. The portion can be a particular field or a set of two or more fields, for example. For instance, a workforce person object may have a name field, a business email address, and a personal email address. A given purpose may apply to the name and business email address but not the personal email address. The purpose disassociation procedures described herein can apply to portions of an object, or to particular field categories of the object (e.g., organization-related, personal, confidential, or contact information categories, etc.). In some implementations, a given customer can define custom field categories.

In some implementations, the system 2450 supports a legal hold for an object. A legal hold can correspond to a decision or determination that certain data cannot be destroyed or changed, such as if the data corresponds or relates to a lawsuit or other legal action. The server 2452 can communicate a legal hold message to the landscape systems 2456 to inform the landscape systems 2456 about the legal hold. Each landscape system 2456 can store the object, in response to the legal hold notification, in a manner such that the object cannot be destroyed or changed without an appropriate authorized action. An authorized user can perform an action, for instance using the administrative application 2482, to destroy data stored for a legal hold, such as after a legal need for the data has passed. A legal hold can be implemented by each landscape system 2456 in various ways, such as by indefinitely blocking the object or by archiving a copy of the object.

In some implementations, the server 2452 sends a restriction message to the landscape systems 2456 about a restriction of processing of an object for one or more purposes. Each landscape system 2456 can respond to the restriction message by blocking the object for all purposes included in the restriction message. A restriction message can be sent, for example, based on a need to restrict processing of personal data as determined by input from the administrative application 2482, for example. Other various reasons may be a cause for why processing is to be restricted. For example, for an object that may otherwise be targeted for deletion, a data subject (e.g., an entity) may request the restriction of processing instead of the deletion of the object based on a need or desire to maintain the state of the object for use in a pending litigation. In this case, the processing of the object can be restricted and the object data can be prevented from being destructed (e.g., a destruction-preventing restriction of processing). In other cases, a data subject might opt-out of certain processing activities, such as individualized advertising. This type of restriction of processing can be performed without restricting or preventing later destruction of the objects.

The administrative application 2482 can be used for other purposes. For example, the server 2452 can provide information for display in the administrative application 2482 that informs an administrator why certain master data objects are not yet disassociated from certain purposes or not yet blocked. For example, one landscape system 2456 might have a wrong configuration and the wrong configuration might prevent the blocking of a master data object in other systems.

FIG. 25 is an example table 2500 that illustrates purpose disassociation decisions. Systems A 2502, B 2504, and C 2506 each process an instance 2508*a*, 2508*b*, or 2508*c*, respectively of a master data object m for different purposes. For example, a purpose column 2510 indicates that system A 2502 processes the master data object instance 2508*a* for a p1 purpose 2512 and a p2 purpose 2514. System B 2504 processes the master data object instance 2508*b* for a p2 purpose 2516 and a p3 purpose 2518 (e.g., with the p2 purpose 2514 being a same purpose as the p2 purpose 2516, in different applications). System C 2506 processes the master data object instance 2508*c* for a p3 purpose 2520 and a p4 purpose 2522 (e.g., with the p3 purpose 2520 being a same purpose as the p3 purpose 2518).

A local can-disassociate purpose column 2524 indicates local can-disassociate purpose decisions made by or in each system, for each associated purpose for each system. The table 2500 indicates decisions that can occur on a first day of a multi-day example (or a first time point of a multi-time point example). That is, although days are shown, minutes, months, years, or any other type of time point can be used. Other tables in FIGS. 26-30 below discuss decisions made by systems on other days of the multi-day example. Over time, systems A 2502, B 2504, and C 2506 can decide to disassociate purposes from the master data object or to block or destruct the master data object, for example. Each of systems A 2502, B 2504, and C 2506 can make a local decision, independent of other systems, regarding whether the respective system can disassociate the master data object.

For example, system A 2502 can make a first decision 2526 that system A 2502 can disassociate the p1 purpose 2512 from the master data object instance 2508*a* and a second decision 2528 that system A 2502 cannot currently disassociate the p2 purpose 2514 from the master data object instance 2508*a*. System B 2504 can make a first decision 2530 that system B 2504 cannot currently disassociate the p2 purpose 2516 from the master data object instance 2508*b* and a second decision 2532 that system B 2504 cannot currently disassociate the p3 purpose 2518 from the master data object instance 2508*b*. System C 2506 can make a first decision 2534 that system C 2506 can disassociate the p3 purpose 2520 from the master data object instance 2508*c* and a second decision 2536 that system C 2506 can disassociate the p4 purpose 2522 from the master data object instance 2508*c*.

Each system can provide data for respective internal decisions to a central component. The central component can maintain a data structure similar to the local can-disassociate purpose column 2524, for example, based on data received from separate systems. The central component can make centralized determinations based on an overview/summary of the local decisions that are included in the data structure. For instance, and as shown in a centralized determination column 2537, on the first day of the multi-day example, the central component can make a first determination 2538, based on data received from all systems, that the purpose p1 can be disassociated from the master data object in each of the systems. This decision may be based on the fact that no system needs the purpose p1 for the master data object m 2508. Similarly, the central component can make a second determination 2540, based on data received from all systems, that the purpose p4 can be disassociated from the master data object in each of the systems, where the decisions is based on no system needing the purpose p4 for the master data object m 2508. The central component can also determine that neither purpose p2 nor purpose p3 can be disassociated from the master data object in any system, since at least one system still needs purpose p2 for the master data object and at least one system still needs purpose p3 for the master data object.

FIG. 26 is an example table 2600 that illustrates purpose disassociation decisions on a second day of a multi-day example. The table 2600 illustrates a continuation of the example from FIG. 25. Based on the centralized determinations 2538 and 2540 that purpose p1 and purpose p4 can be disassociated from the master data object, system A 2502 has disassociated purpose p1 2512 from the master data object instance 2508*a* and system C 2506 has disassociated purpose p4 2522 from the master data object instance 2508*c* (e.g., purpose p1 2512 and purpose p4 2522 no longer appear in the table 2600).

The table 2600 also illustrates new local decisions made by or for system A 2502, system B 2504, and system C 2506, with respect to purposes for the master data object. On the second day (or other second time point), as indicated in a local can-disassociate purpose column 2602, system A 2502 can make a decision 2604 that system A 2502 cannot currently disassociate purpose p2 2606 from the master data object instance 2508*a*. System B 2504 can make a first decision 2608 that system B 2504 cannot currently disassociate purpose p2 2610 from the master data object instance 2508*b* and a second decision 2612 that system B 2504 can disassociate a purpose p3 2614 from the master data object instance 2508*b*. System C 2506 can make a decision 2616 that system C 2506 can disassociate purpose p3 2625 from the master data object instance 2508*c*.

As shown in a centralized determination column 2620, on the second day of the multi-day example, the central component can make a determination 2622, based on data received from all systems, that purpose p3 can be disassociated from the master data object in each of the systems, the decision based on no system needing purpose p3 for the master data object.

FIG. 27 is an example table 2700 that illustrates purpose disassociation decisions on a third day of a multi-day example. The table 2700 illustrates a continuation of the example from FIG. 26. Based on the centralized determination 2622 that purpose p3 can be disassociated from the master data object, system B 2504 has disassociated purpose p3 2614 from the master data object instance 2508*b* and system C 2506 has disassociated purpose p3 2625 from the master data object instance 2508*c* (e.g., purpose p3 2614 and purpose p3 2625 no longer appear in the table 2700).

The table 2700 also illustrates new local decisions made by or for system A 2502, system B 2504, and system C 2506, with respect to purposes for the master data object 2508. On the third day (or other third time point), as indicated in a local can-disassociate purpose column 2702, system A 2502 can make a decision 2704 that system A 2502 cannot currently disassociate purpose p2 2706 from the master data object instance 2508*a*. Similarly, system B 2504 can make a decision 2708 that system B 2504 cannot currently disassociate purpose p2 2710 from the master data object instance 2508*b*.

As illustrated by a blocked indicator 2712, system C 2506 has blocked the master data object instance 2508*c*. For instance, a retention policy may apply to the master data object instance 2508*c* in system C 2506. As shown in a centralized determination column 2714, on the third day of the multi-day example, the central component can make a determination 2716, based on data received from all systems, that purpose p2 cannot be disassociated from the master data object in any of the systems, based on at least one system (e.g., system A 2502 and system B 2504) needing purpose p2 for the master data object.

FIG. 28 is an example table 2800 that illustrates purpose disassociation decisions on a fourth day of a multi-day example. The table 2800 illustrates a continuation of the example from FIG. 27, including new local decisions made by or for system A 2502, system B 2504, and system C 2506, with respect to purposes for the master data object. On the fourth day (or other fourth time point), as indicated in a local can-disassociate purpose column 2802, system A 2502 can make a decision 2804 that system A 2502 can disassociate a purpose p2 2806 from the master data object instance 2508*a*. Similarly, system B 2504 can make a decision 2808 that system B 2504 can disassociate a purpose p2 2810 from the master data object instance 2508*b*.

As illustrated by a blocked indicator 2812, system C 2506 has continued to block the master data object instance 2508*c*. The master data object instance 2508*c* can appear to be deleted to system users other than those who have specific authorization to view the blocked master data object instance. The master data object instance 2508*c* may not be needed for regular processing but system C 2506 may make the master data object 2508*c* available to authorized users for a certain period of time, such as for an audit. As shown in a centralized determination column 2814, on the fourth day of the multi-day example, the central component can make a determination 2816, based on data received from all systems, that purpose p2 can be disassociated from the master data object in all of the systems, based on no systems needing purpose p2 for the master data object.

FIG. 29 is an example table 2900 that illustrates a fifth day of a multi-day example. The table 2900 illustrates a continuation of the example from FIG. 28, including new local decisions made by or for system A 2502, system B 2504, and system C 2506, with respect to purposes for the master data object. As illustrated by a blocked indicator 2902, system C 2506 has continued to block the master data object instance 2508*c*. Blocked indicators 2904 and 2906 indicate that system A 2502 has blocked the master data object instance 2508*a* and that system B 2504 has blocked the master data object instance 2508*b*, respectively. Since purposes have been removed based on guidance from the central component, master data object instances without any associated purposes can be blocked or destroyed by a local system without considering the object's state in other systems.

FIG. 30 is an example table 3000 that illustrates a sixth day of a multi-day example. The table 3000 illustrates a continuation of the example from FIG. 29. System A 2502 and system B 2504 have now both destroyed the master data object. A respective system can destroy a master data object after a retention period ends, for example. As illustrated by a blocked indicator 3002, system C 2506 has continued to block the master data object instance 2508*c*.

Figure 31:
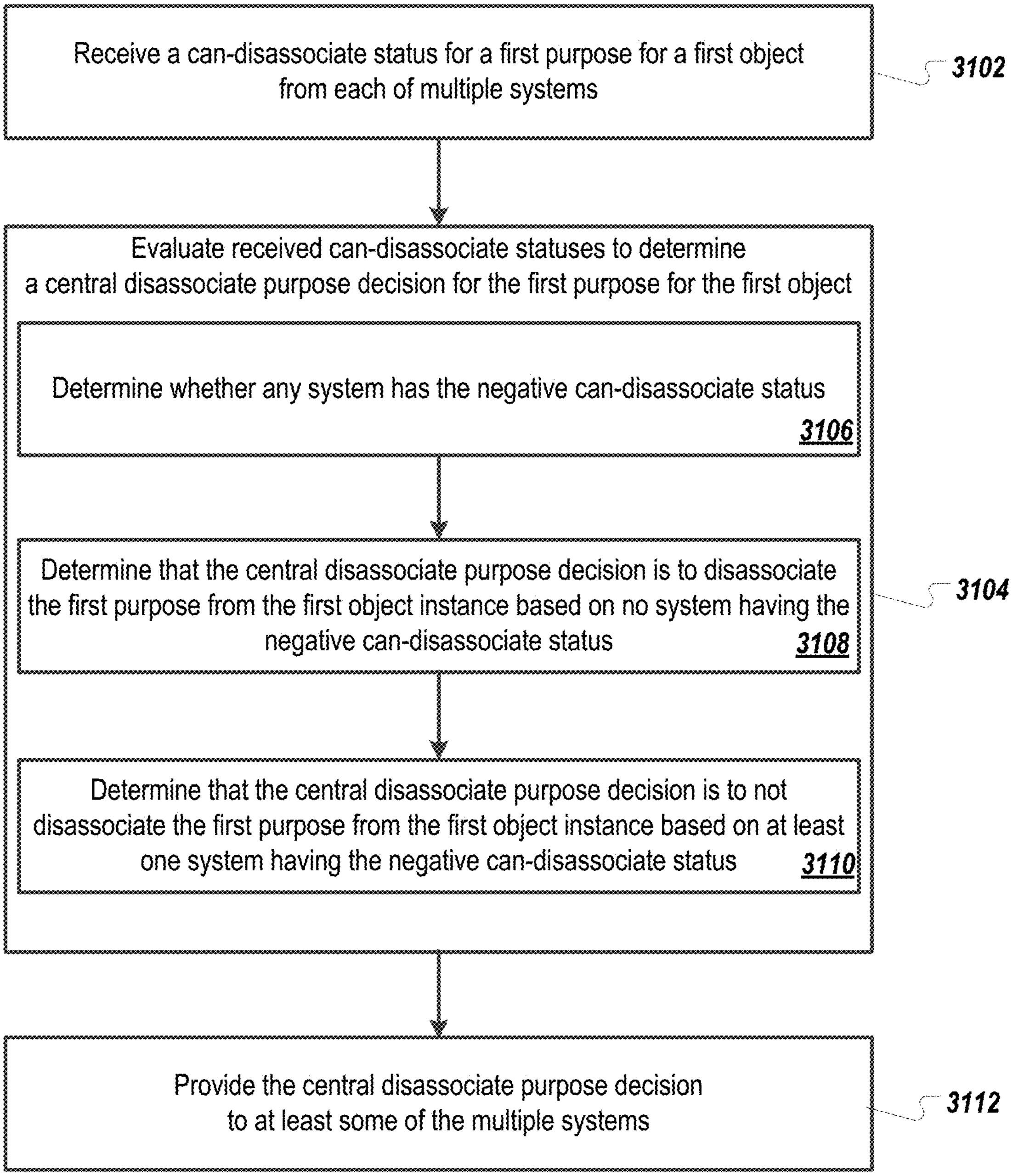
FIG. 31 is a flowchart of an example method for aligned purpose disassociation in a multi-system landscape.

FIG. 31 is a flowchart of an example method 3100 for aligned purpose disassociation in a multi-system landscape. It will be understood that method 3100 and related methods may be performed, for example, by any suitable system, environment, software, and hardware, or a combination of systems, environments, software, and hardware, as appropriate. For example, one or more of a client, a server, or other computing device can be used to execute method 3100 and related methods and obtain any data from the memory of a client, the server, or the other computing device. In some implementations, the method 3100 and related methods are executed by one or more components of the system 100 described above with respect to FIG. 1. For example, the method 3100 and related methods can be executed by the server 102 of FIG. 1.

At 3102, a can-disassociate status for a first purpose for a first object instance is received, at a central system, from each of multiple systems in a multi-system landscape. The first purpose indicates a first type of processing that can be performed on the first object instance. The first object instance can be a master data object. As another example, the first object instance can be a master data object in a first system and a transactional data object (that references a master data object) in a different, second system. The can-disassociate status for a respective system can be either an affirmative can-disassociate status that indicates that the respective system can disassociate the first purpose from the first object instance or a negative can-disassociate status that indicates that the respective system cannot disassociate the first purpose from the first object instance.

Receiving the can-disassociate statuses can include each of the multiple systems pushing, providing, or making available a respective can-disassociate status to the central system. Receiving the can-dissociate statuses can include polling the multiple systems for the can-disassociate statuses and receive responses from the polling. The polling can be performed in response to receiving a request from a first system for a first central disassociate purpose decision for the first purpose for the first object instance. The can-disassociate status for the first purpose for the first object instance can be determined locally by each respective system. The systems can each locally determine a can-disassociate status without considering can-disassociate statuses of other systems.

At 3104, the received can-disassociate statuses are evaluated to determine a central disassociate purpose decision for the first purpose for the first object instance.

At 3106, determining the central disassociate purpose decision includes determining whether any system has the negative can-disassociate status.

At 3108, determining the central disassociate purpose decision includes determining that the central disassociate purpose decision is to disassociate the first purpose from the first object instance based on no system having the negative can-disassociate status.

At 3110, determining the central disassociate purpose decision includes determining that the central disassociate purpose decision is to not disassociate the first purpose from the first object instance based on at least one system having the negative can-disassociate status.

Determining the central disassociate purpose decision can include overriding a negative can-disassociate status from a first system. Overriding the negative can-disassociate status from the first system can include determining that the central disassociate purpose decision is to disassociate the first purpose from the first object instance despite the first system having the negative can-disassociate status.

At 3112, the central disassociate purpose decision is provided to at least some of the multiple systems. The central disassociate purpose decision can be provided to each of the multiple systems or to a particular system in response to a request. In some cases, the central disassociate purpose decision can be provided only when the central disassociate purpose decision is to disassociate the first purpose from the first object instance (and not when the central disassociate purpose decision is to not disassociate the first purpose from the first object instance). A respective system can disassociate the first purpose from the first object in response to receiving a central disassociate purpose decision of disassociating the first purpose from the first object instance.

In some implementations, a first can-disassociate status for the first purpose for the first object instance can be received from a first system at a first point in time, and after receiving the first can-disassociate status for the first purpose for the first object instance from the first system, a second, different can-disassociate status for the first purpose for the first object instance can be received from the same first system at a later point in time. The central disassociate purpose decision can be updated (and in some cases recommunicated) based on the second can-disassociate status. In some implementations, a determination can be made that a can-disassociate status has not been received from a first system after a predetermined period of time after sending a request to the first system. For example, the first system may be down, there may be a network or other communication issue, etc. A default can-disassociate status can be determined for the first system, for the first purpose for the first object. For example, a default can-disassociate decision can be configured to be positive or negative for the first system (and can be configured differently for different systems). As another example, a system can be configured so that a default can-disassociate decision for objects of a certain type for a purpose of a certain type is either positive or negative, for instance. The default can-disassociate decision for the first system can be used when determining the central disassociate purpose decision.

Figure 32B:
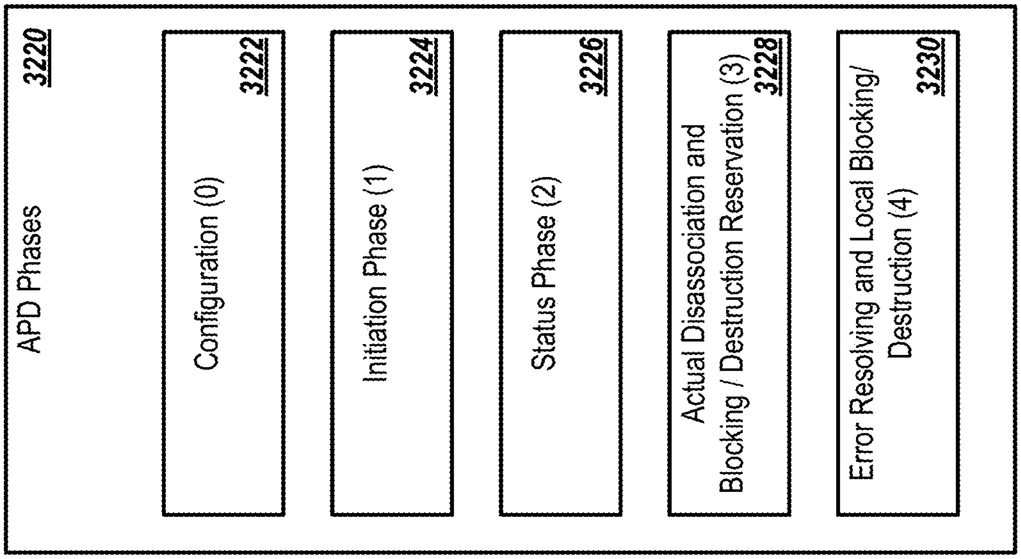
FIG. 32B illustrates phases of an example aligned purpose disassociation protocol.
Figure 32A:
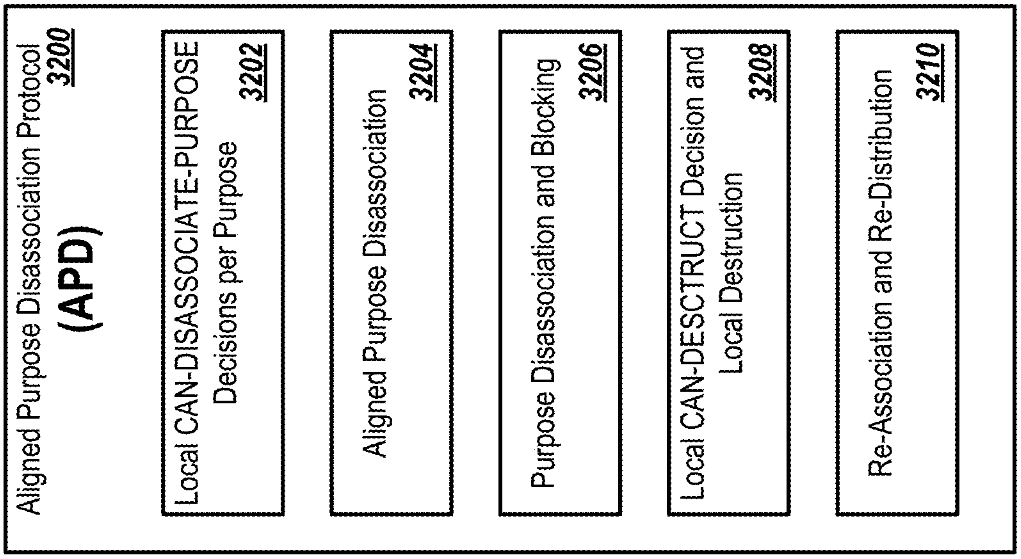
FIG. 32A illustrates different functionalities of an aligned purpose disassociation protocol.

FIG. 32A illustrates different functionalities of an aligned purpose disassociation protocol 3200. The APD protocol 3200 can apply to different systems in a landscape, as described above. Additionally, the APD protocol can be applied to different applications in a same system. For example, different applications in a same system can each separately participate in the APD protocol. Accordingly, "application" is used below in further descriptions of the APD protocol. In general, as used throughout this specification, either an "application" (e.g., of a particular system) or a "system" itself, of a multiple-system/multiple-application landscape, can participate in the APD protocol (or in the integrated end of purpose and PDR protocols).

The APD protocol 3200 can include a functionality of local can-disassociate purpose decisions per purpose 3202. For example, applications that actively participate in the APD protocol can decide locally (e.g., without needing to consider circumstances in other applications), for each purpose of a master data object, whether the purpose can be locally disassociated. However, although an application may locally determine that the application can disassociate the purpose from the master data object, the application does not disassociate the purpose unless or until the application receives a centralized disassociate purpose instruction.

The APD protocol 3200 can also include a functionality of an aligned purpose disassociation 3204. For example, a centralized service (e.g., a DPI service) can provide a mechanism that determines a centralized disassociation decision by evaluating whether all involved applications that process a master data m object for a purpose p can disassociate m from p. After determining the centralized disassociation decision, the DPI service informs the applications about the centralized disassociation decision. The DPI service used with/for the APD protocol 3200 can use the DPI architecture pattern and framework described above for the IEOP protocol.

Another functionality of the APD protocol 3200 includes purpose disassociation and blocking 3206. For example, applications that receive the centralized disassociation decision from the DPI service that instructs dissociating a purpose p from a master data object m respond to the DPI service instruction by locally disassociating the purpose p from the master data object m. Furthermore, applications can locally block the master data object m for all purposes when a retention period applies and when there are no longer any purposes associated with the object in the application (e.g., after all previously associated purposes have been disassociated).

The APD protocol 3200 also includes local can-destruct decisions and local destruction functionality 3208. For example, applications can locally decide (e.g., without considering circumstances in other applications) whether a blocked master data object m can be locally destructed. For example, an application can determine that m is to be destructed when no purpose is associated with m, no transactional document t references m, and no retention period currently applies to m. Applications can destruct a master data object after determining that the master data object can be destructed.

The APD protocol 3200 includes re-association and re-distribution functionality 3210. For example, applications can, in response to a re-associate command from the DPI service, re-associate a purpose p that had been previously disassociated from a master data object m. For example, as described in more detail below, an application in the landscape may have reported a can-disassociate decision to the DPI service for a purpose for an object but then subsequently had new activity for the object for the purpose. Accordingly, the application may respond with a failure status to the DPI service after receiving a disassociate instruction from the DPI service. Upon receiving the failure status, the DPI service can send a re-associate command to the participating applications, so that applications that had successfully disassociated the purpose can re-associate the purpose.

Other Aligned Purpose Disassociation Functionalities

FIG. 32B illustrates phases of an example aligned purpose disassociation protocol 3220. Different versions of the APD protocol can be implemented, with some versions including more functionality than other versions. For example, some versions, such as the APD protocol 3220, can include more functionality than what is described above. For example, the APD protocol 3220 includes a configuration phase 3222 (phase 0), an initiation phase 3224 (phase 1), a status phase 3226 (phase 2), an actual disassociation and blocking/destruction reservation phase 3228 (phase 3), and an error resolving and local blocking/destruction phase 3230 (phase 4). The APD protocol 3220, as compared to above APD descriptions, can offer more robust error handling, such as re-association capabilities if errors or race conditions occur during disassociation, and resource savings, by determining to not start the protocol if a protocol handler already knows that an aligned purpose disassociation can't currently occur. For example, the protocol 3220 can include a mechanism to decide based on previous protocol runs whether a new protocol run should be accepted at all or not at a certain point in time. For example, based on previous protocol runs and on configured data, a predetermination can be made that the protocol would lead to a "can disassociate" decision, so in these cases the protocol is not executed so that the connected applications do not need to perform resource intensive calculations.

In the configuration phase 3222, trust relationships are configured between components, applications are registered, applications select in which of the phases after the configuration phase the application participates, and default replies can be configured for applications. In the initiation phase 3224, a particular application requests initiation of the aligned purpose disassociation protocol for a master data object a purpose. In the status phase 3226, applications that participate in the status phase can be queried for a local disassociation status for the master data object and the purpose. In some cases, some applications that participate in the status phase do not participate in the actual dissociation and blocking/destruction reservation phase 3228. In the actual disassociation and blocking/destruction reservation phase 3228, applications receive instructions regarding purpose disassociation. In the error resolving and local blocking/destruction phase 3230, re-associate instructions are sent to and processed by applications in response to the DPI service receiving an indication from at least one application that requested disassociation was unable to occur.

Regarding configuration of default replies in the configuration phase 3222, for applications which indicate participation in the status phase 3226, a default reply to a query for purpose status for all or specified master data objects can be configured. The default reply can be can-disassociate or cannot-disassociate, for example. The default reply can be used if the application doesn't respond during the status phase 3226. For instance, for an application deemed an important voter, a default reply can be configured as cannot-disassociate, so that if the application is unresponsive, an aligned purpose disassociation cannot occur (e.g., without active consent of the application). For other applications, such as an analytic application, a default reply can be can-disassociate, if disassociating the purpose in the application would generally be acceptable even if the application is unresponsive (e.g., if the application is down, an aligned purpose disassociation can still occur—the application does not block the whole protocol). Other configuration aspects are described in more detail below.

FIG. 33 illustrates formal definitions 3300 that describe an aligned purpose disassociation protocol. The APD protocol applies to disassociation of purposes in a set of purposes P 3302, for objects in a set of master data objects M 3304, in applications in a set of applications B 3306. The APD protocol involves a set of association functions A 3308 and a set of disassociation functions D 3310 that each specify a Boolean condition that, if true, indicates that a given purpose p should be either associated with or disassociated from a given master data object m, respectively.

A rule 3312 specifies that the APD protocol can ensure, for purposes p in the set of purposes P 3302, objects m in the set of master data objects M 3304, applications b in the set of applications B 3306, association functions a in the set of association functions A 3308, and disassociation functions d in the set of disassociation functions D 3310, that either an association function a for a particular purpose p and master data object m or a disassociation function d for the same purpose p and same master data object m can evaluate to a true value but both functions cannot simultaneously evaluate to a true value. In other words, the APD protocol can ensure that either a condition for associating or a condition for disassociating a purpose can apply, but both conditions can't apply at the same time. Otherwise, problems may occur, such as purposes being disassociated right after their association and/or purposes being re-associated right after their disassociation. As a particular example, a landscape might be configured to associate a purpose "EMPLOYMENT" when a WorkforcePerson object has a configured last name. However, disassociation rules that may be configured to cause disassociation after the employee leaves a company may never be executed, because a condition for keeping the purpose associated (e.g., the employee having a configured last name in the system) will generally still apply even after the employee leaves the company. Enforcement of the rule 3312 by the APD protocol can avoid such a situation.

A rule 3314 corresponds to selection of phase participation by applications in the configuration phase. The rule 3314 specifies that an application that participates in a phase $q_i$ must also participate in phase $q_{i+1}$ (e.g., if an application participates in one phase it also participates in the following phases). $B_i$ can be defined as the set of all applications participating in the phase $q_i$. Accordingly, a sub-rule $B_i \subseteq B_{i+1}$ applies (e.g., applications that participate in a given phase are a subset of applications that participate in the next phase). Additionally, a sub-rule $B_3=B_4=B$ applies (e.g., all applications involved in the protocol participate in the $3^{rd}$ and $4^{th}$ phase). For instance, B represents all applications involved in the APD protocol $B_3$ represents applications participating in the third phase, and $B_4$ represents applications participating in the fourth phase.

In other words, an application can choose per master data type in which phases the application participates, subject to the rule 3314. For example, if a particular application participates in phase 1 by being an initiator of the APD protocol for WorkforcePerson objects, the application also participates in phases 2, 3, and 4. As another example, another application may determine to not participate in deciding whether a purpose can be disassociated from an object but may need to know disassociation results and disassociate when requested. Accordingly, that application might not participate for WorkforcePerson objects in phase 1 and 2, but does participate for WorkforcePerson objects in phase 3 and 4. Since actual disassociation happens in phase 3, every application involved in the protocol participates in phase 3. And since the resolving of errors during phase 3 is performed in phase 4, every application involved in the protocol also participates in phase 4. For a given application, the application may be configured to not participate, for example, in phases 1 and 2 due to such functionality not being implemented. For other applications, phase 1 and phase 2 functionality may be implemented, but a customer may choose to disable that functionality and have the application only participate in phases 3 and 4.

The configuration phase can include ensuring that there is at least one application $b_1 \in B_1$ participates in the first phase for each combination of master data object and purpose (m,p). That is, administrator(s) who configure APD in a given landscape can ensure that for every master data object/purpose combination at least one application initiates the APD protocol. For a given master data object, different applications can initiate the APD protocol for different purposes. For example, a first application may initiate the APD protocol for a WorkforcePerson master data object and a purpose of executing employment contract, a second application may initiate APD for project management purposes for WorkforcePerson objects, and a third application may initiate APD for WorkforcePerson objects and travel cost reimbursement purposes.

A function 3316 of Π(p,m,b) can be defined for an application b, a purpose p and a master data object m, that returns true if the application b associates the master data object m with the purpose p and false otherwise. A function 3318 of Π(p,m) can be defined for a purpose p and a master data object m, that returns true if any application associates the master data object m with the purpose p and false otherwise. A disassociation function 3320 of d(p,m,b) can be defined for an application b, a purpose p and a master data object m, that returns true if the application b can disassociate the master data object m from the purpose p and false otherwise.

The configuration phase can include configuring a maximal accepted minimum remaining association time per purpose parameter $$t_p^{max} \text{ 3322,}$$

a minimum remaining association time timestamp parameter min $$t_{b_2,m,p}^{min} \text{ 3324.}$$

The DPI service can maintain a global minimum association timestamp $t_{m,p}$ 3326 for a given master data object and purpose. The parameters 3322, 3324, and 3326 are described in more detail below in the descriptions of the post-configuration phases of the APD protocol.

Figure 34:
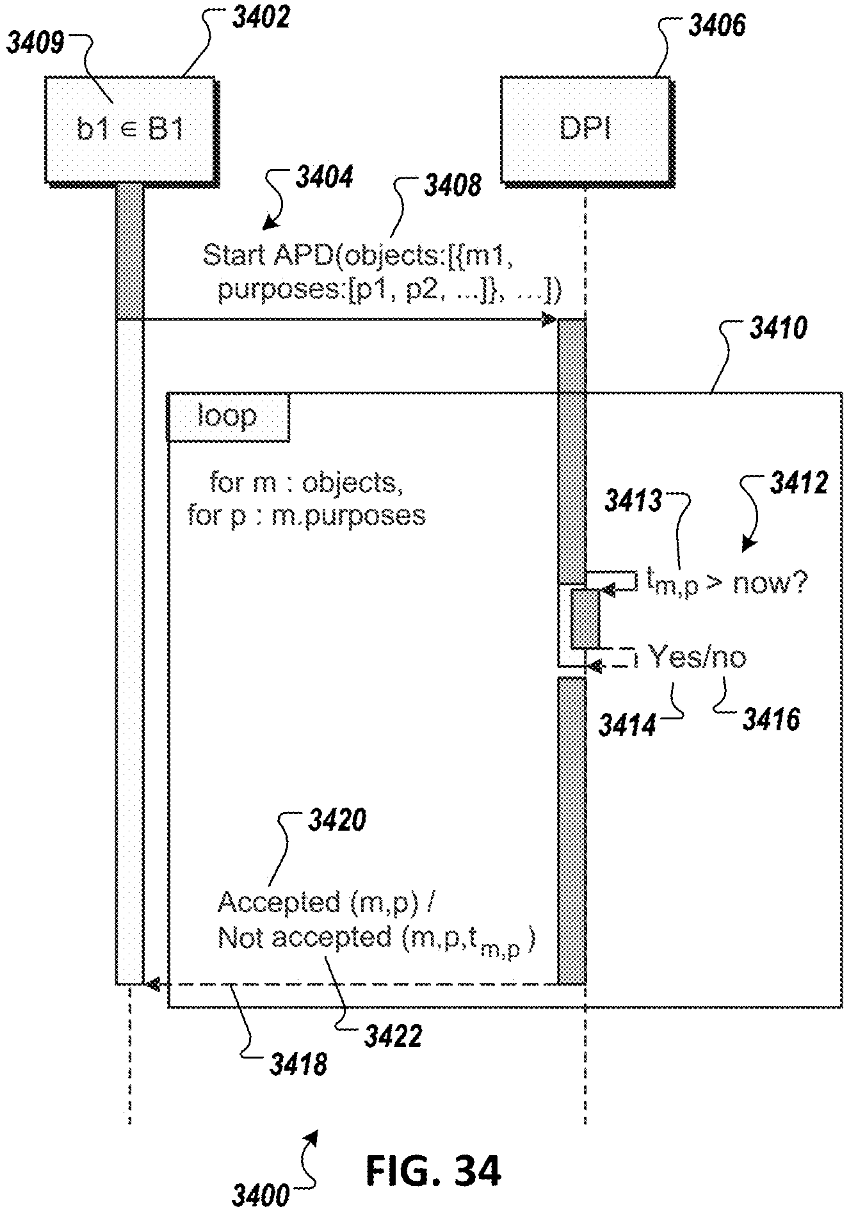
FIG. 34 is a swim lane diagram that illustrates a pattern of aligned purpose disassociation activities in an initiation phase.

FIG. 34 is a swim lane diagram 3400 that illustrates a pattern of aligned purpose disassociation activities in an initiation phase. Specific examples of the initiation phase are described below with respect to FIGS. 35, 36, and 37. Initiation phase activities can include an initiator application b1 3402 sending an initiation request 3404 to a DPI service 3406. The initiation request 3404 can have parameters that follow a pattern 3408 of "objects: [{m1,purposes:[p1, p2, . . . ]}, . . . ]". That is, the initiation request 3404 can be for one or more master data objects (e.g., m1, m2, m3, . . . ) and for each master data object, one or more purposes (e.g., p1, p2, p3, . . . ).

As indicated by a b1∈B1 notation 3409, the initiator application 3402 is included in a set of application(s) that may initiate the APD protocol for combination(s) of the master data object and purpose tuples included in the initiation request 3404. The initiation phase activity can include a pattern of an iteration construct 3410 that is performed by the DPI service 3406 in response to the initiation request 3404. When executing the iteration construct 3410, the DPI service 3406 can iterate over each master data object in the initiation request 3404, and for each master data object, iterate over each purpose specified for the master data object in the initiation request 3404.

For each master data object and purpose combination processed in the iteration construct 3410, the DPI service 3406 can perform a determination 3412 to determine whether a global minimum association timestamp $t_{m,p}$ 3413 stored at the DPI service 3406 is greater than a current time (e.g., if a global minimum association timestamp $t_{m,p}$ 3413 is stored at the DPI service 3406). The global minimum association timestamp $t_{m,p}$ 3413 represents a latest can-disassociate time that an application participating in the status phase had previously provided to the DPI service 3406. For example, if a first application had previously responded that it can dissociate a purpose from a master data object on Nov. 1, 2023 and a second application had previously responded that it can disassociate the purpose from the object on Dec. 1, 2023, the DPI service 3406 may have stored a value of Dec. 1, 2023 for the global minimum association timestamp $t_{m,p}$ 3413. The determination 3412 for a master data object and purpose combination from the initiation request 3404 results in a yes value 3414 if the global minimum association timestamp $t_{m,p}$ 3413 is greater than the current time and a no value 3416 if the global minimum association timestamp $t_{m,p}$ 3413 is not greater than the current time or if the DPI service 3406 has not stored a value for the global minimum association timestamp $t_{m,p}$ 3413.

The DPI service 3406 can send an initiation response 3418 to the initiator application b1 3402, in response to the initiation request 3404, for each combination of master data object and purpose specified in the initiation request 3404. For a given master data object and purpose combination, if the determination 3412 results in the no value 3416, the DPI service 3406 can include an acceptance indication 3420 in the initiation response 3418 for the master data object and purpose. Additionally, the DPI service 3406 can initiate the APD protocol for the master data object and purpose (e.g., by starting phase two of the protocol, as described below).

If the determination 3412 results in the yes value 3414 for the master data object and purpose combination, the DPI service 3406 can include a not-accepted indication 3422 in the initiation response 3418 (e.g., since the determination 3412 indicates that at least once application can't disassociate the purpose from the master data object until a later date). The not-accepted indication 3422 can include the global minimum association timestamp $t_{m,p}$ 3413. For example, the initiator application b1 3402 can receive and store the global minimum association timestamp $t_{m,p}$ 3413, and can check the global minimum association timestamp $t_{m,p}$ 3413 stored at the initiator application b1 3402 before sending another initiation request to the DPI service 3406 (e.g., the initiator application b1 3402 can determine to not send any additional initiation requests while the current time is before the time reflected in the global minimum association timestamp $t_{m,p}$ 3413). The DPI service Although individual initiation responses 3418 can be sent for each master data object and purpose combination and the DPI service 3406 can be configured to initiate the APD protocol for each master data object and purpose combination that has been accepted, in some implementations, the DPI service 3406 sends an aggregate acceptance/non-acceptance indicator to the initiator application 3402 in one initiation response 3418 that is based on whether APD initiation for each master data object and purpose combination in the initiation request 3404 has been accepted. For example, in some implementations, the DPI service 3406 can treat the initiation request 3404 as an all-or-nothing request, in that the DPI service 3406 rejects the initiation request 3404 if the determination 3412 results in the yes value 3414 for any master data and purpose combination in the initiation request 3404. The DPI service 3406 can accept the initiation request 3404 if the determination 3412 results in the no value 3416 for each master data and purpose combination in the initiation request 3404. The DPI service 3406 can then initiate the APD protocol for each master data object and purpose included in the imitation request 3404 by starting phase two of the protocol for each master data object and purpose included in the initiation request 3404.

In summary, and as a formal description of phase 1 of the APD protocol, and in reference to some of the formal definitions 3300 described above with respect to FIG. 33, in phase 1 of the APD protocol, an application $b_1 \in B_1$ can trigger the APD protocol through a request to a DPI service that includes parameters $\{(m, \{p|p \in P \wedge \Pi(p,m,b_1)=true \wedge d(p,m,b_1)=true\})|m \in M\}$ (e.g., a set of tuples that each include a master data object with a set of associated purposes). If the DPI service stores a global minimum association timestamp $t_{m,p}$ for a master data object m and purpose p with $t_{m,p}$>now, the DPI service can reject, up front, the APD initiation request for that master data object and purpose.

Figure 35:
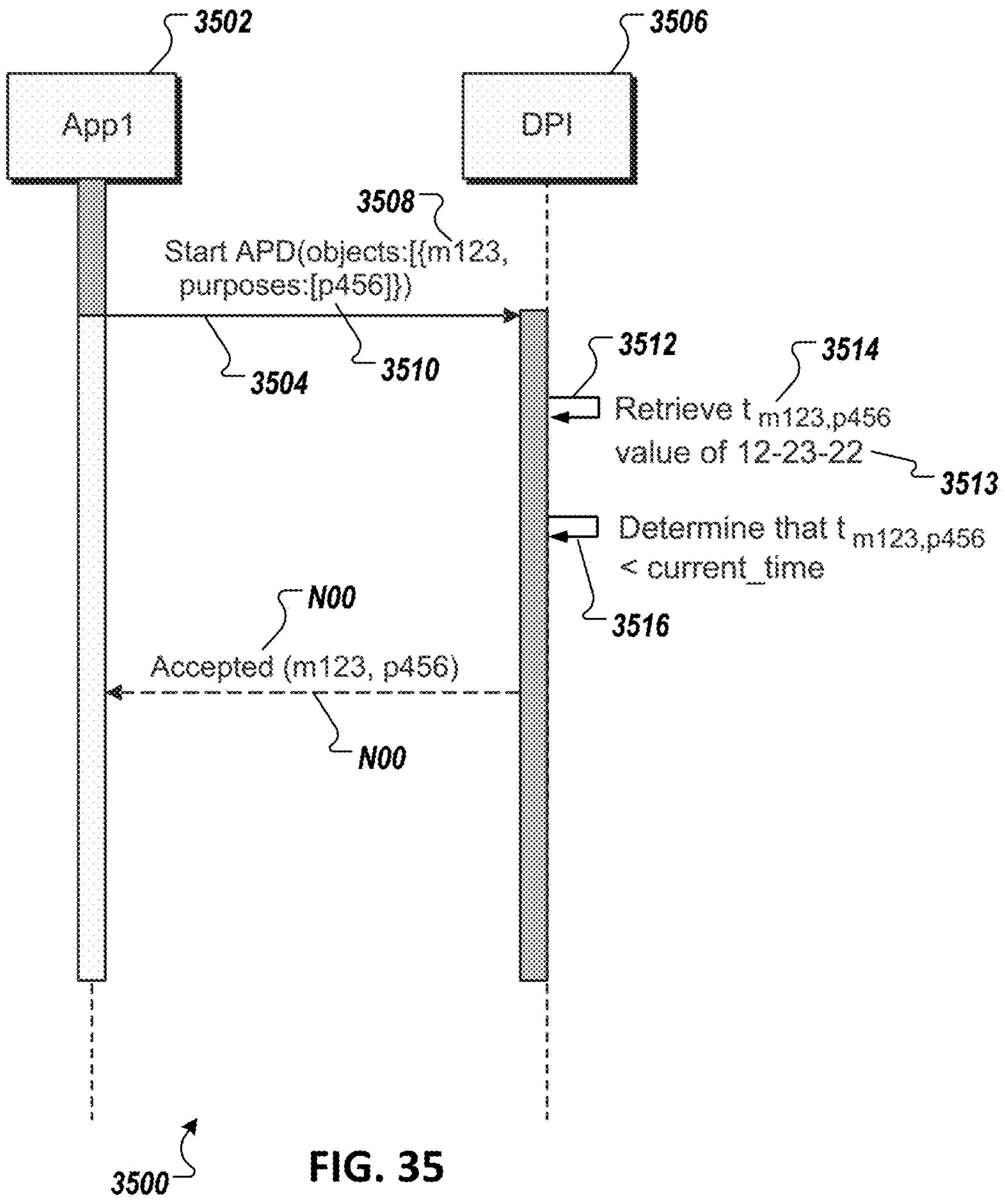
FIG. 35 is a swim lane diagram that illustrates example activity in an initiation phase of an aligned purpose disassociation protocol.

FIG. 35 is a swim lane diagram 3500 that illustrates example activity in an initiation phase of an aligned purpose disassociation protocol. An application 3502 sends an initiation request 3504 to a DPI service 3506. The initiation request 3504 is requesting initiation of the APD protocol for a master data object with an identifier 3508 of "m123" and a purpose with a purpose identifier 3510 of "p456".

At 3512, in response to the initiation request 3504, the DPI service 3506 retrieves a value 3513 of "Dec. 23, 2022" for a global minimum association timestamp 3514 for the master data object and the purpose (e.g., from storage at the DPI service 3506). At 3516, the DPI service 3506 determines that the value 3513 of the global minimum association timestamp 3514 is less than the current time. Accordingly, the DPI service 3506 can determine that the APD protocol can be initiated for the master data object and the purpose, since the DPI service 3506 is not aware of any applications that can't currently disassociate the purpose from the master data object. The DPI service 3506 can send an acceptance message 3518, for the master data object and the purpose, to the application 3502. Additionally, the DPI service 3506 can initiate the APD protocol (e.g., initiate phase 2) for the master data object and purpose, as described below.

Figure 36:
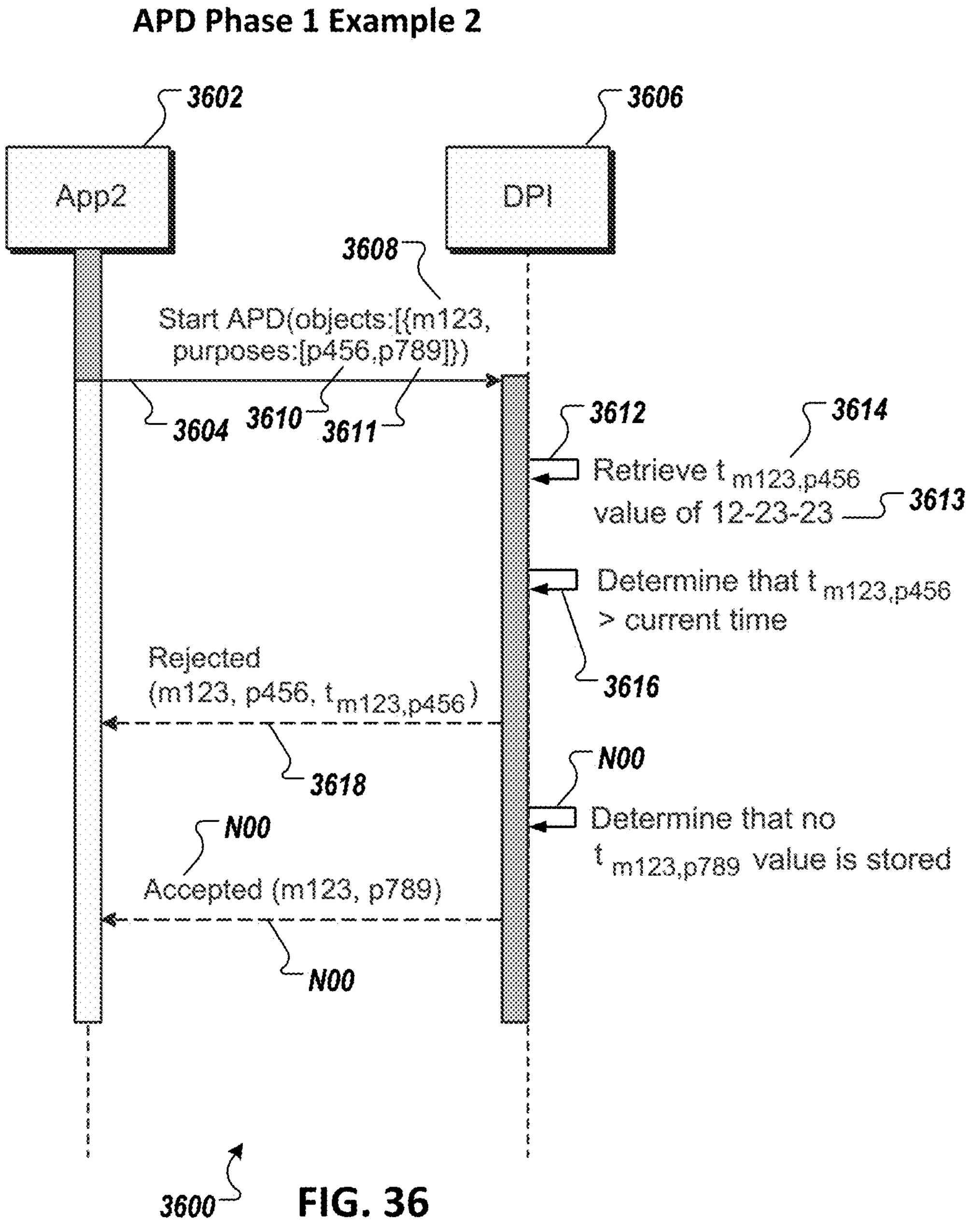
FIG. 36 is a swim lane diagram that illustrates example activity in an initiation phase of an aligned purpose disassociation protocol.

FIG. 36 is a swim lane diagram 3600 that illustrates example activity in an initiation phase of an aligned purpose disassociation protocol. An application 3602 sends an initiation request 3604 to a DPI service 3606. The initiation request 3604 is requesting initiation of the APD protocol for a master data object with an identifier 3608 of "m123" and a first purpose with a purpose identifier 3610 of "p456" and a second purpose with a purpose identifier 3611 of "p789".

At 3612, in response to the initiation request 3604, the DPI service 3606 retrieves a value 3613 of "Dec. 23, 2023" for a global minimum association timestamp 3614 for the master data object and the purpose with purpose identifier p456 (e.g., from storage at the DPI service 3606). At 3616, the DPI service 3606 determines that the value 3613 of the global minimum association timestamp 3614 is greater than the current time. Accordingly, the DPI service 3606 can determine that the APD protocol cannot be initiated for the master data object and the purpose with purpose identifier p456, since the value 3613 of the global minimum association timestamp 3614 indicates that at least one application cannot disassociate the purpose with purpose identifier p456 until a time point in the future. The DPI service 3606 can send a rejection message 3618 for the master data object and the purpose with purpose identifier p456 that includes the global minimum association timestamp 3614, to the application 3602.

At 3620, the DPI service 3606 determines that there is no global minimum association timestamp stored for the master data object and the purpose with purpose identifier p789. Accordingly, the DPI service 3606 can send an acceptance message 3622 to the application 3602, for the master data object and the purpose with purpose identifier p789. Additionally, the DPI service 3606 can initiate the APD protocol (e.g., initiate phase 2) for the master data object and purpose with purpose identifier p789, as described below.

Figure 37:
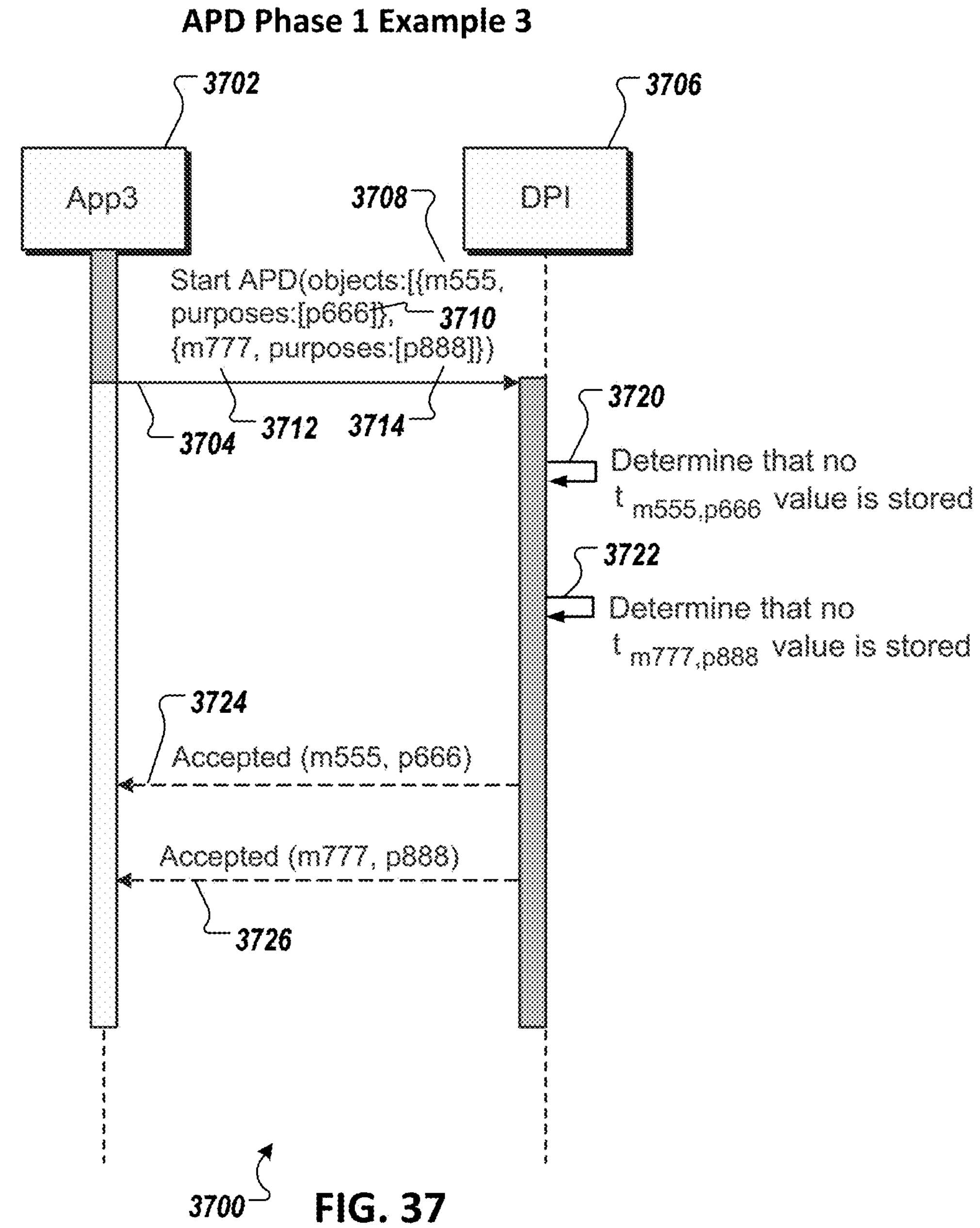
FIG. 37 is a swim lane diagram that illustrates example activity in an initiation phase of an aligned purpose disassociation protocol.

FIG. 37 is a swim lane diagram 3700 that illustrates example activity in an initiation phase of an aligned purpose disassociation protocol. An application 3702 sends an initiation request 3704 to a DPI service 3706. The initiation request 3704 is requesting initiation of the APD protocol for: 1) a master data object with an identifier 3708 of "m555" and a purpose with a purpose identifier 3710 of "p666"; and 2) a master data object with an identifier 3712 of "m777" and a purpose with a purpose identifier 3714 of "p888".

At 3720, the DPI service 3706 determines that there is no global minimum association timestamp stored for the master data object with object identifier m555 and the purpose with purpose identifier p666. Similarly, at 3722, the DPI service 3706 determines that there is no global minimum association timestamp stored for the master data object with object identifier m777 and the purpose with purpose identifier p888. Based on the determinations at 3720 and 3722, the DPI service 3706 can send acceptance messages 3724 and

3276, for 1) the master data object with object identifier m555 and the purpose with purpose identifier p666; and 2) the master data object with object identifier m777 and the purpose with purpose identifier p888, respectively. Additionally, the DPI service 3706 can initiate the APD protocol for 1) the master data object with object identifier m555 and the purpose with purpose identifier p666; and 2) the master data object with object identifier m777 and the purpose with purpose identifier p888.

Figure 38:
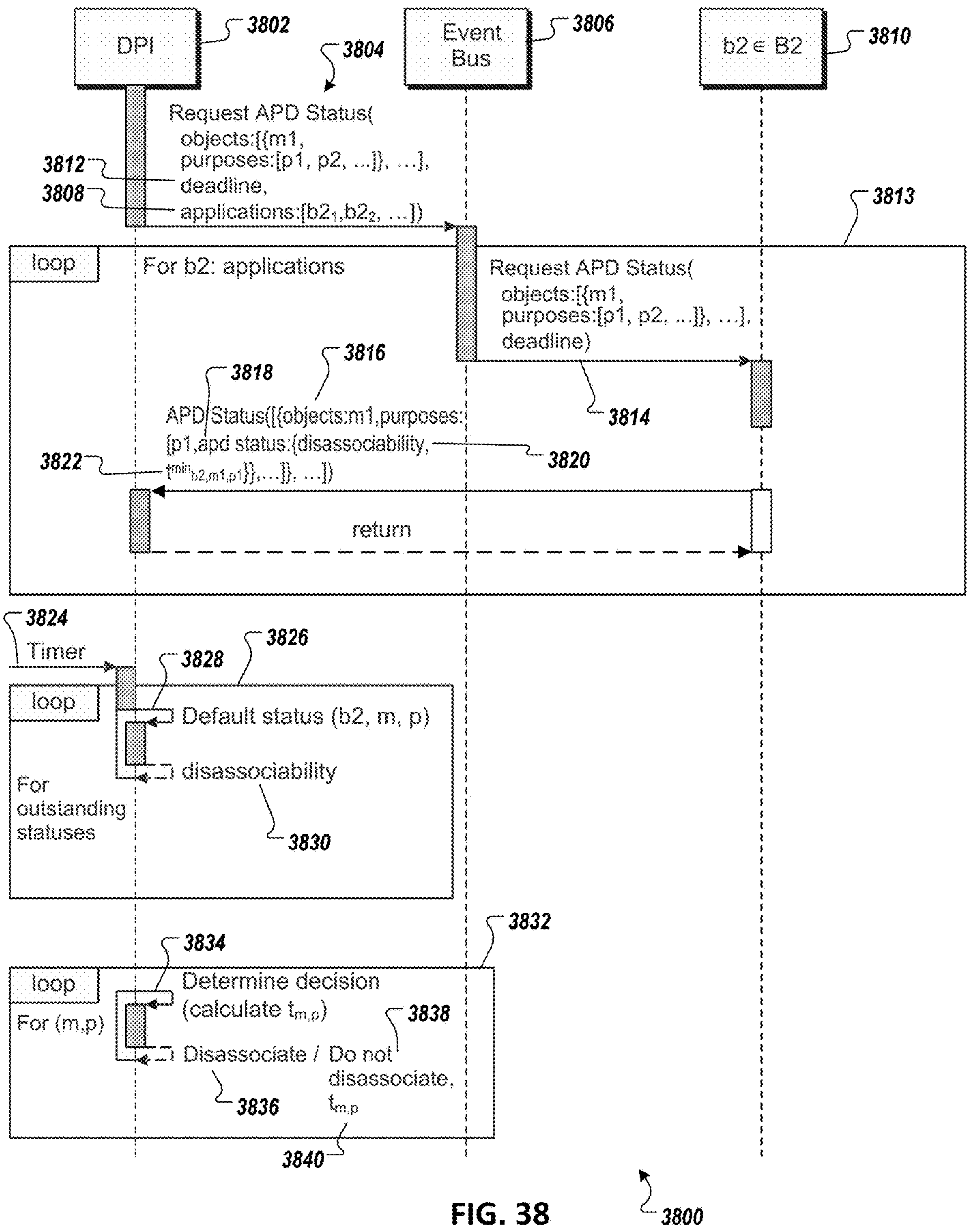
FIG. 38 is a swim lane diagram that illustrates a pattern of aligned purpose disassociation activities in a status phase.

FIG. 38 is a swim lane diagram 3800 that illustrates a pattern of aligned purpose disassociation activities in a status phase. Specific examples of the status phase are described below with respect to FIGS. 39, 40, and 41. Status phase activities can include a DPI service 3802 sending an APD status request 3804 to an event bus 3806. The DPI service 3802 is requesting the event bus 3806 to send an APD status request to each application referenced in an application list 3808. The application list 3808 corresponds to a set 3810 of applications b2∈B2 (e.g., applications that are configured, in the configuration phase, to participate in phase 2 (e.g., the status phase)).

The APD status request 3804 is requesting APD status for one or more master data objects (e.g., m1, m2, m3, . . . ) and for each master data object, one or more purposes (e.g., p1, p2, p3, . . . ). The set 3810 of applications includes the application that initiated the APD protocol for the specified master data object(s) and purpose(s). The master data object and purpose combinations referenced in the APD status request 3804 can exclude any master data object and purpose combinations that the DPI service 3802 had rejected in the previous phase (e.g., based on a master data object/purpose combination having a global minimum association timestamp greater than the current time).

The DPI service 3802 is requesting applications to respond with status by a specified deadline 3812. As illustrated in an iteration construct 3813, in response to receiving the APD status request 3804, the event bus 3806 sends an APD status request 3814 corresponding to the APD status request 3804 to each application in the set 3810 of applications.

Each application in the set 3810 of applications can send an APD status 3816 in response to a respective APD status request 3814. The APD status 3816 includes references to master data object(s) and purpose(s) included in the APD status request 3814 and an application APD status 3818. The application APD status 3818 includes a Boolean disassociability value 3820 for each respective master data object and purpose combination that indicates whether the application can disassociate the purpose from the master data object. When the disassociability value 3820 is false for a given master data object and purpose combination, the application can include a minimum remaining association time timestamp $$t_{b_2,m,p}^{min} \text{ 3822}$$

that indicates an earliest time that the application will likely be able to disassociate the purpose from the master data object.

The DPI service 3802 can detect a timer event 3824 after the deadline 3812 has passed since the sending of the APD status request 3804. As illustrated by an iteration construct 3826, the DPI service 3802 can perform processing for each application in the set 3810 of applications that has not yet responded to the APD status request 3804. At 3828, for each application that has not yet responded to the APD status request 3804 and for each master data object and purpose combination referenced in the APD status request 3804, the DPI service 3802 can retrieve default status information for the application and the master data object and purpose combination. The default status information can include a default disassociability Boolean value 3830 for the application that indicates whether the application that has not responded to the APD status request 3804 should be considered as being able to disassociate the purpose from the master data object.

Respective default disassociability Boolean values 3830 and disassociability values 3820 received from respective applications can be used by the DPI service 3802 to determine APD decisions. For example and as illustrated by an iteration construct 3832, the DPI service 3802 can determine an APD decision 3834 for each master data object and purpose combination referenced in the APD status request 3804. Each APD decision 3834 can include either a disassociate result 3836 or a do-not-disassociate result 3838. For example, if the received APD statuses (and default statuses, if applicable) indicate that no application still requires the association of a particular purpose with a particular object then the overall decision for the object and purpose can be the disassociate result 3836. If at least one application still requires that the purpose is associated with the master object then the overall decision for the whole landscape can be the do-not-disassociate result 3838 (e.g., indicating that the purpose should not be disassociated from the master data object in the landscape).

If an APD decision 3834 for a master data object and purpose combination includes the do-not-disassociate result 3838, the DPI service 3802 can calculate a global minimum association timestamp 3840 for the master data object and purpose combination. That is, if at least one application sends a minimum remaining association time timestamp $$t_{b_2,m,p}^{min} \text{ 3822,}$$

the DPI service 3802 can calculate the global minimum association timestamp $$\text{3840 } t_{m,p} = \min\left(\max\left(t_{b_2,m,p}^{min} \mid b_2 \in B_2\right); \text{now} + t_p^{max}\right).$$

That is, the DPI service can set as the global minimum association timestamp the maximum of all timestamps per master data object and purpose from all applications that returned a $$t_{b_2,m,p}^{min}$$

value, but not a timestamp that is more than the duration of a $$t_p^{max}$$

parameter into the future. The DPI service 3802 can store respective $t_{m,p}$ values until they are outdated.

The $$t_p^{max}$$

parameter corresponds to the maximal accepted minimum remaining association time per purpose parameter 3322 mentioned above with respect to FIG. 33. The maximal accepted minimum remaining association time per purpose parameter 3322 can be configured by an administrator as a cap on minimum remaining associate time timestamps $$t_{b_2,m,p}^{min}$$

that are returned by applications. The cap can prevent use of an accidental timestamp with an unreasonable value (e.g., 1000 years) being returned and used in calculations by the DPI service 3802. In some cases, the administrator can adjust the maximal accepted minimum remaining association time per purpose parameter 3322 in response to a change in legislation. For example, new legislation may stipulate that certain data is to be (or can be) now kept for five years instead of a previous ten years. The administrator can set the maximal accepted minimum remaining association time per purpose parameter 3322 parameter to five years, to ensure that an application value of ten years (or longer) is not used by the DPI service 3802.

In summary, and as a formal description of phase 2 of the APD protocol, and in reference to some of the formal definitions 3300 described above with respect to FIG. 33, in phase 2 of the APD protocol, the DPI service 3802 can inform all applications $b_2 \in B_2$ about an APD check for master data object and purpose combinations of $\{(m, \{p|p \in P\})|m \in M\}$ and request the applications to send a response to the DPI service with the application status for each $(m,p) \in \{\{m\} \times \{p|p \in P \wedge \Pi(p,m,b_1)=\text{true} \wedge d(p,m,b_1)=\text{true} \wedge \neg t_{m,p} > \text{now}\}\}$ within a certain timeframe. Each application $b_2$ can respond to the request from the DPI service with an indication whether the purpose p can be disassociated in the application from the master data object m for all (m,p). If the purpose p cannot be disassociated from the master data object m the application can optionally include a minimum remaining association time timestamp $$t_{b_2,m,p}^{min}.$$

For each $b_2$ application that does not respond in time, the DPI service can assume a configured default status. The DPI service can determine an overall status for each (m,p) combination. If at least one application $b_2$ included a minimum remaining association time timestamp $$t_{b_2,m,p}^{min}$$

in its response for a (m,p) combination, the DPI service can calculate a timestamp $$t_{m,p} = \min\left(\max\left(t_{b_2,m,p}^{min} \middle| b_2 \in B_2\right); \text{now} + t_p^{max}\right)$$

for the combination and persist the $t_{m,p}$ value until the corresponding time is reached.

Figure 39:
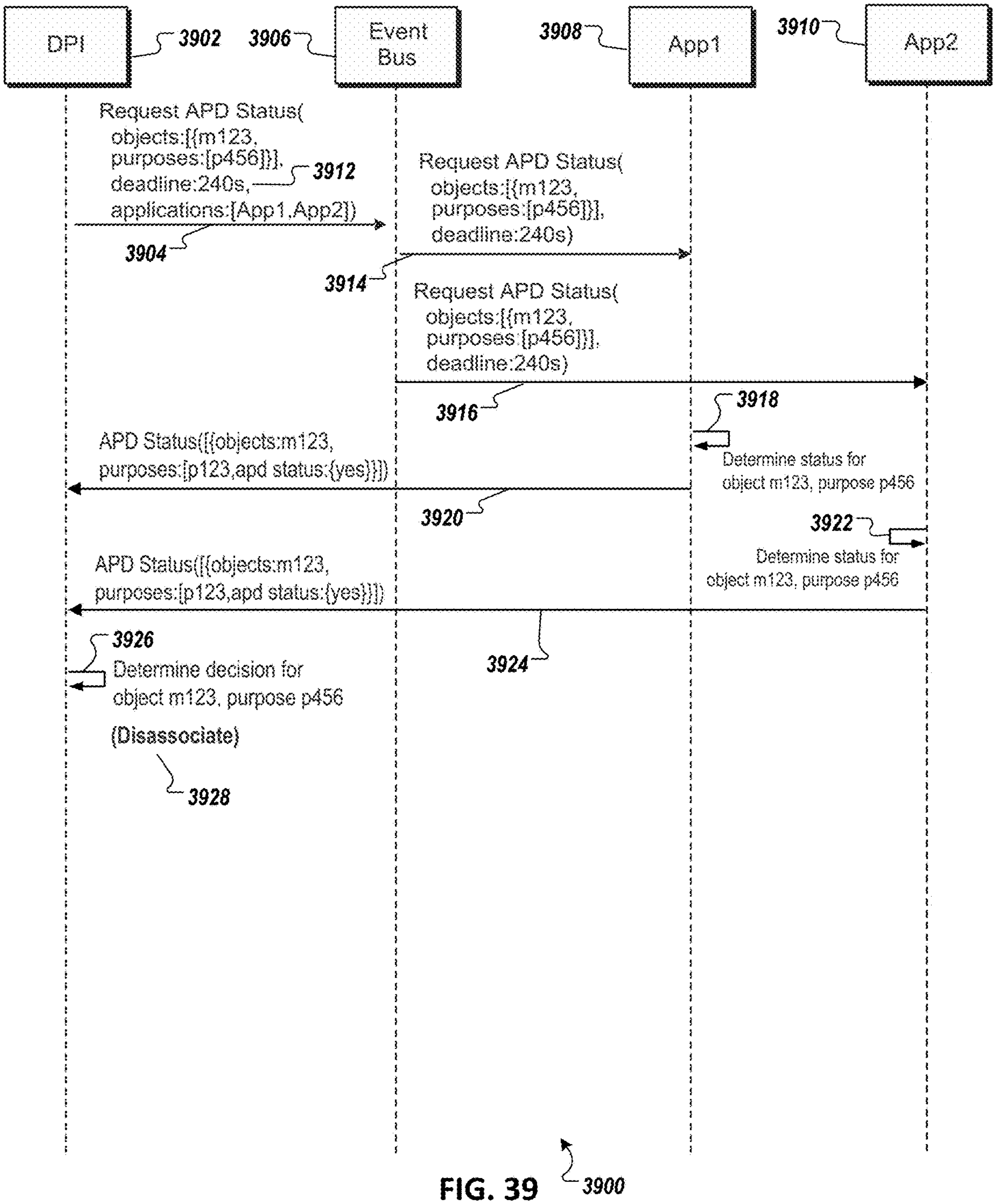
FIG. 39 is a swim lane diagram that illustrates example activity in a status phase of an aligned purpose disassociation protocol.

FIG. 39 is a swim lane diagram 3900 that illustrates example activity in a status phase of an aligned purpose disassociation protocol. A DPI service 3902 sends an APD status request 3904 to an event bus 3906. The APD status request 3904 is requesting APD status for a master data object with object identifier m123 and a purpose with purpose identifier p456. The DPI service 3902 is requesting the event bus 3906 to forward a respective APD status request to a first application 3908 and a second application 3910 for the first application 3908 and the second application 3910 to respond with APD status for the master data object with object identifier m123 and a purpose with purpose identifier p456 by a deadline 3912 of four minutes (e.g., 240 seconds) from receipt of the APD status request. In response to receiving the APD status request 3904, the event bus 3906 forwards an APD status request 3914 to the first application 3908 and an APD status request 3916 to the second application 3910.

At 3918, in response to the APD status request 3914, the first application 3908 determines an APD status at the first application 3908 for the master data object with object identifier m123 and the purpose with purpose identifier p456. For example, the first application 3908 can determine that the first application 3908 can disassociate the purpose with purpose identifier p456 from the master data object with object identifier m123. Accordingly, the first application 3908 can send an APD status 3920 to the DPI service 3902 that indicates that the first application 3908 can disassociate the purpose with purpose identifier p456 from the master data object with object identifier m123.

Similar to the processing done by the first application 3908, at 3922, in response to the APD status request 3916, the second application 3910 determines an APD status at the second application 3910 for the master data object with object identifier m123 and the purpose with purpose identifier p456. For example, the second application 3910 can determine that the second application 3910 can disassociate the purpose with purpose identifier p456 from the master data object with object identifier m123. Accordingly, the second application 3910 can send an APD status 3924 to the DPI service 3902 that indicates that the second application 3910 can disassociate the purpose with purpose identifier p456 from the master data object with object identifier m123.

At 3926, the DPI service 3902 determines an APD decision for the master data object with object identifier m123 and the purpose with purpose identifier p456 based on the APD statuses received from respective applications. For example, since each application that received an APD status request indicated that the respective application can disassociate the purpose with purpose identifier p456 from the master data object with object identifier m123, an APD decision 3928 for the master data object with object identifier m123 and the purpose with purpose identifier p456 can be to disassociate the purpose with purpose identifier p456 from the master data object with object identifier m123. Since the APD decision 3928 is to disassociate, the DPI service 3902 can instruct applications to disassociate, as described below for phase 3 of the APD protocol.

Figure 40:
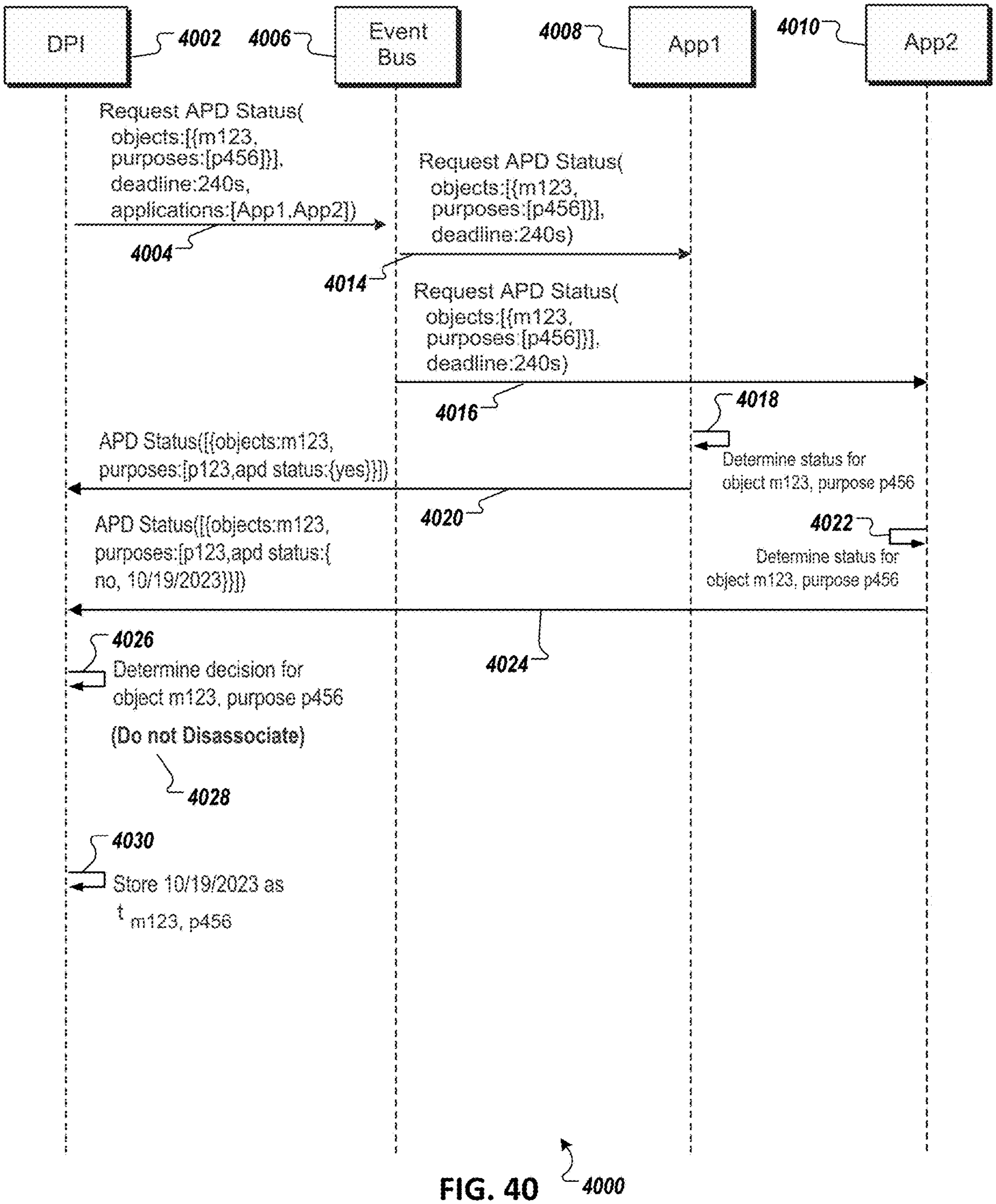
FIG. 40 is a swim lane diagram that illustrates example activity in a status phase of an aligned purpose disassociation protocol.

FIG. 40 is a swim lane diagram 4000 that illustrates example activity in a status phase of an aligned purpose disassociation protocol. Similar to FIG. 39, a DPI service 4002 sends an APD status request 4004 to an event bus 4006 for a master data object with object identifier m123 and a purpose with purpose identifier p456 that requests the event bus 4006 to forward a respective APD status request to a first application 4008 and a second application 4010. In response to receiving the APD status request 4004, the event bus 4006 forwards an APD status request 4014 to the first application 4008 and an APD status request 4016 to the second application 4010.

At 4018, in response to the APD status request 4014, the first application 4008 determines an APD status at the first application 4008 for the master data object with object identifier m123 and the purpose with purpose identifier p456. For example, the first application 4008 can determine that the first application 4008 can disassociate the purpose with purpose identifier p456 from the master data object with object identifier m123. Accordingly, the first application 4008 can send an APD status 4020 to the DPI service 4002 that indicates that the first application 4008 can disassociate the purpose with purpose identifier p456 from the master data object with object identifier m123.

At 4022, in response to the APD status request 4016, the second application 4010 determines an APD status at the second application 4010 for the master data object with object identifier m123 and the purpose with purpose identifier p456. For example, the second application 4010 can determine that the second application 4010 cannot disassociate the purpose with purpose identifier p456 from the master data object with object identifier m123. For example, the second application 4010 may still be processing the master data object with object identifier m123 for the purpose with purpose identifier p456. Accordingly, the second application 4010 can send an APD status 4024 to the DPI service 4002 that indicates that the second application 4010 cannot disassociate the purpose with purpose identifier p456 from the master data object with object identifier m123. The APD status 4024 includes a minimum remaining association time timestamp of Oct. 19, 2023, which indicates when the second application 4010 can disassociate the purpose with purpose identifier p456 from the master data object with object identifier m123.

At 4026, the DPI service 4002 determines an APD decision for the master data object with object identifier m123 and the purpose with purpose identifier p456 based on the APD statuses received from respective applications. For example, since at least the second application 4010 cannot currently disassociate the purpose with purpose identifier p456 from the master data object with object identifier m123, an APD decision 4028 for the master data object with object identifier m123 and the purpose with purpose identifier p456 can be to not disassociate the purpose with purpose identifier p456 from the master data object with object identifier m123. Accordingly, the DPI service 4002 does not instruct applications to disassociate the purpose with purpose identifier p456 from the master data object with object identifier m123.

Additionally, at 4030, the DPI service 4002 can store the Oct. 19, 2023 date received from the second application 4010 as a global minimum association timestamp for the master data object with object identifier m123 and the purpose with purpose identifier p456. If the DPI service 4002 receives a timestamp in an APD status from another application indicating the other application cannot disassociate the purpose with purpose identifier p456 from the master data object with object identifier m123 until a time that is later than the Oct. 19, 2023 date, the DPI service can store the later time as the global minimum association timestamp for the master data object with object identifier m123 and the purpose with purpose identifier p456.

Figure 41:
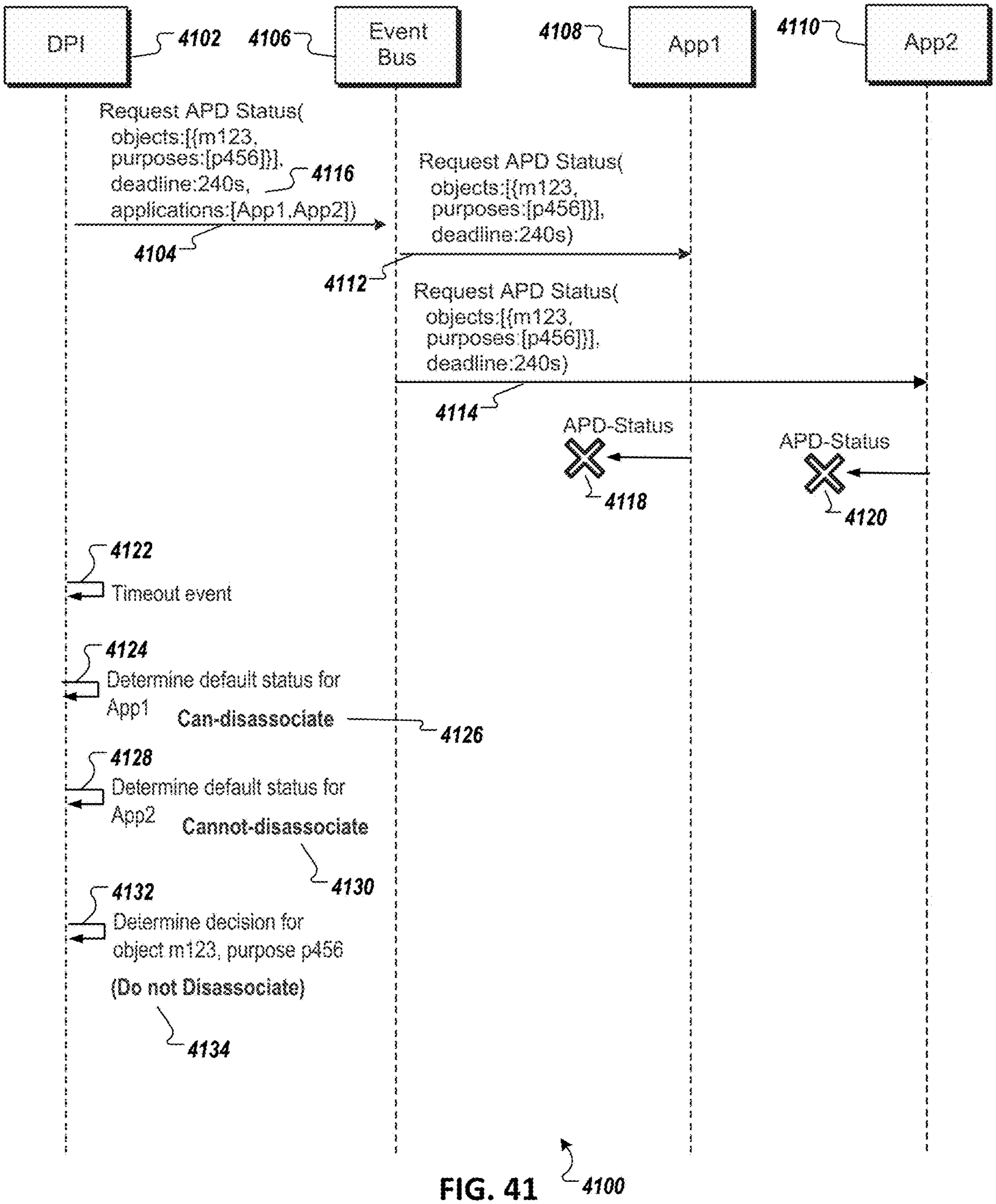
FIG. 41 is a swim lane diagram that illustrates example activity in a status phase of an aligned purpose disassociation protocol.

FIG. 41 is a swim lane diagram 4100 that illustrates example activity in a status phase of an aligned purpose disassociation protocol. Similar to FIG. 39, a DPI service 4102 sends an APD status request 4104 to an event bus 4106 for a master data object with object identifier m123 and a purpose with purpose identifier p456 that requests the event bus 4106 to forward a respective APD status request to a first application 4108 and a second application 4110. In response to receiving the APD status request 4104, the event bus 4106 forwards an APD status request 4112 to the first application 4108 and an APD status request 4114 to the second application 4110.

Although the event bus 4106 is configured to retry sending of messages such as the APD status request 4104, the first application 4108 and/or the second application 4110, for various reasons, may not be able to respond to the APD status request 4112 or the APD status request 4114 before a deadline 4116 of four minutes from receipt that is specified in the APD status request 4104 (and in the APD status requests 4112 and 4114, respectively. For example, the first application 4108 and/or the second application 4110 may be down and thus never received the APD status request 4112 or 4114 or may have after receiving the APD status request 4112 or 4114 before responding, respectively. As another example, the first application 4108 and/or the second application 4110 may have not yet responded before the deadline due to a heavy load. In the example of FIG. 41, neither the first application 4108 nor the second application 4110 have responded to the APD status request 4112 or 4114, as illustrated by icons 4118 and 4120, respectively.

The DPI service 4102 can detect a timeout event 4122, after a time duration of four minutes corresponding to the deadline 4116 has passed, after a sending of the APD status request 4104 without the DPI service 4102 having received a requested APD status from each application to which the APD status request was targeted. At 4124, in response to the timeout event 4122 and having not received an APD status from the first application 4108, the DPI service 4102 determines a default status 4126, for the first application 4108, of can-disassociate, for the master data object with object identifier m123 and a purpose with purpose identifier p456. Similarly, at 4124, in response to the timeout event 4122 and having not received an APD status from the second application 4110, the DPI service 4102 determines a default status 4130, for the second application 4110, of cannot-disassociate, for the master data object with object identifier m123 and a purpose with purpose identifier p456. The default statuses 4126 and 4130 were configured for the first application 4108 and the second application 4110, respectively, in the configuration phase of the APD protocol, as described above.

At 4132, the DPI service 4102 determines an APD decision for the master data object with object identifier m123 and the purpose with purpose identifier p456 based on the default status 4126 and the default status 4130. If the DPI service 4102 receives APD statuses from other applications, the DPI service 4102 can base the APD decision on the received APD statuses and the default APD statuses 4126 and 4130. Based on at least the default status 4130 of cannot-disassociate, an APD decision 4134 for the master data object with object identifier m123 and the purpose with purpose identifier p456 can be to not disassociate the purpose with purpose identifier p456 from the master data object with object identifier m123. Accordingly, the DPI service 4102 does not instruct applications to disassociate the purpose with purpose identifier p456 from the master data object with object identifier m123.

Figure 42:
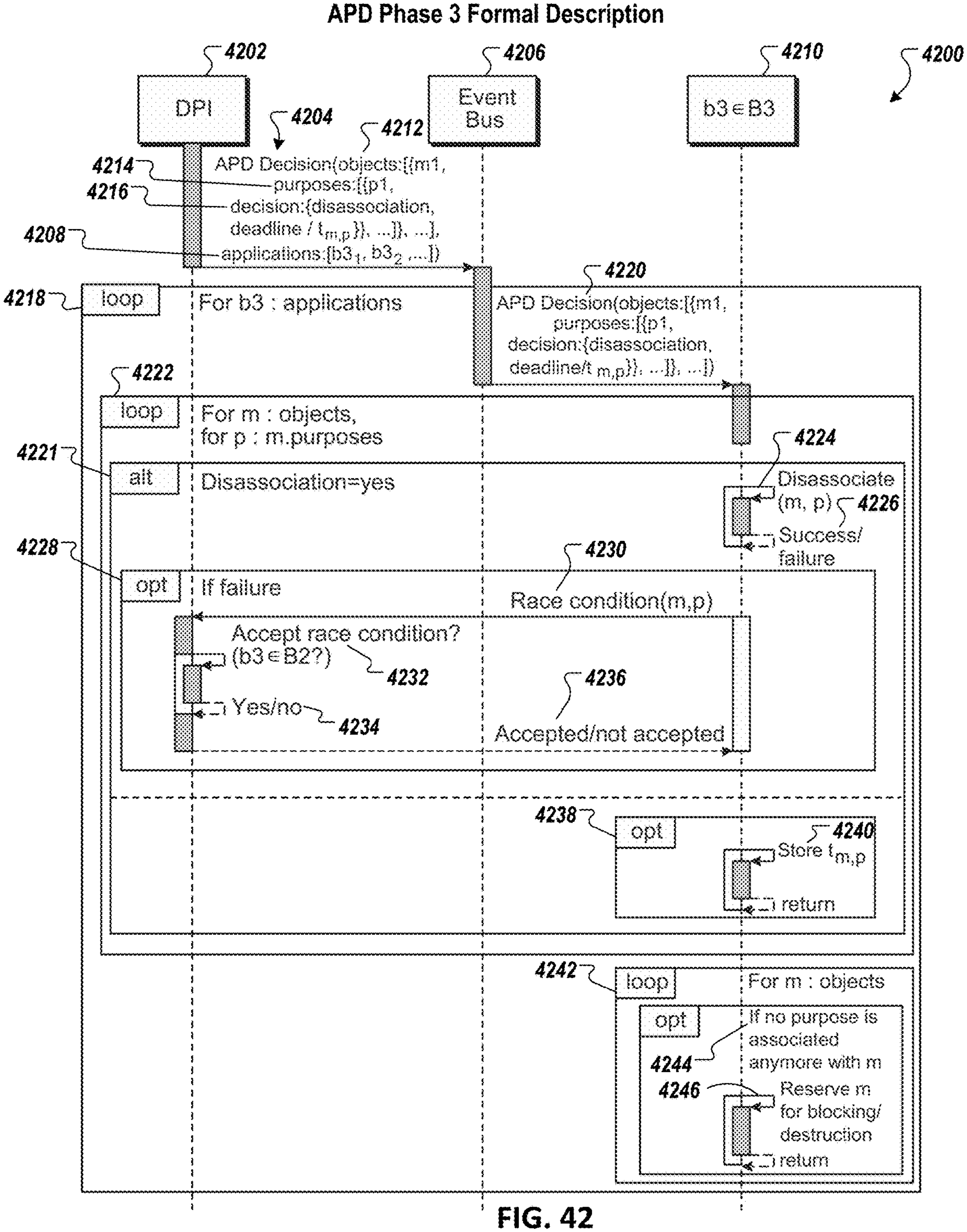
FIG. 42 is a swim lane diagram that illustrates a pattern of aligned purpose disassociation activities in an actual disassociation and blocking/destruction reservation phase.

FIG. 42 is a swim lane diagram 4200 that illustrates a pattern of aligned purpose disassociation activities in an actual disassociation and blocking/destruction reservation phase. Specific examples of the actual disassociation and blocking/destruction reservation phase (e.g., phase 3) are described below with respect to FIGS. 43, 44, and 45. Phase 3 activities can include a DPI service 4202 sending an APD decision 4204 to an event bus 4206. The DPI service 4202 is requesting the event bus 4206 to send an APD decision to each application referenced in an application list 4208. The application list 4208 corresponds to a set 4210 of applications b3∈B3. The set 4210 of applications participating in the third phase includes all applications participating in the APD protocol, including those applications that provided status in the status phase and applications, such as analytical or middleware applications (e.g., an MDI service) that do not participate in status provisioning but nonetheless respond to an APD decision from the DPI service 4202.

The APD decision 4204 is for one or more master data objects 4212 (e.g., m1,m2, m3, . . . ) and for each master data object, one or more purposes 4214 (e.g., p1, p2, p3, . . . ). The APD decision 4204 includes decision information 4216 that includes, for each master data object and purpose combination, a Boolean disassociation instruction (e.g., true/yes or false/no) that indicates whether the receiving application is to disassociate the purpose from the master data object. If the disassociation instruction is yes (e.g., disassociate), the disassociation information can include a deadline by which the application is to disassociate the purpose from the master data object. If the disassociation instruction is no (e.g., do not disassociate), the disassociation information can include a global minimum association timestamp $t_{m,p}$. As illustrated in an iteration construct 4218, in response to receiving the APD decision 4204, the event bus 4206 sends an APD decision 4220 corresponding to the APD decision 4204 to each application in the set 4210 of applications.

As illustrated in a conditional block 4221 of an iteration construct 4222, at 4224, when the disassociation instruction is yes for a given master data object and purpose combination in the APD decision 4220, each application in the set 4210 of applications attempts to disassociate the purpose from the master data object. A result of a disassociation attempt can be a success or failure result 4226. As indicated in a conditional block 4228, when the disassociation result is failure, the application that was not able to disassociate can send a race condition message 4230 to the DPI service 4202 to inform the DPI service 4202 that the application was not able to disassociate the purpose from the object.

Applications that may be processing the purpose for the object and may therefore potentially vote cannot disassociate can be configured as participants in the status phase. Accordingly, the DPI service 4202 can assume that an application that now responds with a disassociation failure should be an application that had participated in the status phase (and had previously sent a can-disassociate status (e.g., all phase 2 applications would have responded with a can-disassociate status for the DPI service 4202 to have sent the APD decision 4204 with a disassociation instruction of yes)). The DPI service 4202 can perform a check 4232 to confirm that the application sending the race condition message 4230 is a phase 2 participant and can send a race condition response 4236 to the application sending the race condition message, based on the result of the check 4234. For example, if the check 4234 returns yes (e.g., the application sending the race condition message is a phase 2 participant), the DPI service 4202 can send an acceptance message to the application. If the check 4232 returns no (e.g., the application sending the race condition message is not a phase 2 participant), the DPI service 4202 can send a rejection message to the application (and possibly perform other activities, such as requesting intervention by an administrator). When the application sending the race condition message 4230 is a phase 2 participant, the failure of the application to disassociate the purpose can be caused by the application 1) receiving an APD status request for an object/purpose combination; 2) responding with can-disassociate to the APD status request; 3) identifying new activity for the purpose for the object after having sent a can-disassociate status; 4) receiving the APD decision to disassociate; and 5) determining that the application can no longer disassociate the purpose from the object due to the new activity. As described below for phase 4, the DPI service 4202 can initiate error correction by requesting re-association, after accepting a race condition message 4230 (e.g., since at least one application now needs the purpose to be assigned to the master data object, an aligned purpose disassociation can no longer occur at the current time, so the DPI service 4202 can initiate re-association so that any application that had successfully disassociated the purpose can now re-associate the purpose).

As illustrated in an optional block 4238, if the disassociation instruction in the decision information 4216 is do-not-disassociate for a master data object and purpose combination and if the disassociation instruction includes a global minimum association timestamp $t_{m,p}$, each application in the set 4210 of applications can, at 4240, locally store the global minimum association timestamp $t_{m,p}$. As described below, an application can check a locally stored global minimum association timestamp $t_{m,p}$ value before sending a subsequent APD initiation request to the DPI service 4202.

As illustrated in an iteration construct 4242, after disassociating a purpose from a master data object specified in the APD decision, each application in the set 4210 of applications can perform a check 4244 to determine whether the application still associates at least one other purpose with the object or whether no purposes are now associated with the object. In response to determining that no purpose is now associated with a master data object, the application can, at 4246, reserve the master data object for blocking or destruction. For example, the application can reserve the object for blocking if retention rules apply to the object and reserve the object for destruction if no retention rules apply to the object. Actual blocking or destruction can occur in phase 4, as described below.

In summary, and as a formal description of phase 3 of the APD protocol, and in reference to some of the formal definitions 3300 described above with respect to FIG. 33, in phase 3 of the APD protocol, a DPI service can inform, in a decision message, all $b_3 \in B_3$ applications about a decision whether a purpose p is to be disassociated from a master data object m for all $(m,p) \in \{\{m\} \times \{p | p \in P \wedge \Pi(p,m,b_1)=\text{true} \wedge d(p,m,b_1)=\text{true} \wedge \neg t_{m,p}>\text{now}\}\}$, where the decision message indicates a timeframe by when the disassociation is to be completed. If the decision indicates that the purpose p cannot be disassociated from the object m, the DPI service can also inform all $b_3$ applications about a global minimum association timestamp $t_{m,p}$. The applications $b_3$ can store the $t_{m,p}$ timestamp to avoid initiating APD for an (m,p) combination before the time indicated by $t_{m,p}$. If the decision indicates that p is to be disassociated from m, an application $b_3$ disassociates p from m. If no purpose $p \in P$ is any longer associated with m in an application $b_3$ (i.e. $\Pi(p,m,b_3)=\text{false}$), the application $b_3$ can reserve m for blocking if retention rules apply and reserve m for destruction if no retention rules apply. If an application $b_3 \in B_3 | b_3 \in B_2$ cannot disassociate p from m, the application $b_3$ can notify the DPI service with a race condition request for the (m,p) combination. The DPI service can reject the race condition request if the application $b_3 \notin B_2$.

Figure 43:
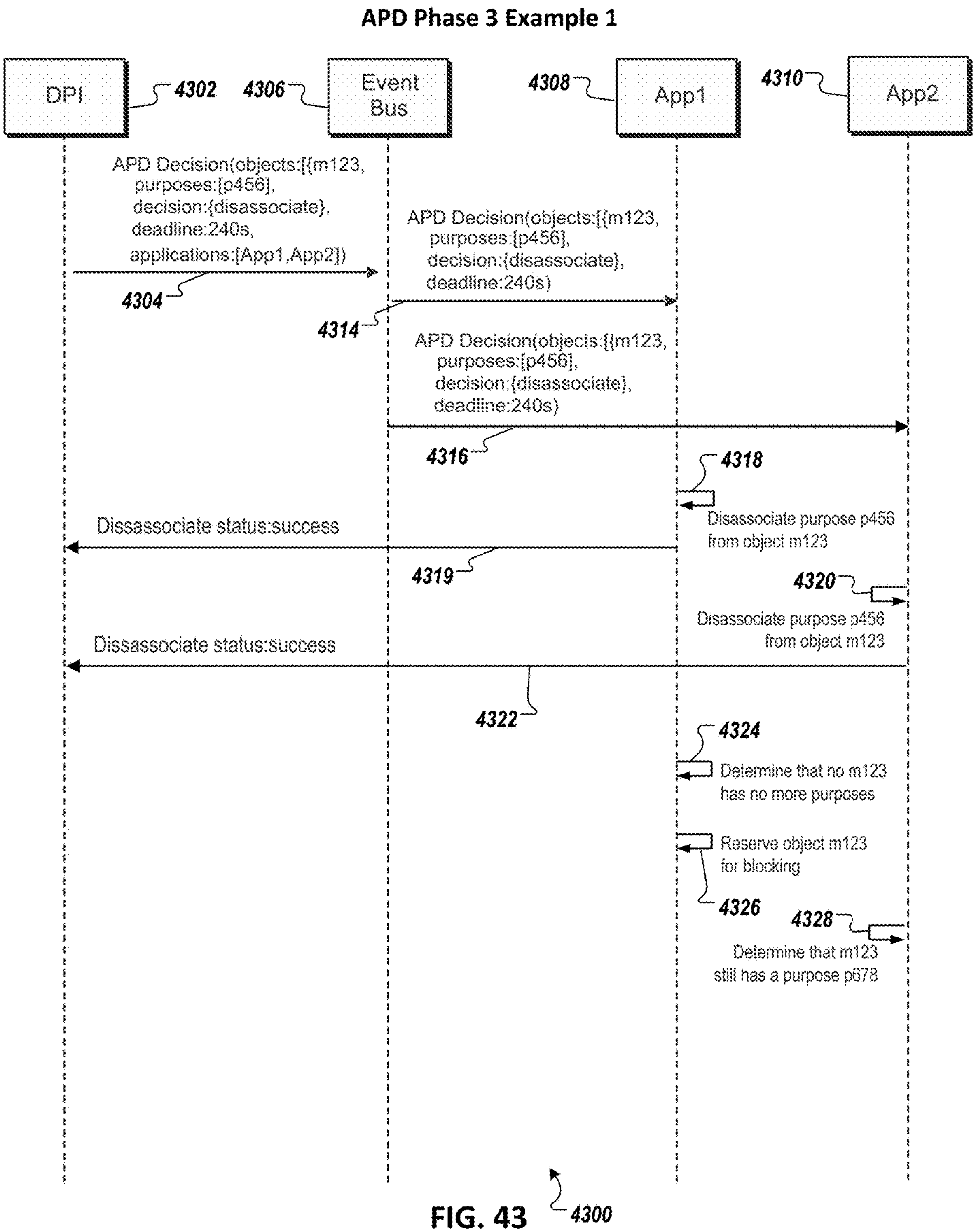
FIG. 43 is a swim lane diagram that illustrates example activity in an actual disassociation and blocking/destruction reservation phase of an aligned purpose disassociation protocol.

FIG. 43 is a swim lane diagram 4300 that illustrates example activity in an actual disassociation and blocking/destruction reservation phase of an aligned purpose disassociation protocol. A DPI service 4302 sends an APD decision 4304 to an event bus 4306. The APD decision 4304 includes APD decision information for a master data object with object identifier m123 and a purpose with purpose identifier p456. The DPI service 4302 is requesting the event bus 4306 to forward a respective APD decision corresponding to the APD decision 4304 to a first application 4308 and a second application 4310. The APD decision 4304 is to disassociate the purpose with purpose identifier p456 from the master data object with object identifier m123 by a deadline of four minutes (e.g., 240 seconds) from receipt. In response to receiving the APD decision 4304, the event bus 4306 forwards an APD decision 4314 to the first application 4308 and an APD decision 4316 to the second application 4310.

At 4318, in response to receiving the APD decision 4314, the first application 4308 disassociates the purpose with purpose identifier p456 from the master data object with object identifier m123 and sends a success indication 4319 to the DPI service 4302. Similarly, at 4320, in response to receiving the APD decision 4316, the second application 4310 disassociates the purpose with purpose identifier p456 from the master data object with object identifier m123 and sends a success indication 4322 to the DPI service 4302.

At 4324, the first application 4308 determines that the master data object with object identifier m123 no longer has any associated purposes. Accordingly, at 4326, the first application 4308 reserves the master data object with object identifier m123 for blocking (e.g., the master data object with object identifier m123 may have a retention period in the first application 4308). At 4328, the second application 4310 determines that the master data object with object identifier m123 is still associated with at least a purpose with purpose identifier p678. Accordingly, the second application 4310 does not reserve the master data object with object identifier m123 for blocking or destruction.

Figure 44:
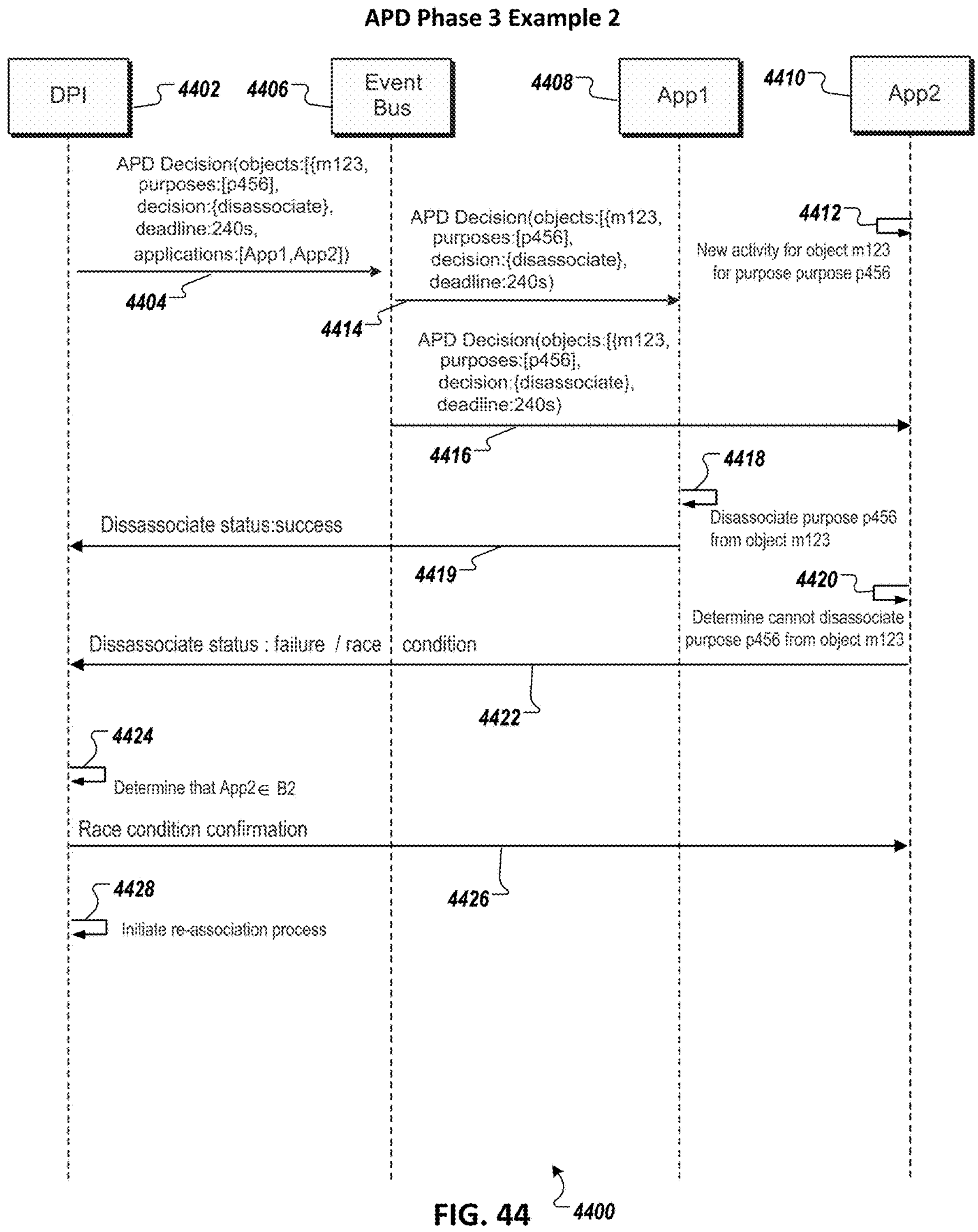
FIG. 44 is a swim lane diagram that illustrates example activity in an actual disassociation and blocking/destruction reservation phase of an aligned purpose disassociation protocol.

FIG. 44 is a swim lane diagram 4400 that illustrates example activity in an actual disassociation and blocking/destruction reservation phase of an aligned purpose disassociation protocol. Similar to the example of FIG. 43, a DPI service 4402 sends an APD decision 4404 to an event bus 4406. The APD decision 4404 includes APD decision information for a master data object with object identifier m123 and a purpose with purpose identifier p456 and the DPI service 4402 is requesting the event bus 4406 to forward a respective APD decision corresponding to the APD decision 4404 to a first application 4408 and a second application 4410.

At 4412, the second application 4410 has new activity for the master data object with object identifier m123 for the purpose with purpose identifier p456, even though the second application had previously sent a can-disassociate status for the purpose with purpose identifier p456 and the master data object with object identifier m123 to the DPI service 4402. In response to receiving the APD decision 4404, the event bus 4406 forwards an APD decision 4414 to the first application 4408 and an APD decision 4416 to the second application 4410. At 4418, in response to receiving the APD decision 4414, the first application 4408 disassociates the purpose with purpose identifier p456 from the master data object with object identifier m123 and sends a success indication 4419 to the DPI service 4402.

At 4420, the second application 4410 determines, based on the new activity for the master data object with object identifier m123 for the purpose with purpose identifier p456 that began at 4412 and which is not yet finished, that the second application 4410 cannot currently disassociate the purpose with purpose identifier p456 from the master data object with object identifier m123. Accordingly, the second application 4410 sends a failure/race condition notification 4422 to the DPI service 4402.

At 4424, the DPI service 4402 determines that the second application 4410 participated in the status phase of the APD protocol (and therefore had previously provided a can-disassociate status for the master data object with object identifier m123 and the purpose with purpose identifier p456). The DPI service 4402 can send a race condition confirmation 4426 to the second application 4410, based on determining that the second application 4410 participated in the status phase. At 4428, the DPI service 4402 initiates a re-association process for the master data object with object identifier m123 and the purpose with purpose identifier p456. Re-association is described in more detail below in the discussion of phase 4 of the APD protocol.

Figure 45:
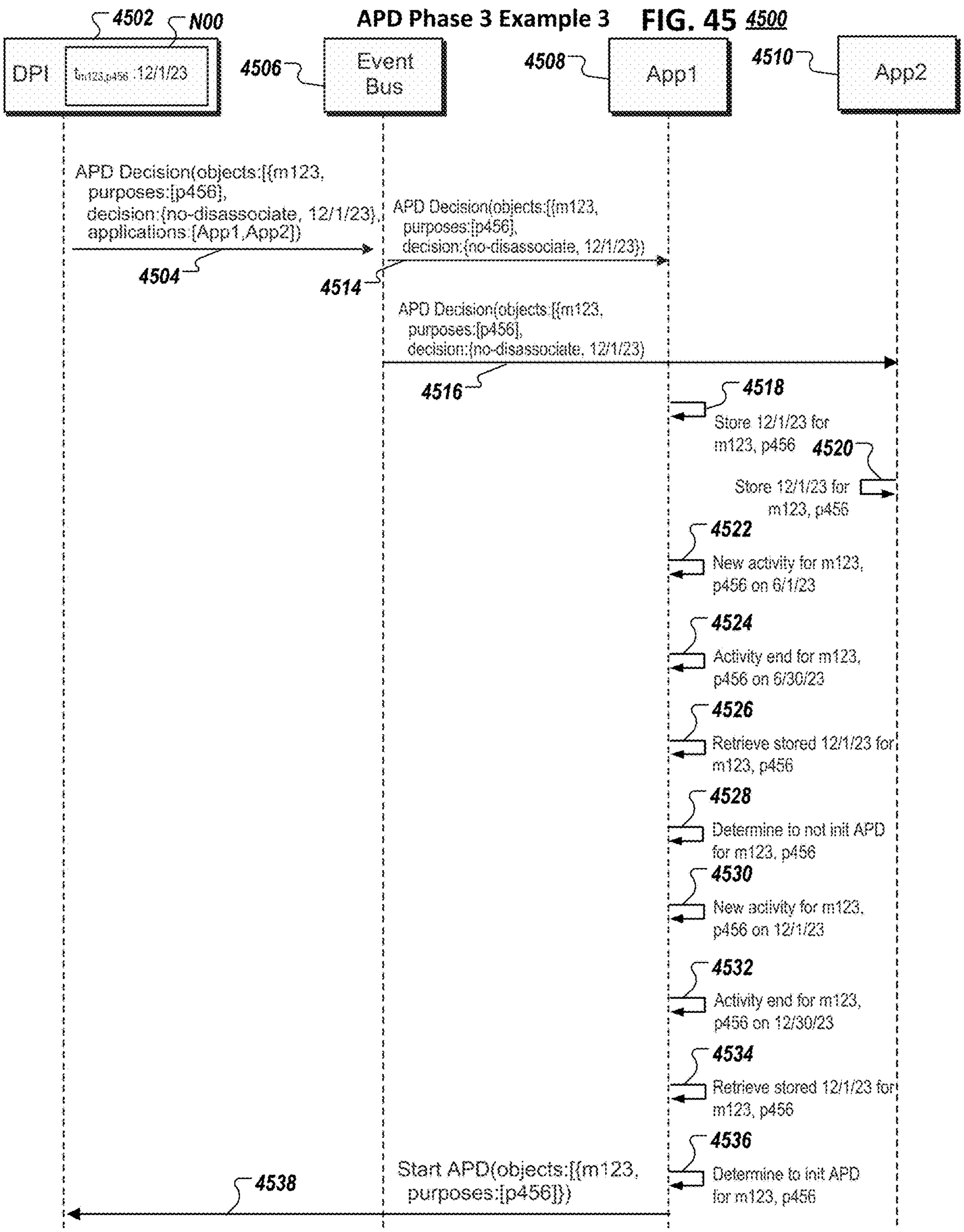
FIG. 45 is a swim lane diagram that illustrates example activity in an actual disassociation and blocking/destruction reservation phase of an aligned purpose disassociation protocol.

FIG. 45 is a swim lane diagram 4500 that illustrates example activity in an actual disassociation and blocking/destruction reservation phase of an aligned purpose disassociation protocol. Similar to the example of FIG. 43, a DPI service 4502 sends an APD decision 4504 to an event bus 4506. The APD decision 4504 includes APD decision information for a master data object with object identifier m123 and a purpose with purpose identifier p456 and the DPI service 4502 is requesting the event bus 4506 to forward a respective APD decision corresponding to the APD decision 4504 to a first application 4508 and a second application 4510.

In response to receiving the APD decision 4504, the event bus 4506 forwards an APD decision 4514 to the first application 4508 and an APD decision 4516 to the second application 4510. The APD decision 4504 (and correspondingly, the APD decisions 4514 and 4516) reflects a decision to not disassociate the purpose with purpose identifier p456 from the master data object with object identifier m123. The APD decision 4504 (and the APD decisions 4514 and 4516) include a global minimum association timestamp value of Dec. 1, 2023, corresponding to a global minimum association timestamp value 4518 $t_{m123,p456}$ that is stored at the DPI service 4502.

At 4518, in response to receiving the APD decision 4514, the first application 4508 stores the Dec. 1, 2023 global minimum association timestamp value for the master data object with object identifier m123 and the purpose with purpose identifier p456. Similarly, at 4520, the second application 4510 stores the Dec. 1, 2023 global minimum association timestamp value for the master data object with object identifier m123 and the purpose with purpose identifier p456.

At 4522, new activity for the master data object with object identifier m123 for the purpose with purpose identifier p456 occurs, in the first application 4508, on Jun. 1, 2023. At 4524, on Jun. 30, 2023, the activity for the master data object with object identifier m123 for the purpose with purpose identifier p456 that began in the first application 4508 on Jun. 1, 2023 ends. At 4526, the first application 4508, in response to the activity ending on Jun. 1, 1930, retrieves the stored global minimum association timestamp value (e.g., Dec. 1, 2023) for the master data object with object identifier m123 and the purpose with purpose identifier p456. At 4528, the first application determines to not initiate the APD protocol for the master data object with object identifier m123 and the purpose with purpose identifier p456, based on the activity end time being less than the global minimum association timestamp value. That is, the first application 4508 does not initialize the APD protocol knowing that the DPI service 4502 would reject initiation of the APD protocol.

At 4530, additional new activity for the master data object with object identifier m123 for the purpose with purpose identifier p456 occurs, in the first application 4508, on Dec. 1, 2023. At 4532, on Dec. 30, 2023, the activity for the master data object with object identifier m123 for the purpose with purpose identifier p456 that began in the first application 4508 on Dec. 1, 2023 ends. At 4534, the first application 4508, in response to the activity ending on Dec. 1, 1930, retrieves the stored global minimum association timestamp value (e.g., Dec. 1, 2023) for the master data object with object identifier m123 and the purpose with purpose identifier p456. At 4536, the first application 4508 determines to initiate the APD protocol for the master data object with object identifier m123 and the purpose with purpose identifier p456, based on the activity end time being greater than the global minimum association timestamp value. At 4538, the first application 4508 sends an APD initiation request 4538 to the DPI service 4502, to request initiation of the APD protocol for the master data object with object identifier m123 and the purpose with purpose identifier p456.

Figure 46:
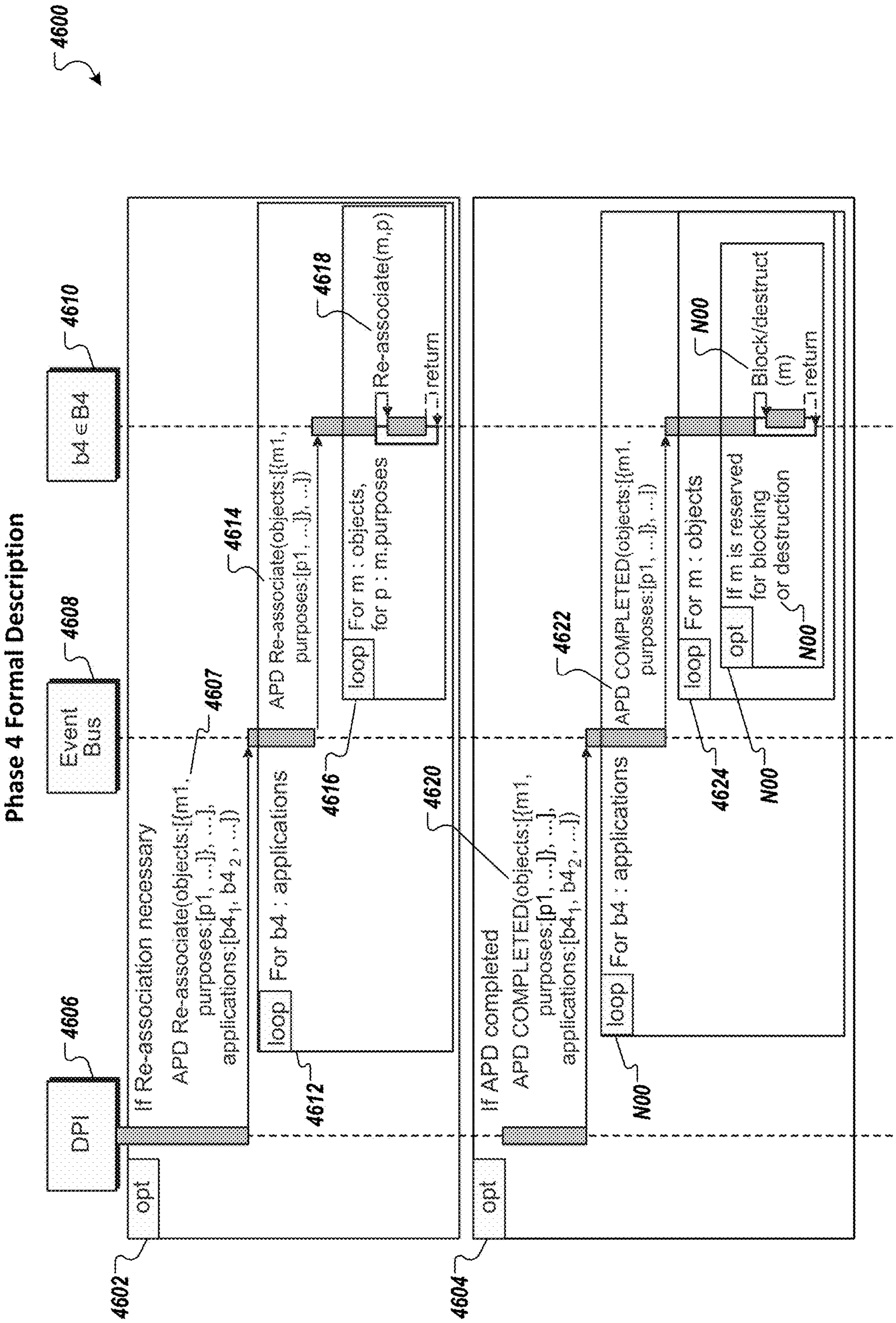
FIG. 46 is a swim lane diagram that illustrates an error resolving and local blocking/destruction phase of an aligned purpose disassociation protocol.

FIG. 46 is a swim lane diagram 4600 that illustrates an error resolving and local blocking/destruction phase of an aligned purpose disassociation protocol. Specific examples of the error resolving and local blocking/destruction phase (e.g., phase 4) are described below with respect to FIGS. 47 and 48. Phase 4 activities can include activities in either a first conditional block 4602 or a second conditional block 4604.

Phase 4 includes activities in the first conditional block 4602 for a master data object and purpose combination if a DPI service 4606 has received at least one message from an application that participated in the status phase of the APD protocol and indicated disassociability for the master data object and the purpose but then subsequently reported, in phase 3, a disassociation failure indicating that the application cannot disassociate the purpose from the object (e.g., due to a race condition occurring due to new activity in the application). In response to receiving at least one disassociation failure, the DPI service 4606 can send a re-associate request 4607 for one or more master data objects and one or more purposes, to an event bus 4608, requesting the event bus 4608 to forward the re-associate request 4607 to each application in a set 4610 of applications that participate in phase 4. As with phase 3, the set 4610 of applications participating in the fourth phase includes all applications participating in the APD protocol, including those applications that provided status in the status phase and applications, such as analytical or middleware applications (e.g., an MDI service) that do not participate in status provisioning but nonetheless respond to phase 4 instructions from the DPI service 4606.

As illustrated in an iteration construct 4612, the event bus 4608 forwards a re-associate request 4614 corresponding to the re-associate request 4607 to each application in the set 4610 of applications. As illustrated in an iteration construct 4616, each application that receives the re-associate request 4614 performs a re-association operation 4618 for each master data object and purpose combination specified in the re-associate request 4614.

Phase 4 includes activities in the second conditional block 4604 for a master data object and purpose combination if the DPI service 4606 has not received any race condition requests for the combination in phase 3. For example, in response to a phase 3 deadline occurring with having received any race condition requests for one or more master data object/purpose combinations, the DPI service can send an APD completed notification 4620 for those master data object/purpose combinations to the event bus 4608 requesting the event bus 4608 to forward the APD completed notification 4620 to the applications in the set 4610 of applications. In response to receiving the APD completed notification 4622, the event bus 4608 sends an APD completed notification 4622 to each application in the set 4610 of applications.

As illustrated in an iteration construct 4624, each application that receives the APD completed notification 4622 can perform processing 4626 for each master data object specified in the APD completed notification 4622. For example, the application can determine whether the object has previously been reserved for blocking or destruction. If the object has previously been performed for blocking or destruction, the application can, at 4628, block or destruct the object, respectively. As another example, the APD protocol can be configured so that applications check, in the fourth phase rather than the third phase, whether each object specified in the APD completed notification no longer has any assigned purposes (and block or destruct, as appropriate for those object with no assigned purposes).

In summary, and as a formal description of phase 4 of the APD protocol, and in reference to some of the formal definitions 3300 described above with respect to FIG. 33, in phase 4 of the APD protocol, if any application $b_3 \in B_3 | b_3 \in B_2$ informed a DPI service in phase 3 about the undisassociability of a purpose p from a master data object m, the DPI service can send a RE-ASSOCIATE-(m,p) message to all applications $b_4 \in B_4$. Applications that receive the re-associate message can re-associate p again with m. If the DPI service does not receive any RACE-CONDITION-(m,p) requests during the $3^{rd}$ phase, the DPI service can sends a $\{(m,p)|(m,p)$ must be disassociated$\}$-COMPLETED message to all applications $b_4 \in B_4$. If application $b_4$ reserved any object m for blocking or destruction, the $b_4$ application can respectively block or destruct the object m.

Figure 47:
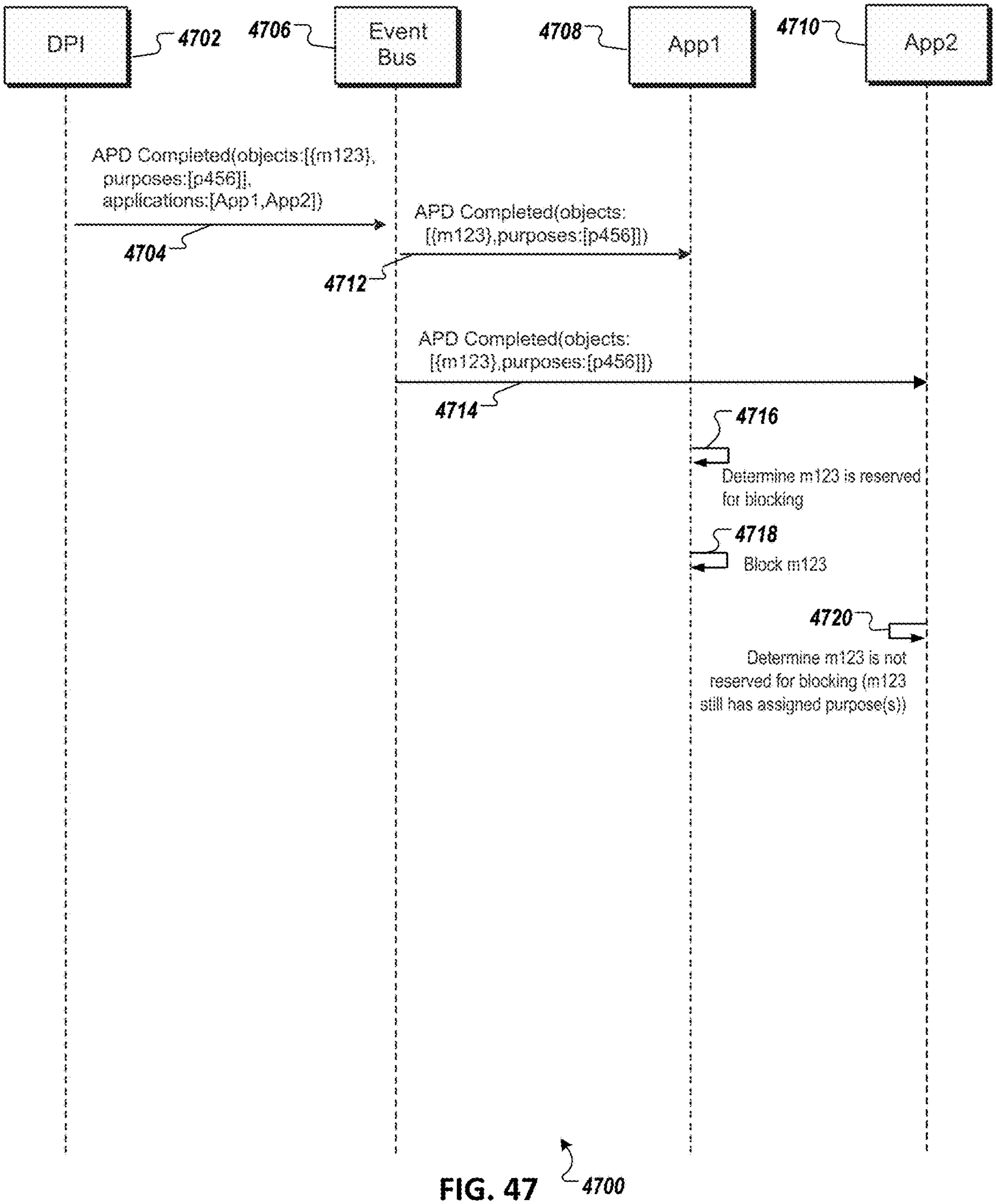
FIG. 47 is a swim lane diagram that illustrates example activity in an error resolving and local blocking/destruction phase of an aligned purpose disassociation protocol.

FIG. 47 is a swim lane diagram 4700 that illustrates example activity in an error resolving and local blocking/destruction phase of an aligned purpose disassociation protocol. The swim lane diagram 4700 corresponds to the second conditional block 4604 described above with respect to FIG. 46 that is executed for a master data object and purpose combinations if a DPI service (e.g., the DPI service 4606 or a DPI service 4702) has not received any race condition requests for the combinations in phase 3 of the APD protocol. As shown in FIG. 47, the DPI service 4702 can send an APD completed notification 4704 for a master data object with object identifier m123 and a purpose with purpose identifier p456 to an event bus 4706 requesting the event bus 4706 to forward the APD completed notification 4704 to a first application 4708 and a second application 4710. For example, in response to receiving the APD completed notification 4704, the event bus 4706 sends an APD completed notification 4712 to the first application 4708 and an APD completed notification 4714 to the second application 4710.

At 4716, in response to receiving the APD completed notification 4712, the first application 4708 determines that the master data object with object identifier m123 is reserved for blocking (e.g., the first application 4708 may have reserved the object for blocking in phase 3 after disassociating the purpose with purpose identifier p456 from the object). At 4718, in response to determining that the master data object with object identifier m123 is reserved for blocking, the first application 4708 blocks the object.

At 4720, in response to receiving the APD completed notification 4714, the second application 4710 determines that the master data object with object identifier m123 is not reserved for blocking. Accordingly, the second application 4710 does not block (or destruct) the master data object with object identifier m123. The second application 4710 may have determined, in phase 3, after disassociating the purpose with purpose identifier p456 from the master data object with object identifier m123, that at least one other purpose is assigned to the object in the second application 4710.

Figure 48A:
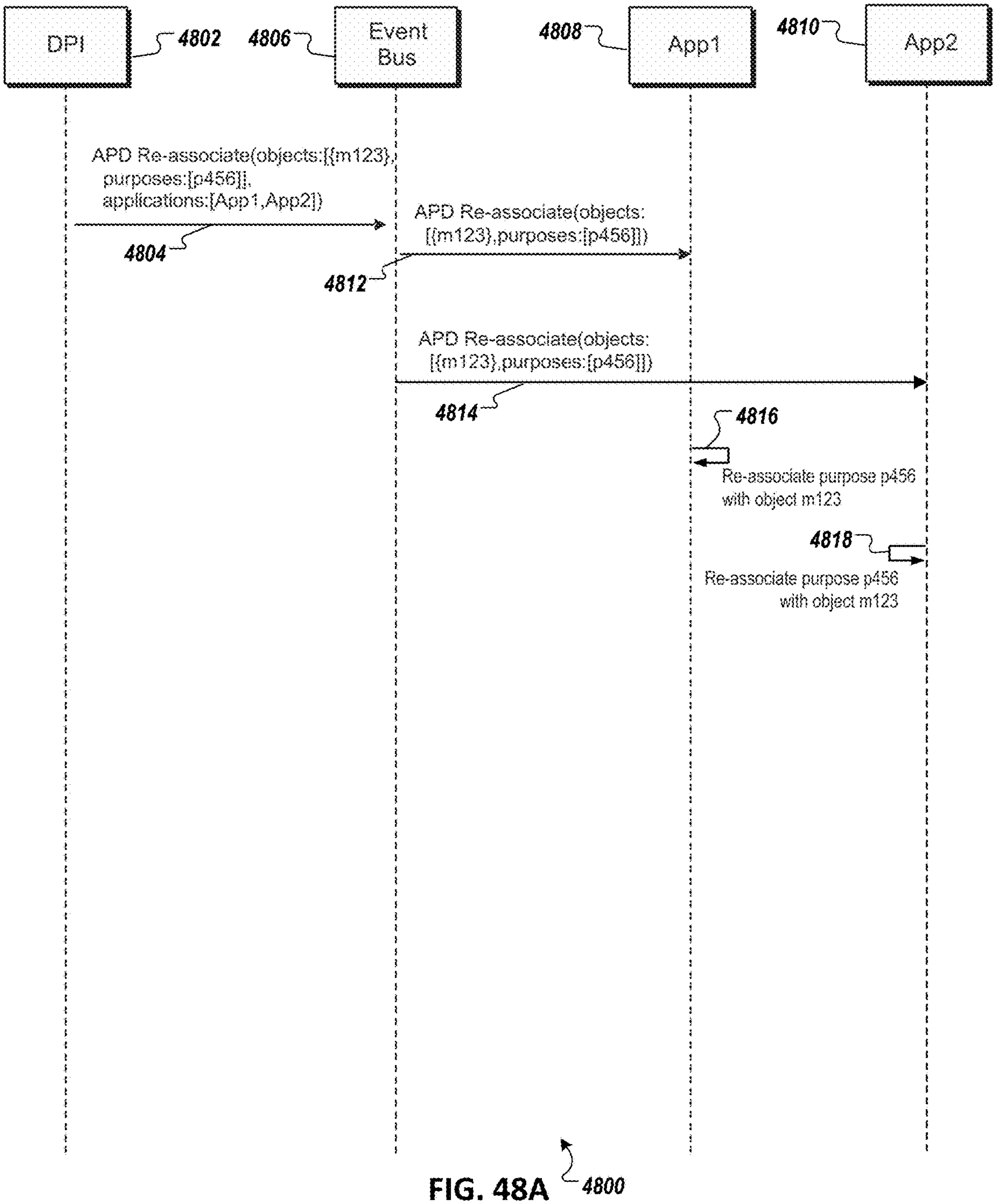
FIG. 48A is a swim lane diagram that illustrates example activity in an error resolving and local blocking/destruction phase of an aligned purpose disassociation protocol.

FIG. 48A is a swim lane diagram 4800 that illustrates example activity in an error resolving and local blocking/destruction phase of an aligned purpose disassociation protocol. The swim lane diagram 4800 corresponds to the first conditional block 4602 described above with respect to FIG. 46 that is executed if a DPI service (e.g., the DPI service 4606 or a DPI service 4802) has received at least one message from an application that participated in the status phase of the APD protocol and indicated disassociability for the master data object and the purpose but then subsequently reported, in phase 3, a disassociation failure indicating that the application cannot disassociate the purpose from the object (e.g., due to a race condition occurring due to new activity in the application).

As shown in FIG. 48, in response to receiving at least one disassociation failure, the DPI service 4802 can send a re-associate request 4804 for a master data object with object identifier m123 and a purpose with purpose identifier p456 to an event bus 4806, requesting the event bus 4806 to forward the re-associate request 4804 to a first application 4808 and a second application 4810. For example, in response to receiving the re-associate request 4804, the event bus 4806 sends a re-associate request 4812 to the first application 4808 and a re-associate request 4814 to the second application 4810.

At 4816, in response to receiving the re-associate request 4812, the first application 4808 re-associates the purpose with purpose identifier p456 with the master data object with object identifier m123. Similarly, at 4820, in response to receiving the re-associate request 4814, the second application 4810 re-associates the purpose with purpose identifier p456 with the master data object with object identifier m123.

Figure 48B:
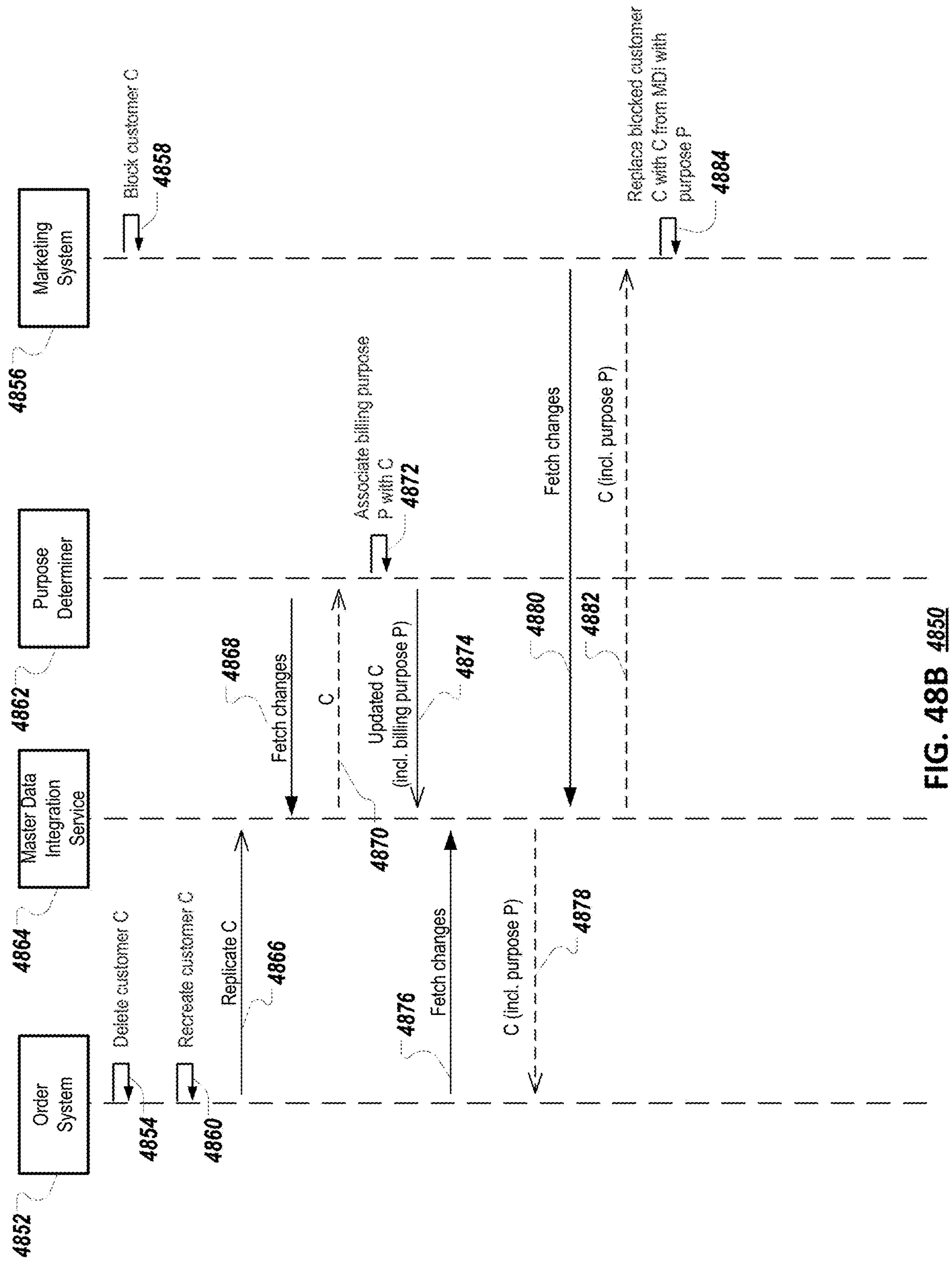
FIG. 48B is a swim lane diagram that illustrates purpose re-association.

FIG. 48B is a swim lane diagram 4850 that illustrates purpose re-association. In addition to re-associating purposes as described above for FIG. 48A, purposes can be re-associated for other reasons, such as in response to new transactional activity. For example, a new contractual relationship may be established after some time has passed since a past contractual relationship occurred. For example, an order system 4852 may have, at 4854, deleted a customer master data object C for a customer after a certain period of time since the customer placed an order. A billing purpose P may have been disassociated from the customer master data object C after a period of time. A marketing system 4856 may, at 4858, have blocked the customer master data object C. The blocking and deleting of the customer master data object C may have occurred in response to an integrated end-of-purpose protocol for the customer master data object C, for example.

At a later point in time after the integrated end-of-purpose protocol had completed, the order system 4852 may receive a request to re-create the customer master data object C. For example, the customer may have submitted a request to re-create an account in the order system 4852. If the order system 4852 had previously blocked the master data object C instead of having deleted the master data object C, an administrator may have needed to unblock the master data object C. At 4860, the order system 4852 re-creates the master data object C, in response to the request to re-create the master data object C.

A billing purpose P may need to be re-associated with the re-created master data object C. In some implementations, the order system 4852 has an ability to associate purposes with objects. Accordingly, the order system 4852 can associate the billing purpose P with the master data object C. For example, the order system 4852 can make an internal determination, which can be represented generically by an association function a (m,p) which specifies a condition in which a purpose p is to be associated with a master data object m. For example, in the order system 4852, a rule can be specified that in response to a customer creating an account for creating orders in the order system 4852 (or perhaps in response to creating an actual order), that a billing purpose P is to be associated with the customer. As another example, after a customer creates an account, an administrator can manually associate a billing purpose P with the customer master data object C.

In other implementations, some applications may not have an ability to associate a purpose with an object. A purpose determiner 4862 (which may be a component of a DPI service) can associate purposes with objects. The purpose determiner 4862 can receive objects for which to associate purposes from a MDI service 4864. For example, at 4866, after the master data object C is created in the order system 4852, the order system 4852 can replicate the customer master data object C to the MDI service 4864. The purpose determiner 4862 can send a request 4868 to the MDI service 4864 for object updates. At 4870, the MDI service can provide the customer master data object C to the purpose determiner 4862.

At 4872, the purpose determiner 4862 can associate the billing purpose P with the master data object C (e.g., based on configured rule(s)). At 4874, the purpose determiner 4862 can provide the master data object C that is now associated with the billing purpose P to the MDI service 4864. Various types of approaches can be used to associate a purpose with an object. In some cases, a purpose association is implemented in an object using an attribute or property of the object. In other cases, a mapping table is updated to reflect a purpose association to an object. The purpose determiner 4862 can maintain the mapping table and can provide the mapping table or a reference to a mapping object to the MDI service 4864, for example.

In cases where a purpose is implemented as an attribute of an object, the MDI service 4864 can treat a new association of a purpose to an object as an update to the object that can be retrieved by requesting applications. For example, at 4876, the order system 4852 sends a request for object updates to the MDI service 4864. At 4878, the MDI service 4864 provides the master data object C with the assigned billing purpose P to the order system 4852. Other applications can also receive an update from the MDI service 4864 in order to receive an updated object with a new associated purpose. For example, at 4880, the marketing system 4856 sends a request for object updates to the MDI service 4864. At 4882, the MDI service 4864 provides the master data object C with the assigned billing purpose P to the order system 4852. At 4884, the marketing system 4856 replaces the blocked version of the master data object C with the new version of the master data object C (with assigned purpose P) that was received from the MDI service 4864. The marketing system 4856 can replace the customer master data object C because the blocked version may have included outdated information, for example.

Figure 49:
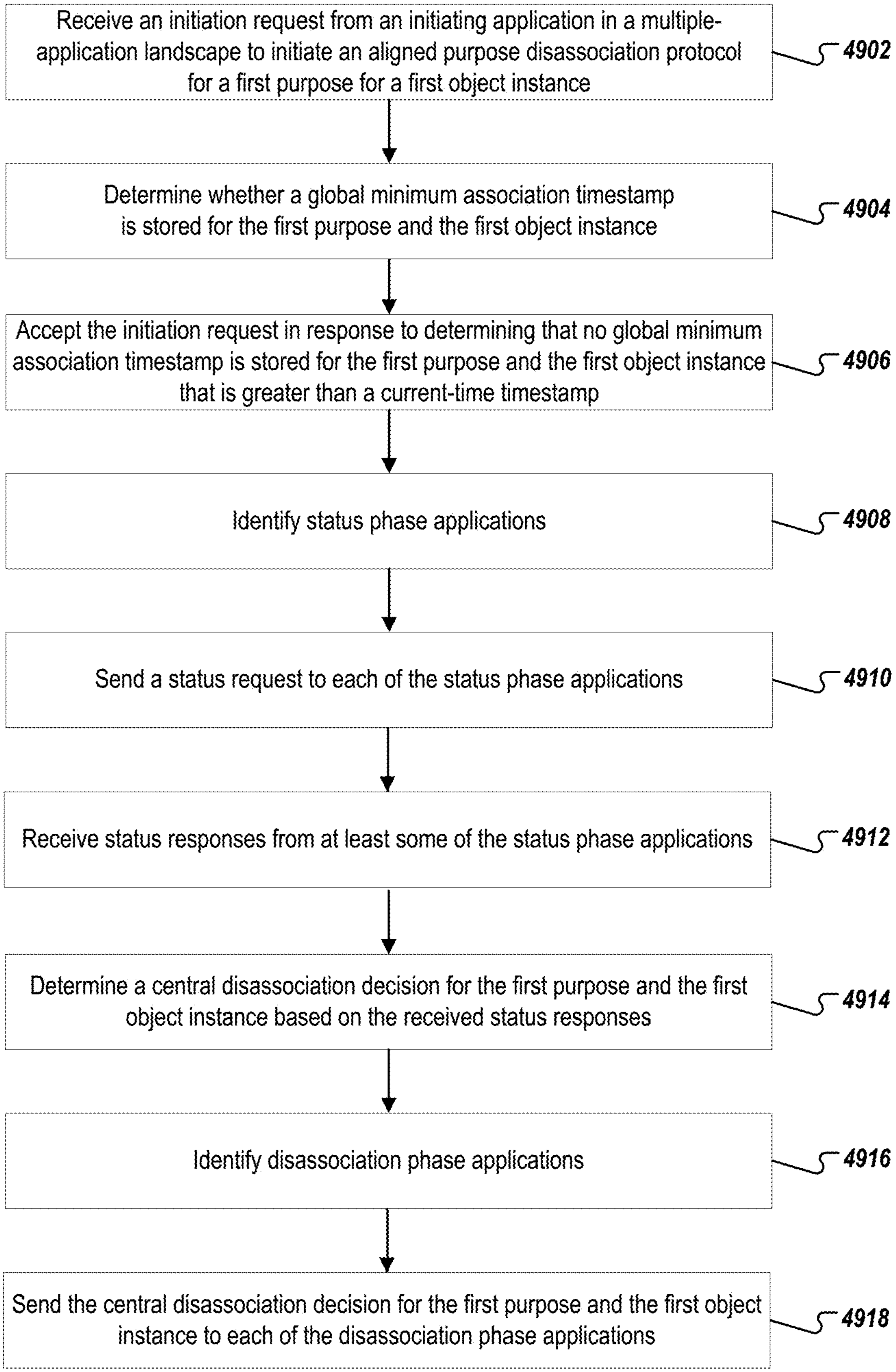
FIG. 49 is a flowchart of an example method for aligned purpose disassociation.

FIG. 49 is a flowchart of an example method 4900 for aligned purpose disassociation. It will be understood that method 4900 and related methods may be performed, for example, by any suitable system, environment, software, and hardware, or a combination of systems, environments, software, and hardware, as appropriate. For example, one or more of a client, a server, or other computing device can be used to execute method 4900 and related methods and obtain any data from the memory of a client, the server, or the other computing device. In some implementations, the method 4900 and related methods are executed by one or more components of the system 100 described above with respect to FIG. 1. For example, the method 4900 and related methods can be executed by the server 102 of FIG. 1.

At 4902, an initiation request is received from an initiating application in a multiple-application landscape to initiate an aligned purpose disassociation protocol for a first purpose for a first object instance. The first purpose indicates a first type of processing that can be performed on the first object instance and the initiating application is configured as an eligible application to initiate the aligned purpose disassociation protocol for the first purpose and an object type of the first object instance.

At 4904, a determination is made as to whether a global minimum association timestamp is stored for the first purpose and the first object instance. The global minimum association timestamp indicates a known earliest time that the first purpose can be disassociated from the first object instance.

At 4906, the initiation request is accepted in response to determining that no global minimum association timestamp is stored for the first purpose and the first object instance that is greater than a current-time timestamp. The initiation request can be rejected when a global minimum association timestamp is stored for the first purpose and the first object instance that is greater than the current-time timestamp. Although the initiation request can be received from an initiating application, in some cases, the DPI service itself determines to initiate the aligned purpose disassociation protocol. For example, the DPI service can determine to initiate the aligned purpose disassociation protocol in response to determining that the known earliest time that the first purpose can be disassociated from the first object instance has passed. That is, the DPI service can initiate the aligned purpose disassociation protocol without waiting for an external trigger.

At 4908, in response to accepting the initiation request, status phase applications of the applications in the multiple-application landscape are identified that are configured to participate in a status phase of the aligned purpose disassociation protocol.

At 4910, a status request is sent to each of the status phase applications that requests each status phase application to respond with a status response that indicates whether the status phase application is able to disassociate the first purpose from the first object instance. The status request can have a deadline by which the status phase applications are requested to respond.

At 4912, status responses are received from at least some of the status phase applications. A status response for an application can be either an affirmative can-disassociate status that indicates that the application can disassociate the first purpose from the first object instance or a negative can-disassociate status that indicates that the application cannot disassociate the first purpose from the first object instance. When a status response is the negative can-disassociate status, the status response can include an application minimum remaining association time timestamp that indicates a time at which the application can disassociate the first purpose from the first object instance.

At 4914, a central disassociation decision is determined for the first purpose and the first object instance based on the received status responses. At determination can be made that a first status phase application has not responded to the status request before the deadline. A default status response can be determined for the first status phase application and the default status response for the first status phase application can be used when determining the central disassociation decision for the first purpose and the first object instance. Determining the central disassociation decision can include determining a disassociate instruction as the central disassociation decision when each of the status responses is the affirmative can-disassociate status. Determining the central disassociation decision can include determining a do-not-disassociate instruction as the central disassociation decision when any of the status responses is the negative can-disassociate status.

At 4916, disassociation phase applications of the applications in the multiple-application landscape are identified that are configured to participate in a disassociation phase of the aligned purpose disassociation protocol. The initiating application participates in the status phase and the disassociation phase and each status phase application participates in the disassociation phase. Some disassociation phase application might not participate in the status phase.

At 4918, the central disassociation decision for the first purpose and the first object instance is sent to each of the disassociation phase applications. Each disassociation phase application, in response to receiving the disassociate instruction as the central disassociation decision, can perform a disassociation operation to attempt to disassociate, in the disassociation phase application, the first purpose from the first object instance. A disassociation operation status can be received from each disassociation phase application. A determination can be made that at least one disassociation phase application failed to disassociate the first purpose from the first object instance based on receiving at least one disassociation operation status that indicates a failure of a disassociation phase application to disassociate the first purpose from the first object instance. In response to determining that at least one disassociation phase application failed to disassociate the first purpose from the first object instance, a re-association request can be sent to each respective disassociation phase application that instructs the disassociation phase application to re-associate the first purpose with the first object instance.

A determination can be made that each disassociation phase application has provided a successful disassociation operation status. In response to determining that each disassociation phase application has provided a successful disassociation operation status, an aligned purpose disassociation protocol completion message can be sent to each disassociation phase application. Each disassociation phase application, in response to receiving the aligned purpose disassociation protocol completion message, can block the first object instance if, in the disassociation phase application, no other purposes are assigned to the first object instance and a retention period applies to the first object instance, or physically delete the first object instance if, in the disassociation phase application, no other purposes are assigned to the first object instance and a retention period does not apply to the first object instance.

In response to determining that the central disassociation decision is the do-not-disassociate instruction, all application minimum remaining association time timestamps that are included in respective status responses from status phase applications can be identified and used to determine a maximum application minimum remaining association time timestamp from among the application minimum remaining association time timestamps. The maximum application minimum remaining association time timestamp can be sent to each disassociation phase application along with the do-not-disassociate instruction. In some implementations, a predetermined cap for the maximum application minimum remaining association time timestamp can be identified and used to limit the maximum application minimum remaining association time timestamp by the predetermined cap when the maximum application minimum remaining association time timestamp is greater than the predetermined cap. Each disassociation phase application can store the maximum application minimum remaining association time timestamp. The initiating application can store the maximum application minimum remaining association time timestamp and check the maximum application minimum remaining association time timestamp before sending another initiation request for the first purpose and the first object instance.

Figure 50A:
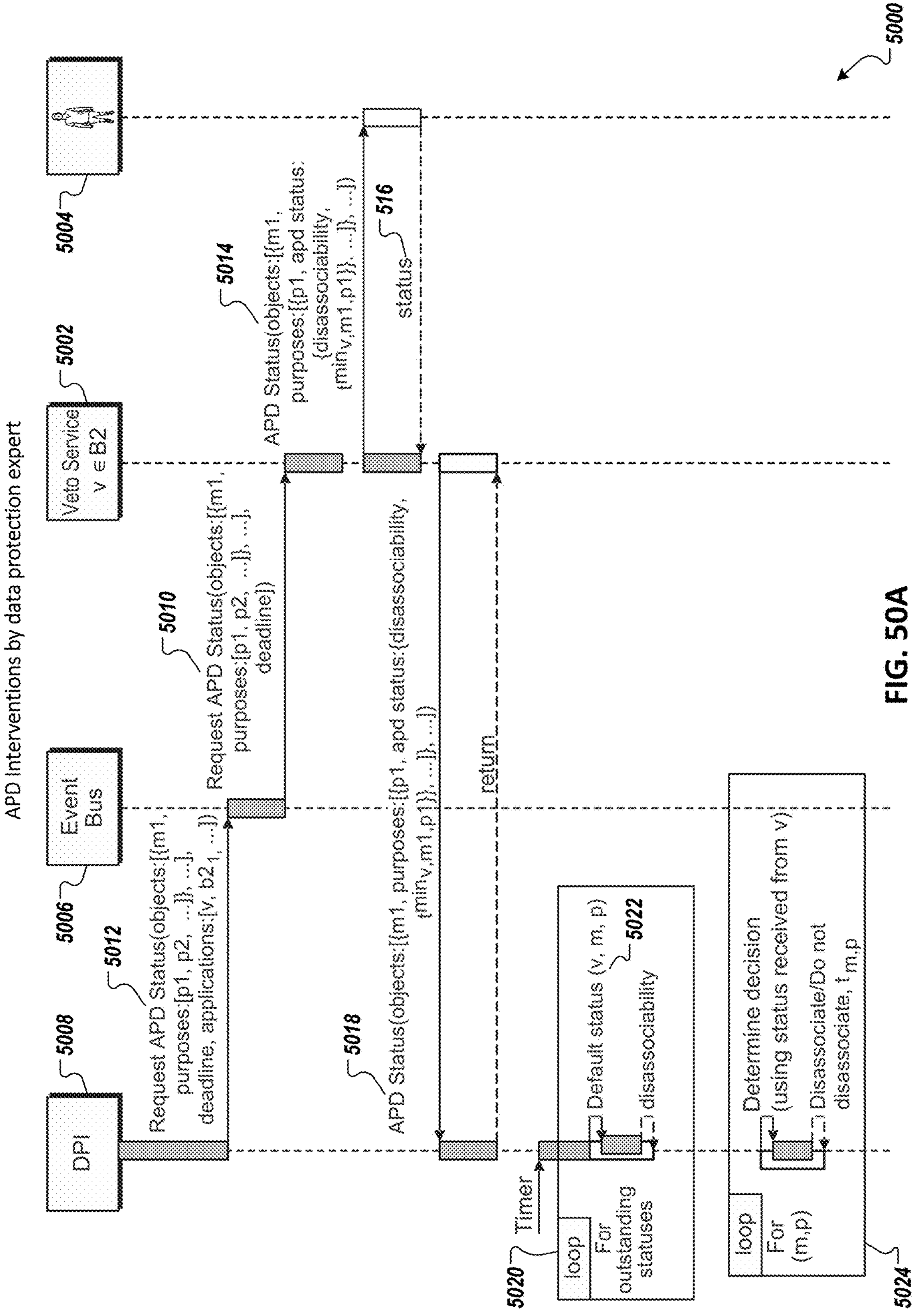
FIG. 50A is a swim lane diagram that illustrates a pattern of aligned purpose disassociation activities that involve a veto service.

FIG. 50A is a swim lane diagram 5000 that illustrates a pattern of aligned purpose disassociation activities that involve a veto service. Similar to the veto service 1520 described above with respect to FIG. 15 and the integrated end of purpose protocol, a veto service 5002 can participate in APD protocols as a regular application (e.g., with a same voting status and standing as other applications). The veto service 5002 can be configured in various ways, such as to forward requests to a human expert 5004 and/or, as described below in FIG. 50B, to forward requests as a proxy service to other systems that aren't (or can't be, for some reason) connected to an event bus 5006 and/or a DPI service 5008. As another example, the veto service 5002 can be configured to evaluate various rules regarding purpose disassociation regarding certain types or instances of master data objects. In summary, the veto service 5002 can be installed or deployed in the landscape to provide special APD-related processing not provided by a regular landscape application. Additionally, multiple veto services can be configured or developed in a given landscape. A developer can develop a new veto service that complies with the APD protocol, for example.

As an example of participation in the APD protocol, the veto service 5002 can receive an APD status request 5010 from the event bus 5006 (e.g., as a forwarded version of an APD status request 5012 sent to the event bus 5006 by the DPI service 5008). The APD status request 5010 can be for one or more master data object and purpose combinations. The veto service 5002 can present APD status request information 5014 to the human expert 5004 (e.g., in a user interface of an administrative application). The veto service 5002 can receive APD status information 5016 from the human expert (e.g., via the user interface of the administrative application).

The veto service 5002 can convert the APD status information 5016 received from the human expert into an APD status message 5018 that is in a format used by the DPI service 5008 and send the APD status message 5018 to the DPI service 5008. As shown in an iteration construct 5020 used to process outstanding statuses, if in fact the veto service 5002 has not (or does not) respond to an APD status request by a specified deadline, the DPI service 5008 can retrieve, like for other applications, a default status 5022 for the veto service for a given master data object and purpose combination. As shown in an iteration construct 5024, the DPI service 5008 can determine an APD decision using APD status information received from the veto service 5002 and from other applications.

Other than participation in the status phase of the APD protocol, the veto service 5002 can also participate in the initiation phase by acting as an initiator of the APD protocol (e.g., in response to a request from an administrator). As with other applications, the veto service 5002 participates in the third and fourth phases of the APD protocol, to handle (or to forward) APD decision, re-associate, or APD completion messages. In some implementations, multiple veto services are used, such as to have two human experts participating in certain APD decisions. Each veto service can separately send an APD status request to a separate human expert, and each human expert can separately provide APD status information to respective veto services, with the respective veto services forwarding respective human expert provided information to the DPI service for APD decision determination.

Figure 50B:
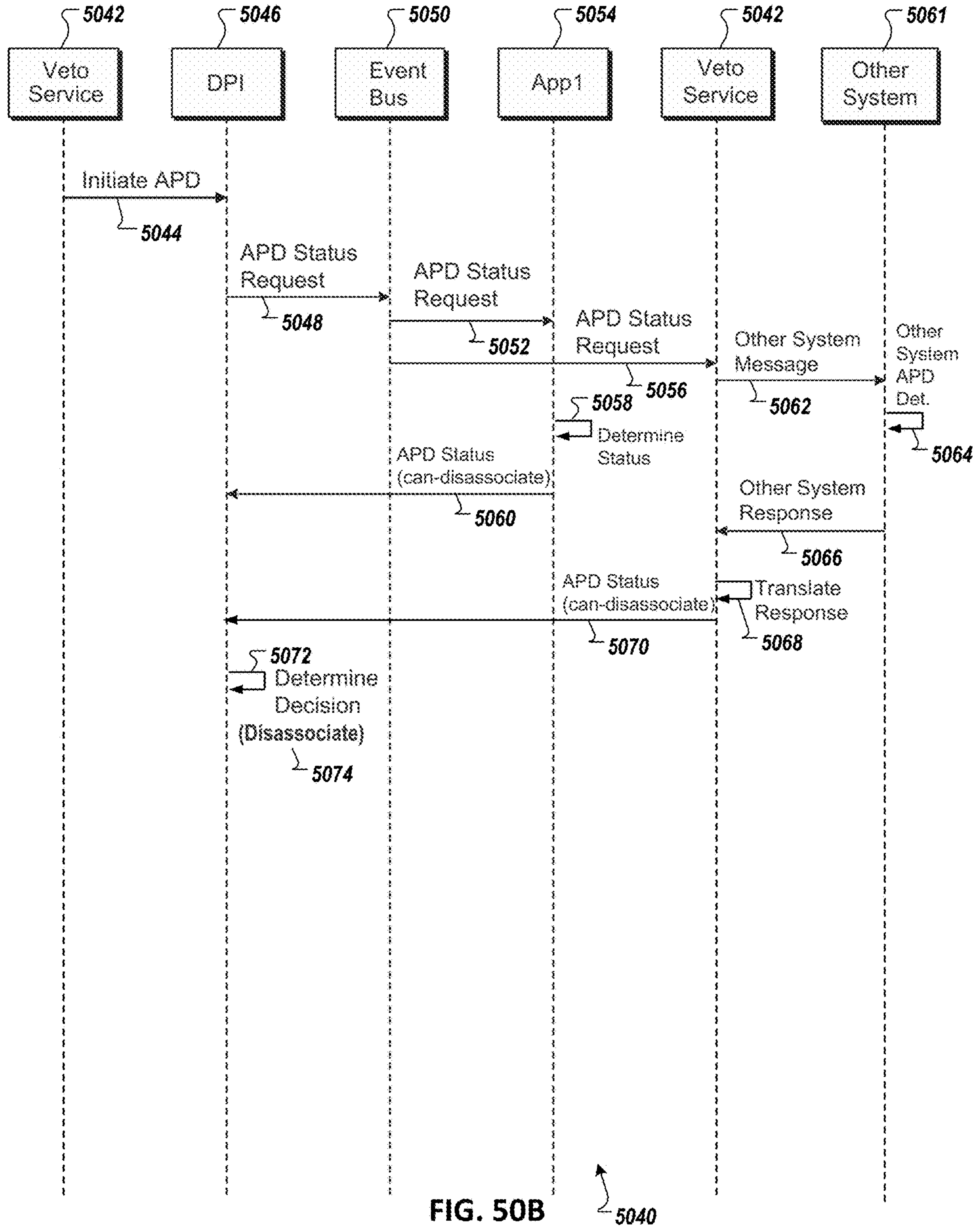
FIG. 50B is a swim lane diagram that illustrates aligned purpose disassociation activities that involve a veto service.

FIG. 50B is a swim lane diagram 5040 that illustrates aligned purpose disassociation activities that involve a veto service. For example, a veto service 5042 can send an APD initialization message 5044 to a DPI service 5046. That is, the veto service 5042 can participate in phase 1 of the APD protocol as an initiating application. The DPI service 5046 can accept the APD initialization message and start the APD protocol by sending an APD status request 5048 to an event bus 5050. The event bus 5050 can forward the APD status request 5048 to participating protocol applications by sending an APD status request 5052 to a first application 5054 and an APD status request 5056 to a veto service 5042.

At 5058, the first application 5054 determines an APD status for master data object and purpose combination(s) included in the APD status request 5052. The first application 5054 sends an APD status message 5060 to the DPI service 5046 that indicates that the first application 5054 can disassociate the purpose(s) from the object(s) for master data object/purpose combinations included in the APD status request 5052.

The veto service 5042 can be a proxy service that is configured to interface with systems, such as a system 5061, that do not directly interface with the DPI service 5046 and/or the event bus 5050. The system 5061 may be a third party system that can't be modified (or can't be acceptably modified, due to cost, time, or other resource constraints) to interface with the DPI service 5046 and/or the event bus 5050, for example. The veto service 5042, in response to receiving the APD status request 5056, can send a message 5062 to the system 5061. The veto service 5042 can be configured to interface with the system 5061, using protocols that are in place for the system 5061. The message 5062 sent by the veto service 5042 to the system 5061 requests the system 5061 to perform local processing to determine APD status for master data object and purpose combination(s) included in the APD status request 5056.

At 5064, the system 5061 performs local processing to determine that the system 5061 can disassociate the purpose(s) from the object(s) for master data object/purpose combinations included in the APD status request 5056. The veto service 5042 can receive a message 5066 from the system 5061 that includes a result of the local APD determination that was performed in the system 5061. At 5068, the veto service 5042 translates the result of the local APD determination that was performed in the system 5061 into converted status information that is in an APD status format used by the DPI service 5046.

The veto service 5042 sends an APD status message 5070 that includes the converted status information that indicates the system 5061 can disassociate with respect to the APD status request 5056. At 5072, the DPI service 5046 determines an APD decision 5074 (e.g., to disassociate) for the APD status request 5048, based on the APD statuses received from the first application 5054 and the veto service 5042.

Figure 51A:
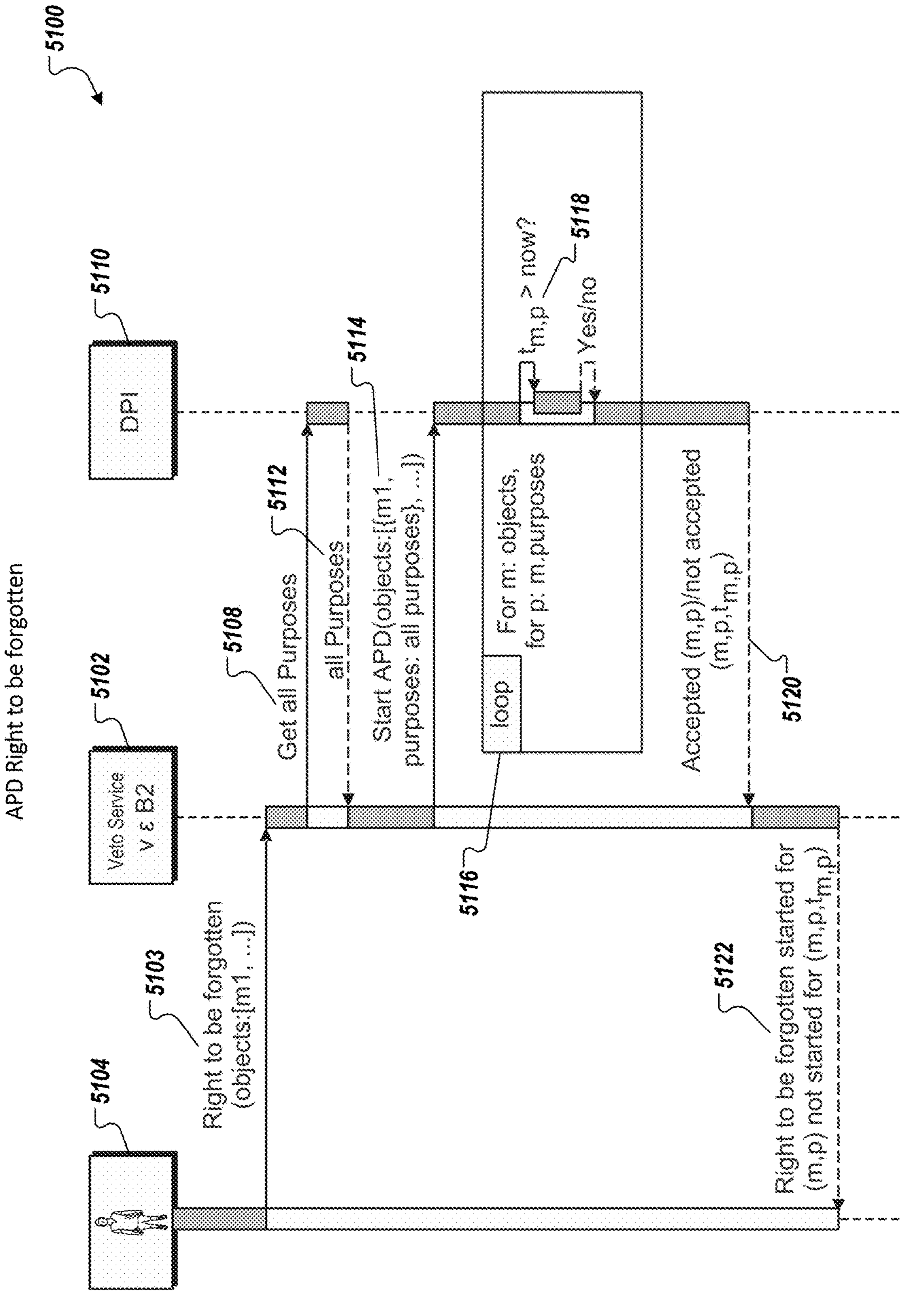
FIG. 51A is a swim lane diagram that illustrates aligned purpose disassociation activities that involve a veto service.

FIG. 51A is a swim lane diagram 5100 that illustrates aligned purpose disassociation activities that involve a veto service. For example, a veto service 5102 can receive a right-to-be-forgotten request 5103 from a user 5104 (e.g., from a user device of the user 5104) for removal of any unneeded purposes from one or more master data objects corresponding to the user 5104. As another example, the user 5104 may be an administrator who is submitting a request on behalf of an end user and the right-to-be-forgotten request 5103 can correspond to the end user.

In response to the right-to-be-forgotten request 5103, the veto service 5102 can send a request 5108 to a DPI service 5110 to retrieve all relevant purposes from the DPI service 5110. All relevant purposes can, in some implementations, include all purposes defined in the system. As another example, all relevant purposes can include all possible purposes for a given object. In general, the system can be configured so that a result of processing the right-to-be-forgotten request results in disassociation of as many purposes as is currently possible.

The DPI service 5110 can send a list 5112 of all purposes to the veto service 5106. The veto service 5106 can send an APD initialization request 5114 to the DPI service 5110 to start the APD protocol for the master data object(s) specified in the right-to-be-forgotten request 5103 and the purposes in the list 5112 of all purposes. As illustrated in an iteration construct 5116, the DPI service 5110 can process each master data object and purpose combination included in the APD initialization request 5114 to determine whether the DPI service 5110 has a global minimum association timestamp $t_{m,p}$ 5118 for the combination and whether the timestamp is greater than the current time. The DPI service 5110 can send acceptance notification(s) 5120 to the veto service 5102 for each master data object and purpose combination. For example, the DPI service 5110 can send an acceptance notification for each combination except for those combinations for which a global minimum association timestamp $t_{m,p}$ is greater than the current time.

The DPI service 5110 can then carry out the APD protocol for each of the accepted master data object and purpose combinations. Accordingly, as the phases of the APD protocol proceed and are completed, purposes that can be disassociated from the master data objects specified in the right-to-be-forgotten request 5103 are eventually disassociated. Purposes that cannot currently be disassociated, due to at least one application responding cannot-disassociate for a master data object and purpose combination, can remain associated. As such, by initiating the APD protocol in response to the right-to-be-forgotten request 5103, the veto service 5106 can trigger disassociation of as many purposes as currently possible for the master data objects in the right-to-be-forgotten request 5103. The veto service 5102 can send a notification 5122 to the user 5104 informing the user for which master data object and purpose combinations the APD protocol was started or rejected. Additionally, the veto service 5102 can receive updates about progress of the later stages of the APD protocol for the accepted master data object and purpose combinations and can send further informative updates to the user 5104 about the progress.

Figure 51B:
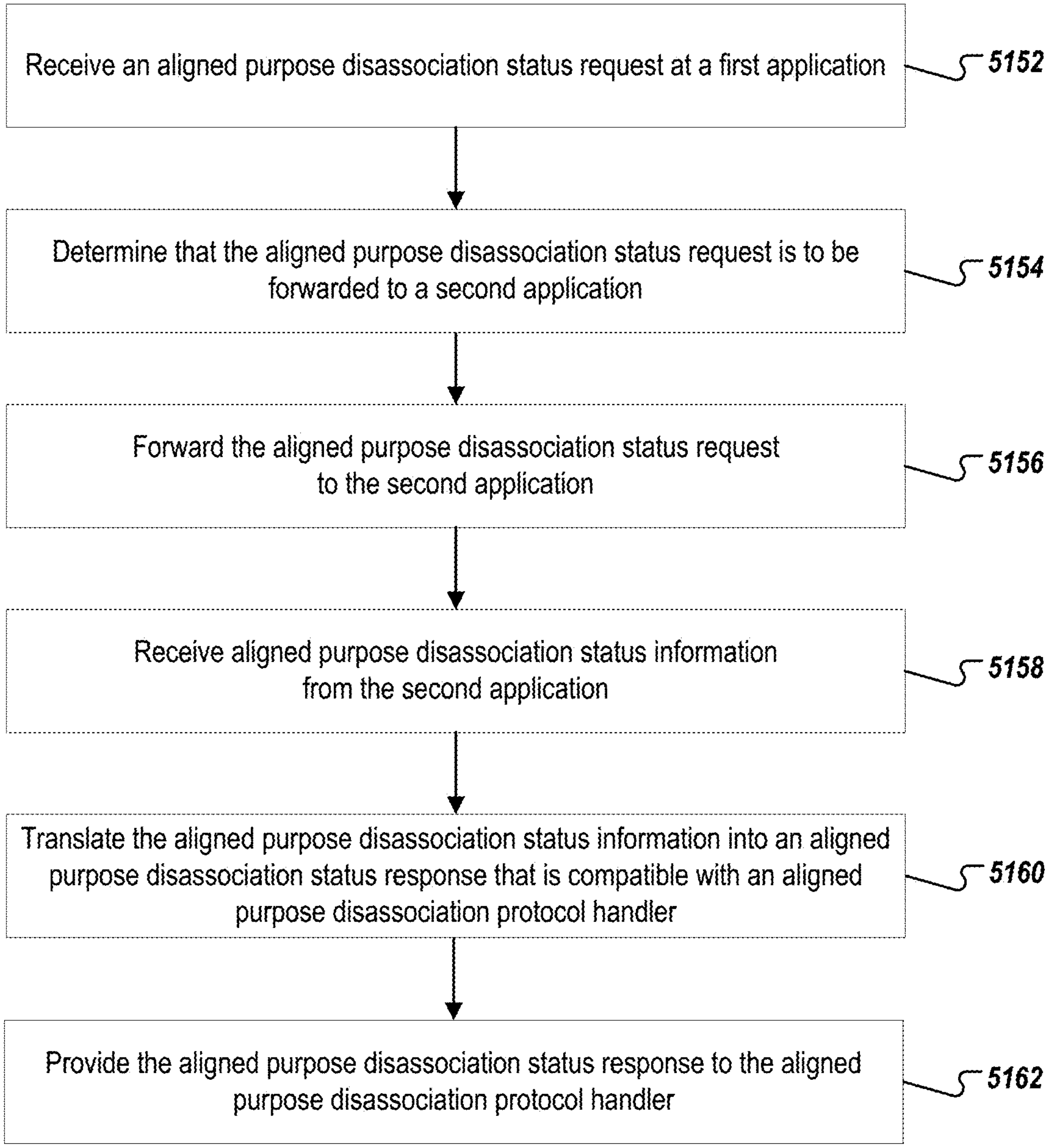
FIG. 51B is a flowchart of an example method for integrated end of purpose processing.

FIG. 51B is a flowchart of an example method 5150 for integrated end of purpose processing. It will be understood that method 5150 and related methods may be performed, for example, by any suitable system, environment, software, and hardware, or a combination of systems, environments, software, and hardware, as appropriate. For example, one or more of a client, a server, or other computing device can be used to execute method 5150 and related methods and obtain any data from the memory of a client, the server, or the other computing device. In some implementations, the method 5150 and related methods are executed by one or more components of the system 100 described above with respect to FIG. 1. For example, the method 5150 and related methods can be executed by the server 102 of FIG. 1.

At 5152, an aligned purpose disassociation status request for at least one master data object and purpose combination is received, from an aligned purpose disassociation protocol handler, at a first application in a multiple-application landscape. The aligned purpose disassociation status request is also received by multiple other applications in the multiple-application landscape. The aligned purpose disassociation status request received at a respective application requests aligned purpose disassociation status from the application that indicates, for each master data object and purpose combination, whether the application can disassociate the purpose from the master data object.

At 5154, the first application determines that the aligned purpose disassociation status request is to be forwarded to a second application that is different from the first application and different from the multiple other applications. The second application can be an administrative application used by an administrator on an administrative device. The first application can be a proxy application and the second application can be an application that is external to and not connected to the aligned purpose disassociation protocol handler.

At 5156, the first application forwards the aligned purpose disassociation status request to the second application. The aligned purpose disassociation status request can be translated to a format understandable by the second application before forwarding the aligned purpose disassociation status request to the second application. Information from the aligned purpose disassociation status request can be presented to the administrator in a user interface of the administrative application to request the administrator to provide aligned purpose disassociation status information for the at least one master data object and purpose combination.

At 5158, the first application receives aligned purpose disassociation status information from the second application that indicates, for each master data object and purpose combination, whether the second application can disassociate the purpose from the master data object. The aligned purpose disassociation status information received from the second application can be aligned purpose disassociation status information provided by the administrator using the user interface of the administrative application.

At 5160, the first application translates the aligned purpose disassociation status information received from the second application into an aligned purpose disassociation status response that is compatible with the aligned purpose disassociation protocol handler.

At 5162 the first application provides, in response to the aligned purpose disassociation status request, the aligned purpose disassociation status response to the aligned purpose disassociation protocol handler. The aligned purpose disassociation protocol handler uses the aligned purpose disassociation status response with aligned purpose disassociation status responses from the multiple other applications to generate an aligned purpose disassociation decision for the at least one master data object and purpose combination. The aligned purpose disassociation status responses received from the multiple other applications can include an aligned purpose disassociation status response that includes information provided by a different administrator who is different from the administrator. The aligned purpose disassociation protocol handler can be configured to retrieve a default status for the second application, a first master data object, and a first purpose in response to determining that the first application has not provided the aligned purpose disassociation status response within a predetermined time window and use the default status when generating an aligned purpose disassociation decision for the first master data object and the first purpose. The default status can indicate that the first application cannot attest that the second application can disassociate the first purpose from the first master data object.

Enhancing Integrated End of Purpose Protocol With Purpose Information and Transition from IEOP to Aligned Purpose Disassociation As discussed above, the IEOP protocol can be configured to not consider individual purposes that have been assigned to objects. However, in some cases, the IEOP protocol can be enhanced to consider individual purposes. Additionally, the APD protocol can be configured to handle scenarios where some but not all applications have transitioned from using just the IEOP protocol to participating in the APD protocol. Both of these scenarios are discussed below.

Figure 52:
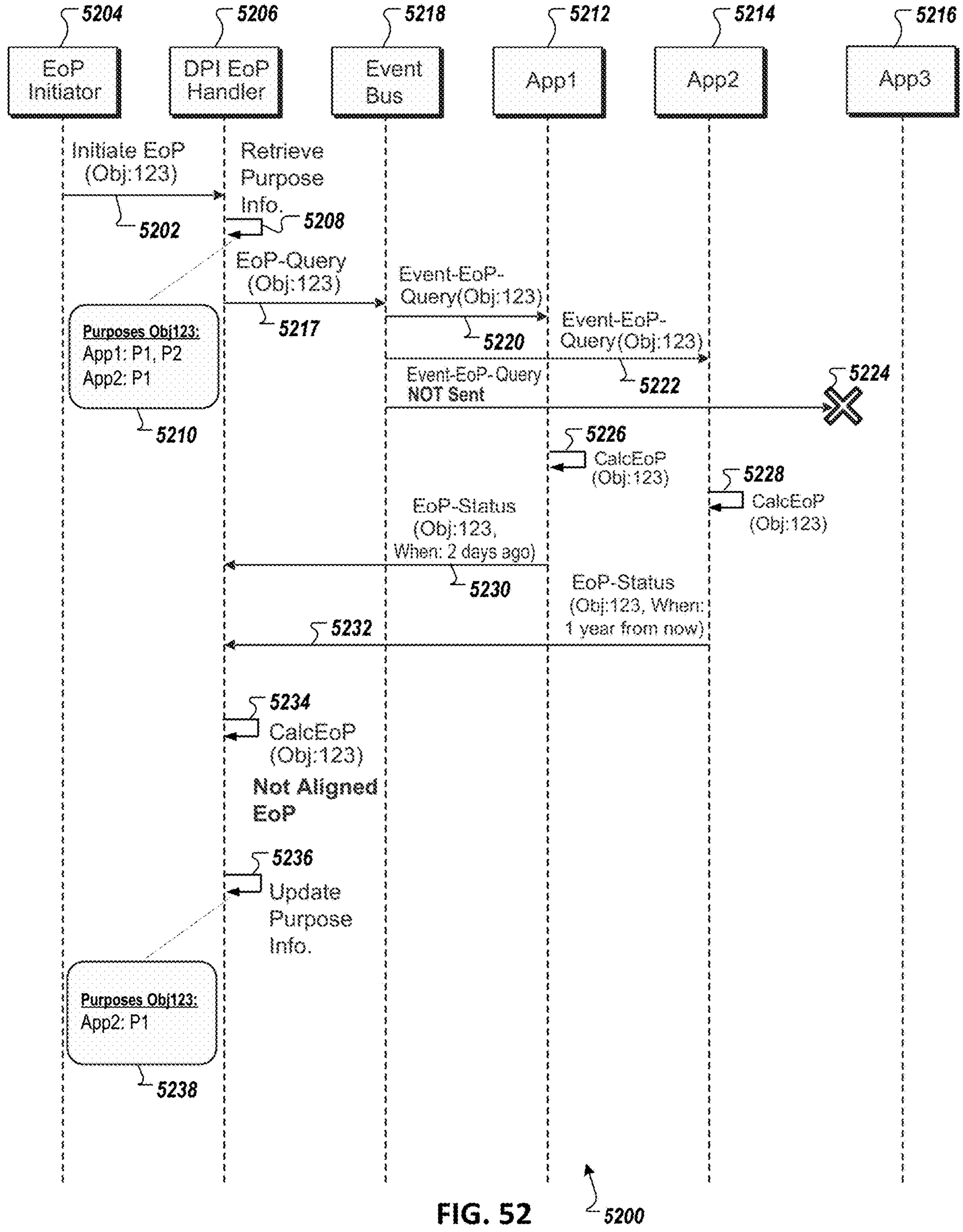
FIG. 52 is a swim lane diagram of a method for an integrated end of purpose protocol that uses purpose information for respective purposes.

FIG. 52 is a swim lane diagram of a method 5200 for an integrated end of purpose protocol that uses purpose information for respective purposes. At 5202, an EoP initiator 5204 sends an EOP initialization message to an EoP handler 5206 (e.g., a DPI service) for a master data object with an object identifier of "123". At 5208, the EoP handler 5206 retrieves purpose information 5210 for the master data object. The EoP handler 5206 can manage the purpose information 5210 to track which applications are processing which master data objects for which purposes, for example. The purpose information 5210 indicates that a first application 5212 is processing the master data object for a P1 purpose and a P2 purpose and a second application 5214 is processing the master data object for the P1 purpose. The purpose information 5210 does not list a third application 5216 as processing the master data object for any purposes.

The EoP handler 5206 can use the purpose information 5210 to determine target applications to send an EoP query. For example, the EoP handler 5206 can determine to send an EoP query to applications that currently process the master data object for at least one purpose (e.g., the first application 5212 and the second application 5214) and to exclude from sending an EoP query applications that currently do not process the master data object for any purposes (e.g., the third application 5216).

For example, at 5217, the EoP handler 5206 sends an EoP-query message to an event bus 5218. The EoP-query message sent to the event bus 5218 can list target recipients of the first application 5212 and the second application 5214. At 5220 and 5222, the event bus 5218 forwards the EoP-query message to the first application 5212 and the second application 5214, respectively. The EoP-query message is not sent to the third application 5216, as illustrated by an icon 5224. At 5226 and 5228, local blocking components of the first application 5212 and the second application 5214 perform local EoP calculations for the master data object, respectively.

Each connected application can send a calculated EoP status by making direct API calls to the EoP handler 5206. For example, at 5230 and 5232, the first application 5212 and the second application 5214 each respectively send an EoP status to the EoP handler 5206. The EoP status sent by the first application 5212 has an EoP date value corresponding to "2 days ago" which indicates that the first application 5212 is at end of purpose for the master data object. The EoP status sent by the second application 5214 has an EoP date value corresponding to "one year from now", which indicates that the second application 5214 is not at end of purpose for the master data object.

At 5234, the EoP handler 5206 uses the EoP-status messages received from all of the connected applications to calculate a global end-of-purpose determination for the master data object. Based on the EoP status from the second application 5214, the EoP handler 5206 determines that an aligned end-of-purpose has not been reached for the master data object.

In some implementations, the EoP handler performs a purpose information update operation 5236 after receiving EoP status values from connected applications. For instance, based on the EoP status from the first application 5212 that indicates end of purpose for the master data object in the first application 5212, the EoP handler can modify the purpose information 5210 to create updated purpose information 5238 by removing from the purpose information 5210 the purposes for the master data object for the first application 5212. Accordingly, the EoP handler 5206 can exclude the first application 5212 from receiving future EoP queries, at least until the EoP handler 5206 becomes aware of a new purpose for the master data object for the first application 5212. Applications can inform the EoP handler 1206 when a new purpose is assigned to a master data object, for example.

Figure 53:
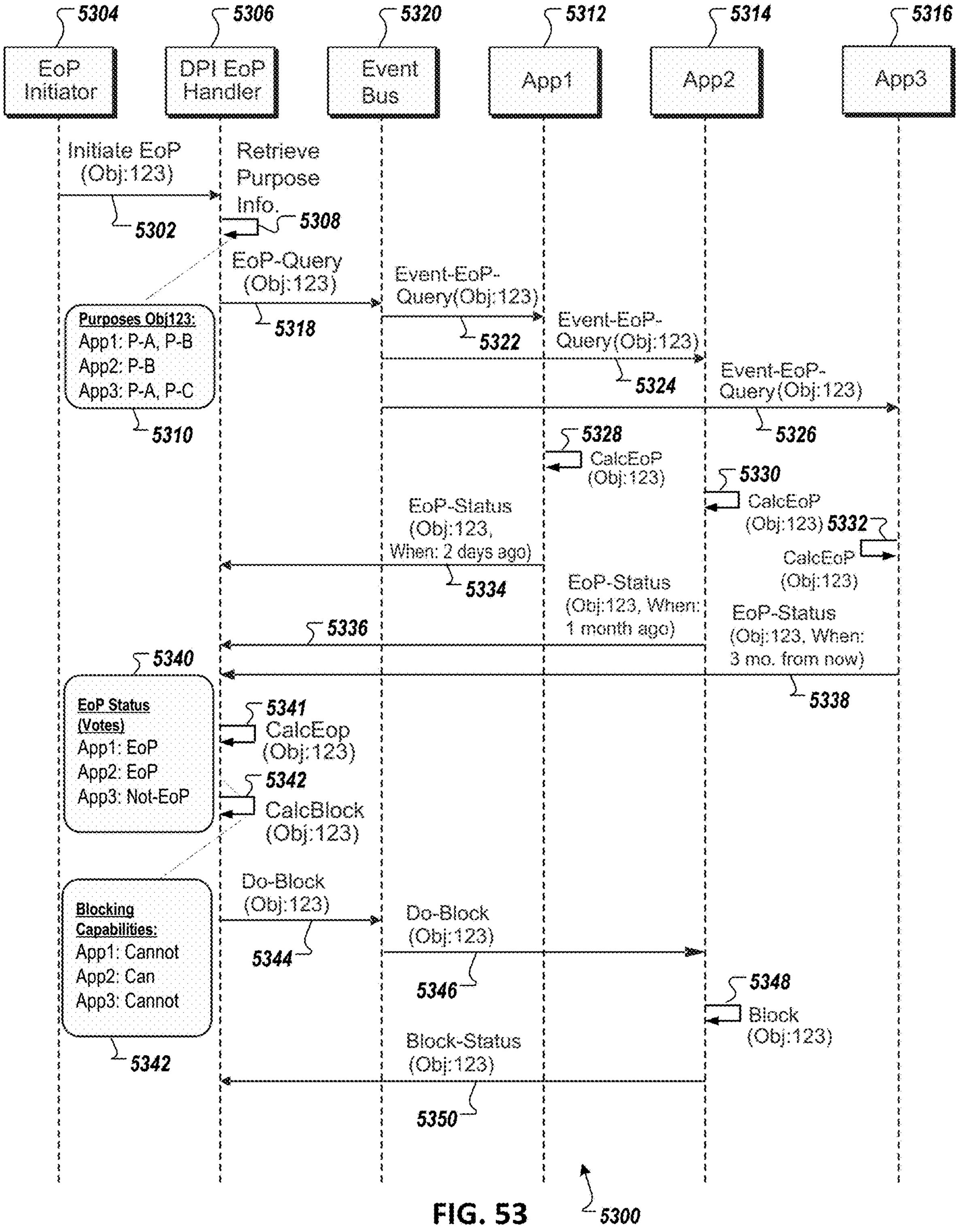
FIG. 53 is a swim lane diagram of a method for an integrated end of purpose protocol that uses purpose information for respective purposes.

FIG. 53 is a swim lane diagram of a method 5300 for an integrated end of purpose protocol that uses purpose information for respective purposes. At 5302, an EoP initiator 5304 sends an EOP initialization message to an EoP handler 5306 (e.g., a DPI service) for a master data object with an object identifier of "123". At 5308, the EoP handler 5306 retrieves purpose information 5310 for the master data object. The purpose information 5310 indicates that a first application 5312 is processing the master data object for a P-A purpose and a P-B purpose, a second application 5314 is processing the master data object for the P-B purpose, and a third application 5316 is processing the master data object for the P-A purpose and the P-C purpose.

As described above, the EoP handler 5306 can use the purpose information 5310 to determine target applications to send an EoP query. For example, the EoP handler 5306 can determine to send an EoP query to applications that currently process the master data object for at least one purpose (e.g., the first application 5312, the second application 5314, and the third application 5316). At 5318, the EoP handler 5306 sends an EoP-query message to an event bus 5320. At 5322, 5324, and 5326, the event bus 5320 forwards the EoP-query message to the first application 5312, the second application 5314, and the third application 5316, respectively.

At 5328, 5330, and 5332, local blocking components of the first application 5312, the second application 5314, and the third application 5316 perform local EoP calculations for the master data object, respectively. At 5334, 5336, and 5338, the first application 5312, the second application 5314, and the third application 5316 each respectively send an EoP status to the EoP handler 5306.

The EoP status sent by the first application 5312 has an EoP date value corresponding to "2 days ago" which indicates that the first application 5312 is at end of purpose for the master data object. The EoP status sent by the second application 5314 has an EoP date value corresponding to "one month ago", which indicates that the second application 5314 is at end of purpose for the master data object. The EoP status sent by the third application 5316 has an EoP date value corresponding to "three months from now", which indicates that the third application 5316 is not at end of purpose for the master data object. The EoP handler 5306 can collect all of the received EoP statuses as collected EoP statuses 5340 and use the collected EoP statuses 5340, at 5341, to determine that an aligned end of purpose has not been reached for the master data object (e.g., due to the EoP status received from the third application 5316).

Although the collected EoP statuses 5340 do not indicate an aligned end of purpose for the master data object, the EoP handler 5306 can, at 5342, use the collected EoP statuses 5340 and the purpose information 5310 to determine blocking capabilities 5342 that indicate whether the master data object can still be blocked in some of the landscape applications. Since the third application 5316 is not at end of purpose for the master data object, the EoP handler 5306 knows that the third application 5316 cannot block the master data object. Additionally, since the third application 5316 is not at end of purpose for the master data object, the EoP handler 5306 can determine that the third application 5316 may be processing the master data object for the P-A purpose, the P-C purpose, or both the P-A and P-C purposes. Based on the third application 5316 possibly processing the master data object for the P-A purpose, and the purpose information 5310 indicating that the first application 5312 was processing the master data object for the P-A purpose, the EoP handler 5306 can determine that the first application 5312 should not block the master data object.

As another example, given that both the first application 5312 and the second application 5314 indicated end of purpose for the master data object after having the P-B purpose linked to each application in the purpose information 5310, the EoP handler 5306 can determine that no application is processing the master data object for the P-B purpose. Since the second application 5314 was only processing the master data object for the P-B purpose, the EoP handler 5306 can determine that the second application can now block the master data object, as indicated in the blocking capabilities 5342. Accordingly, the EoP handler 5306 can, at 5344, send a block command to the event bus 5320 requesting blocking of the master data object. The block command can be targeted to the second application 5314 and not the first application 5312 or the third application 5316. At 5346, the event bus 5320 sends the block command to the second application 5314. At 5348, the second application 5314 performs a local blocking operation for the master data object. At 5350, the second application 5314 sends a block status to the EoP handler 5306 that indicates an outcome of the local blocking operation.

Figure 54:
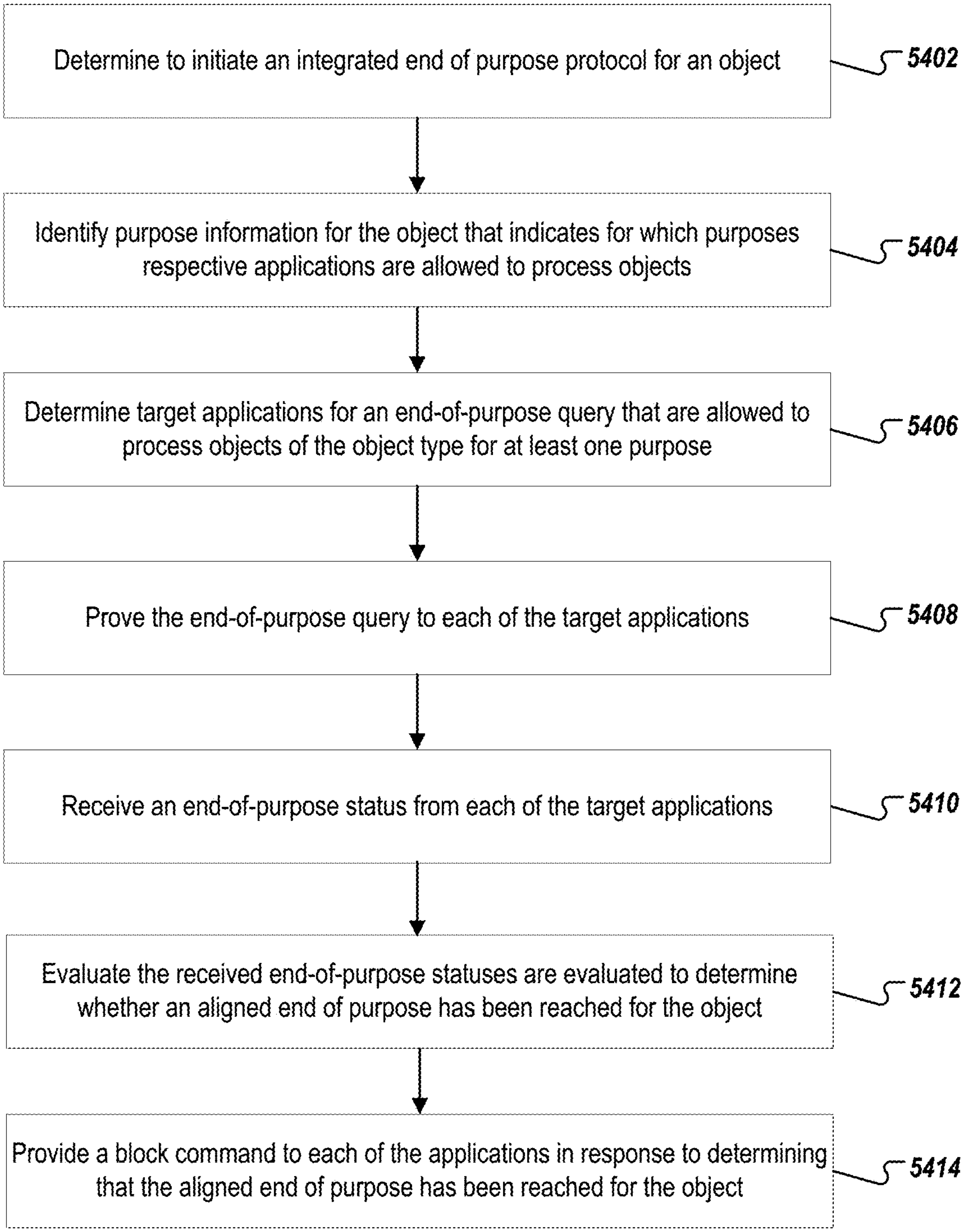
FIG. 54 is a flowchart of an example method for integrated end of purpose processing using purpose information.

FIG. 54 is a flowchart of an example method 5400 for integrated end of purpose processing using purpose information. It will be understood that method 5400 and related methods may be performed, for example, by any suitable system, environment, software, and hardware, or a combination of systems, environments, software, and hardware, as appropriate. For example, one or more of a client, a server, or other computing device can be used to execute method 5400 and related methods and obtain any data from the memory of a client, the server, or the other computing device. In some implementations, the method 5400 and related methods are executed by one or more components of the system 100 described above with respect to FIG. 1. For example, the method 5400 and related methods can be executed by the server 102 of FIG. 1.

At 5402, a determination is made, in a multiple-application landscape that includes multiple applications, to initiate an integrated end of purpose protocol for an object of an object type. For example, a request can be received or an internal determination can be made to initiate the integrated end of purpose protocol for the object.

At 5404, purpose information is identified that indicates for which purposes respective applications are allowed to process objects in the multiple-application landscape.

At 5406, applications that are allowed process objects of the object type for at least one purpose are determined as target applications for an end-of-purpose query, based on the purpose information. Applications that do not process objects of the object type are not included in the target applications.

At 5408, the end-of-purpose query is provided, to each of the target applications of the end-of-purpose query, that requests each of the target applications to determine whether the target application is able to block the object.

At 5410, in response to the end-of-purpose query, an end-of-purpose status is received from each of the target applications that indicates whether the respective target application is able to block the object.

At 5412, the received end-of-purpose statuses are evaluated to determine whether an aligned end of purpose has been reached for the object in the multiple-application landscape. Evaluating the received end-of-purpose statuses comprises determining whether each end-of-purpose status indicates end of purpose for the object.

At 5414, in response to determining that the aligned end of purpose has been reached for the object in the multiple-application landscape, a block command is provided to each of the multiple applications, that instructs a respective application to locally block the object in the respective application.

The received end-of-purpose statuses and the purpose information can be evaluated. The purpose information can be updated, based on the received end-of-purpose statuses, to create updated purpose information for at least some of the target applications. Updating the purpose information can include removing a first purpose assignment for a first purpose from a first application in response to determining that no application is processing the object for the first purpose (e.g., as described above with respect to FIG. 53). When an aligned end-of-purpose has not been reached for the object (e.g., based on evaluated the received end-of-purpose statuses) a determination can be made that the first application has no purposes assigned to the object (e.g., after purpose information has been updated). Based on determining that the first application has no purposes assigned to the object, a block command can be sent for the object to the first application instructing the first application to block the object.

Figure 55:
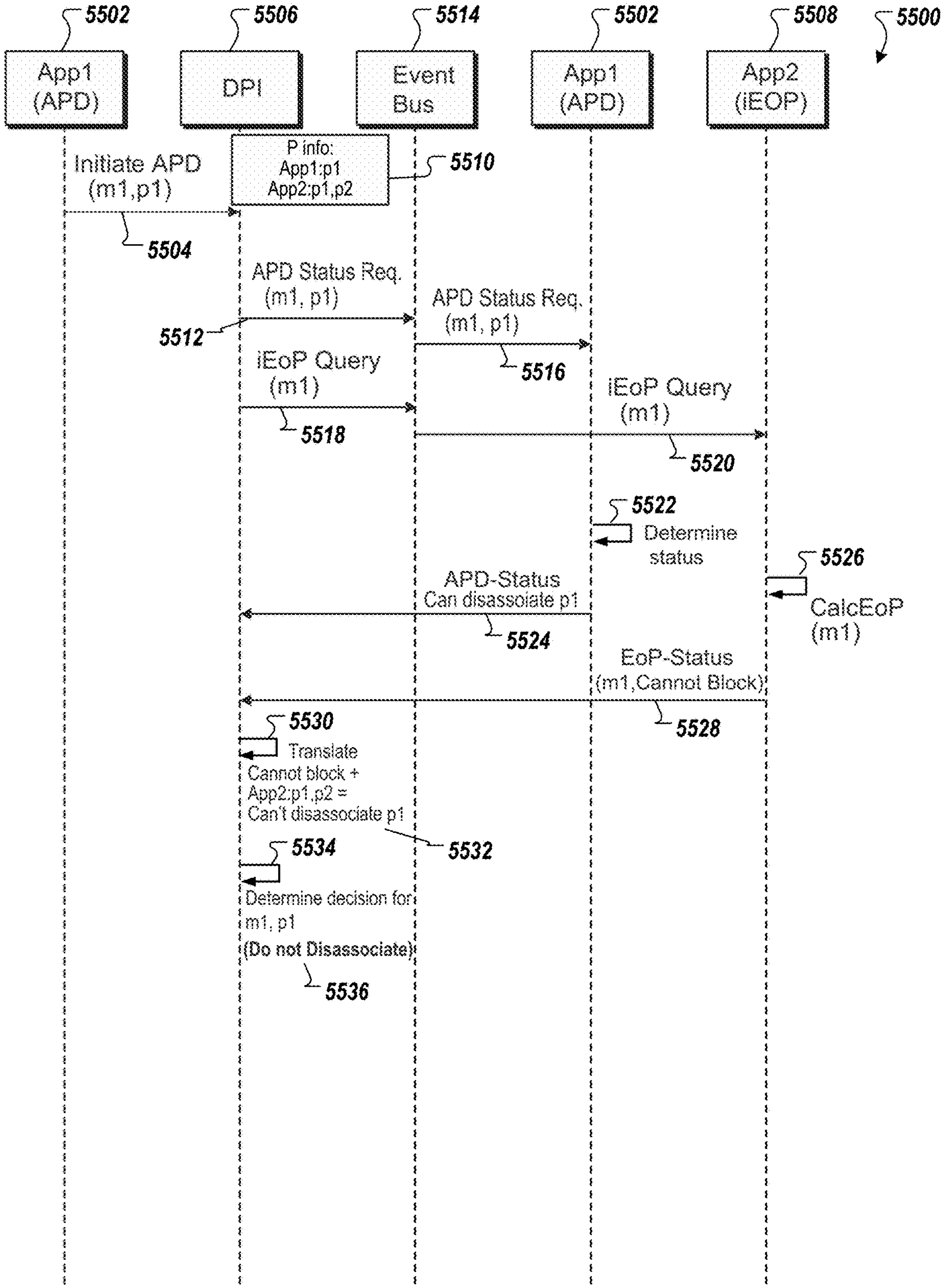
FIG. 55 is a swim lane diagram that illustrates a transition from an integrated end of purpose protocol to an aligned purpose disassociation protocol.

FIG. 55 is a swim lane diagram 5500 that illustrates a transition from an integrated end of purpose protocol to an aligned purpose disassociation protocol. A transition can occur if some applications implement the iEoP protocol and some applications implement the APD protocol, for example. Transition processing can be performed until all applications have finished implementing the APD protocol, for example.

A first application 5502, which is configured to participate in the APD protocol, sends an APD initialization request 5504 to a DPI service 5506 for a master data object with object identifier m1 (e.g., an "m1 object") and a purpose with purpose identifier p1 (e.g., a "p1 purpose"). The DPI service 5506 can be aware that the first application 5502 is configured to participate in the APD protocol and that other application(s), including a second application 5508, are configured to participate in the iEoP protocol (and not the APD protocol). The DPI service 5506 can also manage and maintain purpose information 5510 that indicates which applications process objects for which purposes. For example, the purpose information 5510 currently indicates that the first application 5502 processes objects for the p1 purpose and that the second application 5508 processes objects for the p1 purpose and a p2 purpose.

In response to the APD initiation request 5504 (e.g., in response to accepting the APD initiation request 5504), the DPI service 5506 can send an APD status request 5512 to an event bus 5514 requesting that the event bus 5514 forward the APD status request 5512 to the first application 5502. For example, the event bus 5514 forwards an APD status request 5516 to the first application 5502.

Based on knowing that the second application 5508 participates in the iEoP protocol rather than the APD protocol, the DPI service can send an iEoP query 5518 to the event bus 5514 requesting that the event bus 5514 forward the iEoP query 5518 to the second application 5508. For example, the event bus 5514 forwards an iEoP query 5520 to the second application 5508.

At 5522, the first application 5502, in response to the APD status request 5516, determines an APD status for the m1 object and the p1 purpose. The first application 5502 sends an APD status 5524 indicating that the first application 5502 can disassociate the p1 purpose from the m1 object to the DPI service 5506.

At 5526, the second application 5508, in response to the iEoP query 5520, determines an EoP status for the m1 object. The second application 5508 sends an EoP status 5528 indicating that the second application 5508 cannot block the m1 object to the DPI service 5506.

At 5530, the DPI service 5506 translates the EoP status 5528 to an APD status. For example, based on the EoP status 5506 of cannot-block, and the purpose information 5510 for the second application 5508, the DPI service 5506 cannot discern whether the second application 5508 can disassociate the p1 purpose from the m1 object. Accordingly, the DPI service conservatively assumes that the second application 5508 cannot disassociate the p1 purpose from the m1 object, and accordingly, translates the EoP status 5528 to a converted cannot-disassociate APD status 5532.

At 5534, the DPI service 5506 determines an APD decision 5536 of do-not-disassociate, based on the APD status 5524 and the converted cannot-disassociate APD status 5532 (e.g., at least the converted cannot-disassociate APD status 5532 prevents an aligned disassociate decision). Accordingly, the DPI service 5506 maintains the purpose information 5510 since the DPI service 5506 has not determined that any aligned purpose disassociations will occur.

Figure 56:
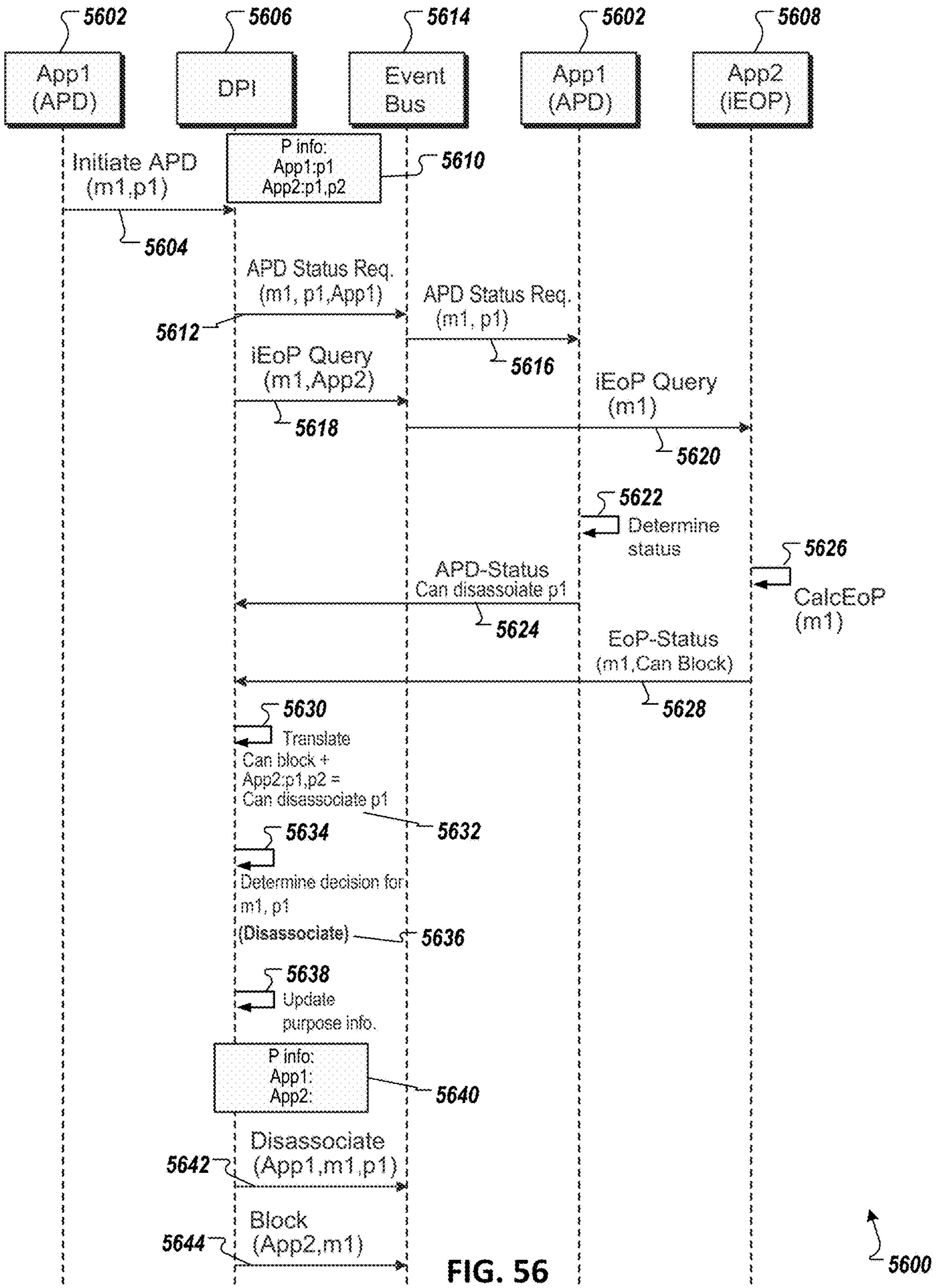
FIG. 56 is a swim lane diagram that illustrates a transition from an integrated end of purpose protocol to an aligned purpose disassociation protocol

FIG. 56 is a swim lane diagram 5600 that illustrates a transition from an integrated end of purpose protocol to an aligned purpose disassociation protocol. Similar to FIG. 55, a first application 5602, which is configured to participate in the APD protocol, sends an APD initialization request 5604 to a DPI service 5606 for an m1 master data object and a p1 purpose. The DPI service 5606 can be aware that the first application 5602 is configured to participate in the APD protocol and that other application(s), including a second application 5608, are configured to participate in the iEoP protocol (and not the APD protocol). The DPI service 5606 can also manage and maintain purpose information 5610 that indicates which applications process objects for which purposes. For example, the purpose information 5610 currently indicates that the first application 5602 processes objects for the p1 purpose and that the second application 5608 processes objects for the p1 purpose and a p2 purpose.

In response to the APD initiation request 5604 (e.g., in response to accepting the APD initiation request 5604), the DPI service 5606 can send an APD status request 5612 to an event bus 5614 requesting that the event bus 5614 forward the APD status request 5612 to the first application 5602. For example, the event bus 5614 forwards an APD status request 5616 to the first application 5602. Based on knowing that the second application 5608 participates in the iEoP protocol rather than the APD protocol, the DPI service can send an iEoP query 5618 to the event bus 5614 requesting that the event bus 5614 forward the iEoP query 5618 to the second application 5608. For example, the event bus 5614 forwards an iEoP query 5620 to the second application 5608.

At 5622, the first application 5602, in response to the APD status request 5616, determines an APD status for the m1 object and the p1 purpose. The first application 5602 sends an APD status 5624 indicating that the first application 5602 can disassociate the p1 purpose from the m1 object to the DPI service 5606. At 5626, the second application 5608, in response to the iEoP query 5620, determines an EoP status for the m1 object. In contrast to the example of FIG. 55, the second application 5608 sends an EoP status 5628 indicating that the second application 5608 can block the m1 object to the DPI service 5606.

At 5630, the DPI service 5606 translates the EoP status 5628 to an APD status. For example, based on the EoP status 5606 of can-block, and the purpose information 5610 for the second application 5608, the DPI service 5606 can discern that the second application 5608 can disassociate the p1 purpose from the m1 object. Accordingly, the DPI service translates the EoP status 5628 to a converted can-disassociate APD status 5632.

At 5634, the DPI service 5606 determines an APD decision 5636 of disassociate, based on the APD status 5624 and the converted can-disassociate APD status 5632. At 5638, the DPI service 5606 can update the purpose information 5610 to generate updated purpose information 5640, based on the EoP status 5628 and the disassociate decision 5636. The DPI service 5606 can send a disassociate instruction 5642 to the event bus 5614, instructing the first application 5602 to disassociate the p1 purpose from the m1 object (e.g., after receiving a corresponding message from the event bus 5614). Additionally, the DPI service 5606 can send a block command 5644 to the event bus 5614, instructing the second application 5608 to block the m1 object (e.g., after receiving a corresponding message from the event bus 5614).

Figure 57:
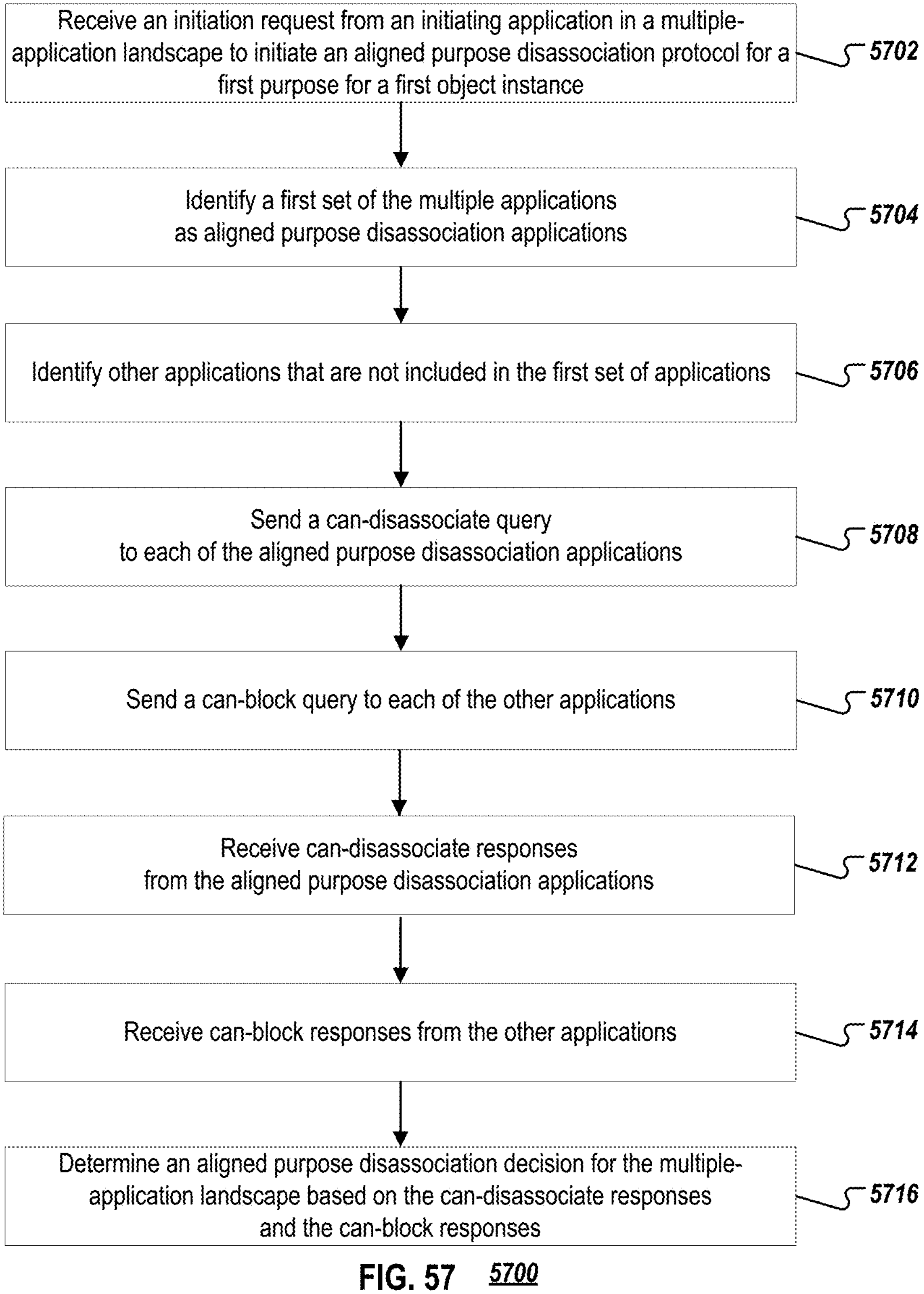
FIG. 57 is a flowchart of an example method for transitioning from an integrated end of purpose protocol to an aligned purpose disassociation protocol.

FIG. 57 is a flowchart of an example method 5700 for transitioning from an integrated end of purpose protocol to an aligned purpose disassociation protocol. It will be understood that method 5700 and related methods may be performed, for example, by any suitable system, environment, software, and hardware, or a combination of systems, environments, software, and hardware, as appropriate. For example, one or more of a client, a server, or other computing device can be used to execute method 5700 and related methods and obtain any data from the memory of a client, the server, or the other computing device. In some implementations, the method 5700 and related methods are executed by one or more components of the system 100 described above with respect to FIG. 1. For example, the method 5700 and related methods can be executed by the server 102 of FIG. 1.

At 5702, an initiation request is received from an initiating application in a multiple-application landscape to initiate an aligned purpose disassociation protocol for a first purpose for a first object instance. The first purpose indicates a first type of processing that can be performed on the first object instance.

At 5704, a first set of the multiple applications is identified as aligned purpose disassociation applications that are each configured to indicate whether the application is able to disassociate the first purpose from the first object instance.

At 5706, other applications are identified that are not included in the first set of applications. Each of the other applications is configured to indicate whether the other application can block the first object instance (e.g., due to not having any purposes assigned to the first object instance or based on another determination that indicates whether the other application can block the first object instance).

At 5708, a can-disassociate query is sent to each of the aligned purpose disassociation applications requesting a can-dissociate response that indicates whether the aligned purpose disassociation application is able to disassociate the first purpose from the first object instance.

At 5710, a can-block query is sent to each of the other applications requesting a can-block response that indicates whether the other application is able to block the first object instance.

At 5712, can-disassociate responses are received from the aligned purpose disassociation applications. A can-disassociate response for an aligned purpose disassociation application can be either an affirmative can-disassociate response that indicates that the application can disassociate the first purpose from the first object instance or a negative can-disassociate response that indicates that the application cannot disassociate the first purpose from the first object instance.

At 5714, can-block responses are received from the other applications. Can-block responses for the other applications can be either an affirmative can-block response that indicates that the other application can block the first object instance or a negative can-block response that indicates that the other application cannot block the first object instance.

At 5716, an aligned purpose disassociation decision is determined for the multiple-application landscape based on the can-disassociate responses and the can-block responses. Determining the aligned purpose disassociation decision for the multiple-application landscape based on the can-disassociate responses and the can-block responses can include converting the can-block responses to converted can-disassociate responses and using the converted can-disassociate responses and the can-disassociate responses to determine the aligned purpose disassociation decision. For example, purpose information for each of the other applications can be retrieved that identifies which purposes are processed in which of the other applications. A determination can be made, for each of the other applications, as to whether the purpose information indicates that the other application performs processing for the first purpose. In response to determining that the purpose information indicates that one of the other applications performs processing for the first purpose, the purpose information and a can-block response from the application can be used converting the first can-block response to a first converted can-disassociate response. For example, based on determining that a can-block response for an application is the affirmative can-block response and that the purpose information indicates that application performs processing for the first purpose, the first can-block response can be converted to the affirmative can-disassociate response. As another example, based on determining that a can-block response for an application is the negative can-block response and that the purpose information indicates that the application performs processing for the first purpose, the first can-block response can be converted to the negative can-disassociate response.

Determining the aligned purpose disassociation decision can include determining an aligned disassociate decision based on determining that each of the can-disassociate responses and the converted can-disassociate responses are the affirmative can-disassociate response. Determining the aligned purpose disassociation decision can include determining an aligned do-not-disassociate decision based on determining that at least one of the can-disassociate responses or the converted can-disassociate responses are the negative can-disassociate response. The aligned purpose disassociation decision can be sent to each of the aligned purpose disassociation applications.

A determination can be made, based on the received can-block responses and the received can-disassociate responses, that no purposes are assigned to the first object instance in any of the multiple applications. In response to the determination, a block instruction for the first object instance can be sent to each of the other applications.

Integrated Personal Data Retrieval

Figure 58:
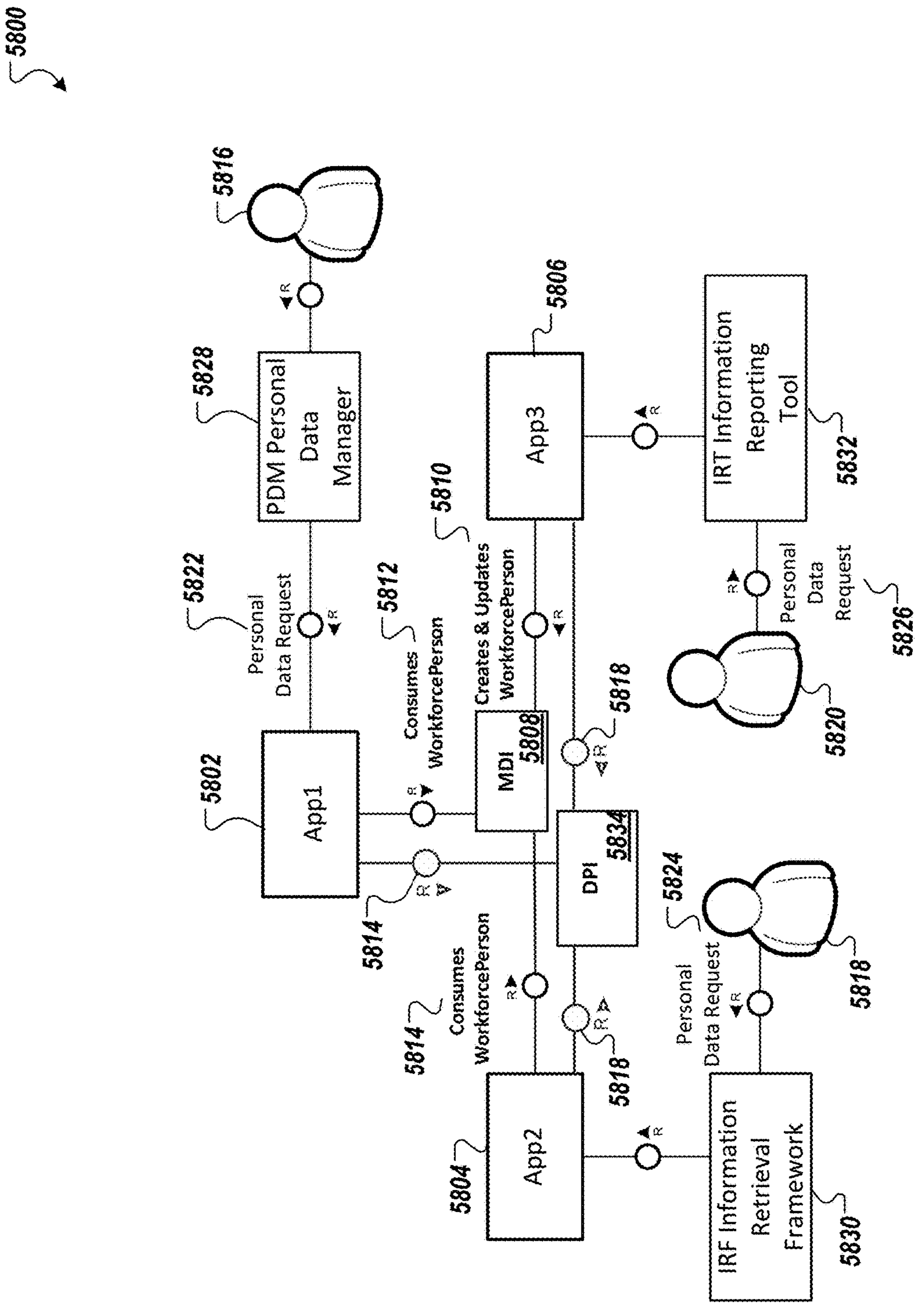
FIG. 58 illustrates a system for integrated personal data retrieval.

FIG. 58 illustrates a system 5800 for integrated personal data retrieval. The system 5800 is an integrated system that includes different types of applications or sub systems. For example, the system 5800 includes a first application 5802, a second application 5804, and a third application 5806. The system 5800 can include other, additional applications. An MDI system 5808 can replicate data between the first application 5802, the second application 5804, and the third application 5806, using a common data model (e.g., the one domain model described above). In some implementations, the system 5800 does not include the MDI system 5808. For example, the first application 5802, the second application 5804, and the third application 5806 can transfer objects directly and/or can have a common understanding of object instance identifiers.

Each application can store personal data concerning a data subject (e.g., an application user). Although a user as a data subject is described below, in some cases the data subject does not directly use an application that stores personal data about the data subject. As an example, the user/data subject can be an employee of a company that uses the applications in the system 5800 to manage the company. The user can be represented in the system 5800 and in the one domain model using a WorkforcePerson entity. The third application 5806 can be a leading system for the WorkforcePerson entity in that the third application 5806 is involved in initially creating the WorkforcePerson entity and providing data and updates for created WorkforcePerson entity instances to the MDI system 5808, as illustrated by a message 5810. The third application 5806 may include other types of objects that include personal data for the user. The third application 5806 may be a leading system for some objects and not a leading system for other objects.

The first application 5802 and the second application 5804 can consume WorkforcePerson entity data, as illustrated by messages 5812, and 5814, respectively. The first application 5802 and/or the second application 5804 may store, in WorkforcePerson objects, personal data for the user that was not created by the third application 5806. Additionally, the first application 5802 and/or the second application 5804 may include other types of objects that include personal data for the user.

A user may desire, and may be enabled by various regulations, to request from the system 5800 personal data that is stored about the user in the system 5800. The user may, over time, use different applications in the system 5800. For example, the user may use multiple (e.g., two or more, or all) of the various applications included in the system 5800. Each of the first application 5802, the second application 5804, and the third application 5806 can include a personal data component through which the user can submit a personal data request. For example, as illustrated by users 5816, 5825, and 5820, a given user may submit a personal data request 5822, 5824, or 5826 using a personal data manager (PDM) 5828, an Information Retrieval Framework (IRF) 5830, or an Information Retrieval Tool (IRT) 5832, provided by the first application 5802, the second application 5804, and the third application 5806, respectively.

Each respective personal data component in a given application can be configured to manage and respond to requests for personal data in the respective application. However, a given personal data component may not be aware of, nor be able to retrieve personal data stored in another application. For instance, the IRF 5830 of the second application 5804 may not be aware of exactly which personal data is stored in the first application 5802 or the third application 5806, and may not have access to data stored locally in other systems.

As part of implementing data privacy services in an integrated landscape, a DPI service 5834 can be included in the system 5800 for orchestrating personal data requests submitted by users within the system 5800. For example, upon receiving the personal data request 5822, 5824, or 5826 at the PDM 5828, the IRF 5830, or the IRT 5832, the first application 5802, the second application 5804, or the third application 5806 can a send a request 5836, 5838, or 5840, respectively, to the DPI service 5834, for the DPI service 5834 to orchestrate an integrated personal data retrieval process, for retrieving personal data from multiple applications in the system 5800, as described in more detail below.

Figure 59:
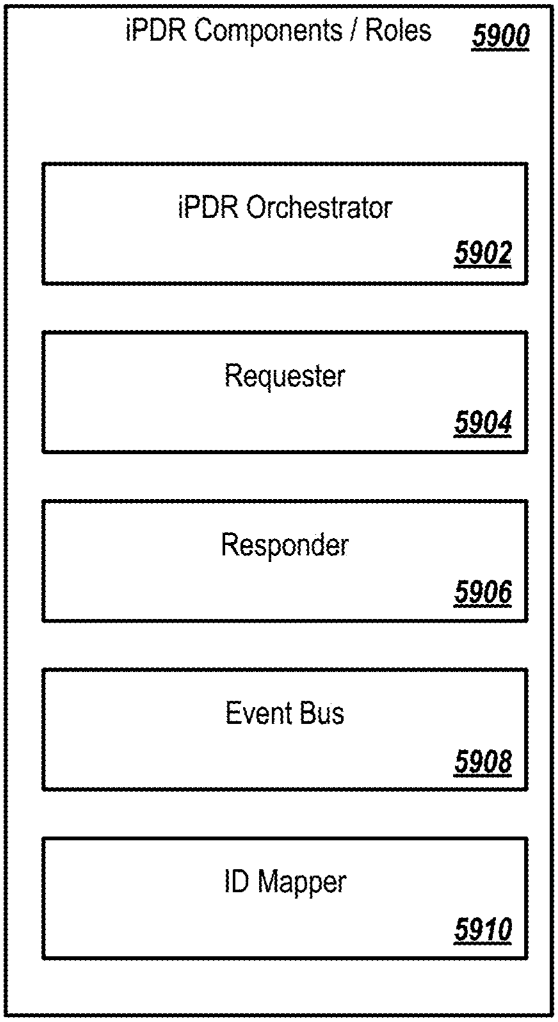
FIG. 59 illustrates integrated personal data retrieval components.

FIG. 59 illustrates integrated personal data retrieval (iPDR) components 5900. An iPDR orchestrator 5902, which can be, for example, a DPI service, coordinates the iPDR protocol. For example, the iPDR orchestrator 5902 accepts PDR requests from requesters 5904, sends out messages to responders 5906 for personal data, and collects responses from the responders 5906. The requesters 5904 can be any PDR tool of an application in the landscape. A requester 5904 starts the iPDR protocol by sending a message to the iPDR orchestrator 5902. The responders 5906 can be any application within a landscape that can receive messages that are sent by the iPDR orchestrator 5902.

Messages sent by a requester 5904 to the iPDR orchestrator 5902 and from the iPDR orchestrator 5902 to responders 5906 can include one or more parameters that each describe which personal data the responders 5906 are to export. For example, parameters can include object types and object identifiers of objects that may include personal data for the user, a purpose identifier for requesting data corresponding to a particular purpose, or a regulation indicator that specifies a personal data regulation or set of regulations that the responder should follow when collecting personal data.

As another example, a language or locale parameter can specify a particular language or locale that a responder can use when collecting and exporting personal data. For example, exported data, such as dates, can be localized to a particular locale. As another example, textual data can be converted by a responder to the requested language.

Each responder 5906 can collect personal data, based on parameters if any parameters are specified, export the personal data from local storage, and send a copy of the personal data to the iPDR orchestrator 5902. The iPDR orchestrator 5902 can inform the requester 5904 once data has been collected from each responder 5906, to enable the requester 5904 to retrieve the collected data.

An event bus 5908 can be messaging middleware that is used to send messages between the iPDR orchestrator 5902 and requesters 5904 and responders 5906. The event bus 5908 can provide asynchronous communication between components and can handle message resending (if necessary) and other communication functionality. For example, the event bus 5908 can perform one or more of: (1) accepting a message from the iPDR orchestrator 5902 and broadcasting the message to all responders 5906 ensuring that no message gets lost; (2) accepting a message from iPDR orchestrator 5902 that includes a recipient list, and ensuring that every recipient in the recipient list receives the message without a message getting lost; or 3) transmitting a message to all responders 5906 that have subscribed to a certain topic while ensuring that no message gets lost.

An ID (identifier) mapper 5910 can map identifiers between different identifier spaces. For example, a given application may associate certain data objects that include personal data with an application-specific ID instead of a global identifier. If the application receives a request to provide personal data associated with a certain object with a global identifier, the ID mapper 5910 can map, for the application, the global identifier to the application-specific identifier. If the application sends a message with an application-specific identifier, the ID mapper 5910 can map, for one or more recipients that use global identifiers, the application-specific identifier to the global identifier.

Figure 60:
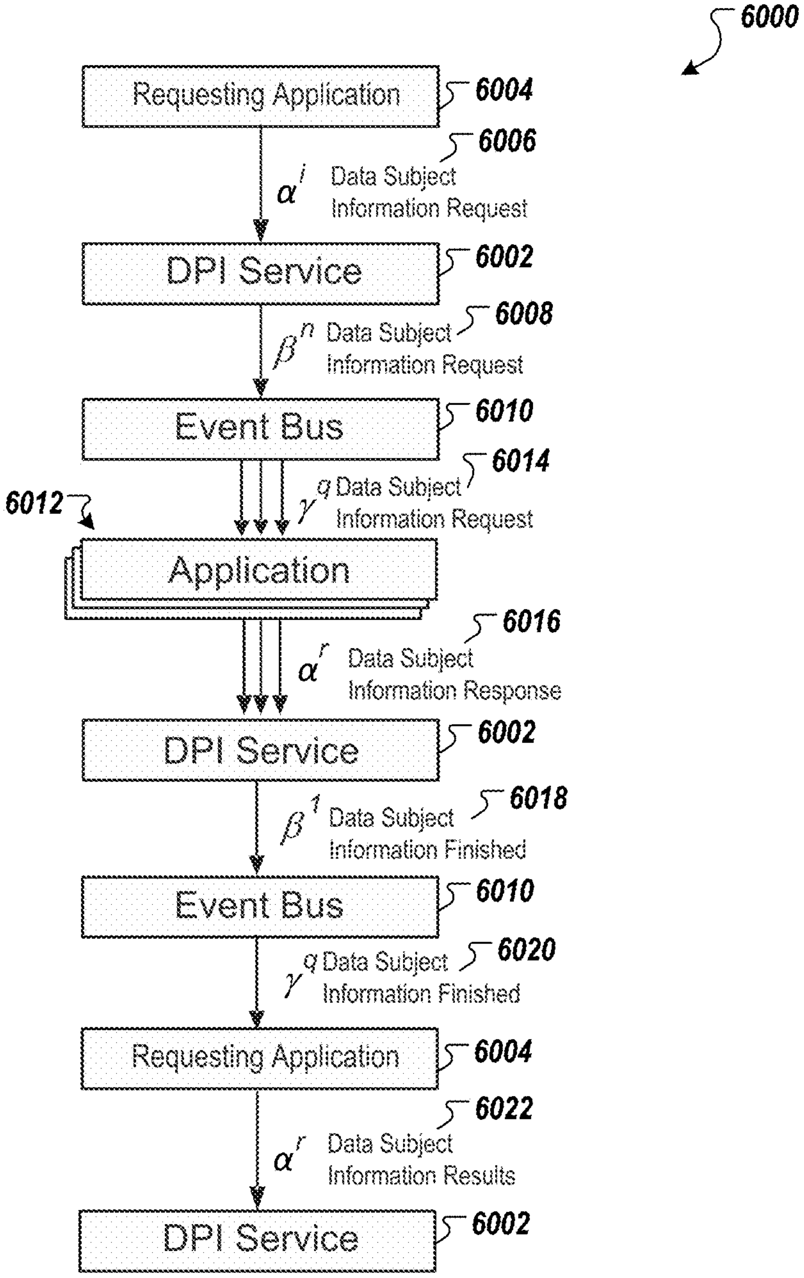
FIG. 60 is a flowchart of an example method for an integrated personal data retrieval process.

FIG. 60 is a flowchart of an example method 6000 for an integrated personal data retrieval process. The iPDR process can use the DPI architecture pattern described above. For example, a requesting application 6004 can send a data subject information request 6006 an alpha $\alpha^i$ invocation of an API of the DPI service 6002.

In response to the data subject information request 6006, the DPI service 6002 can validate the data subject information request 6006, as described in more detail below. In response to validating the data subject information request 6006, the DPI service 6002 sends a beta $\beta^n$ data subject information request 6008 to an event bus 6010 requesting that the event bus 6010 distribute the data subject information request 6008 to connected applications 6012. The event bus 6010, in response to receiving the beta $\beta^n$ data subject information request 6008, distributes a gamma $\gamma^q$ data subject information request 6014 to each application of connected applications 6012.

Each connected application 6012 collects (and/or exports) personal data according to the data subject information request 6014. After collecting or exporting personal data, each application sends a data subject information response message 6016 as an alpha $\alpha^r$ invocation to the DPI service 6002. After receiving a data subject information response message 6016 from each connected application 6012, the DPI service 6002 aggregates the collected data and sends a beta $\beta^1$ data subject information finished notification 6025 to the event bus 6010 requesting that the event bus 6010 distribute the data subject information finished notification 6025 to the requesting application 6004. The event bus 6010, in response to receiving the beta $\beta^1$ data subject information finished notification 6025, distributes a gamma $\gamma^q$ data subject information finished notification 6020 to the requesting application 6004. In response to receiving the data subject information finished notification 6020, the requesting application 6004 sends a data subject information results request 6022 to the DPI service 6002 as an alpha $\alpha^r$ invocation of an API of the DPI service 6002. The DPI service 6002 can enable the requesting application 6004 to retrieve the aggregated collected data, in various ways, as described in more detail below.

FIG. 61 is a table 6100 that describes integrated personal data request messages. A data subject information request 6102, represented by $\alpha^i$ 6104, can be sent by a requester to the iPDR orchestrator to request personal data about a data subject. The personal data about the data subject can be represented by an entity of a specific data type, such as a particular instance of a particular master data object. The data subject information request 6102 can be sent using an API of the orchestrator. The requester can receive, as a return value of the API, a request identifier that the requester can later use to map to results of the data subject information request 6102. In some implementations, the orchestrator can generate and return, to the requester, a request secret, that the requester can use to access results of the data subject information request 6102.

The orchestrator can send a data subject information request message 6106, represented by $\beta^n$ 6108, to an event bus for the event bus to forward the data subject information request 6106 to registered applications. The data subject information request 6106 can include the request identifier and timeout value that indicates by which responders are to reply to the data subject information request 6106.

The event bus can deliver a data subject information request message 6110 (e.g., corresponding to the data subject information request 6106), represented by $\gamma^q$ 6112, to each registered application. The data subject information request 6110 can include the request identifier and the timeout value.

Each application that receives the data subject information request message 6110 can collect local data about the requested data subject and send the data about the data subject to the orchestrator as a data subject information response message 6114 (e.g., represented by $\alpha^r$ 6116). The data subject information response message 6114 includes the request identifier.

After collecting data from all responding applications, the orchestrator can a data subject information finished notification 6125, represented by $\beta^1$ 6120, to the event bus, to be forwarded to the requester. The data subject information finished notification 6125 includes the request identifier.

The event bus can forward a data subject information finished notification 6122, represented by $\gamma^q$ 6124, to the requester. The data subject information finished notification 6122 includes the request identifier.

In response to receiving the data subject information finished notification 6122, the requester can use an API of the orchestrator to send an obtain data subject information result message 6126, represented by a" 6128, to the orchestrator. The obtain data subject information result message 6126 includes the request identifier. The orchestrator can provide the collected personal data about the data subject to the requester, in response to the obtain data subject information result message 6126. The requester can use the request secret to access the collected personal data that is included in (or linked by) the response to the obtain data subject information result message 6126.

Figure 62:
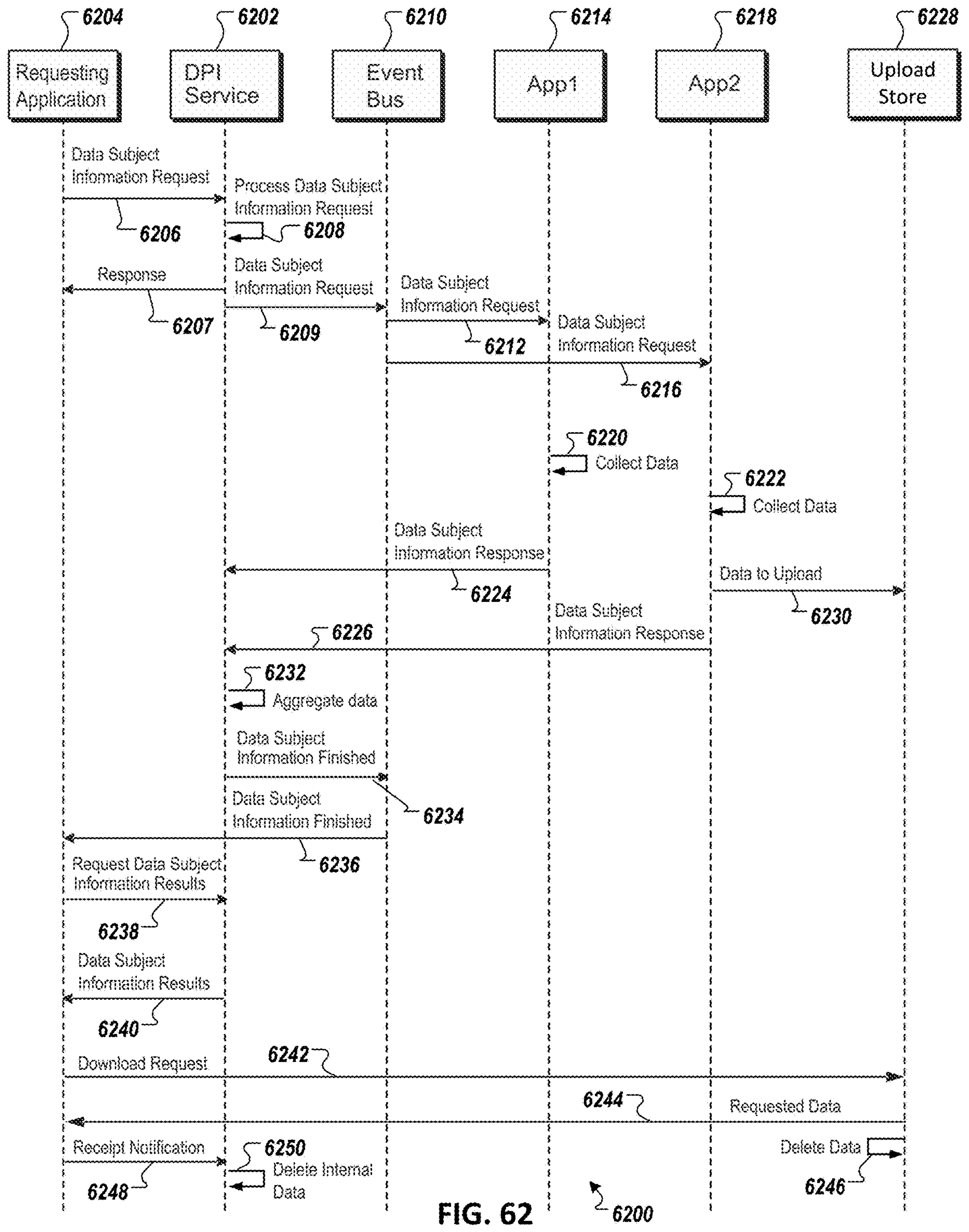
FIG. 62 is a swim lane of an example method for an integrated personal data retrieval process.

FIG. 62 is a swim lane of an example method 6200 for an integrated personal data retrieval process. The iPDR process can be orchestrated by a DPI service 6202. A requesting application 6204 can send a data subject information request 6206 to the DPI service 6202. The data subject information request 6206 can include an object identifier of an object that represents the data subject. For example, the data subject may be represented by a WorkforcePerson, Customer, Partner, or other object instance. The requesting application 6204 can receive, for example, such as from a user interface of the requesting application, identifying information for the data subject, such an Email address, a name, a social security number, or some other identifier. In other cases, the requesting application receiving the data subject identifying information from another process (or an internal process), rather than a user interface. The requesting application 6204 can determine an object identifier that corresponds to the identifying information. In some cases, the object identifier is a global identifier (e.g., as included in a one domain model). In other cases, the requesting application 6204 determines a non-global identifier (e.g., of an object instance of an object type used in the requesting application 6204) and uses an identifier mapper to determine the global identifier. In some cases, the requesting application provides the non-global identifier in the data subject information request 6206 and a downstream component (e.g., the DPI service 6202 or a responding application) determines the global identifier using the identifier mapper.

At 6208, in response to the data subject information request 6206, the DPI service 6202 can process the data subject information request 6206. Processing the data subject information request 6206 can include validating the data subject information request 6206. For example, the DPI service 6202 can verify that the data subject information request 6206 has a correct syntax. As another example, the DPI service 6202 can verify the requesting application 6204 (e.g., that the requesting application 6204, and/or that a user associated with a current session is authorized to make a request for the data subject). For example, the DPI service 6202 can ensure that the user associated with the current session corresponds to the data subject. As another example, the DPI service 6202 can ensure that the requesting application 6204 is registered with the DPI service 6202 as an authorized application.

Other examples include the DPI service 6202 verifying that an object identifier included in the data subject information request 6206 is of a valid object type that uniquely identifies a data subject. Additionally or alternatively, the DPI service 6202 can validate that the object identifier actually refers to an object instance. As mentioned, in some cases, the DPI service 6202 uses an identifier mapper to map a received object identifier to a global object identifier. In some implementations, the DPI service 6202 validates that the requesting application 6204 is a valid application for requesting the data subject information request 6206 using the object type of the object included in the data subject information request 6206. For example, in the landscape, certain applications can be identified as valid applications for requesting a data subject information request using a WorkforcePerson object, for example. Also, a subset of applications may be eligible for making data subject information requests, in general. For instance, as described in more detail below, certain applications, such as third party applications, may be eligible to be responders but not requesters, for data subject information requests. Accordingly, if a third party application submits the data subject information request 6206, the DPI service 6202 can reject the data subject information request 6206.

In response to validating the data subject information request 6206, the DPI service 6202 can send a response 6207 to the requesting application 6204. The response 6207 can include information that the requesting application 6204 can use to later interact with the data subject information request 6206. For example, the response can include a request identifier and a request secret. The requesting application 6204 can use the request identifier and/or the request secret to request a cancellation of the data subject information request 6206, request progress status of the data subject information request 6206, or to requests results of the data subject information request 6206 (as described in more detail below).

Also in response to validating the data subject information request 6206, the DPI service 6202 sends a data subject information request 6209 to an event bus 6210 requesting that the event bus 6210 distribute the data subject information request 6209 to connected applications (e.g., applications that are registered with the DPI service 6202).

The event bus 6210, in response to receiving the data subject information request 6209, distributes a data subject information request 6212 to a first application 6214 and a data subject information request 6216 to a second application 6225. As mentioned above, the event bus 6210 can ensure that messages are received by applications, by attempting retries if needed, etc. Each receiving application can process the respective received data subject information request. For example, each application can verify that sender information in the data subject information request corresponds to a valid DPI service instance. As mentioned, in some cases, the receiving application uses an identifier mapper to map either a non-global object identifier included in the data subject information request to a global identifier or a global identifier included in the data subject information request to an object identifier usable in the respective application.

At 6220, the first application 6214 collects personal data according to the data subject information request 6212. Similarly, at 6222, the second application 6225 collects personal data according to the data subject information request 6216. For example, each application can use local capabilities to collect personal data corresponding to the object identifier included in the received data subject information request. For example, each application can collect data for the object with the object identifier, and data for objects that link to the object identifier. For example, the object identifier may identify a master data object and each application can collect data for the master data object and data for transactional objects that refer to the master data object.

After collecting personal data, each application sends a data subject information response message to the DPI service 6202. For example, the first application 6214 sends a data subject information response message 6224 to the DPI service 6202 and the second application 6225 sends a data subject information response message 6226 to the DPI service 6202. Some collected data (e.g., structured data that can be represented in text format, such as in a JSON (JavaScript Object Notation) format) can be serialized and included in a respective data subject information response message 6224 or 6226. Other data, such as image data, audio data, document data represented in a binary format, other types of non-textual data, or textual data that is larger than a threshold size (e.g., a full textual document, other blocks of unstructured data) can be uploaded by an application to an upload store 6228. For example, the second application 6225 provides data to upload 6230 to the upload store 6228. The second application 6225 can include, in the data subject information response message 6226, information for retrieving uploaded data from the upload store 6228. For example, the data subject information response message 6226 can include link(s) to data on the upload store 6228 or other information that can be used to access data from the upload store 6228. In some cases, the data subject information response message 6226 includes a first set of personal data (e.g., textual data) and link(s) to a second set of non-textual data stored at the upload store 6228. In other cases, when an application uploads data to the upload store 6228, the application includes all personal data it collected in a package that is uploaded to the upload store 6228.

At 6232, after receiving a data subject information response message from each connected application, the DPI service 6202 aggregates the collected data (and, when applicable, link(s) to uploaded data). Aggregating the collected data can include converting information from different data subject information response messages that is in different reporting formats into a common reporting format. Aggregating can also include removing duplicate items in response to multiple, duplicate items being received from different applications. After aggregating the collected data, the DPI service 6202 sends a data subject information finished notification 6234 to the event bus 6210 requesting that the event bus 6210 distribute the data subject information finished notification 6234 to the requesting application 6204. In response to receiving the data subject information finished notification 6234, the event bus 6210 distributes a data subject information finished notification 6236 to the requesting application 6204.

The requesting application 6204 can be an application that itself collects personal data and has provided collected data to the DPI service 6202. For example, the requesting application 6204 can be the first application 6214 or the second application 6220. As another example, the requesting application 6204 can be a separate application that does not store or collect personal data.

In response to receiving the data subject information finished notification 6236, the requesting application 6204 sends a data subject information results request 6238 to the DPI service 6202 to request the aggregated collected data. If the DPI service 6202 has received and currently stores all collected data, the DPI service 6202 can send a data subject information results message 6240 to the requesting application 6204 that includes all of the collected data. As another example, if at least some data has been uploaded by one or more applications to the upload store 6228, the data subject information results message 6240 can include link(s) or other information that enables the requesting application 6204 to submit a download request 6242 to the upload store 6228. In response to the download request 6242, the upload store 6228 can send requested data 6244 (e.g., a copy of requested data) to the requesting application 6204. In cases where non-textual data is returned, the DPI service 6202 or the upload store 6228 can also provide a binary of a viewer or player that can be used to view or access the non-textual data. For example, if the personal data includes x-ray data in a non-textual format, the requesting application 6204 can receive an executable file for a viewer application that the data subject can use to view the x-ray data. As another example, the DPI service 6202 can, for some types of data, perform a data conversion from a first data format to a second data format. For instance, in the example of x-ray data, the DPI service 6202 can invoke a conversion program that can convert the x-ray data to image data, or the DPI service 6202 can perform an image capture of an x-ray view interface and provide an image of the x-ray viewer screen.

At 6246, the upload store 6228 deletes data from the upload store 6228, after sending the requested data 6244 to the requesting application 6204. The upload store 6228 can delete data immediately after sending requested data 6244 or can delete data after a predetermined period of time elapses. For instance, personal data on the upload store 6228 may be available for a predetermined period of time (e.g., one hour, one week, thirty days).

After receiving data from the DPI service 6202 and/or the upload store 6228, the requesting application 6204 can send a receipt notification 6248 to the DPI service 6202 notifying the DPI service 6202 that the requesting application 6204 has received requested data. At 6250, in response to the receipt notification 6248, the DPI service 6202 can delete any internal data that had been stored for the requesting application 6204.

Figure 63:
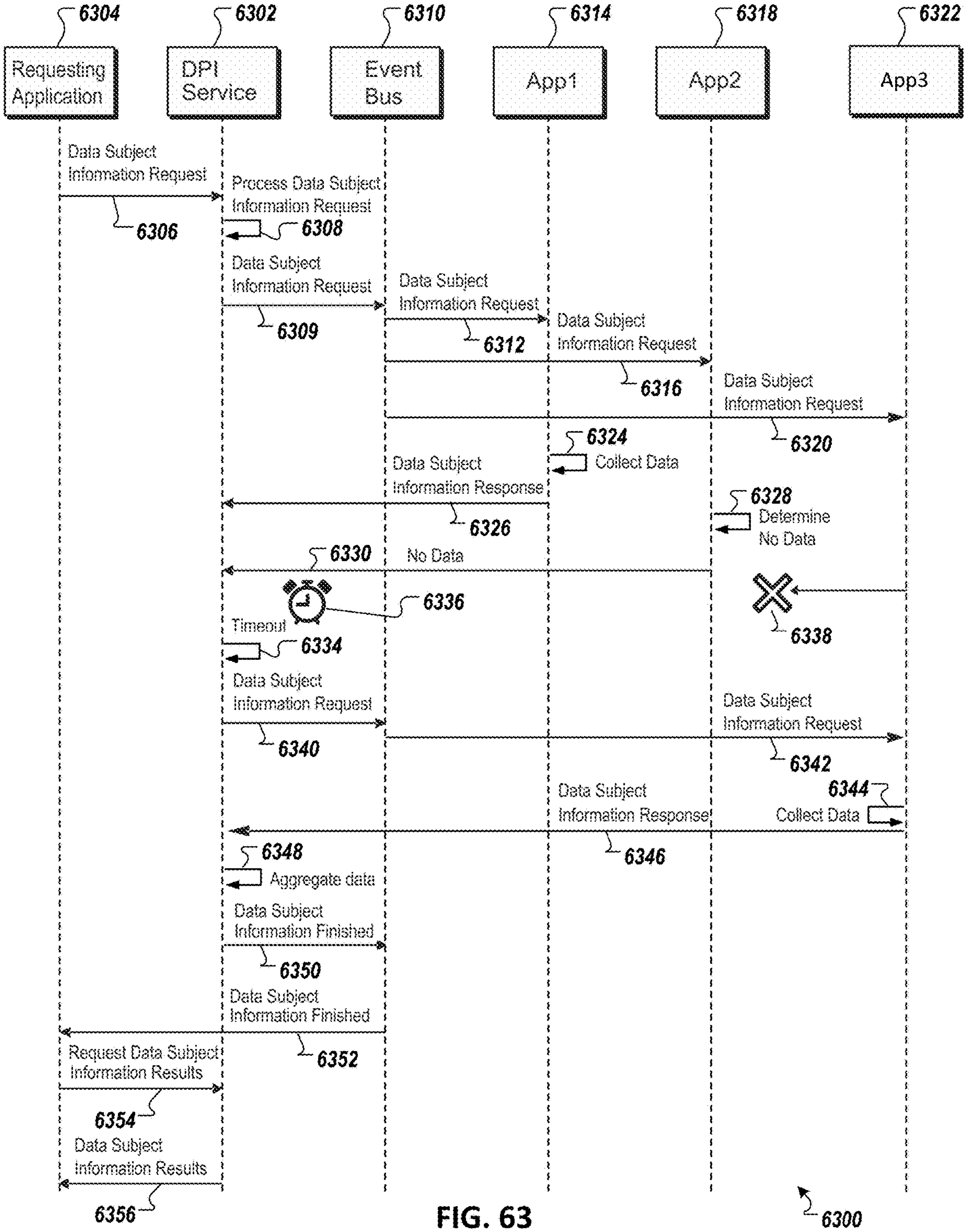
FIG. 63 is a swim lane of an example method for an integrated personal data retrieval process.

FIG. 63 is a swim lane of an example method 6300 for an integrated personal data retrieval process. The iPDR process can be orchestrated by a DPI service 6302. A requesting application 6304 can send a data subject information request 6306 to the DPI service 6302. At 6308, in response to the data subject information request 6306, the DPI service 6302 can process the data subject information request 6306. In response to validating the data subject information request 6306, the DPI service 6302 sends a data subject information request 6309 to an event bus 6310 requesting that the event bus 6310 distribute the data subject information request 6309 to connected applications.

The event bus 6310, in response to receiving the data subject information request 6309, distributes a data subject information request 6312 to a first application 6314, a data subject information request 6316 to a second application 6325, and a data subject information request 6320 to a third application 6322.

At 6324, the first application 6314 collects personal data according to the data subject information request 6312. The first application 6314 sends a data subject information response message 6326 to the DPI service 6302 that includes the data collected by the first application 6314.

At 6328, the second application 6325 determines that the second application 6325 does not include any personal data relating to the data subject of the data subject information request 6316. Accordingly, the second application 6325 sends a no-data indication 6330 to the DPI service 6302.

At 6334, as illustrated by a time icon 6336, the DPI service 6302 detects a timeout event before having received a data subject information response (or a no-data indication) from all connected applications. For example, as illustrated by an icon 6338, the third application 6322 has not sent a data subject information response to the DPI service 6302. For example, although the third application 6322 received the data subject information request 6320, the third application 6322 may now be down.

In some implementations, the DPI service 6302, in response to the timeout event, sends a data subject information finished notification (e.g., the DPI service 6302 may consider data collection completed upon the timeout event, and may not wait any longer for the third application 6322 to respond). In other implementations, the DPI service 6302 can send an error notification to the requesting application 6304 in response to determining that not all connected applications have responded. In general, the DPI service 6302 can manage a state of the data subject information request 6306. For example, the data subject information request 6306 can have a state of initial, being-processed, completed, or in-error. The requesting application 6304 can query the DPI service 6302 for the current state, using the request identifier.

In some implementations, the DPI service 6302 sends a follow-up data subject information request 6340 to the event bus 6310 requesting that the event bus 6310 distribute the follow-up data subject information request 6340 to the third application 6322. The event bus 6310, in response to receiving the follow-up data subject information request 6340, distributes a follow-up data subject information request 6342 to the third application 6322.

At 6344, the third application 6322 collects personal data according to the follow-up data subject information request 6342. The third application 6322 sends a data subject information response message 6346 to the DPI service 6302 that includes the data collected by the third application 6322.

At 6348, the DPI service 6302 aggregates the collected data. After aggregating the collected data, the DPI service 6302 sends a data subject information finished notification 6350 to the event bus 6310 requesting that the event bus 6310 distribute the data subject information finished notification 6350 to the requesting application 6304. In response to receiving the data subject information finished notification 6350, the event bus 6310 distributes a data subject information finished notification 6352 to the requesting application 6304.

In response to receiving the data subject information finished notification 6352, the requesting application 6304 sends a data subject information results request 6354 to the DPI service 6302 to request the aggregated collected data. The DPI service 6302 sends a data subject information results message 6356 to the requesting application 6304 that includes all of the collected data.

Figure 64:
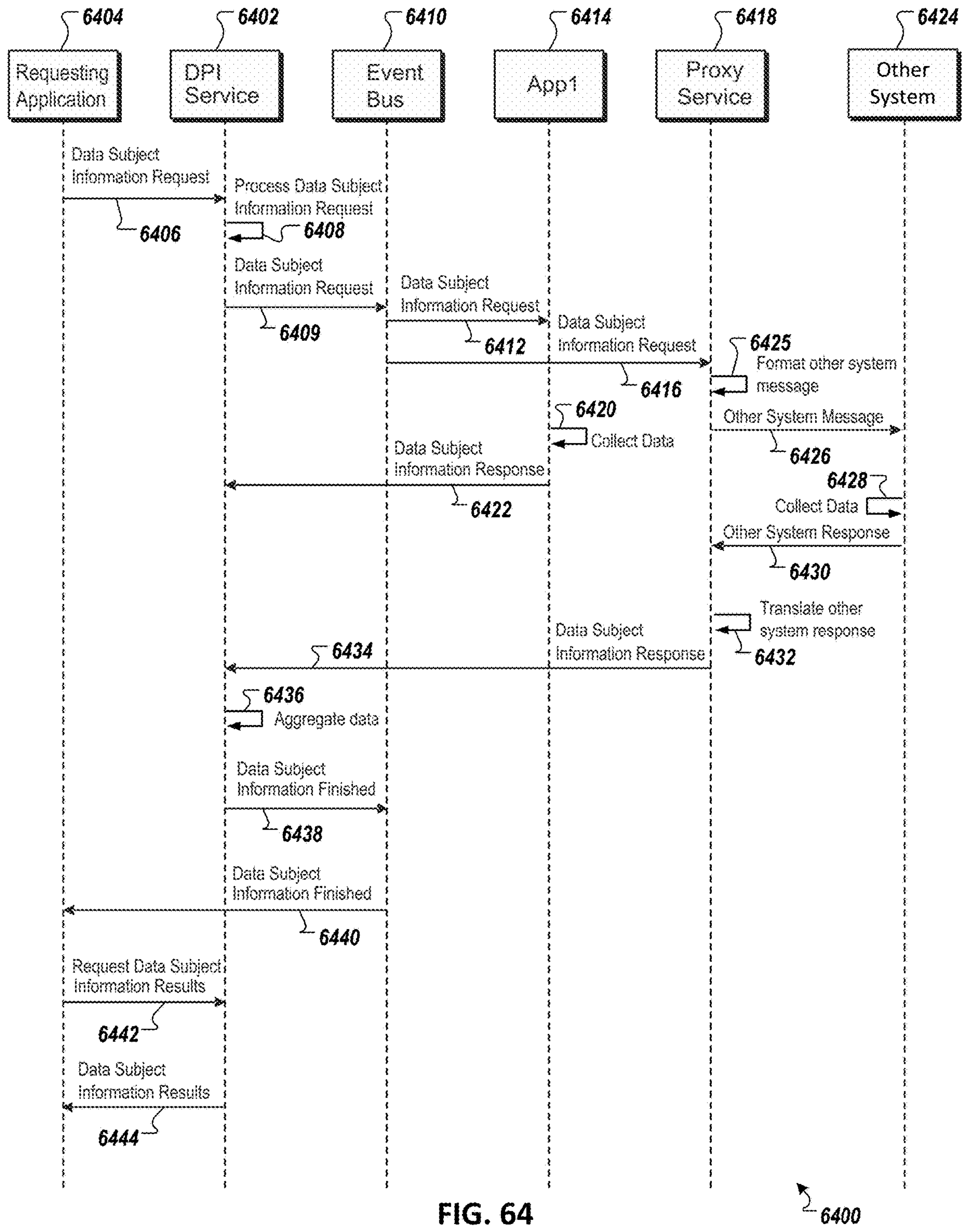
FIG. 64 is a swim lane of an example method for an integrated personal data retrieval process using a proxy service.

FIG. 64 is a swim lane of an example method 6400 for an integrated personal data retrieval process using a proxy service. The iPDR process can be orchestrated by a DPI service 6402. A requesting application 6404 can send a data subject information request 6406 to the DPI service 6402.

At 6408, in response to the data subject information request 6406, the DPI service 6402 can process the data subject information request 6406. In response to validating the data subject information request 6406, the DPI service 6402 sends a data subject information request 6409 to an event bus 6410 requesting that the event bus 6410 distribute the data subject information request 6409 to connected applications. The event bus 6410, in response to receiving the data subject information request 6409, distributes a data subject information request 6412 to a first application 6414 and a data subject information request 6416 to a proxy service 6425. At 6420, the first application 6414 collects personal data according to the data subject information request 6412. The first application 6414 sends a data subject information response message 6422 to the DPI service 6402 that includes the data collected by the first application 6414.

The proxy service 6425 is configured to interface with systems to which the DPI service 6402 (and possibly the event bus 6410) is not integrated. For example, the proxy service 6425 can interface with a system 6424. The system 6424 may be a third party system that is included in the landscape, a legacy system, or some other type of system which cannot be (or isn't currently) directly connected to the DPI service 6402.

At 6425, the proxy service 6425 formats a message to be sent to the system 6424. For example, the proxy service 6425 can translate information in the data subject information request 6416 into a format that is understandable and usable by the system 6424. For example, the proxy service 6425 can perform object identifier mapping, user identifier mapping, and other formatting or translating. The proxy service 6425 can send a message 6426 to the system 6424 that is in a format that is understandable by the system 6424 and which is a request for the system 6424 to collect personal data for the data subject. The message 6426 can include mapped object and/or user identifiers, for example.

At 6428, the system 6424 collects personal data for the data subject. The system 6424 can send a response message 6430 to the proxy service 6425 that includes the collected data. At 6432, the proxy service 6425 translates data in the response message 6430 to a format used for data subject information response messages processed by the DPI service 6402. The proxy service 6425 sends a data subject information response message 6434 to the DPI service 6402 that includes data collected by the system 6424.

At 6436, the DPI service 6402 aggregates the collected data, including data from the first application 6414 and data collected by the system 6424 that is received from the proxy service 6425. After aggregating the collected data, the DPI service 6402 sends a data subject information finished notification 6438 to the event bus 6410 requesting that the event bus 6410 distribute the data subject information finished notification 6438 to the requesting application 6404. In response to receiving the data subject information finished notification 6438, the event bus 6410 distributes a data subject information finished notification 6440 to the requesting application 6404. In response to receiving the data subject information finished notification 6440, the requesting application 6404 sends a data subject information results request 6442 to the DPI service 6402 to request the aggregated collected data. The DPI service 6402 sends a data subject information results message 6444 to the requesting application 6404 that includes all of the collected data, including data received from the first application 6414 and data collected by the system 6424 that was received from the proxy service 6425.

Figure 65:
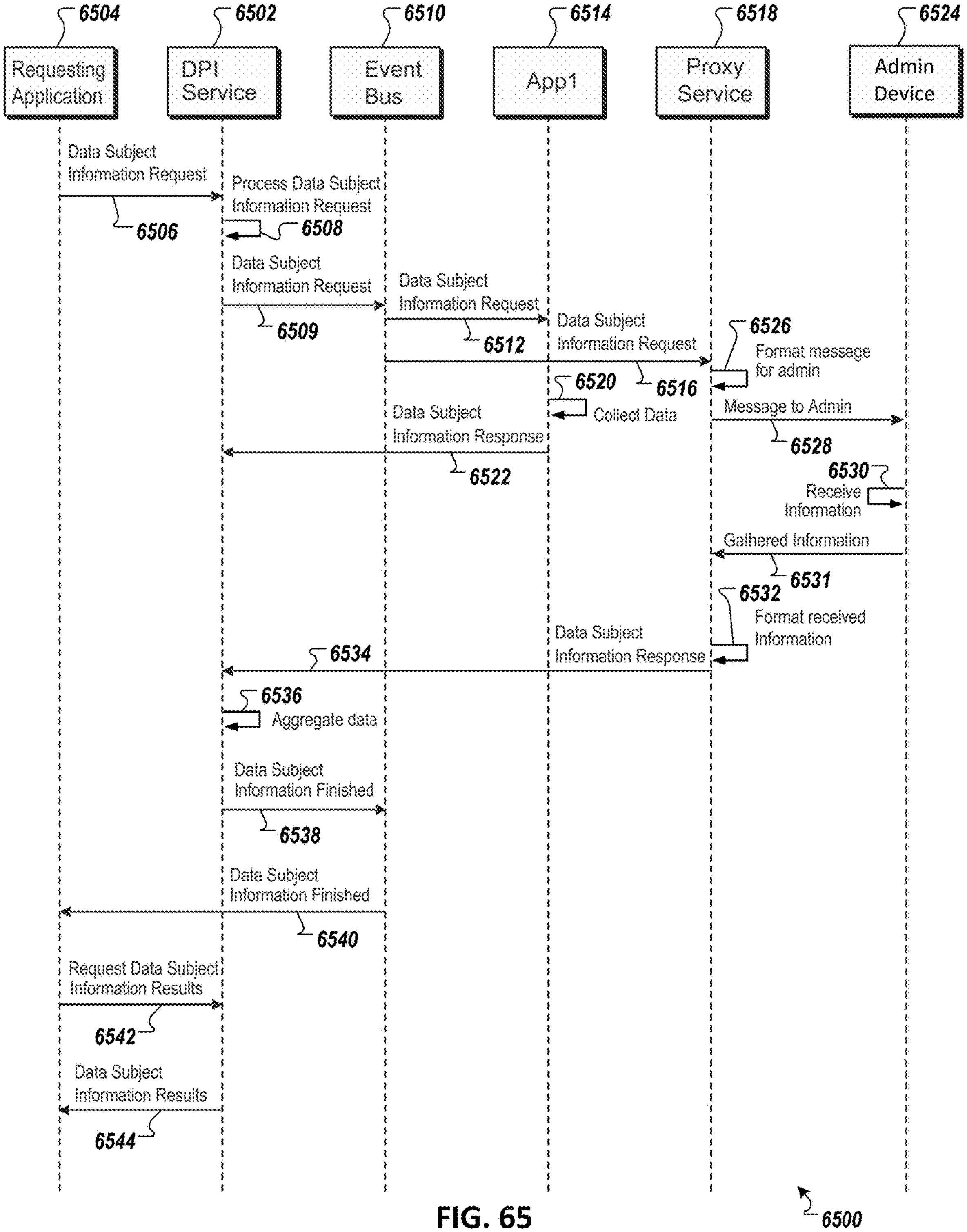
FIG. 65 is a swim lane of an example method for an integrated personal data retrieval process using a proxy service.

FIG. 65 is a swim lane of an example method 6500 for an integrated personal data retrieval process using a proxy service. The iPDR process can be orchestrated by a DPI service 6502. A requesting application 6504 can send a data subject information request 6506 to the DPI service 6502.

At 6508, in response to the data subject information request 6506, the DPI service 6502 can process the data subject information request 6506. In response to validating the data subject information request 6506, the DPI service 6502 sends a data subject information request 6509 to an event bus 6510 requesting that the event bus 6510 distribute the data subject information request 6509 to connected applications. The event bus 6510, in response to receiving the data subject information request 6509, distributes a data subject information request 6512 to a first application 6514 and a data subject information request 6516 to a proxy service 6525. At 6520, the first application 6514 collects personal data according to the data subject information request 6512. The first application 6514 sends a data subject information response message 6522 to the DPI service 6502 that includes the data collected by the first application 6514.

The proxy service 6525 can interface with an administrative device 6524. For example, at 6526, the proxy service 6525 can format a message for an administrator, using information in the data subject information request 6516, that requests the administrator to gather any known personal data for the data subject. The proxy service 6525 can send a formatted message 6528 for the administrator to the administrative device 6524. In response to the formatted message 6528, the administrator can use the administrative device 6524 to gather personal data about the user. For example, the administrator can use one or more applications or web sites that are not directed connected to the DPI service 6502 and collect personal data for the data subject into one or more documents or files. As another example, the administrator can be aware of paper document(s) for the data subject and can use a scanner to scan the paper documents. At 6530, the administrative device 6524 can receive scanned data and/or other document(s) that include data subject data that has been gathered by the administrator.

The administrative device 6524 can send gathered information 6531 for the data subject to the proxy service 6525. In some implementations, such as for scanned documents, the administrative device 6524 can upload information to an upload store and can provide, in the gathered information 6531, link(s) to the uploaded scanned documents.

At 6532, the proxy service 6525 formats the received gathered information 6531 to a format used for data subject information response messages processed by the DPI service 6502. The proxy service 6525 sends a data subject information response message 6534 to the DPI service 6502 that includes data collected by the administrator using the administrative device 6524.

At 6536, the DPI service 6502 aggregates the collected data, including data from the first application 6514 and data collected by the administrator and provided to the proxy service 6525. After aggregating the collected data, the DPI service 6502 sends a data subject information finished notification 6538 to the event bus 6510 requesting that the event bus 6510 distribute the data subject information finished notification 6538 to the requesting application 6504. In response to receiving the data subject information finished notification 6538, the event bus 6510 distributes a data subject information finished notification 6540 to the requesting application 6504. In response to receiving the data subject information finished notification 6540, the requesting application 6504 sends a data subject information results request 6542 to the DPI service 6502 to request the aggregated collected data. The DPI service 6502 sends a data subject information results message 6544 to the requesting application 6504 that includes all of the collected data, including data received from the first application 6514 and data collected by the administrator and provided to the proxy service 6525.

Figure 66:
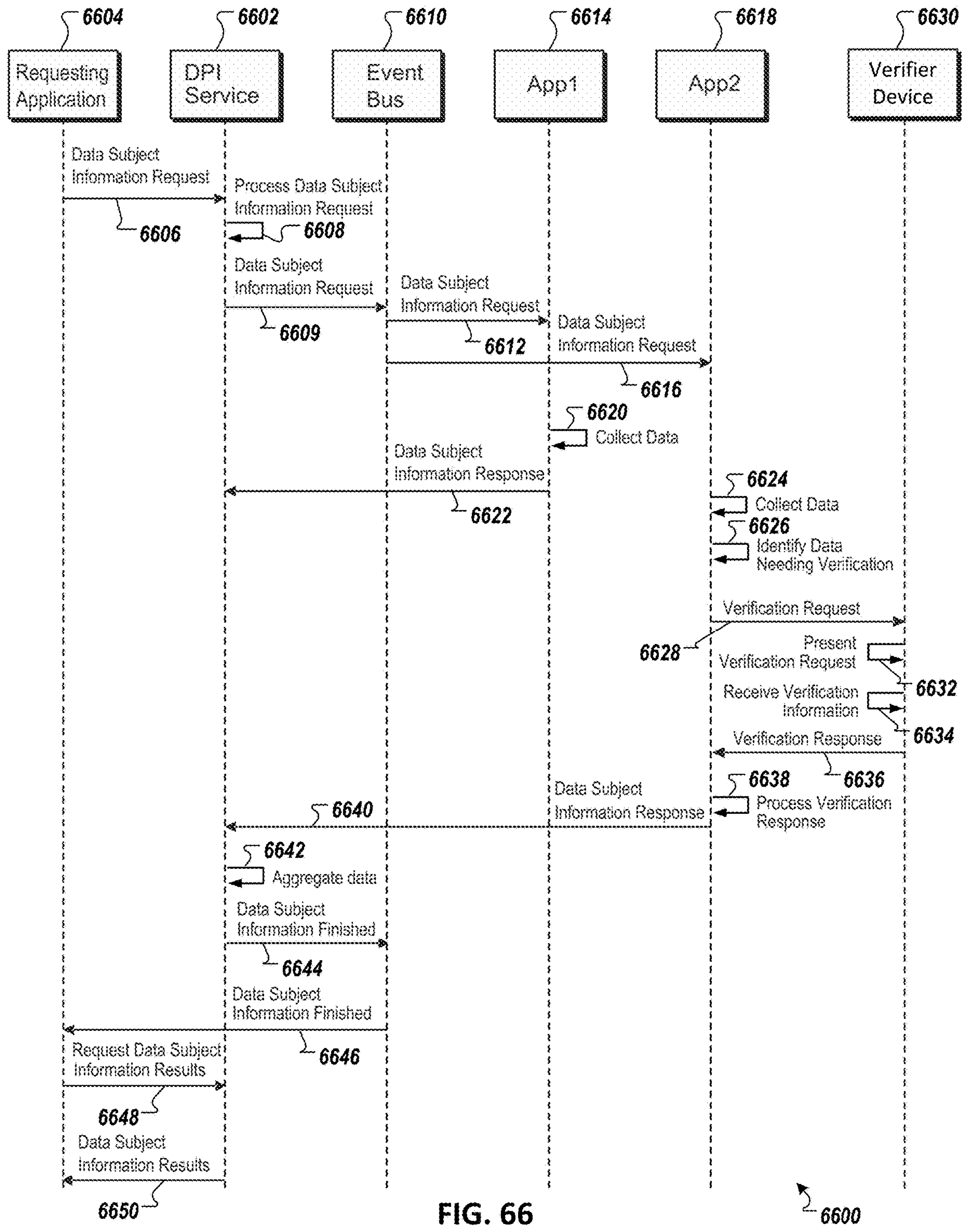
FIG. 66 is a swim lane of an example method for an integrated personal data retrieval process that includes verification.

FIG. 66 is a swim lane of an example method 6600 for an integrated personal data retrieval process that includes verification. The iPDR process can be orchestrated by a DPI service 6602. A requesting application 6604 can send a data subject information request 6606 to the DPI service 6602. At 6608, in response to the data subject information request 6606, the DPI service 6602 can process the data subject information request 6606. In response to validating the data subject information request 6606, the DPI service 6602 sends a data subject information request 6609 to an event bus 6610 requesting that the event bus 6610 distribute the data subject information request 6609 to connected applications. The event bus 6610, in response to receiving the data subject information request 6609, distributes a data subject information request 6612 to a first application 6614 and a data subject information request 6616 to a second application 6625. At 6620, the first application 6614 collects personal data according to the data subject information request 6612. The first application 6614 sends a data subject information response message 6622 to the DPI service 6602 that includes the data collected by the first application 6614.

At 6624, the second application 6625 collects personal data according to the data subject information request 6616. At 6626, the second application 6625 identifies data (e.g., some or all of the data collected by the second application 6625) as needing verification by a human expert. For example, some data first identified as personal data pertaining to a data subject may need to be excluded from being provided to the data subject if providing the data would violate laws or personal rights of other people. For instance, the second application 6625 may include data about mandated payroll withdrawal payments from a first party to be provided to a second party (e.g., an ex-spouse). A data subject information request received from the first party should not include personal data (e.g., bank account information) for the second party, even though the second application 6625 may associate the bank account information for the second party with the first party in data stored by the second application 6625. The data needing verification by a human expert can be identified in various ways, such as by evaluating different rules or by identifying data that has been previously flagged as needing verification before being provided in response to a data subject information request. Another example of data that may need verifying is an audio file. An audio file may include recorded voice of the data subject but may also include recorded voices of other people who have not given consent for their recorded voices to be distributed.

In response to identifying data needing verification by a human expert, the second application 6625 generates and sends a verification request 6628 to a verifier device 6630 of a human expert. In some implementations, the verifier device 6630 corresponds to a local expert who has specific knowledge of the second application 6625 who is therefore qualified to handle verification requests pertaining to the second application 6625. Having a local expert handle application-specific verification requests on demand can result in more accurate verification as compared to a central human user who is tasked with handling verification of verification requests sent from multiple applications. Additionally, performing verification in response to specific application requests can be more efficient as compared to a verifier unconditionally verifying a larger amount of data from multiple applications.

At 6632, the verification request is presented to the human expert on the verifier device 6630. At 6634, the verifier device 6630 receives verification information from the human expert. The verification information can indicate whether or which data referenced in the verification request 6628 can be included in a response to the data subject information request 6616. The verification information can be included in a verification response 6636 that the verifier device 6630 sends to the second application 6625. At 6638, the second application 6625 processes the verification response 6636. Processing the verification response 6636 can involve including information that the human expert verified as allowable in a data subject information response message and/or excluding information that the human expert marked as not allowable from the data subject information response message. After processing the verification response 6636, the second application 6625 sends a data subject information response message 6640 to the DPI service 6602.

At 6642, the DPI service 6602 aggregates the collected data, including data from the first application 6614 and data from the second application 6625 that may include data that has been verified by the human expert. After aggregating the collected data, the DPI service 6602 sends a data subject information finished notification 6644 to the event bus 6610 requesting that the event bus 6610 distribute the data subject information finished notification 6644 to the requesting application 6604. In response to receiving the data subject information finished notification 6644, the event bus 6610 distributes a data subject information finished notification 6646 to the requesting application 6604. In response to receiving the data subject information finished notification 6646, the requesting application 6604 sends a data subject information results request 6648 to the DPI service 6602 to request the aggregated collected data. The DPI service 6602 sends a data subject information results message 6650 to the requesting application 6604 that includes all of the collected data, including data received from the first application 6614 and data from the second application 6625 that may include data that has been verified by the human expert.

Figure 67:
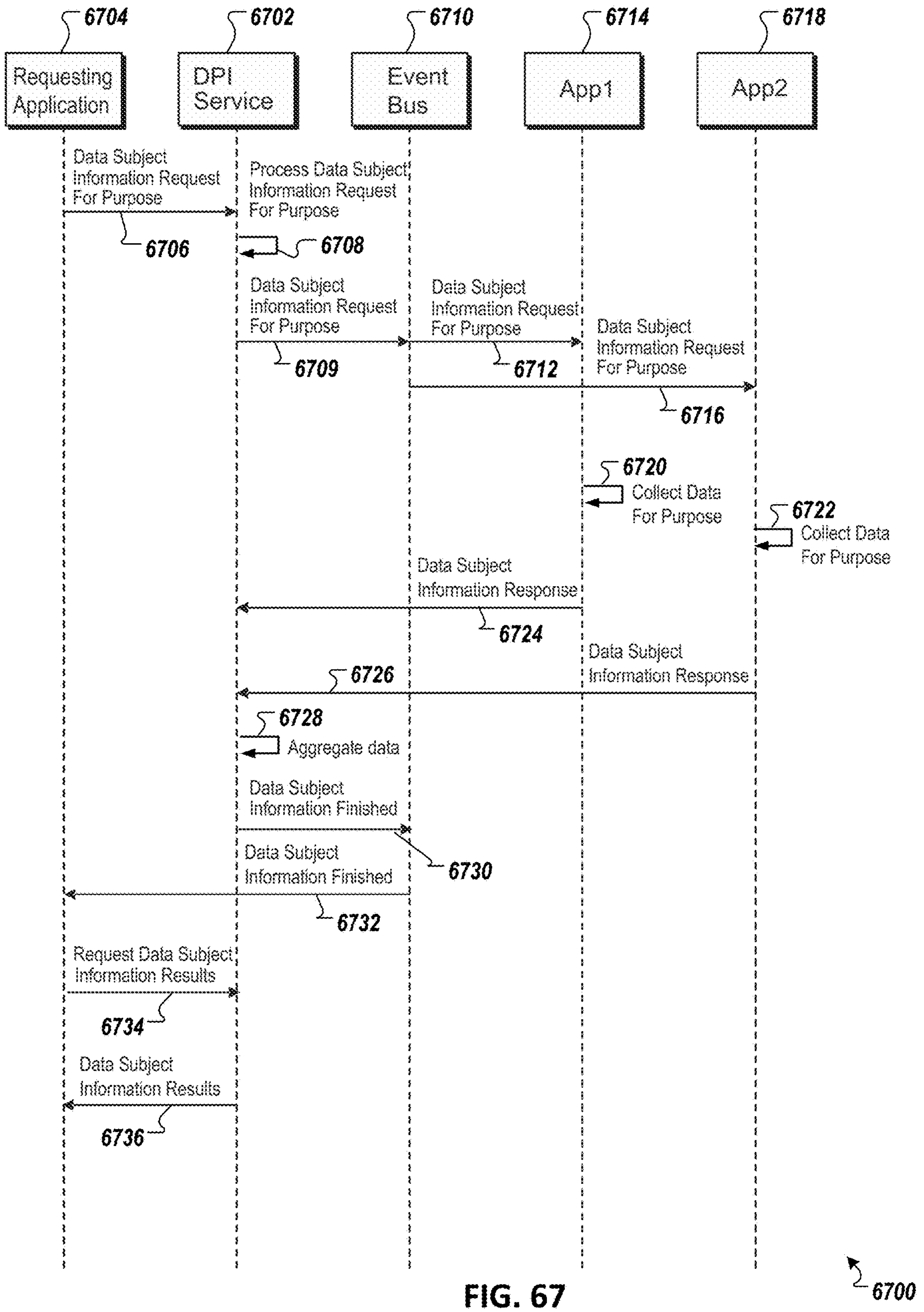
FIG. 67 is a swim lane of an example method for an integrated personal data retrieval process for data associated with a purpose.

FIG. 67 is a swim lane of an example method 6700 for an integrated personal data retrieval process for data associated with a purpose. The iPDR process can be orchestrated by a DPI service 6702. A requesting application 6704 can send a data subject information request for a purpose 6706 to the DPI service 6702. Although described as being for a single purpose, the data subject information request for a purpose 6706 can be for more than one purpose. The requesting application 6704 can enable a data subject to select one or more purposes for which data about the data subject is (or has been) processed, to filter data returned from an information request to only include data associated with the selected purpose(s). For example, a medical patient may choose to select a purpose of a particular medical visit or medical procedure, to request from a system any data that the system has about the patient regarding the selected visit or procedure. Enabling a user to request data related to a particular purpose can result in processing time and storage efficiencies, as compared to a user requesting and receiving all personal data when they actually only are interested in a certain subset.

At 6708, in response to the data subject information request for a purpose 6706, the DPI service 6702 can process the data subject information request for a purpose 6706. Processing the data subject information request for a purpose 6706 can include validating the data subject information request for a purpose 6706.

In response to validating the data subject information request for a purpose 6706, the DPI service 6702 sends a data subject information request for a purpose 6709 to an event bus 6710 requesting that the event bus 6710 distribute the data subject information request for a purpose 6709 to connected applications. The event bus 6710, in response to receiving the data subject information request for a purpose 6709, distributes a data subject information request for a purpose 6712 to a first application 6714 and a data subject information request for a purpose 6716 to a second application 6725.

At 6720, the first application 6714 collects personal data according to the data subject information request for a purpose 6712, by collecting data in the first application 6714 that is associated with the indicated purpose. Similarly, at 6722, the second application 6725 collects personal data according to the data subject information request for a purpose 6716, by collecting data in the second application 6725 that is associated with the indicated purpose.

After collecting personal data associated with the indicated purpose, each application sends a data subject information response message to the DPI service 6702 that includes (or links to) the collected associated with the indicated purpose. For example, the first application 6714 sends a data subject information response message 6724 to the DPI service 6702 and the second application 6725 sends a data subject information response message 6726 to the DPI service 6702.

At 6728, after receiving a data subject information response message from each connected application, the DPI service 6702 aggregates the collected data, with each item in the aggregated collected data being associated with the selected purpose. After aggregating the collected data, the DPI service 6702 sends a data subject information finished notification 6730 to the event bus 6710 requesting that the event bus 6710 distribute the data subject information finished notification 6730 to the requesting application 6704. In response to receiving the data subject information finished notification 6730, the event bus 6710 distributes a data subject information finished notification 6732 to the requesting application 6704. In response to receiving the data subject information finished notification 6732, the requesting application 6704 sends a data subject information results request 6734 to the DPI service 6702 to request the aggregated collected data that is associated with the selected purpose. The DPI service 6702 sends a data subject information results message 6736 to the requesting application 6704 that includes all of the collected data that is associated with the selected purpose.

Figure 68:
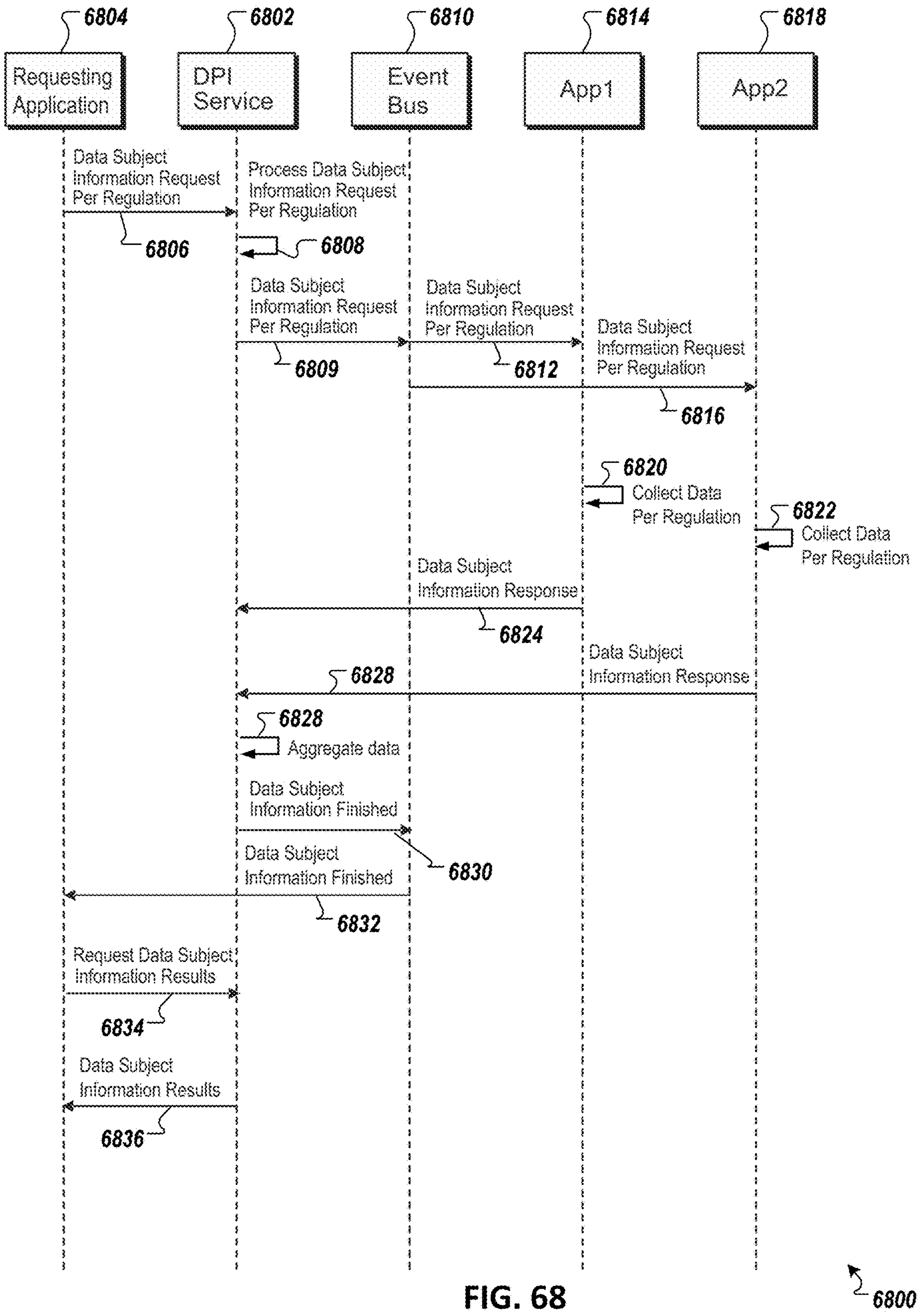
FIG. 68 is a swim lane of an example method for an integrated personal data retrieval process for data associated with a particular regulation.

FIG. 68 is a swim lane of an example method 6800 for an integrated personal data retrieval process for data associated with a particular regulation. The iPDR process can be orchestrated by a DPI service 6802. A requesting application 6804 can send a data subject information request corresponding to a regulation 6806 (e.g., per a regulation) to the DPI service 6802. Although described as corresponding to a single regulation, the data subject information request corresponding to a regulation 6806 can be for more than one regulation. The requesting application 6804 can enable a data subject to select one or more regulations that guide collection or retrieval of personal, to filter data returned from an information request to only include data associated with the selected regulation(s). Applications in the landscape may be configured to collect, store, and provide personal data according to different regulations. For example, different regulations may stipulate that different types of data are to be considered personal data. As another example, different regulations may have different rules for stipulating which data about a data subject is to be (or must be) provided in response to a data subject information request.

At 6808, in response to the data subject information request corresponding to a regulation 6806, the DPI service 6802 can process the data subject information request corresponding to a regulation 6806. Processing the data subject information request corresponding to a regulation 6806 can include validating the data subject information request corresponding to a regulation 6806.

In response to validating the data subject information request corresponding to a regulation 6806, the DPI service 6802 sends a data subject information request corresponding to a regulation 6809 to an event bus 6810 requesting that the event bus 6810 distribute the data subject information request corresponding to a regulation 6809 to connected applications. The event bus 6810, in response to receiving the data subject information request corresponding to a regulation 6809, distributes a data subject information request corresponding to a regulation 6812 to a first application 6814 and a data subject information request corresponding to a regulation 6816 to a second application 6825.

At 6820, the first application 6814 collects personal data according to the data subject information request corresponding to a regulation 6812, by collecting data in the first application 6814 according to the regulation. Similarly, at 6822, the second application 6825 collects personal data according to the data subject information request corresponding to a regulation 6816, by collecting data in the second application 6825 according to the regulation.

After collecting personal data in accordance with the indicated regulation, each application sends a data subject information response message to the DPI service 6802 that includes (or links to) the collected according to the regulation. For example, the first application 6814 sends a data subject information response message 6824 to the DPI service 6802 and the second application 6825 sends a data subject information response message 6826 to the DPI service 6802.

Although FIG. 68 is illustrated as the receiving applications receiving the indicated regulation, in some implementations and for some applications, an application may, in general, for a data subject information request (e.g., a request for which a data is not specified), determine that certain data is to be collected based on a particular regulation. In such cases, the application can include metadata that indicates which regulation was a basis for providing certain data in a respective data subject information response. Other metadata that may describe other details of personal data collection can also be included in the data subject information response. For example, metadata can describe a meaning of one or more object fields that are included in the data subject information response.

At 6828, after receiving a data subject information response message from each connected application, the DPI service 6802 aggregates the collected data, with each item in the aggregated collected data being provided according to the regulation. After aggregating the collected data, the DPI service 6802 sends a data subject information finished notification 6830 to the event bus 6810 requesting that the event bus 6810 distribute the data subject information finished notification 6830 to the requesting application 6804. In response to receiving the data subject information finished notification 6830, the event bus 6810 distributes a data subject information finished notification 6832 to the requesting application 6804. In response to receiving the data subject information finished notification 6832, the requesting application 6804 sends a data subject information results request 6834 to the DPI service 6802 to request the aggregated collected data that corresponds to the selected regulation. The DPI service 6802 sends a data subject information results message 6836 to the requesting application 6804 that includes all of the data that was collected according to the selected regulation.

Figure 69:
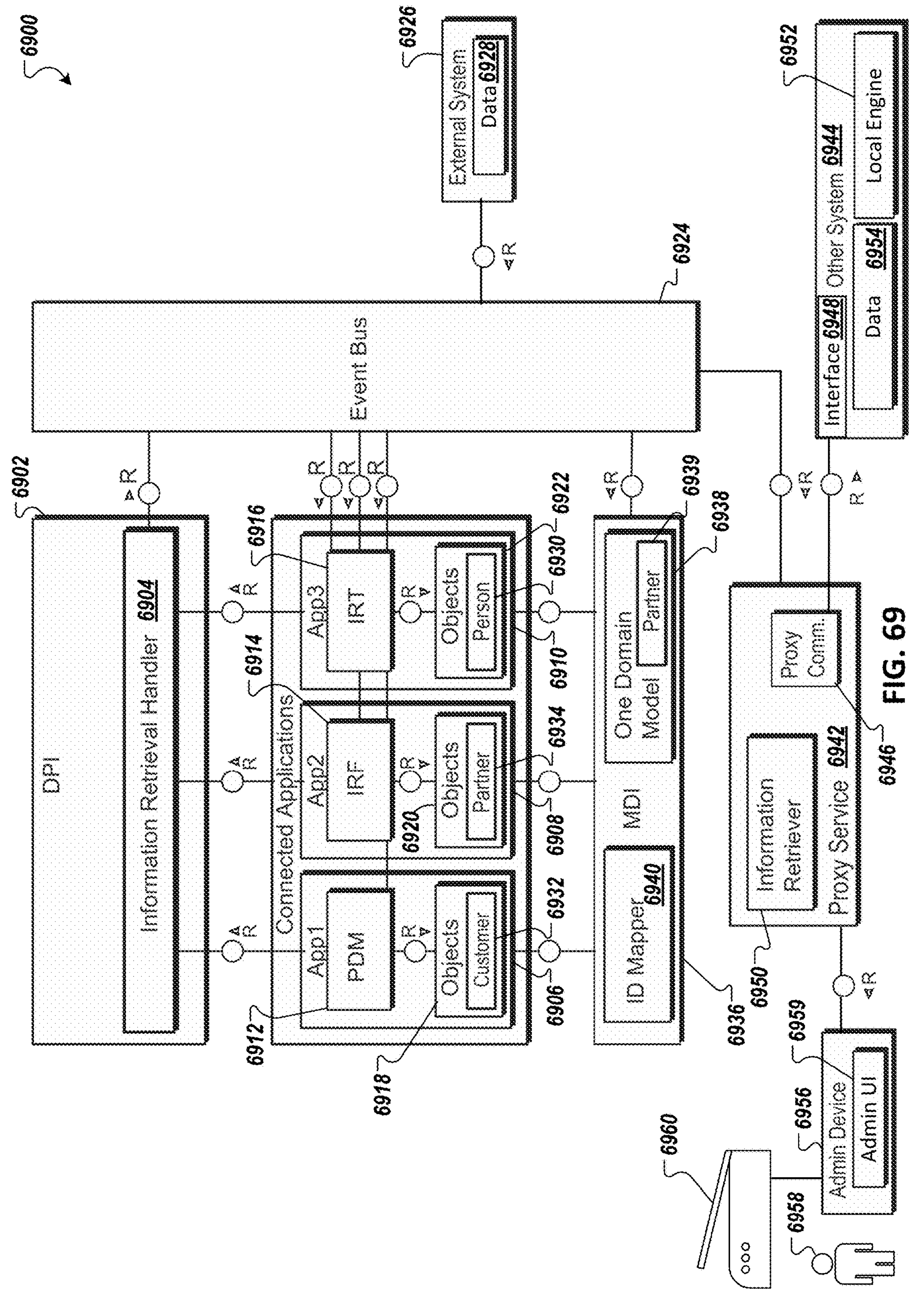
FIG. 69 illustrates an example system for integrated personal data retrieval.

FIG. 69 illustrates an example system 6900 for integrated personal data retrieval. A DPI service 6902 can include an information retrieval handler 6904 (among other components). The information retrieval handler 6904 can handle integrated personal data retrieval for connected applications 6905 that include a first application 6906, a second application 6908, and a third application 6910. Each application in the connected applications 6905 includes a local personal data information retrieval component. For example, the first application 6906 includes a PDM component 6912, the second application 6908 includes an IRF component 6914, and the third application 6910 includes an IRT component 6916. The PDM component 6912, the IRF component 6914, and the IRT component 6916 each can retrieve personal data from a local object store 6925, 6920, or 6922, respectively, in response to an integrated request for personal information that is received from the information retrieval handler 6904 via an event bus 6924.

Any of the connected applications 6905 can receive a personal data request from a user. The connected application that receives the personal data request can submit a request for integrated personal data retrieval to the information retrieval handler 6904. The information retrieval handler 6904 can send, via the event bus 6924, a request for personal data to each of the connected applications 6905 and also other applications, such as an external system 6926. For example, the external system 6926 can respond to requests for personal data (e.g., by providing personal data from a data store 6928) but cannot initiate the integrated personal data retrieval process.

The connected application (e.g., the third application 6910) that initiates the integrated personal data retrieval process can provide an object identifier of an object that represents the data subject for which personal data is to be retrieved. For example, the third application can provide an identifier of a person object 6930 (e.g., a WorkforcePerson object). The data subject may be represented by other objects in other systems. For example, the data subject may be represented as a customer object 6932 in the first application 6906 and/or a partner object 6934 in the second application 6908.

As described above, objects and data can be replicated in the system 6900 using a MDI system 6936. Additionally, a one domain model 6938 can provide a global object layer so that a global partner object 6939 can represent each of the person object 6930, the customer object 6932, and the partner object 6934 throughout the system 6900. Accordingly, if the third application 6910 initiates the integrated personal data retrieval process, the third application 6910 can provide an identifier of the global partner object 6939 to the information retrieval handler 6904 to identify the data subject for the request. As another example, the third application 6910 can provide an identifier of the person object 6930 and an identifier mapper 6940 can be used (e.g., by the initiating application, the responding applications, and/or the information retrieval handler 6904) to map the identifier of the person object 6930 to the global partner object 6934 or to a local object in another application.

In some cases a proxy service 6942 can be used to obtain personal data from systems that are not directly connected to the information retrieval handler 6904. For example, a system 6944 may not be configured to interface with the information retrieval handler 6904. A communication component 6946 of the proxy service 6942 can configured to communicate with the system 6944 using an interface 6948. An information retriever 6950 of the proxy service 6942 can receive requests for personal data over the event bus 6924 from the information retrieval handler 6904 (e.g., in a same manner as for the connected applications 6905). Upon receiving a personal data request, the information retriever 6950 can send a request, using the communication component 6946, to the system 6944, requesting the system 6944 to retrieve personal data for a data subject. A local engine 6952 of the system 6944 can retrieve local personal data 6954 and send the retrieved local personal data to the proxy service 6942. The proxy service 6942 can respond to the request for personal data, to the information retrieval handler 6904, on behalf of the system 6944.

As another example, the proxy service 6942 can forward a request for personal data to an administrative device 6956. An administrator 6958 can view details about the request for personal data (e.g., using a user interface 6959) and can take one or more manual actions to retrieve personal data in response to the request. For example, the administrator 6958 can use a scanner 6960 to scan paper document(s) that include personal data. The administrative device 6956 can send personal data that has been manually obtained by the administrator 6958 to the proxy service 6942. The proxy service 6942 can respond to the request for personal data received from the information retrieval handler 6904, on behalf of the administrator 6958. The administrative device 6956 can be used for other functions, such as to intervene in error handling situations, provide manual verification of personal data, or other activities.

Figure 70:
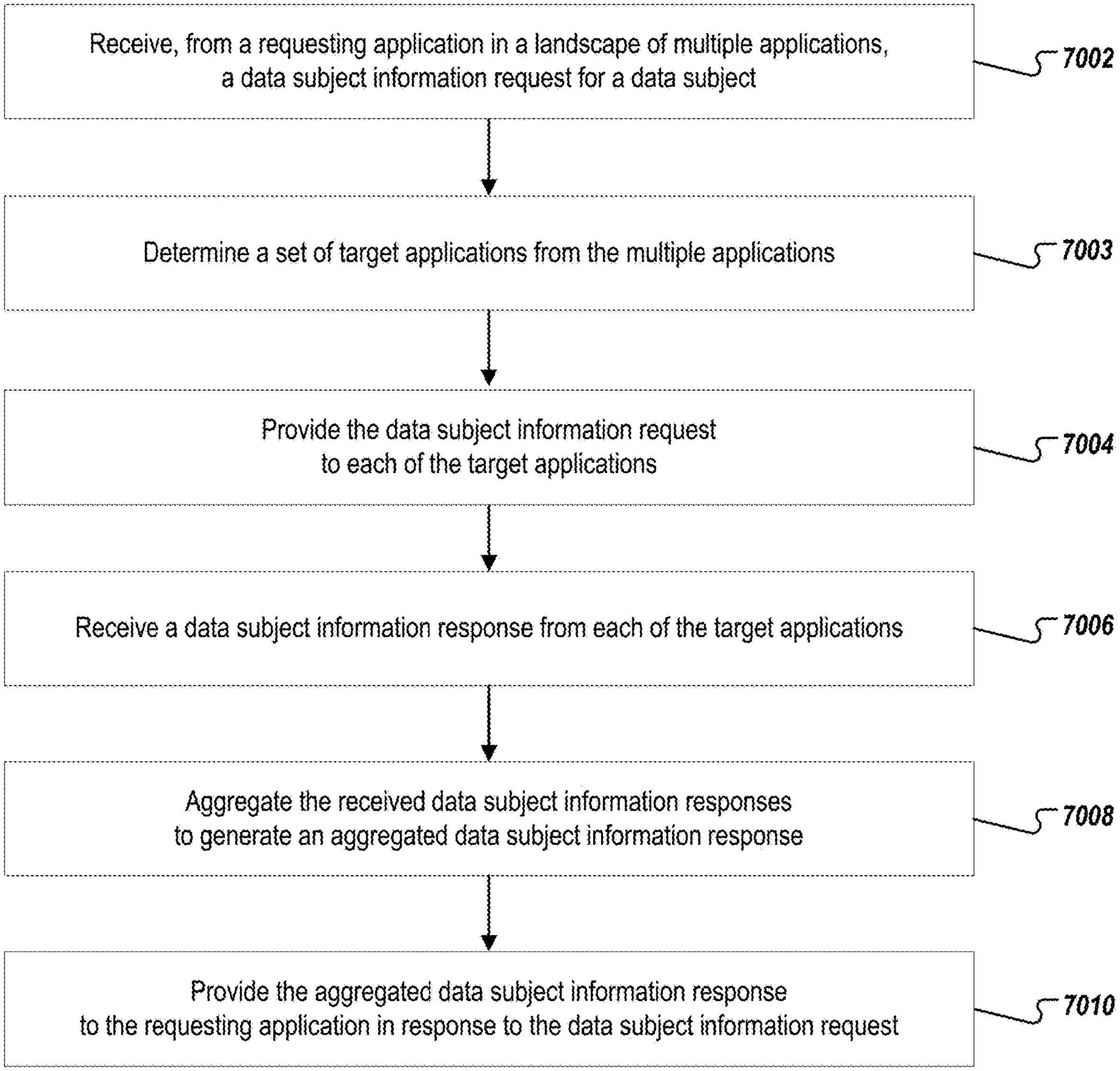
FIG. 70 is a flowchart of an example method for integrated personal data retrieval.

FIG. 70 is a flowchart of an example method 7000 for integrated personal data retrieval. It will be understood that method 7000 and related methods may be performed, for example, by any suitable system, environment, software, and hardware, or a combination of systems, environments, software, and hardware, as appropriate. For example, one or more of a client, a server, or other computing device can be used to execute method 7000 and related methods and obtain any data from the memory of a client, the server, or the other computing device. In some implementations, the method 7000 and related methods are executed by one or more components of the system 100 described above with respect to FIG. 1. For example, the method 7000 and related methods can be executed by the server 102 of FIG. 1.

At 7002, a data subject information request for a data subject is received from a requesting application in a landscape of multiple applications. The data subject information request can include an object identifier of a master data object instance that uniquely identifies the data subject. The master data object instance can be included in a domain model that is used by multiple of the multiple applications. The master data object instance can be mapped to an object identifier of an object that is included in a domain model that is used by multiple of the multiple applications. The data subject information request can include a purpose indicator of a purpose.

At 7003, a set of target applications is determined from the multiple applications. For example, an administrator may have configured a mapping of master data object instances, or types of master data objects, to a subset of the multiple applications that may have data for the data subject. The subset of the multiple applications can be identified as the set of target applications that are to receive the data subject information request.

At 7004, the data subject information request is provided to each of the target applications. For example, the data subject information request can be provided to the target applications using messaging middleware.

At 7006, a data subject information response is received from each of the target applications. Each data subject information response includes application data for the data subject that was retrieved by a respective application in response to the data subject information request. A data subject information response can include transactional data that references the master data object instance. The transactional data can include serialized textual data and/or non-textual data. A data subject information response can include a link to data subject data that an application uploaded to a repository in response to the data subject information request. A data subject information response can be received from the requesting application. A data subject information response can include data subject information that has been verified by a human expert in response to a request from an application. When the data subject information request includes a purpose indicator, the received data subject information responses can include data subject data that is being processed for the purpose. The received data subject information responses can include data subject data that respective applications are obligated to provide according to one or more data regulations.

At 7008, the received data subject information responses are aggregated to generate an aggregated data subject information response.

At 7030, the aggregated data subject information response is provided to the requesting application in response to the data subject information request.

Figure 71:
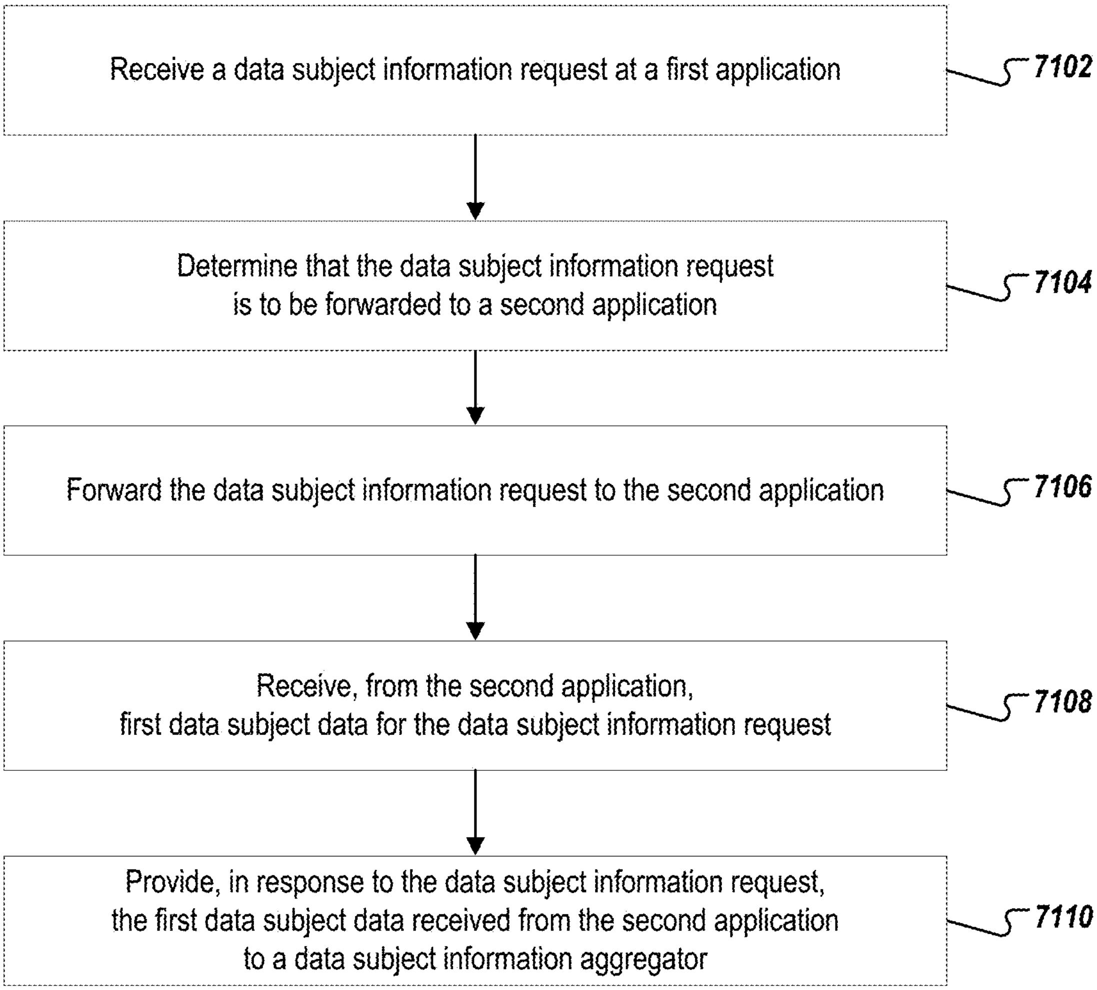
FIG. 71 is a flowchart of an example method for forwarding a data subject information request.

FIG. 71 is a flowchart of an example method 7100 for forwarding a data subject information request. It will be understood that method 7100 and related methods may be performed, for example, by any suitable system, environment, software, and hardware, or a combination of systems, environments, software, and hardware, as appropriate. For example, one or more of a client, a server, or other computing device can be used to execute method 7100 and related methods and obtain any data from the memory of a client, the server, or the other computing device. In some implementations, the method 7100 and related methods are executed by one or more components of the system 100 described above with respect to FIG. 1. For example, the method 7100 and related methods can be executed by the server 102 of FIG. 1.

At 7102, a data subject information request for data corresponding to a data subject is received, from a data subject information aggregator, at a first application in a multiple-application landscape. The data subject information request is also received by multiple other applications in the multiple-application landscape.

At 7104, a determination is made that the data subject information request is to be forwarded to a second application that is different from the first application and different from the multiple other applications. The second application can be a verification application used by a human verifier. Determining that the data subject information request is to be forwarded to the second application can include identifying, in the first application, second data subject data corresponding to the data subject and determining that the second data subject data requires verification by a human verifier. As another example, the second application can be an administrative application used by an administrator on an administrative device. As yet another example, the first application can be a proxy application and the second application can be an application that is external to and not connected to the data subject information aggregator.

At 7106, the data subject information request is forwarded to the second application. The data subject information request to a first format understandable by the second application before the data subject information request is forwarded to the second application.

At 7108, first data subject data for the data subject information request is received, from the second application. The first data subject data can be received from the second application as verified data subject data that has been verified by the human verifier. As another example, the first data subject data received from the second application can be data subject data that has been manually obtained by the administrator. The data subject data that has been manually obtained by an administrator can image data of scanned document data pertaining to the data subject. As another example, the data subject data that has been manually obtained by the administrator can include data manually obtained by the administrator using an application on the administrative device.

At 7130, the first data subject data received from the second application is provided, in response to the data subject information request, to the data subject information aggregator. The first data subject data received from the second application can be translated to a second format understandable by the data subject information aggregator before the first data subject data is provided to the data subject information aggregator in response to the data subject information request. The data subject information aggregator combines the first data subject data received from the second application with other data subject data received from the multiple other applications.

Other Redistribution Scenarios

Figure 72:
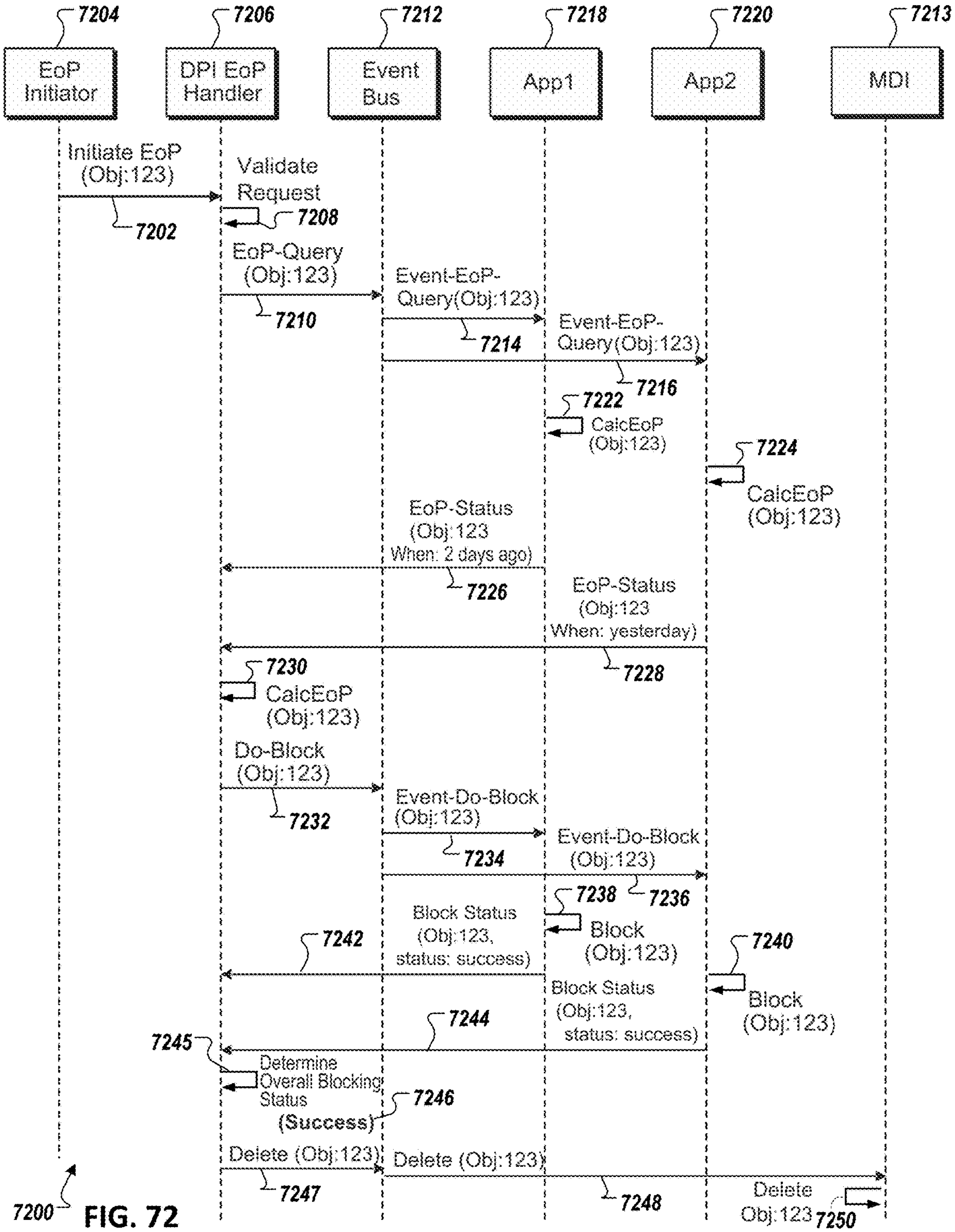
FIG. 72 is a swim lane diagram of an example method \ for an integrated end of purpose status check using a middleware distribution service.

FIG. 72 is a swim lane diagram of an example method 7200 for an integrated end of purpose status check using a middleware distribution service. At 7202, an EoP initiator 7204 sends an EOP initialization message to an EoP handler 7206 (e.g., a DPI service) for a master data object with an object identifier of "123". At 7208, the EoP handler 7206 validates the EOP initialization message. At 7210, the EoP handler 7206 sends an EoP-query message to an event bus 7212. The event bus 7212 broadcasts the EoP-query message to all connected applications except for a distribution service (e.g., a MDI service 7213). For example, at 7214 and 7216, the event bus 7212 forwards the EoP-query message to a first application 7218 and a second application 7220, respectively, but not to the MDI service 7213. The MDI service 7213 can have a copy of the master data object but in this example does not participate in end-of-purpose voting. An implied vote for the MDI service 7213 can be that the MDI service can always vote end-of-purpose for the master data object. The MDI service 7213 can maintain the master data object in case the object needs to be redistributed, as described in more detail in following figures. As described below, the MDI service 7213 can be instructed to delete the master data object if the EoP handler 7206 determines that each application has successfully blocked the object.

For example, a local blocking component of each application that receives the EoP-query message can perform a local end-of-purpose check to determine an EoP status of the master data object in the respective application. For example, at 7222 and 7224, local blocking components of the first application 7218 and the second application 7220 perform local EoP calculations for the master data object, respectively. The local EoP calculations can include determining a timestamp that indicates when end of purpose has been or will be reached.

Each connected application can send a calculated EoP status by making direct API calls to the EoP handler 7206. The EoP status can indicate whether the EoP check was successful and can include a timestamp of the EoP date. For example, at 7226 and 7228, the first application 7218 and the second application 7220 each respectively send an EoP status to the EoP handler 7206. In the example of FIG. 72, all dates returned with respective EoP statuses are dates in the past (e.g., indicating that each application has already reached an end-of-purpose for the master data object).

At 7230, the EoP handler 7206 uses the EoP-status messages received from all of the connected applications to calculate a global end-of-purpose determination. In the example of FIG. 72, the EoP handler 7206 determines that end-of-purpose is reached based on all connected applications returning an EoP status with a timestamp that is in the past.

At 7232, based on determining that end-of-purpose has been globally reached for the master data object, the EoP handler 7206 sends a block command for the master data object to the event bus 7212. The event bus 7212 broadcasts the block command to all connected applications (except for the MDI service 7213). For example, at 7234 and 7236, the event bus 7212 forwards the block command for the master data object to the first application 7218 and the second application 7220, respectively.

The local blocking component of each application that receives the block command for the master data object can perform a local blocking operation for the master data object in the respective application. For example, at 7238 and 7240, local blocking components of the first application 7218 and the second application 7220 perform local blocking operations for the master data object, respectively. Each blocking operation can have a success or failure blocking status.

Each connected application can send a respective blocking status to the EoP handler 7206 by invoking an API of the EoP handler 7206. For example, at 7242 and 7244, the first application 7218 and the second application 7220 each respectively send a blocking status indicating success to the EoP handler 7206. At 7245, the EoP handler 7206 determines an overall blocking status of success 7246. For example, since each blocking status received by the EoP handler 7206 indicates successful blocking, aligned blocking has occurred in the landscape. In response to determining that aligned blocking has occurred in the landscape, the EoP handler 7206 can send a delete-object request 7247 to the event bus 7212 requesting the event bus 7212 to send the delete-object request 7247 to the MDI service 7213. For example, at 7248, the event bus 7212 forwards the delete-object request 7247 to the MDI service 7213. In response to receiving the forwarded delete-object request 7247, the MDI service 7213 performs a delete object operation 7250 to remove the master data object from the MDI service 7213. The MDI service 7213 can safely delete the master data object because each of the other applications has already successfully locally blocked the master data object in respective applications. Accordingly, the MDI service 7213 no longer needs to maintain a copy of the master data object. After the MDI service 7213 deletes the master data object, applications that integrate with the MDI service 7213 (which can include applications that do not participate in the integrated end-of-purpose protocol) can be informed by the MDI service 7213 of the deletion of the master data object when the applications request and receive master data updates from the MDI service 7213.

Figure 73:
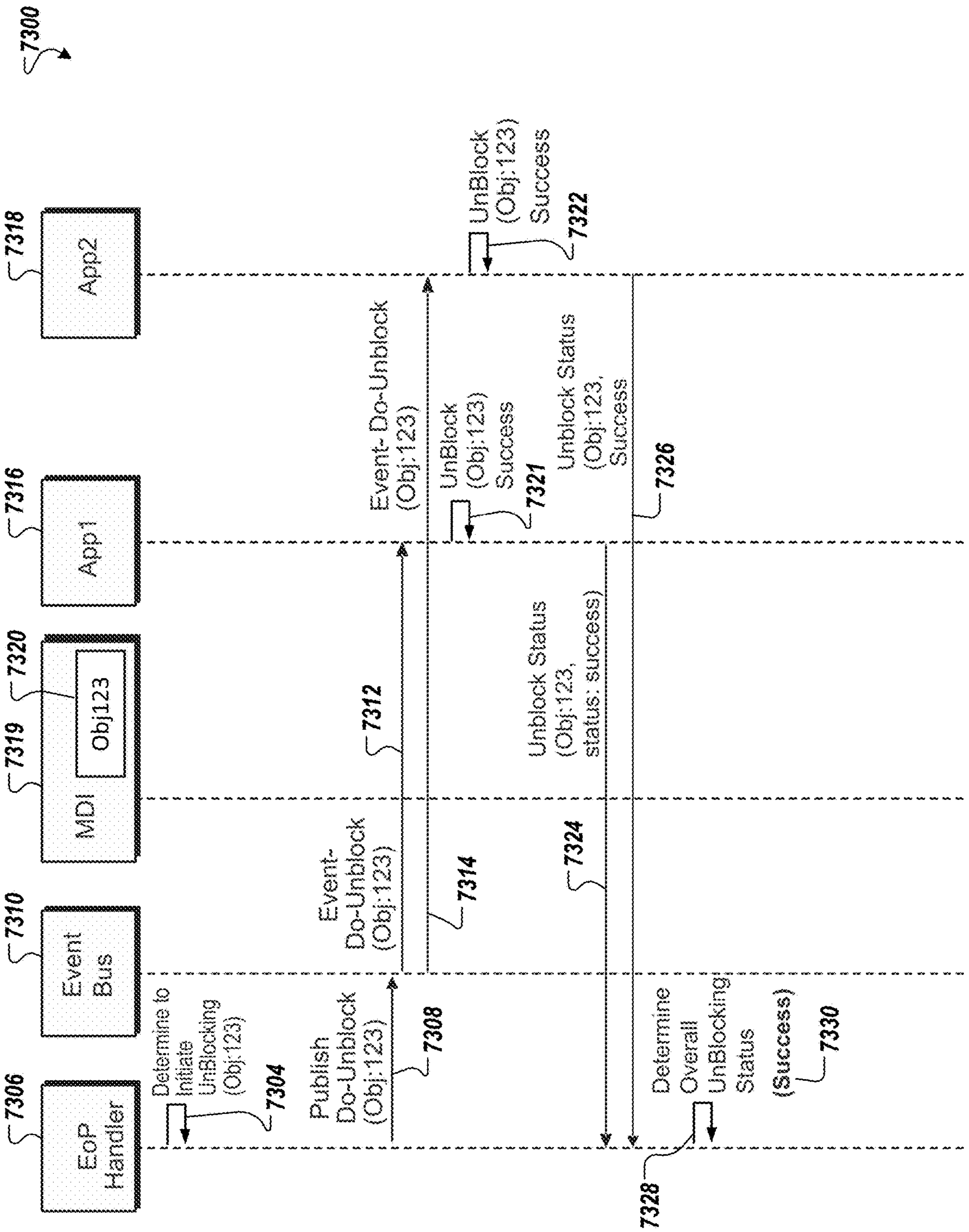
FIG. 73 is a swim lane diagram of an example method \ for determining an overall result for an unblocking protocol.

FIG. 73 is a swim lane diagram of an example method 7300 for determining an overall result for an unblocking protocol. At 7304, an EoP handler 7306 determines to initiate unblocking for a master data object with an object identifier of "123". As described above, the EoP handler 7306 can determine to initiate an unblocking protocol in response to an error condition that occurred during an aligned blocking operation (e.g., when not all applications were able to successfully block the master data object). For example, FIG. 13 above describes a situation in which not all applications were able to successfully block a master data object (e.g., due to at least one application having new activity for the master data object after previously having voted that the application could block the master data object).

At 7308, in response to determining to initiate the unblocking protocol, the EoP handler 7306 sends an unblock command for the master data object to an event bus 7310. The event bus 7310 can broadcast the unblock command to all connected applications. For example, at 7312 and 7314, the event bus 7310 forwards the unblock command for the master data object to a first application 7316 and a second application 7318, respectively.

An MDI service 7319 can have a copy 7320 of the master data object. The MDI service 7319 can be excluded from being a recipient of the unblock command (as well as from a previously-broadcasted block command, as described above with respect to FIG. 72). As described above with respect to FIG. 72, the MDI service 7319 can be excluded from a broadcast of a block command and can be instructed to delete the master data object if all connected applications successfully blocked (or deleted) the master data object. With respect to the unblocking protocol illustrated in FIG. 73, the MDI service 7319 can maintain the copy 7320 of the master data object in case any applications cannot unblock the master data object due to having deleted the master data object (e.g., an application may have deleted the master data object in response to a global block command, such as if the application has no retention policy for the master data object). An application that deletes the master data object (in response to a block command) and then subsequently receives an unblock command can receive the master data object again from the MDI service 7319, as described below with respect to FIG. 74.

In the example of FIG. 73, after having received an unblock command, the local blocking component of each application that receives the unblock command for the master data object can attempt a local unblocking operation for the master data object in the respective application. For example, at 7321 and 7322, local blocking components of the first application 7316 and the second application 7318 attempt local unblocking operations for the master data object, respectively. Each unblocking operation can have an unblocking status. Unblocking status values can include success (e.g., the master data object was successfully unblocked), already-deleted (e.g., unblocking cannot be performed due to the master data object being already deleted in the application), or error-condition (e.g., requested unblocking cannot occur for some reason other than the master data object having been deleted). For example, the local unblocking operation performed by the first application 7316 at 7321 can have a successful status and the first application 7316 can send, at 7324, an unblocking status that indicates successful unblocking of the master data object to the EoP handler 7306 by invoking an API of the EoP handler 7306. Similarly, the local unblocking operation performed by the second application 7318 at 7322 can have a successful status and the second application 7318 can send, at 7326, an unblocking status that indicates successful unblocking of the master data object to the EoP handler 7306 by invoking the API of the EoP handler 7306.

At 7328, the EoP handler 7306 determines an overall unblocking status of success 7330 for the master data object. For example, the EoP handler 7306 can evaluate all of the unblocking statuses received from the connected applications in response to the unblock command. If all unblocking statuses received from the connected applications indicate successful unblocking, as in the example of FIG. 73, the EoP handler 7306 can determine the overall unblocking status of success 7330. As another example, if any of the unblocking statuses received by the EoP handler 7306 indicate an inability to unblock the master data object (or some other error condition), the EoP handler 7306 can determine an overall unblocking status of incomplete (e.g., indicating not all applications were able to successfully unblock the master data object). As described in more detail below with respect to FIG. 74, if an unblocking status indicates that the master data object was already deleted from an application, the MDI service 7319 can redistribute the master data object to that application.

Figure 74:
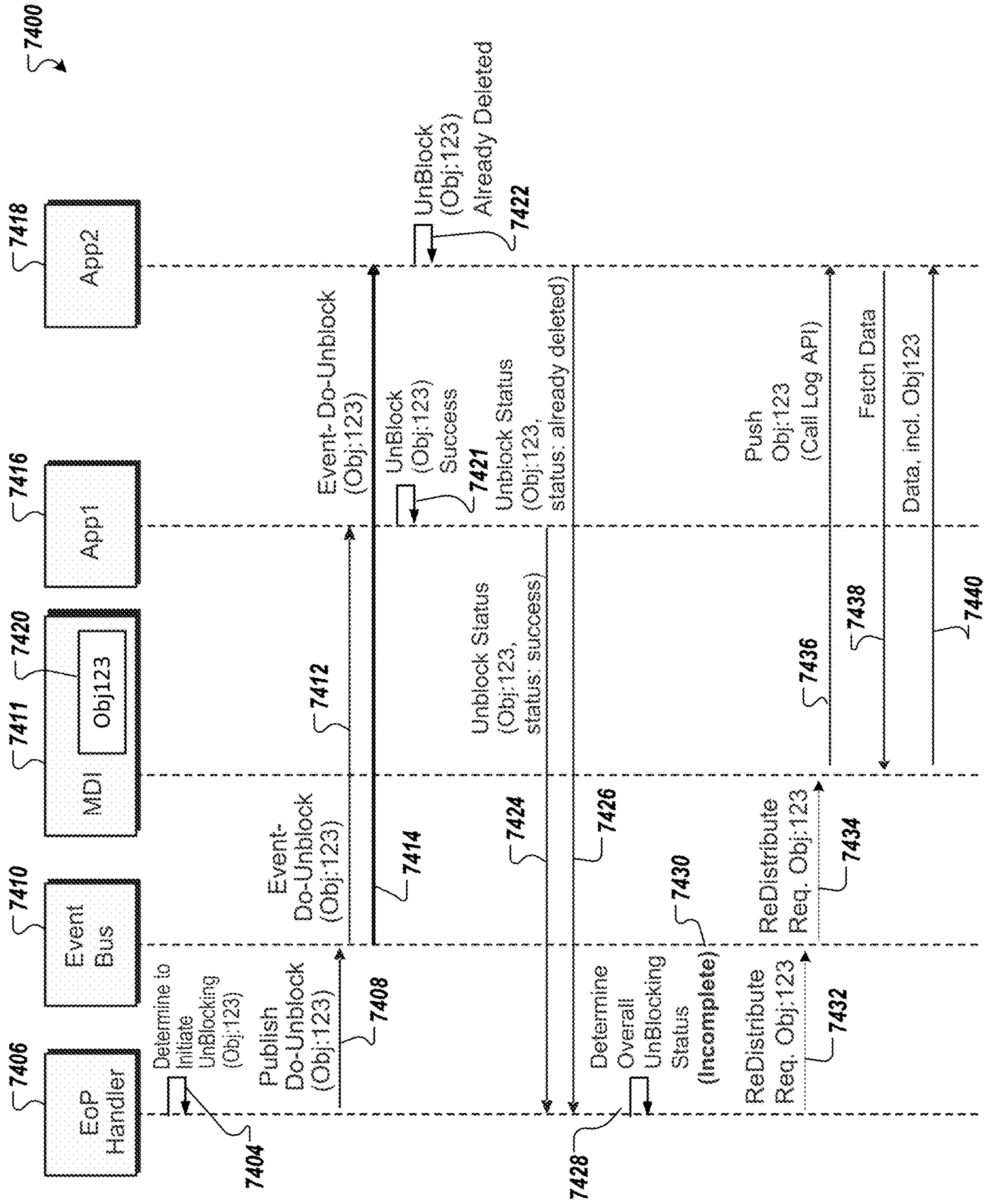
FIG. 74 is a swim lane diagram of an example method for redistributing an object after a failed unblocking protocol.

FIG. 74 is a swim lane diagram of an example method 7400 for redistributing an object after a failed unblocking protocol. At 7404, an EoP handler 7406 determines to initiate unblocking for a master data object with an object identifier of "123". As described above with respect to FIG. 13, the EoP handler 7406 can determine to initiate an unblocking protocol in response determining that not all applications were able to successfully block the master data object after a blocking command had been issued.

At 7408, in response to determining to initiate the unblocking protocol, the EoP handler 7406 sends an unblock command for the master data object to an event bus 7410. The event bus 7410 can broadcast the unblock command to all connected applications except for an MDI service 7411. For example, at 7412 and 7414, the event bus 7410 forwards the unblock command for the master data object to a first application 7416 and a second application 7418, respectively.

The MDI service 7411 can have a copy 7420 of the master data object. The MDI service 7411 can be excluded from being a recipient of the unblock command. For example, with respect to the unblocking protocol illustrated in FIG. 74, the MDI service 7411 can maintain the copy 7420 of the master data object in case any applications cannot unblock the master data object (e.g., due to having deleted the master data object in response to a global block command, such as if the application has no retention policy for the master data object). As described below, an application that deletes the master data object (e.g., in response to a block command) and then subsequently receives an unblock command can receive the master data object again from the MDI service 7411.

For example, after having received an unblock command, the local blocking component of each application that receives the unblock command for the master data object can attempt a local unblocking operation for the master data object in the respective application. For example, at 7421 and 7422, local blocking components of the first application 7416 and the second application 7418 attempt local unblocking operations for the master data object, respectively. Each unblocking operation can have an unblocking status. Unblocking status values can include success (e.g., the master data object was successfully unblocked), already-deleted (e.g., unblocking cannot be performed due to the master data object being already deleted in the application), or error-condition (e.g., requested unblocking cannot occur for some reason other than the master data object having been deleted). For example, an application may have moved the master data object to an archive storage, where the master data object is still available for auditing. The application may not be able to (or may fail to) retrieve the master data object from the archive, which can lead to an unblocking failure for the application. As an example, the local unblocking operation performed by the first application 7416 at 7421 can have a successful status and the first application 7416 can send, at 7424, an unblocking status that indicates successful unblocking of the master data object to the EoP handler 7406 by invoking an API of the EoP handler 7406. As another example, the local unblocking operation performed by the second application 7418 at 7422 can have a status of already-deleted (e.g., if the master data object has already been deleted in the second application 7418). The second application 7418 can send, at 7426, an unblocking status that indicates prior deletion of the master data object to the EoP handler 7406 by invoking an API of the EoP handler 7406.

At 7428, the EoP handler 7406 determines an overall unblocking status of incomplete 7430 for the master data object. For example, the EoP handler 7406 can evaluate all of the unblocking statuses received from the connected applications in response to the unblock command. If any of the unblocking statuses received by the EoP handler 7406 (e.g., the unblocking status received from the second application 7418) indicate an inability to unblock the master data object (or some other error condition), the EoP handler 7406 can determine the overall unblocking status of incomplete 7430.

In response to determining the overall unblocking status of incomplete 7430, the EoP handler 7206 can send a redistribute-object request 7432 to the event bus 7410 requesting the event bus 7410 to send the redistribute-object request 7432 to the MDI service 7411. For example, at 7434, the event bus 7410 forwards the redistribute-object request 7432 to the MDI service 7411. In response to receiving the redistribute-object request 7432, the MDI service 7211 can redistribute the copy 7420 of the master data object. Redistribution can happen in a variety of ways. For example, at 7436, the MDI service 7411 can push the copy 7420 of the master data object to the second application 7418 (and, for example, to other applications). As another example, at 7438, the second application 7418 can pull the copy 7420 of the master data object from the MDI service 7411, for example, using a fetch command. The MDI service 7411 can ensure, after receiving the redistribute-object request 7432, to include the copy 7420 of the master data object in data 7440 that is provided in response to the fetch command.

Different approaches of using MDI to redistribute an object or using a leading system to trigger redistribution of an object can each have advantages. With a leading system approach to redistribution, an assumption can be made that a system or application that has primary responsibility for the object can be considered the leading system. The application that has primary responsibility can be the upstream system that creates the object and provides the object to MDI, so that MDI can distribute the object downstream applications. Generally, leading systems that have responsibility for creating master data objects have a longest retention period among applications. However, in some instances, an application that creates the object and generally has responsibility for the object might not have a longest retention period. For instance, a WorkforcePerson object may be created and generally managed by a Human Resources (HR) system. Other systems can receive replications of the WorkforcePerson object. An environmental application that tracks exposure of employees to dangerous chemical may have a longer retention period than the HR system, however. When a non-leading system has a longer retention period than a leading system, using an approach of MDI redistribution (as described above with respect to FIG. 74) can be a preferred approach.

However, in some scenarios, using a leading system to redistribute an object can be preferred even when MDI is used as described above with respect to FIGS. 72-74. For example, in the scenario of FIG. 72, an object is blocked in all applications (and then deleted from the MDI service 7213). New transactional activity may occur that may make unblocking and redistribution of blocked data desirable. For example, a patient not seen in some time at a hospital may come in again to the hospital. Patient data may have been blocked for the patient (but still retained) in one more systems when end of purpose had been previously reached for a master data object for the patient.

Figure 75:
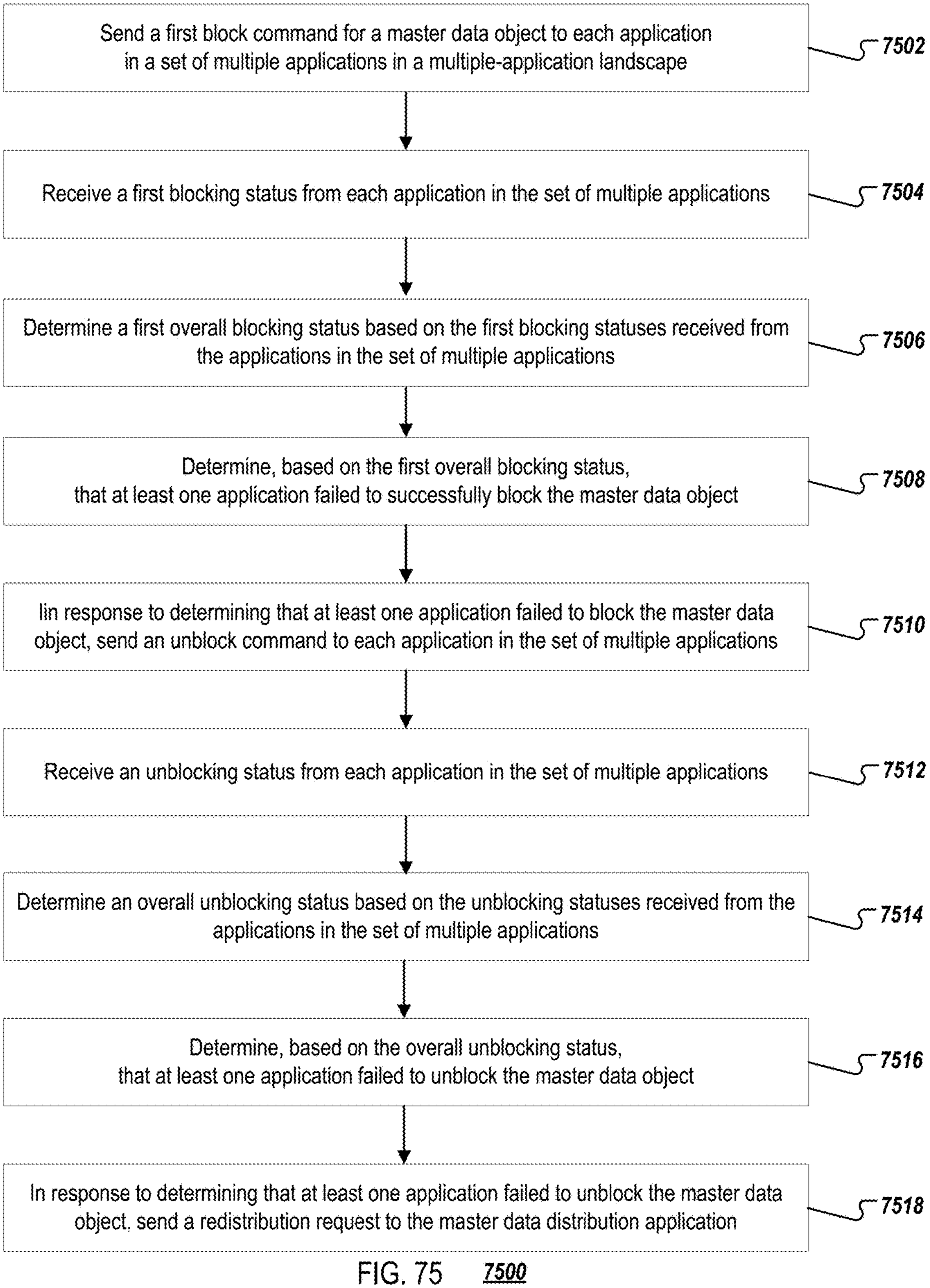
FIG. 75 is a flowchart of an example method for integrated end of purpose processing.

FIG. 75 is a flowchart of an example method 7500 for integrated end of purpose processing. It will be understood that method 7500 and related methods may be performed, for example, by any suitable system, environment, software, and hardware, or a combination of systems, environments, software, and hardware, as appropriate. For example, one or more of a client, a server, or other computing device can be used to execute method 7500 and related methods and obtain any data from the memory of a client, the server, or the other computing device. In some implementations, the method 7500 and related methods are executed by one or more components of the system 100 described above with respect to FIG. 1. For example, the method 7500 and related methods can be executed by the server 102 of FIG. 1.

At 7502, a first block command for a master data object is sent to each application in a set of multiple applications in a multiple-application landscape. The multiple-application landscape includes a master data distribution application that is separate from the applications in the set of multiple applications. The master data distribution application has no retention period for the master data object. The block command can be sent based on a determination of an integrated end of purpose for the master data object in the multiple-application landscape.

A first application that has a retention period for the master data object can, in response to the block command, block the master data object to create a blocked master data object and determine a successful blocking status. A second application that does not have a retention period for the master data object can, in response to the block command, delete the master data object and determine a successful blocking status. A third application can determine, in response to the block command, an unsuccessful blocking status based on new activity for the master data object in the first application after the first application had indicated end of purpose for the master data object.

At 7504, a first blocking status is received from each application in the set of multiple applications. A respective first blocking status for a respective application indicates whether the application successfully blocked the master data object in response to the first block command.

At 7506, a first overall blocking status is determined based on the first blocking statuses received from the applications in the set of multiple applications.

At 7508, a determination is made, based on the first overall blocking status, that at least one application failed to successfully block the master data object.

At 7510, in response to determining that at least one application failed to block the master data object, an unblock command is sent to each application in the set of multiple applications. The first application that created the blocked master data object can, in response to the unblock command, unblock the blocked master data object and determine a successful unblocking status. The second application can, in response to the unblock command, determine that the master data object has been deleted and determine an unsuccessful unblocking status.

At 7512, an unblocking status is received from each application in the set of multiple applications. A respective unblocking status for a respective application indicates whether the application successfully unblocked the master data object in response to the unblock command.

At 7514, an overall unblocking status is determined based on the unblocking statuses received from the applications in the set of multiple applications At 7516, a determination is made, based on the overall unblocking status, that at least one application failed to unblock the master data object.

At 7518, in response to determining that at least one application failed to unblock the master data object, a redistribution request is sent to the master data distribution application requesting the master data distribution application to redistribute the master data object to applications that failed to unblock the master data object.

As another example, a second block command for the master data object can be sent to each application in the set of multiple applications and a second blocking status can be received from each application. A second overall blocking status can be determined based on the received second blocking statuses and a determination can be made, based on the second overall blocking status, that each application in the set of multiple applications successfully blocked the master data object. In response to determining that each application in the set of multiple applications successfully blocked the master data object, a delete object command can be sent to the master data distribution application instructing the master data distribution application to delete the master data object. The master data distribution application can delete the master data object in response to receiving the delete object command based on not having a retention period for the master data object.

Figure 76:
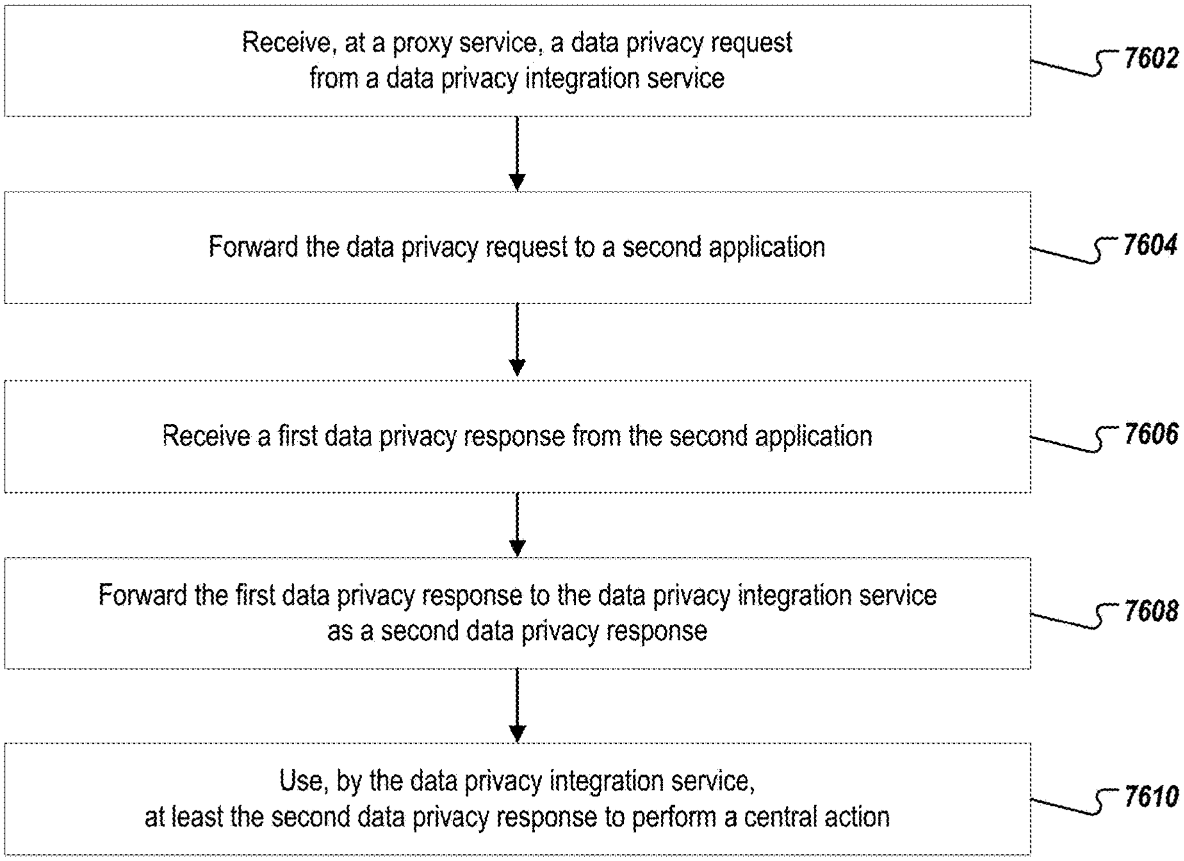
FIG. 76 is a flowchart of an example method for proxy and veto services in data privacy integration scenarios.

FIG. 76 is a flowchart of an example method 7600 for proxy and veto services in data privacy integration scenarios. Method 7600 provides additional examples and discussion to the examples discussed above for FIGS. 23, 51B, 71, and other figures. It will be understood that method 7600 and related methods may be performed, for example, by any suitable system, environment, software, and hardware, or a combination of systems, environments, software, and hardware, as appropriate. For example, one or more of a client, a server, or other computing device can be used to execute method 7600 and related methods and obtain any data from the memory of a client, the server, or the other computing device. In some implementations, the method 7600 and related methods are executed by one or more components of the system 100 described above with respect to FIG. 1. For example, the method 7600 and related methods can be executed by the server 102 of FIG. 1.

At 7602, a data privacy request is received, at a proxy service and from a data privacy integration service in a multiple-application landscape. The proxy service can correspond to the proxy service, veto service, and/or rule services described above. The data privacy request is also received from the data privacy integration service by multiple other applications in the multiple-application landscape. The data privacy integration service can include an integrated end-of-purpose protocol handler. The data privacy integration service can include an aligned purpose disassociation protocol handler. The data privacy integration service can include a data subject information aggregator. The data privacy request can be a request for a vote regarding a master data object. The request for the vote regarding the master data object can query a respective application as to whether the respective application can block the master data object. The request for the vote regarding the master data object can query a respective application as to whether the respective application can disassociate a purpose from the master data object. The data privacy request can be a data subject information request for data corresponding to a data subject.

At 7604, the data privacy request is forwarded, by the proxy service, as a forwarded data privacy request to a second application that is different from the proxy service and the multiple other applications. The second application can be a rule service that automatically determines a vote for the data privacy request based on at least one configured rule (e.g., for the master data object or some other type of rule). The second application can be an administrative application used by an administrator on an administrative device. Information from the forwarded data privacy request can be presented to the administrator in a user interface of the administrative application. The second application can be external to and not connected to the data privacy integration service and the proxy service can connect to the second application on behalf of the data privacy integration service.

At 7606, a first data privacy response is received, by the proxy service, from the second application and in response to the forwarded data privacy request. The first data privacy response received from the second application can include response information for the forwarded data privacy request that was provided by the administrator in the user interface of the administrative application. The proxy service can receive, from the second application, verified data subject data that has been verified and/or filtered by a human verifier. The data subject data received from the second application can include data subject data that has been manually obtained by an administrator. The data subject data that has been manually obtained by the administrator can include image data of scanned document data pertaining to the data subject.

At 7608, a second data privacy response that is based on the first data privacy response is forwarded, by the proxy service to the data privacy integration service. Forwarding the second data privacy response can include translating, by the proxy service, the first data privacy response from a first format used by the second application to a second format used by the data privacy integration service. The proxy service can be a veto service and the veto service can determine that the second application has not provided a response to the forwarded data privacy request within a predetermined time period. In response to determining that the second application has not provided the response to the forwarded data privacy request within the predetermined time period, the veto service can determine a default vote for the data privacy request and provide the default vote to the data privacy integration service. The default vote can be determined based on a mode of the veto service. For example, in a first mode, the veto service can determine a default no vote (e.g., cannot block the master data object, cannot disassociate the purpose from the master data object) and in a second mode the veto service can determine a default yes vote (e.g., can block the master data object, can disassociate the purpose from the master data object). When the data privacy request is a data subject information request for data corresponding to a data subject and the proxy service does not receive a response from the second application, the proxy service can send a default message (e.g., "no data found in application X") to the data privacy integration service.

At 7610, the data privacy integration service uses at least the second data privacy response received from the proxy service to perform a central action for the data privacy request. The data privacy integration service can also use at least one other data privacy response received from at least one other application when performing the central action. The integrated end-of-purpose protocol handler can perform the central action by determining, based on at least the second data privacy response, whether any application in the multiple-application landscape is unable to block the master data object. The aligned purpose disassociation protocol handler can perform the central action by determining, based on at least the second data privacy response, whether any application in the multiple-application landscape is unable to disassociate the purpose from the master data object. The data privacy request can be a data subject information request for data corresponding to a data subject. The second data privacy response can include first data subject data for the data subject received from the second application. The data subject information aggregator can perform the central action by aggregating the first data subject data received from the second application with other data subject data received from the other applications.

Multiple proxy services, veto services, rule services, external applications, or administrative devices can be used. For example, the data privacy request can be received from the data privacy integration service at a second proxy service that is different from the proxy service. The second proxy service can forward the data privacy request to a third application that is different from the second application.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:

receiving, by at least one rule service and from a data privacy integration service in a multiple-application landscape, a data privacy request for a vote regarding a master data object, wherein the data privacy request is also received from the data privacy integration service by multiple other applications in the multiple-application landscape;

determining, by at least one rule service, a respective vote for the rule service regarding the master data object, based on evaluation by the rule service of at least one preconfigured rule configured in the rule service for a type of the master data object; and providing, by each rule service that determined a respective vote, to the data privacy integration service, the respective vote determined by the rule service, wherein the data privacy integration service uses votes provided by other applications and at least one vote provided by at least one rule service to determine a consensus vote for the master data object for the data privacy request, wherein vote providers comprise responders of the data privacy request.

2. The computer-implemented method of claim 1, wherein:

the data privacy integration service comprises an integrated end-of-purpose protocol handler;

the data privacy request for the vote regarding the master data object queries a respective responder as to whether the respective responder can block the master data object; and the integrated end-of-purpose protocol handler determines the consensus vote by determining whether any vote provided by a responder indicates the responder is unable to block the master data object.

3. The computer-implemented method of claim 1, wherein:

the data privacy integration service comprises an aligned purpose disassociation protocol handler;

the data privacy request for the vote regarding the master data object queries a respective responder as to whether the respective responder can disassociate a purpose from the master data object; and the aligned purpose disassociation protocol handler determines the consensus vote by determining whether any vote provided by a responder indicates the responder is unable to disassociate the purpose from the master data object.

4. The computer-implemented method of claim 1, wherein the rule service evaluates a rule that specifies that a default vote should be provided by the rule service if the rule service does not otherwise determine a vote within a predetermined time period.

5. The computer-implemented method of claim 4, wherein the rule service forwards the data privacy request to an administrator and provides the default vote if the administrator does not provide a vote within the predetermined time period.

6. The computer-implemented method of claim 5, wherein information from the data privacy request is presented to the administrator in a user interface of an administrative application.

7. The computer-implemented method of claim 6, wherein the administrator provides the vote in the user interface of the administrative application and the administrative application provides the vote to the rule service.

8. The computer-implemented method of claim 4, wherein the rule service forwards the data privacy request to a different system and provides the default vote if the different system does not provide a vote within the predetermined time period.

9. The computer-implemented method of claim 8, wherein the different system is external to and not connected to the data privacy integration service and the rule service connects to the different system on behalf of the data privacy integration service.

10. The computer-implemented method of claim 8, wherein the rule service:

receives a data privacy response to the data privacy request from the different system; and translates the data privacy response received from the different system from a first format used by the different system to a second format used by the data privacy integration service.

11. The computer-implemented method of claim 4, wherein the default vote is determined based on a mode of the rule service, wherein in a first mode, the rule service determines a default no vote and in a second mode the rule service determines a default yes vote.

12. A computer-implemented system comprising:

one or more computers; and a computer-readable medium coupled to the one or more computers having instructions stored thereon which, when executed by the one or more computers, cause the one or more computers to perform operations comprising:

receiving, by at least one rule service and from a data privacy integration service in a multiple-application landscape, a data privacy request for a vote regarding a master data object, wherein the data privacy request is also received from the data privacy integration service by multiple other applications in the multiple-application landscape;

determining, by at least one rule service, a respective vote for the rule service regarding the master data object, based on evaluation by the rule service of at least one preconfigured rule configured in the rule service for a type of the master data object; and providing, by each rule service that determined a respective vote, to the data privacy integration service, the respective vote determined by the rule service, wherein the data privacy integration service uses votes provided by other applications and at least one vote provided by at least one rule service to determine a consensus vote for the master data object for the data privacy request, wherein vote providers comprise responders of the data privacy request.

13. The computer-implemented system of claim 12, wherein:

the data privacy integration service comprises an integrated end-of-purpose protocol handler;

the data privacy request for the vote regarding the master data object queries a respective responder as to whether the respective responder can block the master data object; and the integrated end-of-purpose protocol handler determines the consensus vote by determining whether any vote provided by a responder indicates the responder is unable to block the master data object.

14. The computer-implemented system of claim 12, wherein:

the data privacy integration service comprises an aligned purpose disassociation protocol handler;

the data privacy request for the vote regarding the master data object queries a respective responder as to whether the respective responder can disassociate a purpose from the master data object; and the aligned purpose disassociation protocol handler determines the consensus vote by determining whether any vote provided by a responder indicates the responder is unable to disassociate the purpose from the master data object.

15. The computer-implemented system of claim 12, wherein the rule service evaluates a rule that specifies that a default vote should be provided by the rule service if the rule service does not otherwise determine a vote within a predetermined time period.

16. The computer-implemented system of claim 15, wherein the rule service forwards the data privacy request to an administrator and provides the default vote if the administrator does not provide a vote within the predetermined time period.

17. A non-transitory, computer-readable medium coupled to one or more processors and having instructions stored thereon which, when executed by the one or more processors, cause the one or more processors to perform operations, the operations comprising:

receiving, by at least one rule service and from a data privacy integration service in a multiple-application landscape, a data privacy request for a vote regarding a master data object, wherein the data privacy request is also received from the data privacy integration service by multiple other applications in the multiple-application landscape;

determining, by at least one rule service, a respective vote for the rule service regarding the master data object, based on evaluation by the rule service of at least one preconfigured rule configured in the rule service for a type of the master data object; and providing, by each rule service that determined a respective vote, to the data privacy integration service, the respective vote determined by the rule service, wherein the data privacy integration service uses votes provided by other applications and at least one vote provided by at least one rule service to determine a consensus vote for the master data object for the data privacy request, wherein vote providers comprise responders of the data privacy request.

18. The computer-readable medium of claim 17, wherein:

the data privacy integration service comprises an integrated end-of-purpose protocol handler;

the data privacy request for the vote regarding the master data object queries a respective responder as to whether the respective responder can block the master data object; and the integrated end-of-purpose protocol handler determines the consensus vote by determining whether any vote provided by a responder indicates the responder is unable to block the master data object.

19. The computer-readable medium of claim 17, wherein:

the data privacy integration service comprises an aligned purpose disassociation protocol handler;

the data privacy request for the vote regarding the master data object queries a respective responder as to whether the respective responder can disassociate a purpose from the master data object; and the aligned purpose disassociation protocol handler determines the consensus vote by determining whether any vote provided by a responder indicates the responder is unable to disassociate the purpose from the master data object.

20. The computer-readable medium of claim 17, wherein the rule service evaluates a rule that specifies that a default vote should be provided by the rule service if the rule service does not otherwise determine a vote within a predetermined time period.

* * * * *